(12) United States Patent
Massiglia et al.

(10) Patent No.: US 12,050,689 B2
(45) Date of Patent: Jul. 30, 2024

(54) HOST ANOMALY-BASED GENERATION OF SNAPSHOTS

(71) Applicant: Pure Storage, Inc., Mountain View, CA (US)

(72) Inventors: Paul R Massiglia, Colorado Springs, CO (US); Ronald Karr, Palo Alto, CA (US); John Colgrove, Los Altos, CA (US)

(73) Assignee: Pure Storage, Inc., Mountain View, CA (US)

( * ) Notice: Subject to any disclaimer, the term of this patent is extended or adjusted under 35 U.S.C. 154(b) by 522 days.

(21) Appl. No.: 17/409,135

(22) Filed: Aug. 23, 2021

(65) Prior Publication Data

US 2021/0382995 A1 Dec. 9, 2021

Related U.S. Application Data

(63) Continuation-in-part of application No. 16/916,903, filed on Jun. 30, 2020, now Pat. No. 11,341,236, (Continued)

(51) Int. Cl.
*G06F 21/56* (2013.01)
*G06F 3/06* (2006.01)
(Continued)

(52) U.S. Cl.
CPC .......... *G06F 21/568* (2013.01); *G06F 3/0619* (2013.01); *G06F 3/0659* (2013.01);
(Continued)

(58) Field of Classification Search
CPC .... G06F 21/568; G06F 21/554; G06F 3/0619; G06F 3/0659; G06F 3/067; G06F 21/78
See application file for complete search history.

(56) References Cited

U.S. PATENT DOCUMENTS 5,208,813 A 5/1993 Stallmo
5,403,639 A 4/1995 Belsan
(Continued)

FOREIGN PATENT DOCUMENTS

CN 103370685 10/2013
CN 103370686 10/2013
(Continued)

OTHER PUBLICATIONS

"International Search Report and Written Opinion received in International Application No. PCT/US2022/047039 dated Jan. 30, 2023".
(Continued)

*Primary Examiner* — Gary S Gracia
(74) *Attorney, Agent, or Firm* — ALG Intellectual Property, LLC

(57) ABSTRACT

An illustrative method includes a data protection system detecting a request provided by a host to perform an operation with respect to a storage system, detecting, based on the request, an anomaly associated with the host, and directing, based on the detecting the anomaly associated with the host, the storage system to generate a recovery dataset for data maintained by the storage system.

20 Claims, 42 Drawing Sheets

Related U.S. Application Data which is a continuation-in-part of application No. 16/711,060, filed on Dec. 11, 2019, now abandoned.

(60) Provisional application No. 62/939,518, filed on Nov. 22, 2019.

(51) Int. Cl.
   *G06F 21/55* (2013.01)
   *G06F 21/78* (2013.01)

(52) U.S. Cl.
   CPC ............ *G06F 3/067* (2013.01); *G06F 21/554* (2013.01); *G06F 21/78* (2013.01)

(56) References Cited

U.S. PATENT DOCUMENTS

| | | |
|---|---|---|
| 5,940,838 A | 8/1999 | Schmuck et al. |
| 6,263,350 B1 | 7/2001 | Wollrath et al. |
| 6,412,045 B1 | 6/2002 | Dekoning et al. |
| 6,595,035 B1 | 7/2003 | Maley |
| 6,718,448 B1 | 4/2004 | Ofer |
| 6,757,769 B1 | 6/2004 | Ofer |
| 6,799,283 B1 | 9/2004 | Tamai et al. |
| 6,834,298 B1 | 12/2004 | Singer et al. |
| 6,850,938 B1 | 2/2005 | Sadjadi |
| 6,915,434 B1 | 7/2005 | Kuroda |
| 6,973,549 B1 | 12/2005 | Testardi |
| 7,028,216 B2 | 4/2006 | Aizawa et al. |
| 7,028,218 B2 | 4/2006 | Schwarm et al. |
| 7,039,827 B2 | 5/2006 | Meyer et al. |
| 7,043,759 B2 | 5/2006 | Kaashoek et al. |
| 7,149,858 B1 | 12/2006 | Kiselev |
| 7,213,264 B2 | 5/2007 | Poletto et al. |
| 7,216,164 B1 | 5/2007 | Whitmore et al. |
| 7,231,050 B1 | 6/2007 | Harris |
| 7,418,730 B2 | 8/2008 | Chu et al. |
| 7,467,333 B2 | 12/2008 | Keeton |
| 7,467,400 B1 | 12/2008 | Moss et al. |
| 7,559,088 B2 | 7/2009 | Cohen et al. |
| 7,735,136 B2 | 6/2010 | Mantripragada et al. |
| 7,739,211 B2 | 6/2010 | Coffman et al. |
| 7,774,848 B2 | 8/2010 | D'Mello |
| 7,783,666 B1 | 8/2010 | Zhuge |
| 7,783,682 B1 | 8/2010 | Patterson |
| 7,797,436 B2 | 9/2010 | Banerjee |
| 7,797,748 B2 | 9/2010 | Zheng |
| 7,873,619 B1 | 1/2011 | Faibish et al. |
| 7,913,300 B1 | 3/2011 | Flank et al. |
| 7,930,260 B2 | 4/2011 | Deo et al. |
| 7,933,936 B2 | 4/2011 | Aggarwal et al. |
| 7,958,159 B1 | 6/2011 | Tran |
| 7,979,613 B2 | 7/2011 | Zohar et al. |
| 7,996,547 B2 | 8/2011 | Sudhakar |
| 8,001,601 B2 | 8/2011 | Duffield et al. |
| 8,010,519 B2 | 8/2011 | Hsu |
| 8,010,667 B2 | 8/2011 | Zhang |
| 8,086,652 B1 | 12/2011 | Bisson et al. |
| 8,117,464 B1 | 2/2012 | Kogelnik |
| 8,132,260 B1 | 3/2012 | Mayer et al. |
| 8,137,199 B2 | 3/2012 | Douceur et al. |
| 8,200,887 B2 | 6/2012 | Bennett |
| 8,205,065 B2 | 6/2012 | Matze |
| 8,260,792 B1 | 9/2012 | Hsu |
| 8,266,267 B1 | 9/2012 | Guruswamy et al. |
| 8,352,540 B2 | 1/2013 | Anglin et al. |
| 8,356,001 B2 | 1/2013 | Collazo |
| 8,433,869 B1 | 4/2013 | Natanzon et al. |
| 8,468,604 B2 | 6/2013 | Claudatos et al. |
| 8,484,163 B1 | 7/2013 | Yucel et al. |
| 8,495,037 B1 | 7/2013 | Westenberg |
| 8,495,740 B1 | 7/2013 | Rouland et al. |
| 8,499,349 B1 | 7/2013 | Cruz et al. |
| 8,504,876 B2 | 8/2013 | Mork et al. |
| 8,527,544 B1 | 9/2013 | Colgrove et al. |
| 8,554,703 B1 | 10/2013 | Lin et al. |
| 8,560,747 B1 | 10/2013 | Tan et al. |
| 8,621,241 B1 | 12/2013 | Stephenson |
| 8,635,498 B2 | 1/2014 | Kahana et al. |
| 8,667,583 B2 | 3/2014 | Polyakov et al. |
| 8,683,591 B2 | 3/2014 | Wittenschlaeger |
| 8,688,620 B2 | 4/2014 | Viswanathan et al. |
| 8,700,875 B1 | 4/2014 | Barron et al. |
| 8,719,936 B2 | 5/2014 | Moffie et al. |
| 8,745,004 B1 | 6/2014 | Natanzon et al. |
| 8,751,463 B1 | 6/2014 | Chamness |
| 8,793,790 B2 | 7/2014 | Khurana et al. |
| 8,806,160 B2 | 8/2014 | Colgrove et al. |
| 8,862,727 B2 | 10/2014 | Jayachandran et al. |
| 8,862,728 B2 | 10/2014 | Jayachandran et al. |
| 8,863,293 B2 | 10/2014 | Christodorescu et al. |
| 8,874,850 B1 | 10/2014 | Goodson et al. |
| 8,904,092 B2 | 12/2014 | Tucek |
| 8,931,107 B1 * | 1/2015 | Brandwine ......... G06F 11/1461 |
| | | 714/4.11 |
| 8,959,305 B1 | 2/2015 | Lecrone et al. |
| 9,015,426 B2 | 4/2015 | Stabrawa |
| 9,032,160 B1 | 5/2015 | Natanzon et al. |
| 9,069,955 B2 | 6/2015 | Dolph et al. |
| 9,081,713 B1 | 7/2015 | Bennett |
| 9,088,601 B2 | 7/2015 | Friedrichs et al. |
| 9,092,146 B2 | 7/2015 | Jayaraman et al. |
| 9,111,232 B2 | 8/2015 | Chi et al. |
| 9,112,895 B1 | 8/2015 | Lin |
| 9,189,334 B2 | 11/2015 | Bennett |
| 9,197,514 B2 | 11/2015 | Finkelstein |
| 9,197,658 B2 | 11/2015 | Wittenschlaeger |
| 9,215,158 B1 * | 12/2015 | Adogla ............... H04L 67/10 |
| 9,235,481 B1 | 1/2016 | Natanzon et al. |
| 9,246,935 B2 | 1/2016 | Lietz |
| 9,256,736 B2 | 2/2016 | Tao |
| 9,256,746 B2 | 2/2016 | Toback |
| 9,258,321 B2 | 2/2016 | Amsler et al. |
| 9,268,797 B2 | 2/2016 | Whitehead et al. |
| 9,311,182 B2 | 4/2016 | Bennett |
| 9,317,686 B1 | 4/2016 | Ye et al. |
| 9,324,022 B2 | 4/2016 | Williams, Jr. et al. |
| 9,338,181 B1 | 5/2016 | Burns et al. |
| 9,348,742 B1 | 5/2016 | Brezinski |
| 9,349,103 B2 | 5/2016 | Eberhardt, III et al. |
| 9,350,750 B1 | 5/2016 | Aval et al. |
| 9,363,286 B2 | 6/2016 | Golovanov |
| 9,386,009 B1 | 7/2016 | Marion et al. |
| 9,407,646 B2 | 8/2016 | Mota et al. |
| 9,423,967 B2 | 8/2016 | Colgrove et al. |
| 9,430,156 B1 | 8/2016 | Shilane et al. |
| 9,436,396 B2 | 9/2016 | Colgrove et al. |
| 9,436,720 B2 | 9/2016 | Colgrove et al. |
| 9,454,321 B1 * | 9/2016 | Smaldone ............... G06F 3/061 |
| 9,454,476 B2 | 9/2016 | Colgrove et al. |
| 9,454,477 B2 | 9/2016 | Colgrove et al. |
| 9,477,693 B1 | 10/2016 | Bachu et al. |
| 9,479,518 B1 | 10/2016 | Fang et al. |
| 9,483,189 B2 | 11/2016 | Brooker |
| 9,503,469 B2 | 11/2016 | Lin |
| 9,513,820 B1 | 12/2016 | Shalev |
| 9,516,016 B2 | 12/2016 | Colgrove et al. |
| 9,516,053 B1 | 12/2016 | Muddu et al. |
| 9,552,248 B2 | 1/2017 | Miller et al. |
| 9,588,847 B1 | 3/2017 | Natanzon et al. |
| 9,591,010 B1 | 3/2017 | Muddu et al. |
| 9,596,254 B1 | 3/2017 | Muddu et al. |
| 9,609,009 B2 | 3/2017 | Muddu et al. |
| 9,609,011 B2 | 3/2017 | Muddu et al. |
| 9,619,772 B1 * | 4/2017 | Adogla ............. G06Q 10/0635 |
| 9,628,507 B2 | 4/2017 | Haq et al. |
| 9,632,870 B2 | 4/2017 | Bennett |
| 9,641,544 B1 | 5/2017 | Treat et al. |
| 9,646,262 B2 | 5/2017 | Phillipps et al. |
| 9,665,302 B1 | 5/2017 | Huff et al. |
| 9,665,303 B1 | 5/2017 | Huff et al. |
| 9,667,641 B2 | 5/2017 | Muddu et al. |
| 9,679,165 B2 | 6/2017 | Pittelko |
| 9,684,472 B2 | 6/2017 | Bish et al. |

(56) References Cited

U.S. PATENT DOCUMENTS

| | | |
|---|---|---|
| 9,686,294 B2 | 6/2017 | Kantor et al. |
| 9,692,785 B2 | 6/2017 | Stephan et al. |
| 9,692,789 B2 | 6/2017 | Kirti et al. |
| 9,696,939 B1 | 7/2017 | Frank et al. |
| 9,699,205 B2 | 7/2017 | Muddu et al. |
| 9,705,914 B2 | 7/2017 | Di Pietro et al. |
| 9,705,970 B2 | 7/2017 | Pomerantz et al. |
| 9,716,723 B2 | 7/2017 | Wittenschlaeger |
| 9,729,572 B1 | 8/2017 | Adams et al. |
| 9,736,243 B2 | 8/2017 | Chablani |
| 9,798,754 B1 | 10/2017 | Shilane |
| 9,798,891 B2 | 10/2017 | Deulgaonkar |
| 9,813,432 B2 | 11/2017 | Dasgupta et al. |
| 9,813,435 B2 | 11/2017 | Muddu et al. |
| 9,813,500 B2 | 11/2017 | Mason |
| 9,824,609 B2 | 11/2017 | Sadeh-Koniecpol et al. |
| 9,838,409 B2 | 12/2017 | Flacher et al. |
| 9,838,410 B2 | 12/2017 | Muddu et al. |
| 9,838,419 B1 | 12/2017 | Fleyder et al. |
| 9,866,573 B2 | 1/2018 | Kozlovsky |
| 9,870,251 B2 | 1/2018 | Baracaldo |
| 9,875,355 B1 | 1/2018 | Williams |
| 9,888,032 B2 | 2/2018 | Dekel et al. |
| 9,900,332 B2 | 2/2018 | Muddu et al. |
| 9,904,587 B1 | 2/2018 | Potlapally et al. |
| 9,916,849 B1 | 3/2018 | Mader et al. |
| 9,917,854 B2 | 3/2018 | Natanzon et al. |
| 9,923,910 B2 | 3/2018 | Di Pietro et al. |
| 9,928,155 B2 | 3/2018 | Xu et al. |
| 9,930,061 B2 | 3/2018 | Zandani |
| 9,940,206 B2 | 4/2018 | Bogdanov et al. |
| 9,948,663 B1 | 4/2018 | Wang et al. |
| 9,954,884 B2 | 4/2018 | Hassell et al. |
| 10,003,605 B2 | 6/2018 | Muddu et al. |
| 10,015,177 B2 | 7/2018 | Muddu et al. |
| 10,025,583 B2 | 7/2018 | Butler et al. |
| 10,032,033 B2 | 7/2018 | Gu et al. |
| 10,037,779 B1 | 7/2018 | Mendonsa et al. |
| 10,038,707 B2 | 7/2018 | Muddu et al. |
| 10,042,697 B2 | 8/2018 | Ahad |
| 10,078,473 B2 | 9/2018 | Ahmed |
| 10,079,842 B1* | 9/2018 | Brandwine .......... H04L 63/1441 |
| 10,102,356 B1 | 10/2018 | Sahin et al. |
| 10,120,887 B1 | 11/2018 | Patel |
| 10,122,740 B1 | 11/2018 | Finkelshtein et al. |
| 10,122,752 B1 | 11/2018 | Soman et al. |
| 10,148,675 B1* | 12/2018 | Brandwine .......... H04L 63/1425 |
| 10,169,601 B2 | 1/2019 | Arasan |
| 10,359,939 B2 | 7/2019 | Wei et al. |
| 10,409,986 B1 | 9/2019 | Natanzon et al. |
| 10,423,541 B1 | 9/2019 | Levin et al. |
| 10,438,000 B1 | 10/2019 | Gu |
| 10,466,925 B1 | 11/2019 | Blanco et al. |
| 10,476,907 B2 | 11/2019 | Hittel et al. |
| 10,496,487 B1 | 12/2019 | Natanzon et al. |
| 10,503,611 B1 | 12/2019 | Srivastav et al. |
| 10,503,897 B1 | 12/2019 | Striem-Amit |
| 10,503,904 B1 | 12/2019 | Singh et al. |
| 10,516,688 B2 | 12/2019 | Tamir et al. |
| 10,530,791 B2 | 1/2020 | Astigarraga |
| 10,536,482 B2 | 1/2020 | Gabaev et al. |
| 10,542,021 B1 | 1/2020 | Mehr |
| 10,558,809 B1 | 2/2020 | Joyce |
| 10,567,500 B1 | 2/2020 | Leshinsky et al. |
| 10,587,484 B2 | 3/2020 | Nazar |
| 10,587,632 B1 | 3/2020 | Perumalla |
| 10,609,066 B1 | 3/2020 | Nossik et al. |
| 10,614,430 B2 | 4/2020 | Armstrong |
| 10,628,585 B2 | 4/2020 | Tamir et al. |
| 10,628,586 B1 | 4/2020 | Jung |
| 10,673,628 B1 | 6/2020 | Shtop et al. |
| 10,685,293 B1 | 6/2020 | Heimann |
| 10,725,965 B1 | 7/2020 | Rokicki |
| 10,733,290 B2 | 8/2020 | Berler et al. |
| 10,735,448 B2 | 8/2020 | Kesin et al. |
| 10,742,682 B2 | 8/2020 | Yu et al. |
| 10,778,714 B2 | 9/2020 | Shi |
| 10,789,363 B1 | 9/2020 | Gursoy |
| 10,810,088 B1 | 10/2020 | Gu et al. |
| 10,819,721 B1 | 10/2020 | Jenkins |
| 10,826,918 B1 | 11/2020 | Rasovic |
| 10,853,200 B2 | 12/2020 | Chen et al. |
| 10,860,405 B1* | 12/2020 | Zonneveld .......... G06F 11/0709 |
| 10,884,914 B2 | 1/2021 | Ahmed et al. |
| 10,902,929 B1 | 1/2021 | Pawlowski |
| 10,965,708 B2 | 3/2021 | Kolychev et al. |
| 10,992,581 B2 | 4/2021 | Kuang et al. |
| 11,005,936 B1 | 5/2021 | Liu et al. |
| 11,010,233 B1 | 5/2021 | Golden et al. |
| 11,025,665 B2 | 6/2021 | Newman et al. |
| 11,030,314 B2 | 6/2021 | Kucherov et al. |
| 11,036,392 B2 | 6/2021 | Resch |
| 11,038,902 B2 | 6/2021 | Zaw |
| 11,044,263 B2 | 6/2021 | McLean et al. |
| 11,049,039 B2 | 6/2021 | Zimmer |
| 11,055,411 B2 | 7/2021 | Strogov et al. |
| 11,055,652 B1 | 7/2021 | Kannan et al. |
| 11,089,105 B1* | 8/2021 | Karumbunathan ... G06F 16/275 |
| 11,100,232 B1 | 8/2021 | Juncker |
| 11,170,107 B2 | 11/2021 | Selvaraj et al. |
| 11,212,681 B1 | 12/2021 | Balaramn et al. |
| 11,336,685 B1 | 5/2022 | Rodriguez et al. |
| 11,372,811 B1* | 6/2022 | Ciubotariu .......... G06F 21/565 |
| 2002/0035683 A1 | 3/2002 | Kaashoek et al. |
| 2002/0038436 A1 | 3/2002 | Suzuki |
| 2002/0087544 A1 | 7/2002 | Selkirk et al. |
| 2002/0178335 A1 | 11/2002 | Selkirk et al. |
| 2002/0184362 A1 | 12/2002 | Banerjee |
| 2003/0140209 A1 | 7/2003 | Testardi |
| 2004/0049572 A1 | 3/2004 | Yamamoto et al. |
| 2004/0117640 A1 | 6/2004 | Chu et al. |
| 2004/0139340 A1 | 7/2004 | Johnson et al. |
| 2005/0020945 A1 | 1/2005 | Tosaya |
| 2005/0023239 A1 | 2/2005 | Lin |
| 2005/0066095 A1 | 3/2005 | Mullick et al. |
| 2005/0193236 A1 | 9/2005 | Stager et al. |
| 2005/0203921 A1 | 9/2005 | Newman et al. |
| 2005/0216535 A1 | 9/2005 | Saika et al. |
| 2005/0223154 A1 | 10/2005 | Uemura |
| 2005/0223239 A1 | 10/2005 | Dotan |
| 2006/0005227 A1 | 1/2006 | Samuelsson et al. |
| 2006/0021029 A1 | 1/2006 | Brickell et al. |
| 2006/0074940 A1 | 4/2006 | Craft et al. |
| 2006/0136365 A1 | 6/2006 | Kedem et al. |
| 2006/0155946 A1 | 7/2006 | Ji |
| 2007/0006319 A1 | 1/2007 | Fitzgibbon et al. |
| 2007/0067585 A1 | 3/2007 | Ueda et al. |
| 2007/0105589 A1 | 5/2007 | Lu |
| 2007/0109856 A1 | 5/2007 | Pellicone et al. |
| 2007/0162954 A1 | 7/2007 | Pela |
| 2007/0171562 A1 | 7/2007 | Maejima et al. |
| 2007/0174673 A1 | 7/2007 | Kawaguchi et al. |
| 2007/0220068 A1 | 9/2007 | Thompson |
| 2007/0220313 A1 | 9/2007 | Katsuragi et al. |
| 2007/0245090 A1 | 10/2007 | King et al. |
| 2007/0266179 A1 | 11/2007 | Chavan et al. |
| 2008/0022378 A1 | 1/2008 | Repasi et al. |
| 2008/0047013 A1 | 2/2008 | Claudatos et al. |
| 2008/0059699 A1 | 3/2008 | Kubo et al. |
| 2008/0065852 A1 | 3/2008 | Moore et al. |
| 2008/0095182 A1 | 4/2008 | Ezur |
| 2008/0098476 A1 | 4/2008 | Syversen |
| 2008/0134174 A1 | 6/2008 | Sheu et al. |
| 2008/0155191 A1 | 6/2008 | Anderson et al. |
| 2008/0178040 A1 | 7/2008 | Kobayashi |
| 2008/0209096 A1 | 8/2008 | Lin et al. |
| 2008/0244205 A1 | 10/2008 | Amano et al. |
| 2008/0275928 A1 | 11/2008 | Shuster |
| 2008/0282045 A1 | 11/2008 | Biswas et al. |
| 2008/0285083 A1 | 11/2008 | Aonuma |
| 2008/0307171 A1* | 12/2008 | Kinoshita .......... G06F 21/805 |
| | | 711/E12.091 |
| 2008/0307270 A1 | 12/2008 | Li |
| 2009/0003131 A1 | 1/2009 | Meyer |

(56) References Cited

U.S. PATENT DOCUMENTS

| | | |
|---|---|---|
| 2009/0006587 A1 | 1/2009 | Richter |
| 2009/0037662 A1 | 2/2009 | La Frese et al. |
| 2009/0106318 A1 | 4/2009 | Mantripragada et al. |
| 2009/0133122 A1 | 5/2009 | Koo et al. |
| 2009/0158432 A1 | 6/2009 | Zheng et al. |
| 2009/0204700 A1 | 8/2009 | Sudhakar |
| 2009/0204858 A1 | 8/2009 | Kawaba |
| 2009/0228648 A1 | 9/2009 | Wack |
| 2009/0300084 A1 | 12/2009 | Whitehouse |
| 2010/0005173 A1 | 1/2010 | Baskaran et al. |
| 2010/0017870 A1 | 1/2010 | Kargupta |
| 2010/0031361 A1 | 2/2010 | Shukla |
| 2010/0057673 A1 | 3/2010 | Savov |
| 2010/0058026 A1 | 3/2010 | Heil et al. |
| 2010/0058122 A1 | 3/2010 | Compton |
| 2010/0067706 A1 | 3/2010 | Anan et al. |
| 2010/0077205 A1 | 3/2010 | Ekstrom et al. |
| 2010/0082879 A1 | 4/2010 | Mckean et al. |
| 2010/0106905 A1 | 4/2010 | Kurashige et al. |
| 2010/0153620 A1 | 6/2010 | Mckean et al. |
| 2010/0153641 A1 | 6/2010 | Jagadish et al. |
| 2010/0191897 A1 | 7/2010 | Zhang et al. |
| 2010/0250713 A1 | 9/2010 | Sudhakar |
| 2010/0250802 A1 | 9/2010 | Waugh et al. |
| 2010/0250882 A1 | 9/2010 | Hutchison et al. |
| 2010/0281225 A1 | 11/2010 | Chen et al. |
| 2010/0287327 A1 | 11/2010 | Li et al. |
| 2010/0306849 A1 | 12/2010 | Zheng |
| 2011/0072300 A1 | 3/2011 | Rousseau |
| 2011/0072515 A1 | 3/2011 | Park et al. |
| 2011/0125716 A1 | 5/2011 | Drews et al. |
| 2011/0121231 A1 | 6/2011 | Haas et al. |
| 2011/0145497 A1 | 6/2011 | Bish et al. |
| 2011/0145598 A1 | 6/2011 | Smith et al. |
| 2011/0161559 A1 | 6/2011 | Yurzola et al. |
| 2011/0167221 A1 | 7/2011 | Pangal et al. |
| 2011/0191537 A1 | 8/2011 | Kawaguchi |
| 2011/0238634 A1 | 9/2011 | Kobara |
| 2011/0258164 A1 | 10/2011 | Mandagere |
| 2011/0271146 A1 | 11/2011 | Mork et al. |
| 2011/0296237 A1 | 12/2011 | Mandagere et al. |
| 2012/0023375 A1 | 1/2012 | Dutta et al. |
| 2012/0036309 A1 | 2/2012 | Dillow et al. |
| 2012/0096225 A1 | 4/2012 | Khawand et al. |
| 2012/0117029 A1 | 5/2012 | Gold |
| 2012/0151593 A1 | 6/2012 | Kang et al. |
| 2012/0159629 A1 | 6/2012 | Lee et al. |
| 2012/0191933 A1 | 7/2012 | Zbiciak et al. |
| 2012/0198175 A1 | 8/2012 | Atkisson |
| 2012/0198192 A1 | 8/2012 | Balasubramanian et al. |
| 2012/0221803 A1 | 8/2012 | Stabrawa |
| 2012/0296922 A1 | 11/2012 | Hsu |
| 2012/0303868 A1 | 11/2012 | Tucek |
| 2012/0311708 A1 | 12/2012 | Agarwal |
| 2012/0324236 A1 | 12/2012 | Srivastava et al. |
| 2012/0330954 A1 | 12/2012 | Sivasubramanian et al. |
| 2013/0036465 A1 | 2/2013 | Chuan et al. |
| 2013/0042052 A1 | 2/2013 | Colgrove et al. |
| 2013/0046995 A1 | 2/2013 | Movshovitz |
| 2013/0047029 A1 | 2/2013 | Ikeuchi et al. |
| 2013/0061322 A1 | 3/2013 | Sethumadhavan |
| 2013/0091102 A1 | 4/2013 | Nayak |
| 2013/0117507 A1 | 5/2013 | Chiang |
| 2013/0205110 A1 | 8/2013 | Kettner |
| 2013/0227236 A1 | 8/2013 | Flynn et al. |
| 2013/0254412 A1 | 9/2013 | Menezes |
| 2013/0275391 A1 | 10/2013 | Batwara et al. |
| 2013/0275656 A1 | 10/2013 | Talagala et al. |
| 2013/0283058 A1 | 10/2013 | Fiske et al. |
| 2013/0290648 A1 | 10/2013 | Shao et al. |
| 2013/0318314 A1 | 11/2013 | Markus et al. |
| 2013/0339303 A1 | 12/2013 | Potter et al. |
| 2013/0340082 A1 | 12/2013 | Shanley |
| 2014/0004829 A1 | 1/2014 | Rieger et al. |
| 2014/0006760 A1 | 1/2014 | Nemiroff et al. |
| 2014/0052946 A1 | 2/2014 | Kimmel |
| 2014/0059688 A1 | 2/2014 | Margalit |
| 2014/0068791 A1 | 3/2014 | Resch |
| 2014/0089730 A1 | 3/2014 | Watanabe et al. |
| 2014/0101361 A1 | 4/2014 | Gschwind |
| 2014/0143517 A1 | 5/2014 | Jin et al. |
| 2014/0172929 A1 | 6/2014 | Sedayao et al. |
| 2014/0196115 A1 | 7/2014 | Pelykh |
| 2014/0201150 A1 | 7/2014 | Kumarasamy et al. |
| 2014/0201836 A1 | 7/2014 | Amsler |
| 2014/0215129 A1 | 7/2014 | Kuzmin et al. |
| 2014/0229131 A1 | 8/2014 | Cohen et al. |
| 2014/0229452 A1 | 8/2014 | Serita et al. |
| 2014/0230051 A1 | 8/2014 | Vallinayagam |
| 2014/0230062 A1 | 8/2014 | Kumaran |
| 2014/0236891 A1 | 8/2014 | Talius et al. |
| 2014/0281155 A1 | 9/2014 | Cohen |
| 2014/0281308 A1 | 9/2014 | Lango et al. |
| 2014/0282518 A1* | 9/2014 | Banerjee ................ G06F 21/53 718/1 |
| 2014/0283061 A1 | 9/2014 | Quinlan et al. |
| 2014/0289853 A1 | 9/2014 | Teddy et al. |
| 2014/0325115 A1 | 10/2014 | Ramsundar et al. |
| 2015/0047045 A1 | 2/2015 | Salsamendi |
| 2015/0081950 A1 | 3/2015 | Nezu |
| 2015/0106557 A1 | 4/2015 | Yu et al. |
| 2015/0106562 A1 | 4/2015 | Helmer |
| 2015/0221349 A1 | 8/2015 | Jeon et al. |
| 2015/0234709 A1 | 8/2015 | Koarashi |
| 2015/0242856 A1 | 8/2015 | Dhurandhar |
| 2015/0244775 A1 | 8/2015 | Vibhor et al. |
| 2015/0278534 A1 | 10/2015 | Thiyagarajan et al. |
| 2015/0331759 A1* | 11/2015 | Brettell ............. G06F 11/1456 707/640 |
| 2015/0355957 A1 | 12/2015 | Steiner |
| 2015/0365427 A1 | 12/2015 | Ben-Shalom |
| 2015/0381646 A1 | 12/2015 | Lin |
| 2016/0019114 A1 | 1/2016 | Han et al. |
| 2016/0028754 A1 | 1/2016 | Mota et al. |
| 2016/0078080 A1 | 3/2016 | Chen et al. |
| 2016/0078245 A1 | 3/2016 | Amarendran et al. |
| 2016/0098191 A1 | 4/2016 | Golden et al. |
| 2016/0098199 A1 | 4/2016 | Golden et al. |
| 2016/0099963 A1 | 4/2016 | Mahaffey et al. |
| 2016/0112397 A1 | 4/2016 | Mankovskii |
| 2016/0164918 A1 | 6/2016 | Satish et al. |
| 2016/0170823 A1 | 6/2016 | Miller et al. |
| 2016/0173599 A1 | 6/2016 | Chablani |
| 2016/0277423 A1 | 9/2016 | Apostolescu et al. |
| 2016/0323105 A1 | 11/2016 | Lee et al. |
| 2016/0352518 A1 | 12/2016 | Ford et al. |
| 2016/0352766 A1 | 12/2016 | Flacher et al. |
| 2016/0357483 A1 | 12/2016 | Okita et al. |
| 2016/0366156 A1 | 12/2016 | Kantor et al. |
| 2016/0371152 A1 | 12/2016 | Parshin et al. |
| 2016/0378352 A1 | 12/2016 | Khan et al. |
| 2017/0034189 A1 | 2/2017 | Powell |
| 2017/0054686 A1 | 2/2017 | Malkov et al. |
| 2017/0061322 A1 | 3/2017 | Chari et al. |
| 2017/0063534 A1 | 3/2017 | Brown |
| 2017/0063887 A1 | 3/2017 | Muddu et al. |
| 2017/0063888 A1 | 3/2017 | Muddu et al. |
| 2017/0063907 A1 | 3/2017 | Muddu et al. |
| 2017/0063908 A1 | 3/2017 | Muddu et al. |
| 2017/0063909 A1 | 3/2017 | Muddu et al. |
| 2017/0063910 A1 | 3/2017 | Muddu et al. |
| 2017/0063911 A1 | 3/2017 | Muddu et al. |
| 2017/0063912 A1 | 3/2017 | Muddu et al. |
| 2017/0104773 A1 | 4/2017 | Flacher et al. |
| 2017/0109057 A1 | 4/2017 | Karaca |
| 2017/0118240 A1 | 4/2017 | Devi Reddy |
| 2017/0131934 A1 | 5/2017 | Kaczmarczyk et al. |
| 2017/0134403 A1 | 5/2017 | Hearn |
| 2017/0134410 A1 | 5/2017 | Muddu et al. |
| 2017/0134415 A1 | 5/2017 | Muddu et al. |
| 2017/0140156 A1 | 5/2017 | Gu et al. |
| 2017/0142140 A1 | 5/2017 | Muddu et al. |
| 2017/0147457 A1 | 5/2017 | Abhijeet |
| 2017/0149730 A1 | 5/2017 | Baughman |

(56) References Cited

U.S. PATENT DOCUMENTS

| | | |
|---|---|---|
| 2017/0155652 A1 | 6/2017 | Most et al. |
| 2017/0177867 A1 | 6/2017 | Crofton et al. |
| 2017/0180394 A1 | 6/2017 | Crofton et al. |
| 2017/0185296 A1 | 6/2017 | Dong et al. |
| 2017/0185301 A1 | 6/2017 | Mcgiverin |
| 2017/0192940 A1 | 7/2017 | Ghatage et al. |
| 2017/0206353 A1 | 7/2017 | Jai et al. |
| 2017/0213128 A1 | 7/2017 | Hammond et al. |
| 2017/0213154 A1 | 7/2017 | Hammond et al. |
| 2017/0213155 A1 | 7/2017 | Hammond et al. |
| 2017/0213156 A1 | 7/2017 | Hammond et al. |
| 2017/0223031 A1 | 8/2017 | Gu et al. |
| 2017/0235497 A1 | 8/2017 | Shih |
| 2017/0235507 A1 | 8/2017 | Sinha |
| 2017/0235561 A1 | 8/2017 | Butler et al. |
| 2017/0235758 A1 | 8/2017 | Venkatesh et al. |
| 2017/0242788 A1 | 8/2017 | Ahmed et al. |
| 2017/0255652 A1 | 9/2017 | Kong et al. |
| 2017/0256325 A1 | 9/2017 | Pappu et al. |
| 2017/0277596 A1 | 9/2017 | Kyathanahalli et al. |
| 2017/0279836 A1 | 9/2017 | Vasseur et al. |
| 2017/0300422 A1 | 10/2017 | Szubbocsev |
| 2017/0301220 A1 | 10/2017 | Jarrell et al. |
| 2017/0316210 A1 | 11/2017 | Patil et al. |
| 2017/0324755 A1 | 11/2017 | Dekel et al. |
| 2017/0329966 A1 | 11/2017 | Koganti |
| 2017/0331892 A1 | 11/2017 | Crofton et al. |
| 2017/0346839 A1 | 11/2017 | Peppe |
| 2017/0364681 A1 | 12/2017 | Roguine |
| 2017/0374083 A1 | 12/2017 | Cohen et al. |
| 2018/0004659 A1 | 1/2018 | Greenspan |
| 2018/0007069 A1 | 1/2018 | Hunt et al. |
| 2018/0024893 A1 | 1/2018 | Sella |
| 2018/0032758 A1 | 2/2018 | Wang et al. |
| 2018/0032759 A1 | 2/2018 | Radocchia et al. |
| 2018/0048658 A1 | 2/2018 | Hittel et al. |
| 2018/0052999 A1 | 2/2018 | Mitola |
| 2018/0054452 A1 | 2/2018 | Muddu et al. |
| 2018/0054454 A1 | 2/2018 | Astigarraga |
| 2018/0063179 A1 | 3/2018 | Salajegheh et al. |
| 2018/0069888 A1 | 3/2018 | Muddu et al. |
| 2018/0082075 A1 | 3/2018 | Copeland |
| 2018/0087984 A1* | 3/2018 | Hagelin ............... G01L 1/146 |
| 2018/0103106 A1 | 4/2018 | Cocagne et al. |
| 2018/0113638 A1 | 4/2018 | Petersen et al. |
| 2018/0114234 A1 | 4/2018 | Fighel |
| 2018/0115577 A1 | 4/2018 | Shukla et al. |
| 2018/0124073 A1 | 5/2018 | Scherman et al. |
| 2018/0124086 A1 | 5/2018 | Flacher et al. |
| 2018/0129579 A1 | 5/2018 | Debnath et al. |
| 2018/0139053 A1 | 5/2018 | Kadam et al. |
| 2018/0157834 A1 | 6/2018 | Continella et al. |
| 2018/0159866 A1* | 6/2018 | Sheri ................ G06F 21/566 |
| 2018/0189000 A1 | 7/2018 | Li et al. |
| 2018/0189508 A1 | 7/2018 | Li et al. |
| 2018/0191763 A1 | 7/2018 | Hillard et al. |
| 2018/0198765 A1 | 7/2018 | Maybee et al. |
| 2018/0198812 A1 | 7/2018 | Christodorescu et al. |
| 2018/0204000 A1 | 7/2018 | Charters et al. |
| 2018/0211038 A1 | 7/2018 | Breiman et al. |
| 2018/0211039 A1 | 7/2018 | Tamir et al. |
| 2018/0212987 A1 | 7/2018 | Tamir et al. |
| 2018/0217996 A1 | 8/2018 | Joshi et al. |
| 2018/0225461 A1 | 8/2018 | Kotler et al. |
| 2018/0239920 A1 | 8/2018 | Gupta |
| 2018/0246649 A1 | 8/2018 | Datar et al. |
| 2018/0248896 A1 | 8/2018 | Challita et al. |
| 2018/0275902 A1 | 9/2018 | Monday et al. |
| 2018/0278647 A1 | 9/2018 | Gabaev et al. |
| 2018/0284758 A1 | 10/2018 | Cella |
| 2018/0285382 A1 | 10/2018 | Mehta et al. |
| 2018/0285567 A1 | 10/2018 | Raman |
| 2018/0293374 A1 | 10/2018 | Chen |
| 2018/0295149 A1 | 10/2018 | Gazit et al. |
| 2018/0307839 A1 | 10/2018 | Bhave et al. |
| 2018/0351969 A1 | 12/2018 | Macleod et al. |
| 2018/0373877 A1 | 12/2018 | Bruso |
| 2018/0375826 A1 | 12/2018 | Chang et al. |
| 2019/0007284 A1 | 1/2019 | Doshi |
| 2019/0012382 A1 | 1/2019 | Minkovicz et al. |
| 2019/0018784 A1 | 1/2019 | Ishii et al. |
| 2019/0034647 A1 | 1/2019 | Avrahami |
| 2019/0036958 A1 | 1/2019 | Shi |
| 2019/0041842 A1 | 2/2019 | Cella et al. |
| 2019/0042744 A1 | 2/2019 | Rajasekharan et al. |
| 2019/0044951 A1 | 2/2019 | Zivkovic et al. |
| 2019/0081876 A1 | 3/2019 | Ghare |
| 2019/0081981 A1 | 3/2019 | Bansal |
| 2019/0087256 A1 | 3/2019 | Horrell et al. |
| 2019/0087572 A1 | 3/2019 | Ellam et al. |
| 2019/0098040 A1 | 3/2019 | Newman et al. |
| 2019/0102262 A1 | 4/2019 | Sukhomlinov et al. |
| 2019/0108099 A1 | 4/2019 | Mazumdar |
| 2019/0108119 A1 | 4/2019 | Gholamipour et al. |
| 2019/0108340 A1 | 4/2019 | Bedhapudi et al. |
| 2019/0108341 A1 | 4/2019 | Bedhapudi et al. |
| 2019/0108889 A1 | 4/2019 | Gholamipour et al. |
| 2019/0109870 A1 | 4/2019 | Bedhapudi et al. |
| 2019/0121576 A1 | 4/2019 | Jean |
| 2019/0121972 A1 | 4/2019 | Norvill |
| 2019/0130097 A1 | 5/2019 | Berler et al. |
| 2019/0138727 A1 | 5/2019 | Dontov et al. |
| 2019/0155868 A1* | 5/2019 | Largo Del Amo ........................ G06F 16/9574 |
| 2019/0156861 A1 | 5/2019 | Burton et al. |
| 2019/0158512 A1 | 5/2019 | Zhang |
| 2019/0188065 A1 | 6/2019 | Anghel |
| 2019/0188385 A1 | 6/2019 | Selvaraj et al. |
| 2019/0196731 A1 | 6/2019 | Sapuntzakis et al. |
| 2019/0197239 A1 | 6/2019 | Govardhan |
| 2019/0207960 A1 | 7/2019 | Chu et al. |
| 2019/0209022 A1 | 7/2019 | Sobol |
| 2019/0213137 A1 | 7/2019 | Lin et al. |
| 2019/0213586 A1 | 7/2019 | Baratam |
| 2019/0245883 A1* | 8/2019 | Gorodissky ......... H04L 63/1433 |
| 2019/0258426 A1 | 8/2019 | Roh |
| 2019/0266335 A1 | 8/2019 | Robinson |
| 2019/0288840 A1 | 9/2019 | Gallancy et al. |
| 2019/0294507 A1 | 9/2019 | Linnen et al. |
| 2019/0294778 A1* | 9/2019 | De Gaetano .......... G06F 21/552 |
| 2019/0303571 A1 | 10/2019 | Chelarescu et al. |
| 2019/0303572 A1 | 10/2019 | Chelarescu et al. |
| 2019/0303573 A1 | 10/2019 | Chelarescu et al. |
| 2019/0303575 A1 | 10/2019 | Chelarescu et al. |
| 2019/0319980 A1 | 10/2019 | Levy et al. |
| 2019/0319987 A1 | 10/2019 | Levy |
| 2019/0324644 A1 | 10/2019 | Jin et al. |
| 2019/0340136 A1* | 11/2019 | Irwin .................... G06F 3/0608 |
| 2019/0347418 A1 | 11/2019 | Strogov et al. |
| 2019/0354443 A1 | 11/2019 | Haustein et al. |
| 2019/0369918 A1 | 12/2019 | Cho et al. |
| 2019/0392417 A1 | 12/2019 | Li et al. |
| 2020/0019470 A1 | 1/2020 | Wolfson et al. |
| 2020/0036736 A1 | 1/2020 | Novikov et al. |
| 2020/0042707 A1 | 2/2020 | Kucherov et al. |
| 2020/0065483 A1 | 2/2020 | Mu et al. |
| 2020/0076781 A1* | 3/2020 | Edwards ............. H04W 12/009 |
| 2020/0076831 A1 | 3/2020 | Baughman et al. |
| 2020/0082075 A1* | 3/2020 | Rinaldi ............... G06F 12/1458 |
| 2020/0104475 A1 | 4/2020 | Guionneau et al. |
| 2020/0128027 A1 | 4/2020 | Hittel et al. |
| 2020/0128028 A1 | 4/2020 | Hittel et al. |
| 2020/0134049 A1 | 4/2020 | Bassov et al. |
| 2020/0159674 A1 | 5/2020 | Morgan et al. |
| 2020/0186602 A1 | 6/2020 | Leshinsky et al. |
| 2020/0201777 A1 | 6/2020 | Kalamatianos et al. |
| 2020/0204509 A1 | 6/2020 | Strogov et al. |
| 2020/0210580 A1* | 7/2020 | Strogov .................. G06N 20/20 |
| 2020/0233959 A1 | 7/2020 | Spurlock et al. |
| 2020/0236085 A1 | 7/2020 | Spurlock et al. |
| 2020/0236121 A1 | 7/2020 | Spurlock et al. |
| 2020/0250051 A1 | 8/2020 | Chen et al. |
| 2020/0250522 A1 | 8/2020 | Meiri et al. |
| 2020/0257798 A1 | 8/2020 | Rao et al. |

(56) References Cited

U.S. PATENT DOCUMENTS

| | | |
|---|---|---|
| 2020/0257820 A1 | 8/2020 | Li |
| 2020/0274887 A1 | 8/2020 | Zaw |
| 2020/0285737 A1 | 9/2020 | Kraus et al. |
| 2020/0293696 A1 | 9/2020 | Motwani et al. |
| 2020/0319979 A1 | 10/2020 | Kulaga et al. |
| 2020/0336503 A1* | 10/2020 | Xu .................. G06F 11/076 |
| 2020/0341685 A1 | 10/2020 | Sharon et al. |
| 2020/0344254 A1 | 10/2020 | Kokko |
| 2020/0356686 A1 | 11/2020 | Vijayvargiya et al. |
| 2020/0358780 A1 | 11/2020 | Anbalagan |
| 2020/0364128 A1 | 11/2020 | Vittal et al. |
| 2020/0364429 A1 | 11/2020 | Yang |
| 2020/0389469 A1 | 12/2020 | Litichever et al. |
| 2021/0006575 A1 | 1/2021 | McLean et al. |
| 2021/0011654 A1 | 1/2021 | Lee et al. |
| 2021/0026961 A1 | 1/2021 | Underwood et al. |
| 2021/0056203 A1 | 2/2021 | Qiao et al. |
| 2021/0089224 A1* | 3/2021 | Beeston ................ G06F 3/0647 |
| 2021/0111881 A1 | 4/2021 | Migault et al. |
| 2021/0117377 A1 | 4/2021 | Savir et al. |
| 2021/0152520 A1 | 5/2021 | Rigor et al. |
| 2021/0152592 A1 | 5/2021 | Martynenko et al. |
| 2021/0157523 A1 | 5/2021 | Matsushita et al. |
| 2021/0182397 A1 | 6/2021 | Karnik et al. |
| 2021/0216478 A1 | 7/2021 | Miller et al. |
| 2021/0216625 A1 | 7/2021 | Miller et al. |
| 2021/0216630 A1 | 7/2021 | Karr |
| 2021/0216633 A1 | 7/2021 | Lee et al. |
| 2021/0216646 A1 | 7/2021 | Miller et al. |
| 2021/0216648 A1 | 7/2021 | Child et al. |
| 2021/0216666 A1 | 7/2021 | Miller et al. |
| 2021/0224379 A1 | 7/2021 | Pientka et al. |
| 2021/0240608 A1 | 8/2021 | Jean et al. |
| 2021/0255938 A1 | 8/2021 | Baker et al. |
| 2021/0271757 A1 | 9/2021 | Horspool et al. |
| 2021/0314341 A1 | 10/2021 | Moskovich et al. |
| 2021/0319103 A1 | 10/2021 | Constantinescu et al. |
| 2021/0374096 A1 | 12/2021 | Von Hein et al. |
| 2021/0382995 A1* | 12/2021 | Massiglia ............... G06F 21/78 |
| 2021/0397711 A1 | 12/2021 | Karr |
| 2022/0229909 A1 | 7/2022 | Shachar et al. |
| 2022/0239690 A1 | 7/2022 | Arnon et al. |

FOREIGN PATENT DOCUMENTS

| | | |
|---|---|---|
| CN | 104025010 | 11/2016 |
| EP | 3066610 | 9/2016 |
| EP | 3082047 | 10/2016 |
| EP | 3120235 | 1/2017 |
| JP | 2007087036 | 4/2007 |
| JP | 2007094472 | 4/2007 |
| JP | 2008250667 | 10/2008 |
| JP | 2010211681 | 9/2010 |
| WO | 1995002349 | 1/1995 |
| WO | 1999013403 | 3/1999 |
| WO | 2008102347 | 8/2008 |
| WO | 2010071655 | 6/2010 |

OTHER PUBLICATIONS

Strunk, J.D. et al., Self-Securing Storage: Protecting Data in Compromised Systems, Carnegie Mellon University.

"Final Office Action received in U.S. Appl. No. 16/249,534 dated Dec. 4, 2020.".

"Non-Final Office Action received in U.S. Appl. No. 16/168,224 dated Aug. 11, 2020.".

"Non-Final Office Action received in U.S. Appl. No. 16/249,534 dated Sep. 11, 2020.".

Kharaz, A. et al., "Unveil: A Large-Scale, Automated Approach to Detecting Ransomware, 25th USENIX Security Symposium, Aug. 10-12, 2016, Austin, TX. ISBN 978-1-931971-32-4. https://www.usenix.org/conference/usenixsecurity16/technical-sessions/presentation/kharaz.".

Mehnaz, S. et al., "RWGuard: A Real-Time Detection System Against Cryptographic Ransomware, Springer Nature Switzerland AG 2018. Raid LNCS 11050, pp. 114-136, 2018. https://doi.org/10/1007/978-3-030-00470-5_6.".

Microsoft Corporation, et al., "Fundamentals of Garbage Collection, Retrieved Aug. 30, 2013 via the WayBack Machine, 11 pages.".

Microsoft Corporation, et al., "GCSettings.IsServerGC Property, Retrieved Oct. 27, 2013 via the WayBack Machine, 3 pages.".

Scaife, N. et al., "CryptoLock (and Drop It): Stopping Ransomware Attacks on User Data, 2016 IEEE 36th International Conference on Distributed Computing Systems.".

\* cited by examiner

HOST ANOMALY-BASED GENERATION OF SNAPSHOTS

RELATED APPLICATIONS

This application is a continuation-in-part of U.S. patent application Ser. No. 16/916,903, filed Jun. 30, 2020, which application is a continuation-in-part of U.S. patent application Ser. No. 16/711,060, filed Dec. 11, 2019, which claims priority under 35 U.S.C. § 119(e) to U.S. Provisional Patent Application No. 62/939,518, filed Nov. 22, 2019. These applications are all incorporated herein by reference in their entireties.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DESCRIPTION OF EMBODIMENTS

Figure 1A:
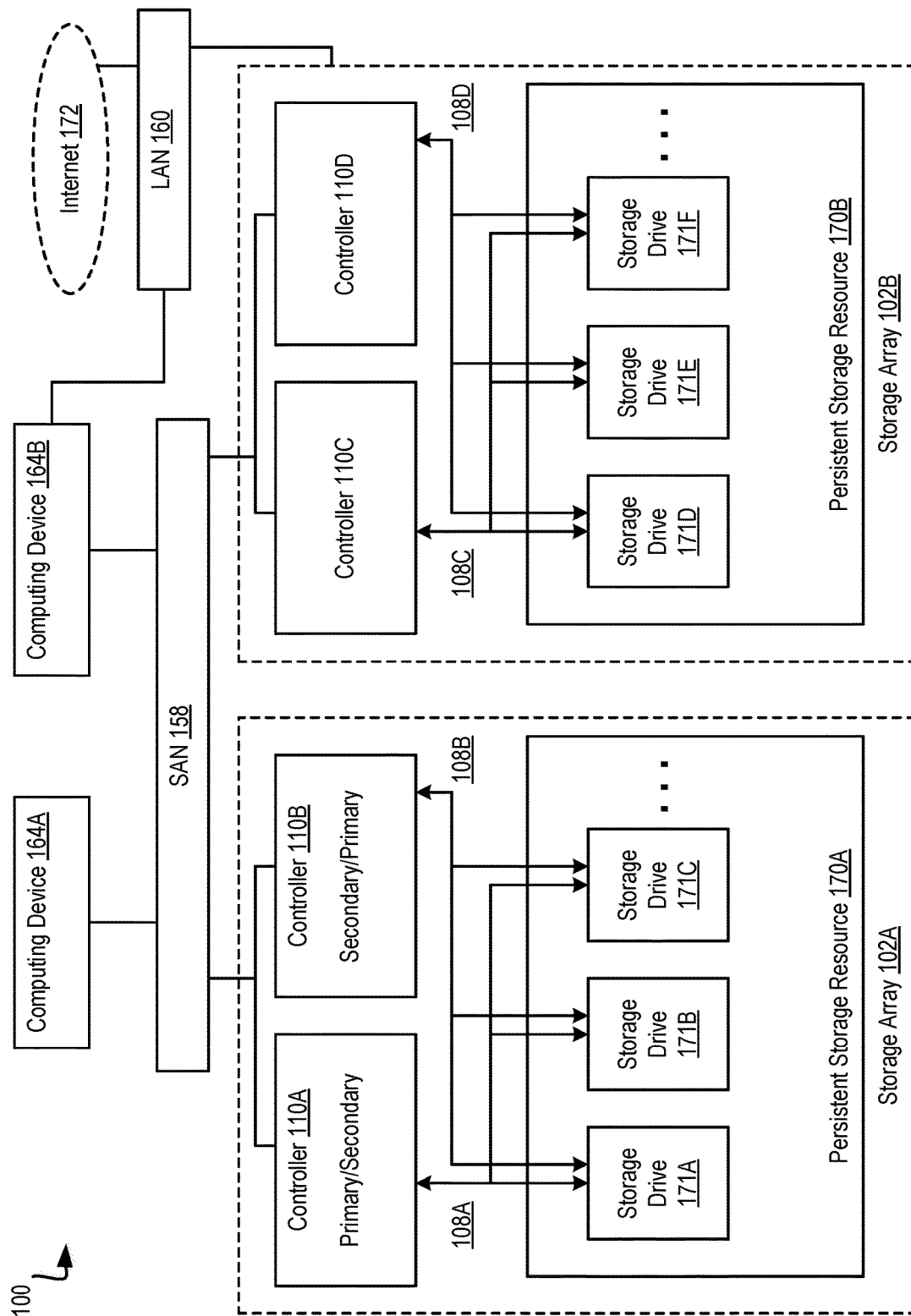
FIG. 1A illustrates a first example system for data storage in accordance with some implementations.

Example methods, systems, apparatuses, and products for detecting a possible security threat against a storage system, performing one or more remedial actions in response to detecting the possible security threat, and other embodiments associated with detecting and reacting to possible security threats in accordance with embodiments of the present disclosure are described with reference to the accompanying drawings, beginning with FIG. 1A. FIG. 1A illustrates an example system for data storage, in accordance with some implementations. System 100 (also referred to as "storage system" herein) includes numerous elements for purposes of illustration rather than limitation. It may be noted that system 100 may include the same, more, or fewer elements configured in the same or different manner in other implementations.

System 100 includes a number of computing devices 164A-B. Computing devices (also referred to as "client devices" herein) may be embodied, for example, a server in a data center, a workstation, a personal computer, a notebook, or the like. Computing devices 164A-B may be coupled for data communications to one or more storage arrays 102A-B through a storage area network ('SAN') 158 or a local area network ('LAN') 160.

The SAN 158 may be implemented with a variety of data communications fabrics, devices, and protocols. For example, the fabrics for SAN 158 may include Fibre Channel, Ethernet, Infiniband, Serial Attached Small Computer System Interface ('SAS'), or the like. Data communications protocols for use with SAN 158 may include Advanced Technology Attachment ('ATA'), Fibre Channel Protocol, Small Computer System Interface ('SCSI'), Internet Small Computer System Interface ('iSCSI'), HyperSCSI, Non-Volatile Memory Express ('NVMe') over Fabrics, or the like. It may be noted that SAN 158 is provided for illustration, rather than limitation. Other data communication couplings may be implemented between computing devices 164A-B and storage arrays 102A-B.

The LAN 160 may also be implemented with a variety of fabrics, devices, and protocols. For example, the fabrics for LAN 160 may include Ethernet (802.3), wireless (802.11), or the like. Data communication protocols for use in LAN 160 may include Transmission Control Protocol ('TCP'), User Datagram Protocol ('UDP'), Internet Protocol ('IP'), HyperText Transfer Protocol ('HTTP'), Wireless Access Protocol ('WAP'), Handheld Device Transport Protocol ('HDTP'), Session Initiation Protocol ('SIP'), Real Time Protocol ('RTP'), or the like.

Storage arrays 102A-B may provide persistent data storage for the computing devices 164A-B. Storage array 102A may be contained in a chassis (not shown), and storage array 102B may be contained in another chassis (not shown), in implementations. Storage array 102A and 102B may include one or more storage array controllers 110A-D (also referred to as "controller" herein). A storage array controller 110A-D may be embodied as a module of automated computing machinery comprising computer hardware, computer software, or a combination of computer hardware and software. In some implementations, the storage array controllers 110A-D may be configured to carry out various storage tasks. Storage tasks may include writing data received from the computing devices 164A-B to storage array 102A-B, erasing data from storage array 102A-B, retrieving data from storage array 102A-B and providing data to computing devices 164A-B, monitoring and reporting of disk utilization and performance, performing redundancy operations, such as Redundant Array of Independent Drives ('RAID') or RAID-like data redundancy operations, compressing data, encrypting data, and so forth.

Storage array controller 110A-D may be implemented in a variety of ways, including as a Field Programmable Gate Array ('FPGA'), a Programmable Logic Chip ('PLC'), an Application Specific Integrated Circuit ('ASIC'), System-on-Chip ('SOC'), or any computing device that includes discrete components such as a processing device, central processing unit, computer memory, or various adapters. Storage array controller 110A-D may include, for example, a data communications adapter configured to support communications via the SAN 158 or LAN 160. In some implementations, storage array controller 110A-D may be independently coupled to the LAN 160. In implementations, storage array controller 110A-D may include an I/O controller or the like that couples the storage array controller 110A-D for data communications, through a midplane (not shown), to a persistent storage resource 170A-B (also referred to as a "storage resource" herein). The persistent storage resource 170A-B main include any number of storage drives 171A-F (also referred to as "storage devices" herein) and any number of non-volatile Random Access Memory ('NVRAM') devices (not shown).

In some implementations, the NVRAM devices of a persistent storage resource 170A-B may be configured to receive, from the storage array controller 110A-D, data to be stored in the storage drives 171A-F. In some examples, the data may originate from computing devices 164A-B. In some examples, writing data to the NVRAM device may be carried out more quickly than directly writing data to the storage drive 171A-F. In implementations, the storage array controller 110A-D may be configured to utilize the NVRAM devices as a quickly accessible buffer for data destined to be written to the storage drives 171A-F. Latency for write requests using NVRAM devices as a buffer may be improved relative to a system in which a storage array controller 110A-D writes data directly to the storage drives 171A-F. In some implementations, the NVRAM devices may be implemented with computer memory in the form of high bandwidth, low latency RAM. The NVRAM device is referred to as "non-volatile" because the NVRAM device may receive or include a unique power source that maintains the state of the RAM after main power loss to the NVRAM device. Such a power source may be a battery, one or more capacitors, or the like. In response to a power loss, the NVRAM device may be configured to write the contents of the RAM to a persistent storage, such as the storage drives 171A-F.

In implementations, storage drive 171A-F may refer to any device configured to record data persistently, where "persistently" or "persistent" refers as to a device's ability to maintain recorded data after loss of power. In some implementations, storage drive 171A-F may correspond to non-disk storage media. For example, the storage drive 171A-F may be one or more solid-state drives ('SSDs'), flash memory based storage, any type of solid-state non-volatile memory, or any other type of non-mechanical storage device. In other implementations, storage drive 171A-F may include mechanical or spinning hard disk, such as hard-disk drives ('HDD').

In some implementations, the storage array controllers 110A-D may be configured for offloading device management responsibilities from storage drive 171A-F in storage array 102A-B. For example, storage array controllers 110A-D may manage control information that may describe the state of one or more memory blocks in the storage drives 171A-F. The control information may indicate, for example, that a particular memory block has failed and should no longer be written to, that a particular memory block contains boot code for a storage array controller 110A-D, the number of program-erase ('P/E') cycles that have been performed on a particular memory block, the age of data stored in a particular memory block, the type of data that is stored in a particular memory block, and so forth. In some implementations, the control information may be stored with an associated memory block as metadata. In other implementations, the control information for the storage drives 171A-F may be stored in one or more particular memory blocks of the storage drives 171A-F that are selected by the storage array controller 110A-D. The selected memory blocks may be tagged with an identifier indicating that the selected memory block contains control information. The identifier may be utilized by the storage array controllers 110A-D in conjunction with storage drives 171A-F to quickly identify the memory blocks that contain control information. For example, the storage controllers 110A-D may issue a command to locate memory blocks that contain control information. It may be noted that control information may be so large that parts of the control information may be stored in multiple locations, that the control information may be stored in multiple locations for purposes of redundancy, for example, or that the control information may otherwise be distributed across multiple memory blocks in the storage drive 171A-F.

In implementations, storage array controllers 110A-D may offload device management responsibilities from storage drives 171A-F of storage array 102A-B by retrieving, from the storage drives 171A-F, control information describing the state of one or more memory blocks in the storage drives 171A-F. Retrieving the control information from the storage drives 171A-F may be carried out, for example, by the storage array controller 110A-D querying the storage drives 171A-F for the location of control information for a particular storage drive 171A-F. The storage drives 171A-F may be configured to execute instructions that enable the storage drive 171A-F to identify the location of the control information. The instructions may be executed by a controller (not shown) associated with or otherwise located on the storage drive 171A-F and may cause the storage drive 171A-F to scan a portion of each memory block to identify the memory blocks that store control information for the storage drives 171A-F. The storage drives 171A-F may respond by sending a response message to the storage array controller 110A-D that includes the location of control information for the storage drive 171A-F. Responsive to receiving the response message, storage array controllers 110A-D may issue a request to read data stored at the address associated with the location of control information for the storage drives 171A-F.

In other implementations, the storage array controllers 110A-D may further offload device management responsibilities from storage drives 171A-F by performing, in response to receiving the control information, a storage drive management operation. A storage drive management operation may include, for example, an operation that is typically performed by the storage drive 171A-F (e.g., the controller (not shown) associated with a particular storage drive 171A-F). A storage drive management operation may include, for example, ensuring that data is not written to failed memory blocks within the storage drive 171A-F, ensuring that data is written to memory blocks within the storage drive 171A-F in such a way that adequate wear leveling is achieved, and so forth.

In implementations, storage array 102A-B may implement two or more storage array controllers 110A-D. For example, storage array 102A may include storage array controllers 110A and storage array controllers 110B. At a given instance, a single storage array controller 110A-D (e.g., storage array controller 110A) of a storage system 100 may be designated with primary status (also referred to as "primary controller" herein), and other storage array controllers 110A-D (e.g., storage array controller 110A) may be designated with secondary status (also referred to as "secondary controller" herein). The primary controller may have particular rights, such as permission to alter data in persistent storage resource 170A-B (e.g., writing data to persistent storage resource 170A-B). At least some of the rights of the primary controller may supersede the rights of the secondary controller. For instance, the secondary controller may not have permission to alter data in persistent storage resource 170A-B when the primary controller has the right. The status of storage array controllers 110A-D may change. For example, storage array controller 110A may be designated with secondary status, and storage array controller 110B may be designated with primary status.

In some implementations, a primary controller, such as storage array controller 110A, may serve as the primary controller for one or more storage arrays 102A-B, and a second controller, such as storage array controller 110B, may serve as the secondary controller for the one or more storage arrays 102A-B. For example, storage array controller 110A may be the primary controller for storage array 102A and storage array 102B, and storage array controller 110B may be the secondary controller for storage array 102A and 102B. In some implementations, storage array controllers 110C and 110D (also referred to as "storage processing modules") may neither have primary or secondary status. Storage array controllers 110C and 110D, implemented as storage processing modules, may act as a communication interface between the primary and secondary controllers (e.g., storage array controllers 110A and 110B, respectively) and storage array 102B. For example, storage array controller 110A of storage array 102A may send a write request, via SAN 158, to storage array 102B. The write request may be received by both storage array controllers 110C and 110D of storage array 102B. Storage array controllers 110C and 110D facilitate the communication, e.g., send the write request to the appropriate storage drive 171A-F. It may be noted that in some implementations storage processing modules may be used to increase the number of storage drives controlled by the primary and secondary controllers.

In implementations, storage array controllers 110A-D are communicatively coupled, via a midplane (not shown), to one or more storage drives 171A-F and to one or more NVRAM devices (not shown) that are included as part of a storage array 102A-B. The storage array controllers 110A-D may be coupled to the midplane via one or more data communication links and the midplane may be coupled to the storage drives 171A-F and the NVRAM devices via one or more data communications links. The data communications links described herein are collectively illustrated by data communications links 108A-D and may include a Peripheral Component Interconnect Express ('PCIe') bus, for example.

Figure 1B:
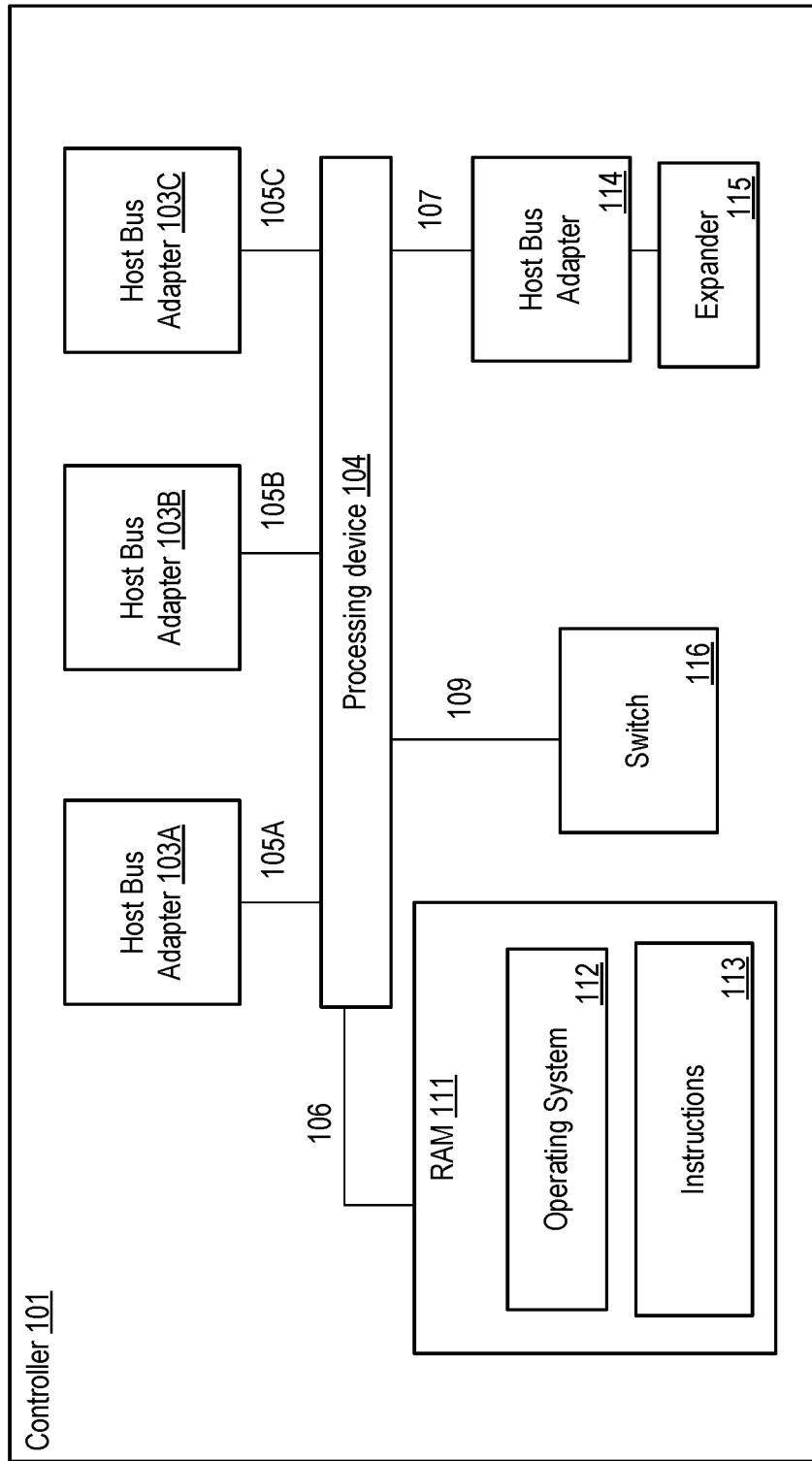
FIG. 1B illustrates a second example system for data storage in accordance with some implementations.

FIG. 1B illustrates an example system for data storage, in accordance with some implementations. Storage array controller 101 illustrated in FIG. 1B may be similar to the storage array controllers 110A-D described with respect to FIG. 1A. In one example, storage array controller 101 may be similar to storage array controller 110A or storage array controller 110B. Storage array controller 101 includes numerous elements for purposes of illustration rather than limitation. It may be noted that storage array controller 101 may include the same, more, or fewer elements configured in the same or different manner in other implementations. It may be noted that elements of FIG. 1A may be included below to help illustrate features of storage array controller 101.

Storage array controller 101 may include one or more processing devices 104 and random access memory ('RAM') 111. Processing device 104 (or controller 101) represents one or more general-purpose processing devices such as a microprocessor, central processing unit, or the like. More particularly, the processing device 104 (or controller 101) may be a complex instruction set computing ('CISC') microprocessor, reduced instruction set computing ('RISC') microprocessor, very long instruction word ('VLIW') microprocessor, or a processor implementing other instruction sets or processors implementing a combination of instruction sets. The processing device 104 (or controller 101) may also be one or more special-purpose processing devices such as an ASIC, an FPGA, a digital signal processor ('DSP'), network processor, or the like.

The processing device 104 may be connected to the RAM 111 via a data communications link 106, which may be embodied as a high speed memory bus such as a Double-Data Rate 4 ('DDR4') bus. Stored in RAM 111 is an operating system 112. In some implementations, instructions 113 are stored in RAM 111. Instructions 113 may include computer program instructions for performing operations in a direct-mapped flash storage system. In one embodiment, a direct-mapped flash storage system is one that that addresses data blocks within flash drives directly and without an address translation performed by the storage controllers of the flash drives.

In implementations, storage array controller 101 includes one or more host bus adapters 103A-C that are coupled to the processing device 104 via a data communications link 105A-C. In implementations, host bus adapters 103A-C may be computer hardware that connects a host system (e.g., the storage array controller) to other network and storage arrays. In some examples, host bus adapters 103A-C may be a Fibre Channel adapter that enables the storage array controller 101 to connect to a SAN, an Ethernet adapter that enables the storage array controller 101 to connect to a LAN, or the like. Host bus adapters 103A-C may be coupled to the processing device 104 via a data communications link 105A-C such as, for example, a PCIe bus.

In implementations, storage array controller 101 may include a host bus adapter 114 that is coupled to an expander 115. The expander 115 may be used to attach a host system to a larger number of storage drives. The expander 115 may, for example, be a SAS expander utilized to enable the host bus adapter 114 to attach to storage drives in an implementation where the host bus adapter 114 is embodied as a SAS controller.

In implementations, storage array controller 101 may include a switch 116 coupled to the processing device 104 via a data communications link 109. The switch 116 may be a computer hardware device that can create multiple endpoints out of a single endpoint, thereby enabling multiple devices to share a single endpoint. The switch 116 may, for example, be a PCIe switch that is coupled to a PCIe bus (e.g., data communications link 109) and presents multiple PCIe connection points to the midplane.

In implementations, storage array controller 101 includes a data communications link 107 for coupling the storage array controller 101 to other storage array controllers. In some examples, data communications link 107 may be a QuickPath Interconnect (QPI) interconnect.

A traditional storage system that uses traditional flash drives may implement a process across the flash drives that are part of the traditional storage system. For example, a higher level process of the storage system may initiate and control a process across the flash drives. However, a flash drive of the traditional storage system may include its own storage controller that also performs the process. Thus, for the traditional storage system, a higher level process (e.g., initiated by the storage system) and a lower level process (e.g., initiated by a storage controller of the storage system) may both be performed.

To resolve various deficiencies of a traditional storage system, operations may be performed by higher level processes and not by the lower level processes. For example, the flash storage system may include flash drives that do not include storage controllers that provide the process. Thus, the operating system of the flash storage system itself may initiate and control the process. This may be accomplished by a direct-mapped flash storage system that addresses data blocks within the flash drives directly and without an address translation performed by the storage controllers of the flash drives.

The operating system of the flash storage system may identify and maintain a list of allocation units across multiple flash drives of the flash storage system. The allocation units may be entire erase blocks or multiple erase blocks. The operating system may maintain a map or address range that directly maps addresses to erase blocks of the flash drives of the flash storage system.

Direct mapping to the erase blocks of the flash drives may be used to rewrite data and erase data. For example, the operations may be performed on one or more allocation units that include a first data and a second data where the first data is to be retained and the second data is no longer being used by the flash storage system. The operating system may initiate the process to write the first data to new locations within other allocation units and erasing the second data and marking the allocation units as being available for use for subsequent data. Thus, the process may only be performed by the higher level operating system of the flash storage system without an additional lower level process being performed by controllers of the flash drives.

Advantages of the process being performed only by the operating system of the flash storage system include increased reliability of the flash drives of the flash storage system as unnecessary or redundant write operations are not being performed during the process. One possible point of novelty here is the concept of initiating and controlling the process at the operating system of the flash storage system.

In addition, the process can be controlled by the operating system across multiple flash drives. This is contrast to the process being performed by a storage controller of a flash drive.

A storage system can consist of two storage array controllers that share a set of drives for failover purposes, or it could consist of a single storage array controller that provides a storage service that utilizes multiple drives, or it could consist of a distributed network of storage array controllers each with some number of drives or some amount of Flash storage where the storage array controllers in the network collaborate to provide a complete storage service and collaborate on various aspects of a storage service including storage allocation and garbage collection.

Figure 1C:
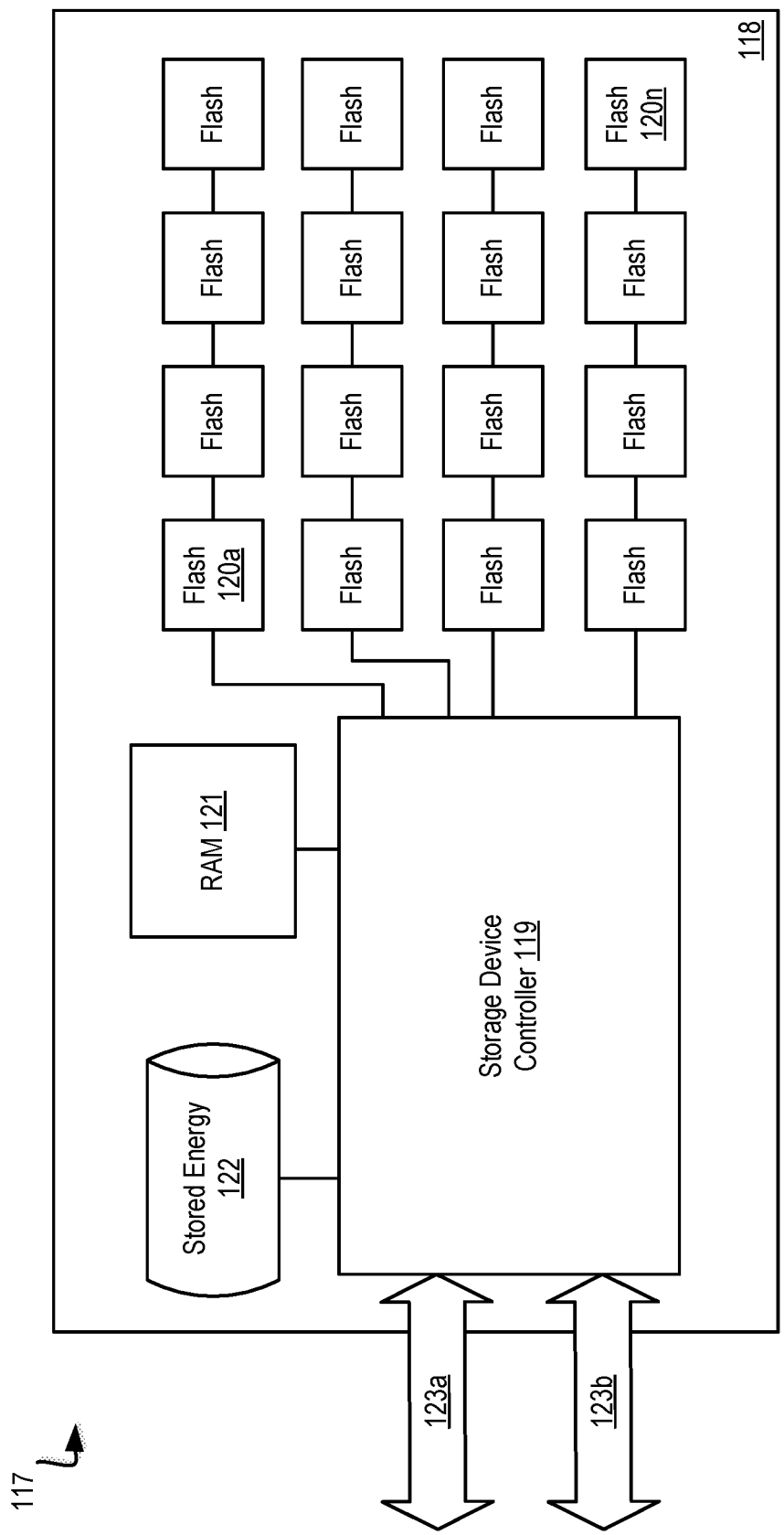
FIG. 1C illustrates a third example system for data storage in accordance with some implementations.

FIG. 1C illustrates a third example system 117 for data storage in accordance with some implementations. System 117 (also referred to as "storage system" herein) includes numerous elements for purposes of illustration rather than limitation. It may be noted that system 117 may include the same, more, or fewer elements configured in the same or different manner in other implementations.

In one embodiment, system 117 includes a dual Peripheral Component Interconnect ('PCI') flash storage device 118 with separately addressable fast write storage. System 117 may include a storage controller 119. In one embodiment, storage controller 119A-D may be a CPU, ASIC, FPGA, or any other circuitry that may implement control structures necessary according to the present disclosure. In one embodiment, system 117 includes flash memory devices (e.g., including flash memory devices 120a-n), operatively coupled to various channels of the storage device controller 119. Flash memory devices 120a-n, may be presented to the controller 119A-D as an addressable collection of Flash pages, erase blocks, and/or control elements sufficient to allow the storage device controller 119A-D to program and retrieve various aspects of the Flash. In one embodiment, storage device controller 119A-D may perform operations on flash memory devices 120a-n including storing and retrieving data content of pages, arranging and erasing any blocks, tracking statistics related to the use and reuse of Flash memory pages, erase blocks, and cells, tracking and predicting error codes and faults within the Flash memory, controlling voltage levels associated with programming and retrieving contents of Flash cells, etc.

In one embodiment, system 117 may include RAM 121 to store separately addressable fast-write data. In one embodiment, RAM 121 may be one or more separate discrete devices. In another embodiment, RAM 121 may be integrated into storage device controller 119A-D or multiple storage device controllers. The RAM 121 may be utilized for other purposes as well, such as temporary program memory for a processing device (e.g., a CPU) in the storage device controller 119.

In one embodiment, system 117 may include a stored energy device 122, such as a rechargeable battery or a capacitor. Stored energy device 122 may store energy sufficient to power the storage device controller 119, some amount of the RAM (e.g., RAM 121), and some amount of Flash memory (e.g., Flash memory 120a-120n) for sufficient time to write the contents of RAM to Flash memory. In one embodiment, storage device controller 119A-D may write the contents of RAM to Flash Memory if the storage device controller detects loss of external power.

In one embodiment, system 117 includes two data communications links 123a, 123b. In one embodiment, data communications links 123a, 123b may be PCI interfaces. In another embodiment, data communications links 123a, 123b may be based on other communications standards (e.g., HyperTransport, InfiniBand, etc.). Data communications links 123a, 123b may be based on non-volatile memory express ('NVMe') or NVMe over fabrics ('NVMf') specifications that allow external connection to the storage device controller 119A-D from other components in the storage system 117. It should be noted that data communications links may be interchangeably referred to herein as PCI buses for convenience.

System 117 may also include an external power source (not shown), which may be provided over one or both data communications links 123a, 123b, or which may be provided separately. An alternative embodiment includes a separate Flash memory (not shown) dedicated for use in storing the content of RAM 121. The storage device controller 119A-D may present a logical device over a PCI bus which may include an addressable fast-write logical device, or a distinct part of the logical address space of the storage device 118, which may be presented as PCI memory or as persistent storage. In one embodiment, operations to store into the device are directed into the RAM 121. On power failure, the storage device controller 119A-D may write stored content associated with the addressable fast-write logical storage to Flash memory (e.g., Flash memory 120a-n) for long-term persistent storage.

In one embodiment, the logical device may include some presentation of some or all of the content of the Flash memory devices 120a-n, where that presentation allows a storage system including a storage device 118 (e.g., storage system 117) to directly address Flash memory pages and directly reprogram erase blocks from storage system components that are external to the storage device through the PCI bus. The presentation may also allow one or more of the external components to control and retrieve other aspects of the Flash memory including some or all of: tracking statistics related to use and reuse of Flash memory pages, erase blocks, and cells across all the Flash memory devices; tracking and predicting error codes and faults within and across the Flash memory devices; controlling voltage levels associated with programming and retrieving contents of Flash cells; etc.

In one embodiment, the stored energy device 122 may be sufficient to ensure completion of in-progress operations to the Flash memory devices 120a-120n stored energy device 122 may power storage device controller 119A-D and associated Flash memory devices (e.g., 120a-n) for those operations, as well as for the storing of fast-write RAM to Flash memory. Stored energy device 122 may be used to store accumulated statistics and other parameters kept and tracked by the Flash memory devices 120a-n and/or the storage device controller 119. Separate capacitors or stored energy devices (such as smaller capacitors near or embedded within the Flash memory devices themselves) may be used for some or all of the operations described herein.

Various schemes may be used to track and optimize the life span of the stored energy component, such as adjusting voltage levels over time, partially discharging the storage energy device 122 to measure corresponding discharge characteristics, etc. If the available energy decreases over time, the effective available capacity of the addressable fast-write storage may be decreased to ensure that it can be written safely based on the currently available stored energy.

Figure 1D:
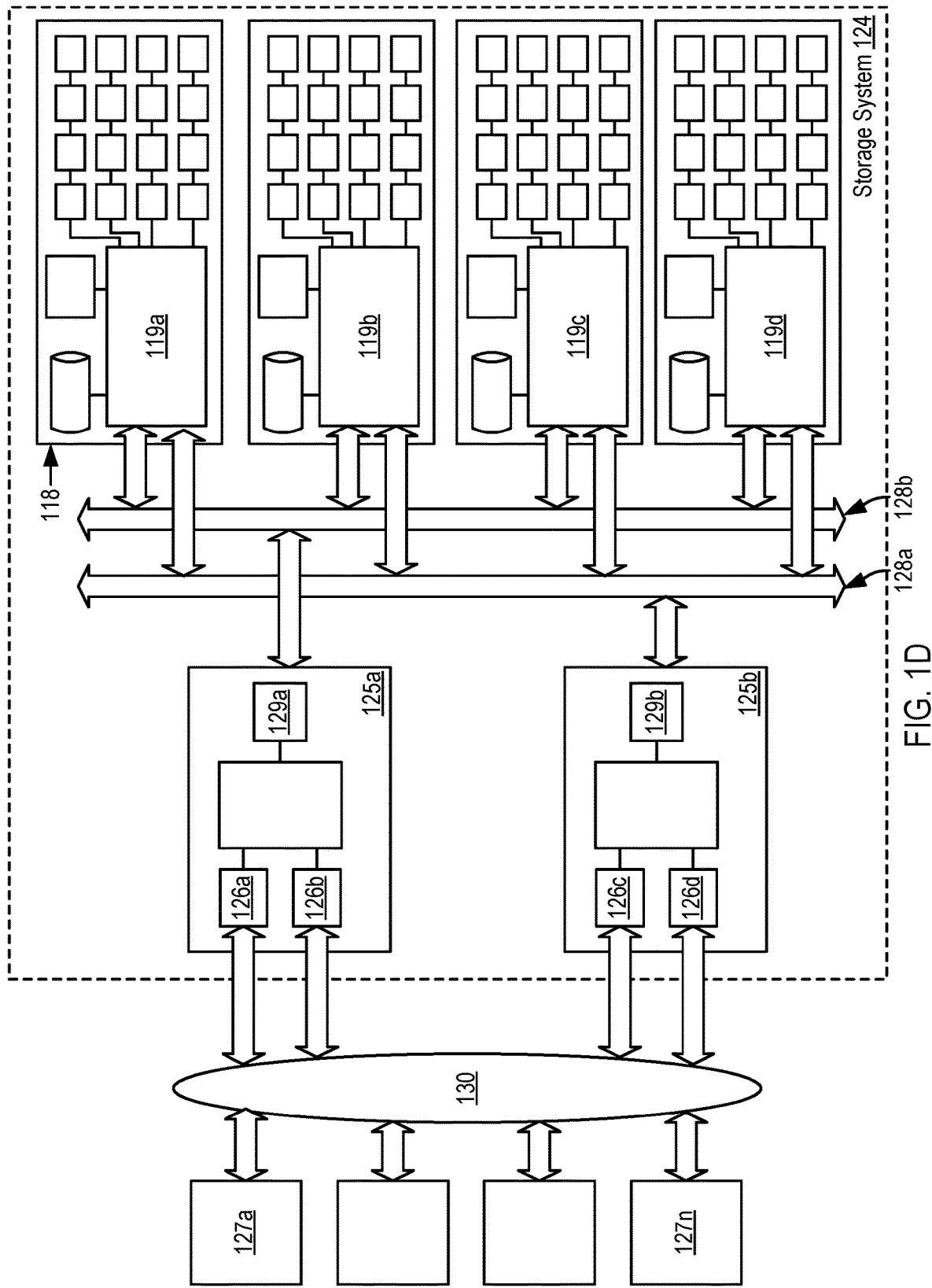
FIG. 1D illustrates a fourth example system for data storage in accordance with some implementations.

FIG. 1D illustrates a third example system 124 for data storage in accordance with some implementations. In one embodiment, system 124 includes storage controllers 125a, 125b. In one embodiment, storage controllers 125a, 125b are operatively coupled to Dual PCI storage devices 119a, 119b and 119c, 119d, respectively. Storage controllers 125a, 125b may be operatively coupled (e.g., via a storage network 130) to some number of host computers 127a-n.

In one embodiment, two storage controllers (e.g., 125a and 125b) provide storage services, such as a SCS) block storage array, a file server, an object server, a database or data analytics service, etc. The storage controllers 125a, 125b may provide services through some number of network interfaces (e.g., 126a-d) to host computers 127a-n outside of the storage system 124. Storage controllers 125a, 125b may provide integrated services or an application entirely within the storage system 124, forming a converged storage and compute system. The storage controllers 125a, 125b may utilize the fast write memory within or across storage devices 119a-d to journal in progress operations to ensure the operations are not lost on a power failure, storage controller removal, storage controller or storage system shutdown, or some fault of one or more software or hardware components within the storage system 124.

In one embodiment, controllers 125a, 125b operate as PCI masters to one or the other PCI buses 128a, 128b. In another embodiment, 128a and 128b may be based on other communications standards (e.g., HyperTransport, InfiniBand, etc.). Other storage system embodiments may operate storage controllers 125a, 125b as multi-masters for both PCI buses 128a, 128b. Alternately, a PCI/NVMe/NVMf switching infrastructure or fabric may connect multiple storage controllers. Some storage system embodiments may allow storage devices to communicate with each other directly rather than communicating only with storage controllers. In one embodiment, a storage device controller 119a may be operable under direction from a storage controller 125a to synthesize and transfer data to be stored into Flash memory devices from data that has been stored in RAM (e.g., RAM 121 of FIG. 1C). For example, a recalculated version of RAM content may be transferred after a storage controller has determined that an operation has fully committed across the storage system, or when fast-write memory on the device has reached a certain used capacity, or after a certain amount of time, to ensure improve safety of the data or to release addressable fast-write capacity for reuse. This mechanism may be used, for example, to avoid a second transfer over a bus (e.g., 128a, 128b) from the storage controllers 125a, 125b. In one embodiment, a recalculation may include compressing data, attaching indexing or other metadata, combining multiple data segments together, performing erasure code calculations, etc.

In one embodiment, under direction from a storage controller 125a, 125b, a storage device controller 119a, 119b may be operable to calculate and transfer data to other storage devices from data stored in RAM (e.g., RAM 121 of FIG. 1C) without involvement of the storage controllers 125a, 125b. This operation may be used to mirror data stored in one controller 125a to another controller 125b, or it could be used to offload compression, data aggregation, and/or erasure coding calculations and transfers to storage devices to reduce load on storage controllers or the storage controller interface 129a, 129b to the PCI bus 128a, 128b.

A storage device controller 119A-D may include mechanisms for implementing high availability primitives for use by other parts of a storage system external to the Dual PCI storage device 118. For example, reservation or exclusion primitives may be provided so that, in a storage system with two storage controllers providing a highly available storage service, one storage controller may prevent the other storage controller from accessing or continuing to access the storage device. This could be used, for example, in cases where one controller detects that the other controller is not functioning properly or where the interconnect between the two storage controllers may itself not be functioning properly.

In one embodiment, a storage system for use with Dual PCI direct mapped storage devices with separately addressable fast write storage includes systems that manage erase blocks or groups of erase blocks as allocation units for storing data on behalf of the storage service, or for storing metadata (e.g., indexes, logs, etc.) associated with the storage service, or for proper management of the storage system itself. Flash pages, which may be a few kilobytes in size, may be written as data arrives or as the storage system is to persist data for long intervals of time (e.g., above a defined threshold of time). To commit data more quickly, or to reduce the number of writes to the Flash memory devices, the storage controllers may first write data into the separately addressable fast write storage on one more storage devices.

In one embodiment, the storage controllers 125a, 125b may initiate the use of erase blocks within and across storage devices (e.g., 118) in accordance with an age and expected remaining lifespan of the storage devices, or based on other statistics. The storage controllers 125a, 125b may initiate garbage collection and data migration data between storage devices in accordance with pages that are no longer needed as well as to manage Flash page and erase block lifespans and to manage overall system performance.

In one embodiment, the storage system 124 may utilize mirroring and/or erasure coding schemes as part of storing data into addressable fast write storage and/or as part of writing data into allocation units associated with erase blocks. Erasure codes may be used across storage devices, as well as within erase blocks or allocation units, or within and across Flash memory devices on a single storage device, to provide redundancy against single or multiple storage device failures or to protect against internal corruptions of Flash memory pages resulting from Flash memory operations or from degradation of Flash memory cells. Mirroring and erasure coding at various levels may be used to recover from multiple types of failures that occur separately or in combination.

The embodiments depicted with reference to FIGS. 2A-G illustrate a storage cluster that stores user data, such as user data originating from one or more user or client systems or other sources external to the storage cluster. The storage cluster distributes user data across storage nodes housed within a chassis, or across multiple chassis, using erasure coding and redundant copies of metadata. Erasure coding refers to a method of data protection or reconstruction in which data is stored across a set of different locations, such as disks, storage nodes or geographic locations. Flash memory is one type of solid-state memory that may be integrated with the embodiments, although the embodiments may be extended to other types of solid-state memory or other storage medium, including non-solid state memory. Control of storage locations and workloads are distributed across the storage locations in a clustered peer-to-peer system. Tasks such as mediating communications between the various storage nodes, detecting when a storage node has become unavailable, and balancing I/Os (inputs and outputs) across the various storage nodes, are all handled on a distributed basis. Data is laid out or distributed across multiple storage nodes in data fragments or stripes that support data recovery in some embodiments. Ownership of data can be reassigned within a cluster, independent of input and output patterns. This architecture described in more detail below allows a storage node in the cluster to fail, with the system remaining operational, since the data can be reconstructed from other storage nodes and thus remain available for input and output operations. In various embodiments, a storage node may be referred to as a cluster node, a blade, or a server.

The storage cluster may be contained within a chassis, i.e., an enclosure housing one or more storage nodes. A mechanism to provide power to each storage node, such as a power distribution bus, and a communication mechanism, such as a communication bus that enables communication between the storage nodes are included within the chassis. The storage cluster can run as an independent system in one location according to some embodiments. In one embodiment, a chassis contains at least two instances of both the power distribution and the communication bus which may be enabled or disabled independently. The internal communication bus may be an Ethernet bus, however, other technologies such as PCIe, InfiniBand, and others, are equally suitable. The chassis provides a port for an external communication bus for enabling communication between multiple chassis, directly or through a switch, and with client systems. The external communication may use a technology such as Ethernet, InfiniBand, Fibre Channel, etc. In some embodiments, the external communication bus uses different communication bus technologies for inter-chassis and client communication. If a switch is deployed within or between chassis, the switch may act as a translation between multiple protocols or technologies. When multiple chassis are connected to define a storage cluster, the storage cluster may be accessed by a client using either proprietary interfaces or standard interfaces such as network file system ('NFS'), common internet file system ('CIFS'), small computer system interface ('SCSI') or hypertext transfer protocol ('HTTP'). Translation from the client protocol may occur at the switch, chassis external communication bus or within each storage node. In some embodiments, multiple chassis may be coupled or connected to each other through an aggregator switch. A portion and/or all of the coupled or connected chassis may be designated as a storage cluster. As discussed above, each chassis can have multiple blades, each blade has a media access control ('MAC') address, but the storage cluster is presented to an external network as having a single cluster IP address and a single MAC address in some embodiments.

Each storage node may be one or more storage servers and each storage server is connected to one or more non-volatile solid state memory units, which may be referred to as storage units or storage devices. One embodiment includes a single storage server in each storage node and between one to eight non-volatile solid state memory units, however this one example is not meant to be limiting. The storage server may include a processor, DRAM and interfaces for the internal communication bus and power distribution for each of the power buses. Inside the storage node, the interfaces and storage unit share a communication bus, e.g., PCI Express, in some embodiments. The non-volatile solid state memory units may directly access the internal communication bus interface through a storage node communication bus, or request the storage node to access the bus interface. The non-volatile solid state memory unit contains an embedded CPU, solid state storage controller, and a quantity of solid state mass storage, e.g., between 2-32 terabytes ('TB') in some embodiments. An embedded volatile storage medium, such as DRAM, and an energy reserve apparatus are included in the non-volatile solid state memory unit. In some embodiments, the energy reserve apparatus is a capacitor, super-capacitor, or battery that enables transferring a subset of DRAM contents to a stable storage medium in the case of power loss. In some embodiments, the non-volatile solid state memory unit is constructed with a storage class memory, such as phase change or magnetoresistive random access memory ('MRAM') that substitutes for DRAM and enables a reduced power hold-up apparatus.

One of many features of the storage nodes and non-volatile solid state storage is the ability to proactively rebuild data in a storage cluster. The storage nodes and non-volatile solid state storage can determine when a storage node or non-volatile solid state storage in the storage cluster is unreachable, independent of whether there is an attempt to read data involving that storage node or non-volatile solid state storage. The storage nodes and non-volatile solid state storage then cooperate to recover and rebuild the data in at least partially new locations. This constitutes a proactive rebuild, in that the system rebuilds data without waiting until the data is needed for a read access initiated from a client system employing the storage cluster. These and further details of the storage memory and operation thereof are discussed below.

Figure 2A:
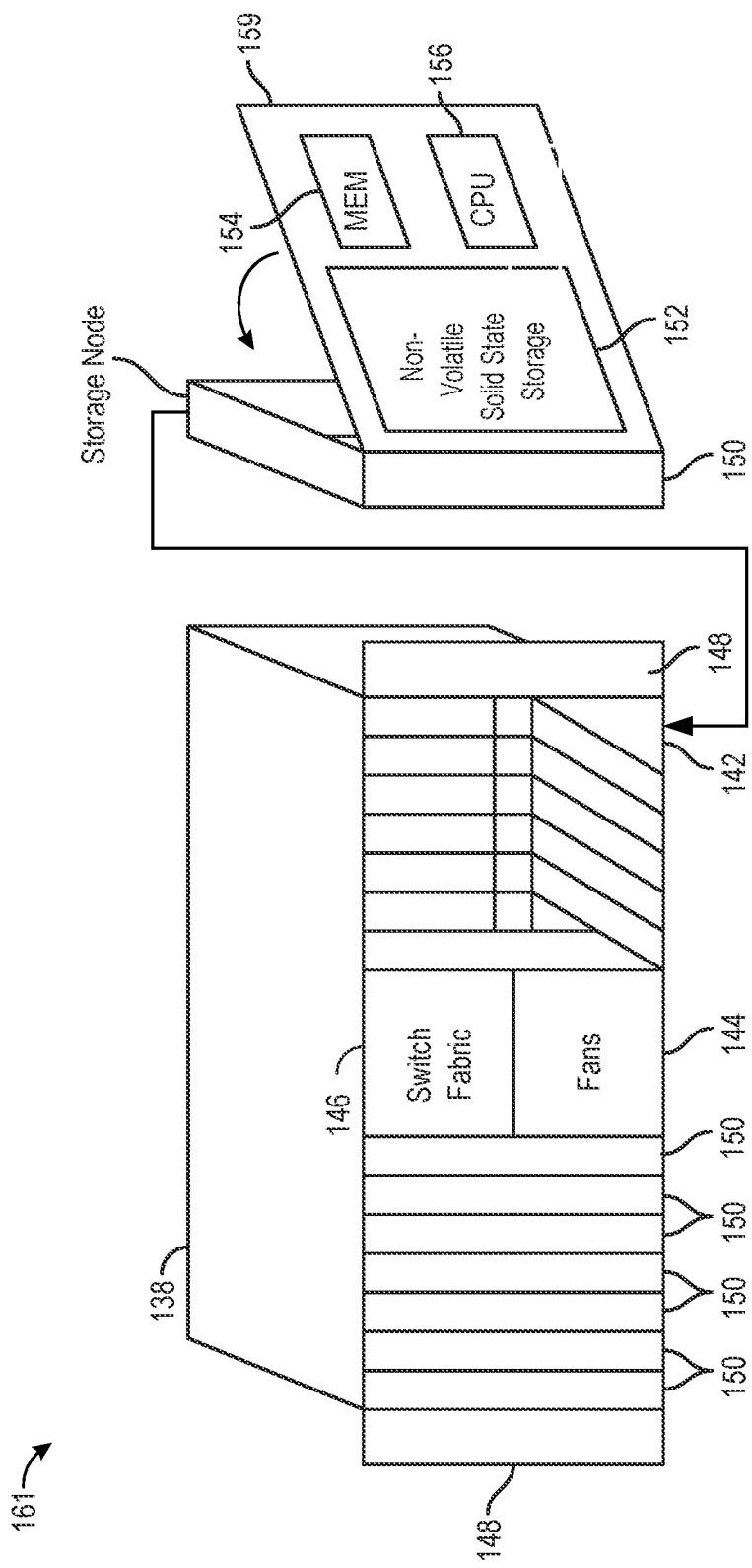
FIG. 2A is a perspective view of a storage cluster with multiple storage nodes and internal storage coupled to each storage node to provide network attached storage, in accordance with some embodiments.

FIG. 2A is a perspective view of a storage cluster 161, with multiple storage nodes 150 and internal solid-state memory coupled to each storage node to provide network attached storage or storage area network, in accordance with some embodiments. A network attached storage, storage area network, or a storage cluster, or other storage memory, could include one or more storage clusters 161, each having one or more storage nodes 150, in a flexible and reconfigurable arrangement of both the physical components and the amount of storage memory provided thereby. The storage cluster 161 is designed to fit in a rack, and one or more racks can be set up and populated as desired for the storage memory. The storage cluster 161 has a chassis 138 having multiple slots 142. It should be appreciated that chassis 138 may be referred to as a housing, enclosure, or rack unit. In one embodiment, the chassis 138 has fourteen slots 142, although other numbers of slots are readily devised. For example, some embodiments have four slots, eight slots, sixteen slots, thirty-two slots, or other suitable number of slots. Each slot 142 can accommodate one storage node 150 in some embodiments. Chassis 138 includes flaps 148 that can be utilized to mount the chassis 138 on a rack. Fans 144 provide air circulation for cooling of the storage nodes 150 and components thereof, although other cooling components could be used, or an embodiment could be devised without cooling components. A switch fabric 146 couples storage nodes 150 within chassis 138 together and to a network for communication to the memory. In an embodiment depicted in herein, the slots 142 to the left of the switch fabric 146 and fans 144 are shown occupied by storage nodes 150, while the slots 142 to the right of the switch fabric 146 and fans 144 are empty and available for insertion of storage node 150 for illustrative purposes. This configuration is one example, and one or more storage nodes 150 could occupy the slots 142 in various further arrangements. The storage node arrangements need not be sequential or adjacent in some embodiments. Storage nodes 150 are hot pluggable, meaning that a storage node 150 can be inserted into a slot 142 in the chassis 138, or removed from a slot 142, without stopping or powering down the system. Upon insertion or removal of storage node 150 from slot 142, the system automatically reconfigures in order to recognize and adapt to the change. Reconfiguration, in some embodiments, includes restoring redundancy and/or rebalancing data or load.

Each storage node 150 can have multiple components. In the embodiment shown here, the storage node 150 includes a printed circuit board 159 populated by a CPU 156, i.e., processor, a memory 154 coupled to the CPU 156, and a non-volatile solid state storage 152 coupled to the CPU 156, although other mountings and/or components could be used in further embodiments. The memory 154 has instructions which are executed by the CPU 156 and/or data operated on by the CPU 156. As further explained below, the non-volatile solid state storage 152 includes flash or, in further embodiments, other types of solid-state memory.

Referring to FIG. 2A, storage cluster 161 is scalable, meaning that storage capacity with non-uniform storage sizes is readily added, as described above. One or more storage nodes 150 can be plugged into or removed from each chassis and the storage cluster self-configures in some embodiments. Plug-in storage nodes 150, whether installed in a chassis as delivered or later added, can have different sizes. For example, in one embodiment a storage node 150 can have any multiple of 4 TB, e.g., 8 TB, 12 TB, 16 TB, 32 TB, etc. In further embodiments, a storage node 150 could have any multiple of other storage amounts or capacities. Storage capacity of each storage node 150 is broadcast, and influences decisions of how to stripe the data. For maximum storage efficiency, an embodiment can self-configure as wide as possible in the stripe, subject to a predetermined requirement of continued operation with loss of up to one, or up to two, non-volatile solid state storage units 152 or storage nodes 150 within the chassis.

Figure 2B:
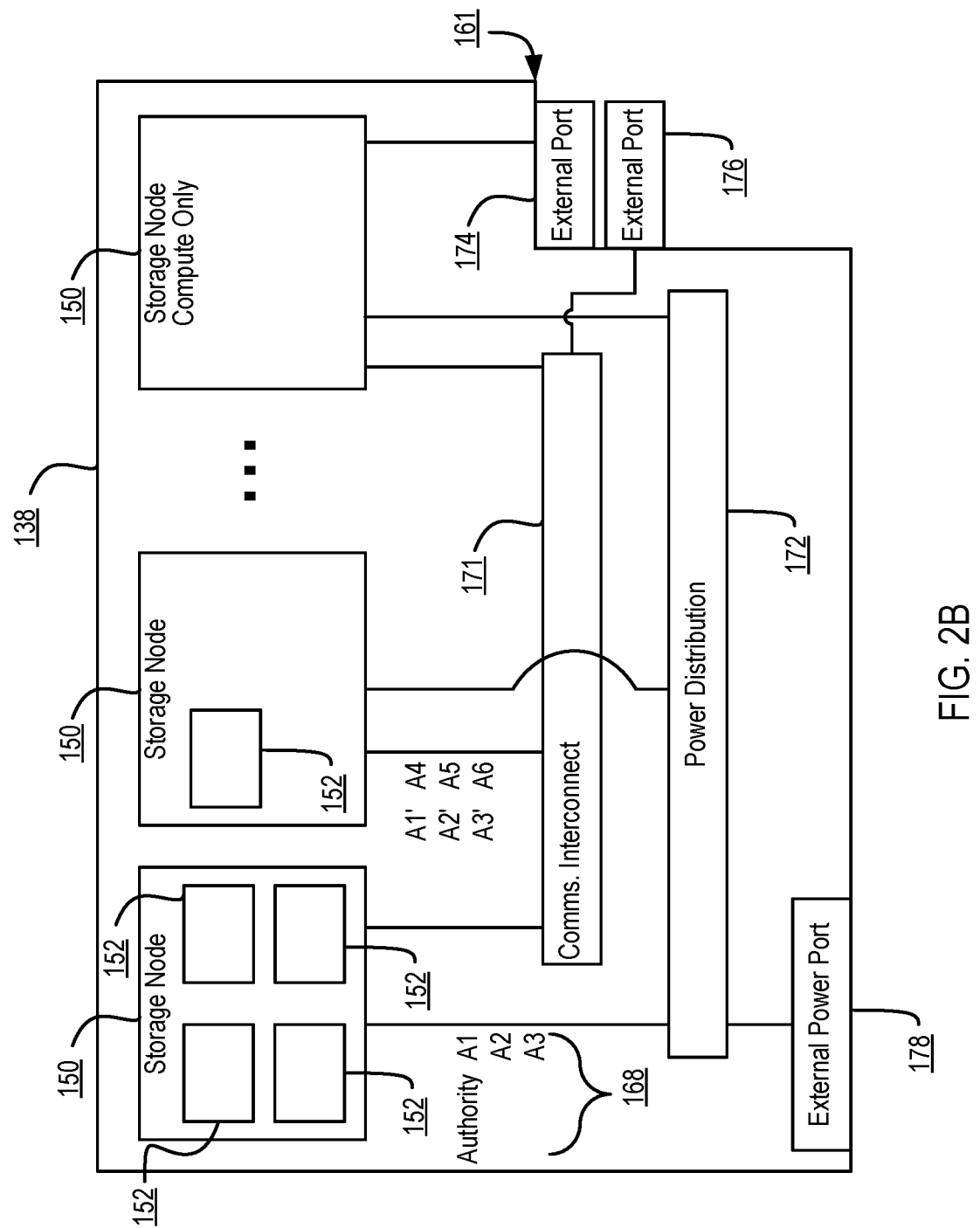
FIG. 2B is a block diagram showing an interconnect switch coupling multiple storage nodes in accordance with some embodiments.

FIG. 2B is a block diagram showing a communications interconnect 173 and power distribution bus 172 coupling multiple storage nodes 150. Referring back to FIG. 2A, the communications interconnect 173 can be included in or implemented with the switch fabric 146 in some embodiments. Where multiple storage clusters 161 occupy a rack, the communications interconnect 173 can be included in or implemented with a top of rack switch, in some embodiments. As illustrated in FIG. 2B, storage cluster 161 is enclosed within a single chassis 138. External port 176 is coupled to storage nodes 150 through communications interconnect 173, while external port 174 is coupled directly to a storage node. External power port 178 is coupled to power distribution bus 172. Storage nodes 150 may include varying amounts and differing capacities of non-volatile solid state storage 152 as described with reference to FIG. 2A. In addition, one or more storage nodes 150 may be a compute only storage node as illustrated in FIG. 2B. Authorities 168 are implemented on the non-volatile solid state storages 152, for example as lists or other data structures stored in memory. In some embodiments the authorities are stored within the non-volatile solid state storage 152 and supported by software executing on a controller or other processor of the non-volatile solid state storage 152. In a further embodiment, authorities 168 are implemented on the storage nodes 150, for example as lists or other data structures stored in the memory 154 and supported by software executing on the CPU 156 of the storage node 150. Authorities 168 control how and where data is stored in the non-volatile solid state storages 152 in some embodiments. This control assists in determining which type of erasure coding scheme is applied to the data, and which storage nodes 150 have which portions of the data. Each authority 168 may be assigned to a non-volatile solid state storage 152. Each authority may control a range of inode numbers, segment numbers, or other data identifiers which are assigned to data by a file system, by the storage nodes 150, or by the non-volatile solid state storage 152, in various embodiments.

Every piece of data, and every piece of metadata, has redundancy in the system in some embodiments. In addition, every piece of data and every piece of metadata has an owner, which may be referred to as an authority. If that authority is unreachable, for example through failure of a storage node, there is a plan of succession for how to find that data or that metadata. In various embodiments, there are redundant copies of authorities 168. Authorities 168 have a relationship to storage nodes 150 and non-volatile solid state storage 152 in some embodiments. Each authority 168, covering a range of data segment numbers or other identifiers of the data, may be assigned to a specific non-volatile solid state storage 152. In some embodiments the authorities 168 for all of such ranges are distributed over the non-volatile solid state storages 152 of a storage cluster. Each storage node 150 has a network port that provides access to the non-volatile solid state storage(s) 152 of that storage node 150. Data can be stored in a segment, which is associated with a segment number and that segment number is an indirection for a configuration of a RAID (redundant array of independent disks) stripe in some embodiments. The assignment and use of the authorities 168 thus establishes an indirection to data. Indirection may be referred to as the ability to reference data indirectly, in this case via an authority 168, in accordance with some embodiments. A segment identifies a set of non-volatile solid state storage 152 and a local identifier into the set of non-volatile solid state storage 152 that may contain data. In some embodiments, the local identifier is an offset into the device and may be reused sequentially by multiple segments. In other embodiments the local identifier is unique for a specific segment and never reused. The offsets in the non-volatile solid state storage 152 are applied to locating data for writing to or reading from the non-volatile solid state storage 152 (in the form of a RAID stripe). Data is striped across multiple units of non-volatile solid state storage 152, which may include or be different from the non-volatile solid state storage 152 having the authority 168 for a particular data segment.

If there is a change in where a particular segment of data is located, e.g., during a data move or a data reconstruction, the authority 168 for that data segment should be consulted, at that non-volatile solid state storage 152 or storage node 150 having that authority 168. In order to locate a particular piece of data, embodiments calculate a hash value for a data segment or apply an inode number or a data segment number. The output of this operation points to a non-volatile solid state storage 152 having the authority 168 for that particular piece of data. In some embodiments there are two stages to this operation. The first stage maps an entity identifier (ID), e.g., a segment number, inode number, or directory number to an authority identifier. This mapping may include a calculation such as a hash or a bit mask. The second stage is mapping the authority identifier to a particular non-volatile solid state storage 152, which may be done through an explicit mapping. The operation is repeatable, so that when the calculation is performed, the result of the calculation repeatably and reliably points to a particular non-volatile solid state storage 152 having that authority 168. The operation may include the set of reachable storage nodes as input. If the set of reachable non-volatile solid state storage units changes the optimal set changes. In some embodiments, the persisted value is the current assignment (which is always true) and the calculated value is the target assignment the cluster will attempt to reconfigure towards. This calculation may be used to determine the optimal non-volatile solid state storage 152 for an authority in the presence of a set of non-volatile solid state storage 152 that are reachable and constitute the same cluster. The calculation also determines an ordered set of peer non-volatile solid state storage 152 that will also record the authority to non-volatile solid state storage mapping so that the authority may be determined even if the assigned non-volatile solid state storage is unreachable. A duplicate or substitute authority 168 may be consulted if a specific authority 168 is unavailable in some embodiments.

With reference to FIGS. 2A and 2B, two of the many tasks of the CPU 156 on a storage node 150 are to break up write data, and reassemble read data. When the system has determined that data is to be written, the authority 168 for that data is located as above. When the segment ID for data is already determined the request to write is forwarded to the non-volatile solid state storage 152 currently determined to be the host of the authority 168 determined from the segment. The host CPU 156 of the storage node 150, on which the non-volatile solid state storage 152 and corresponding authority 168 reside, then breaks up or shards the data and transmits the data out to various non-volatile solid state storage 152. The transmitted data is written as a data stripe in accordance with an erasure coding scheme. In some embodiments, data is requested to be pulled, and in other embodiments, data is pushed. In reverse, when data is read, the authority 168 for the segment ID containing the data is located as described above. The host CPU 156 of the storage node 150 on which the non-volatile solid state storage 152 and corresponding authority 168 reside requests the data from the non-volatile solid state storage and corresponding storage nodes pointed to by the authority. In some embodiments the data is read from flash storage as a data stripe. The host CPU 156 of storage node 150 then reassembles the read data, correcting any errors (if present) according to the appropriate erasure coding scheme, and forwards the reassembled data to the network. In further embodiments, some or all of these tasks can be handled in the non-volatile solid state storage 152. In some embodiments, the segment host requests the data be sent to storage node 150 by requesting pages from storage and then sending the data to the storage node making the original request.

In some systems, for example in UNIX-style file systems, data is handled with an index node or inode, which specifies a data structure that represents an object in a file system. The object could be a file or a directory, for example. Metadata may accompany the object, as attributes such as permission data and a creation timestamp, among other attributes. A segment number could be assigned to all or a portion of such an object in a file system. In other systems, data segments are handled with a segment number assigned elsewhere. For purposes of discussion, the unit of distribution is an entity, and an entity can be a file, a directory or a segment. That is, entities are units of data or metadata stored by a storage system. Entities are grouped into sets called authorities. Each authority has an authority owner, which is a storage node that has the exclusive right to update the entities in the authority. In other words, a storage node contains the authority, and that the authority, in turn, contains entities.

A segment is a logical container of data in accordance with some embodiments. A segment is an address space between medium address space and physical flash locations, i.e., the data segment number, are in this address space. Segments may also contain meta-data, which enable data redundancy to be restored (rewritten to different flash locations or devices) without the involvement of higher level software. In one embodiment, an internal format of a segment contains client data and medium mappings to determine the position of that data. Each data segment is protected, e.g., from memory and other failures, by breaking the segment into a number of data and parity shards, where applicable. The data and parity shards are distributed, i.e., striped, across non-volatile solid state storage 152 coupled to the host CPUs 156 (See FIGS. 2E and 2G) in accordance with an erasure coding scheme. Usage of the term segments refers to the container and its place in the address space of segments in some embodiments. Usage of the term stripe refers to the same set of shards as a segment and includes how the shards are distributed along with redundancy or parity information in accordance with some embodiments.

A series of address-space transformations takes place across an entire storage system. At the top are the directory entries (file names) which link to an inode. Inodes point into medium address space, where data is logically stored. Medium addresses may be mapped through a series of indirect mediums to spread the load of large files, or implement data services like deduplication or snapshots. Medium addresses may be mapped through a series of indirect mediums to spread the load of large files, or implement data services like deduplication or snapshots. Segment addresses are then translated into physical flash locations. Physical flash locations have an address range bounded by the amount of flash in the system in accordance with some embodiments. Medium addresses and segment addresses are logical containers, and in some embodiments use a 128 bit or larger identifier so as to be practically infinite, with a likelihood of reuse calculated as longer than the expected life of the system. Addresses from logical containers are allocated in a hierarchical fashion in some embodiments. Initially, each non-volatile solid state storage unit 152 may be assigned a range of address space. Within this assigned range, the non-volatile solid state storage 152 is able to allocate addresses without synchronization with other non-volatile solid state storage 152.

Data and metadata is stored by a set of underlying storage layouts that are optimized for varying workload patterns and storage devices. These layouts incorporate multiple redundancy schemes, compression formats and index algorithms. Some of these layouts store information about authorities and authority masters, while others store file metadata and file data. The redundancy schemes include error correction codes that tolerate corrupted bits within a single storage device (such as a NAND flash chip), erasure codes that tolerate the failure of multiple storage nodes, and replication schemes that tolerate data center or regional failures. In some embodiments, low density parity check ('LDPC') code is used within a single storage unit. Reed-Solomon encoding is used within a storage cluster, and mirroring is used within a storage grid in some embodiments. Metadata may be stored using an ordered log structured index (such as a Log Structured Merge Tree), and large data may not be stored in a log structured layout.

In order to maintain consistency across multiple copies of an entity, the storage nodes agree implicitly on two things through calculations: (1) the authority that contains the entity, and (2) the storage node that contains the authority. The assignment of entities to authorities can be done by pseudo randomly assigning entities to authorities, by splitting entities into ranges based upon an externally produced key, or by placing a single entity into each authority. Examples of pseudorandom schemes are linear hashing and the Replication Under Scalable Hashing ('RUSH') family of hashes, including Controlled Replication Under Scalable Hashing ('CRUSH'). In some embodiments, pseudorandom assignment is utilized only for assigning authorities to nodes because the set of nodes can change. The set of authorities cannot change so any subjective function may be applied in these embodiments. Some placement schemes automatically place authorities on storage nodes, while other placement schemes rely on an explicit mapping of authorities to storage nodes. In some embodiments, a pseudorandom scheme is utilized to map from each authority to a set of candidate authority owners. A pseudorandom data distribution function related to CRUSH may assign authorities to storage nodes and create a list of where the authorities are assigned. Each storage node has a copy of the pseudorandom data distribution function, and can arrive at the same calculation for distributing, and later finding or locating an authority. Each of the pseudorandom schemes requires the reachable set of storage nodes as input in some embodiments in order to conclude the same target nodes. Once an entity has been placed in an authority, the entity may be stored on physical devices so that no expected failure will lead to unexpected data loss. In some embodiments, rebalancing algorithms attempt to store the copies of all entities within an authority in the same layout and on the same set of machines.

Examples of expected failures include device failures, stolen machines, datacenter fires, and regional disasters, such as nuclear or geological events. Different failures lead to different levels of acceptable data loss. In some embodiments, a stolen storage node impacts neither the security nor the reliability of the system, while depending on system configuration, a regional event could lead to no loss of data, a few seconds or minutes of lost updates, or even complete data loss.

In the embodiments, the placement of data for storage redundancy is independent of the placement of authorities for data consistency. In some embodiments, storage nodes that contain authorities do not contain any persistent storage. Instead, the storage nodes are connected to non-volatile solid state storage units that do not contain authorities. The communications interconnect between storage nodes and non-volatile solid state storage units consists of multiple communication technologies and has non-uniform performance and fault tolerance characteristics. In some embodiments, as mentioned above, non-volatile solid state storage units are connected to storage nodes via PCI express, storage nodes are connected together within a single chassis using Ethernet backplane, and chassis are connected together to form a storage cluster. Storage clusters are connected to clients using Ethernet or fiber channel in some embodiments. If multiple storage clusters are configured into a storage grid, the multiple storage clusters are connected using the Internet or other long-distance networking links, such as a "metro scale" link or private link that does not traverse the internet.

Authority owners have the exclusive right to modify entities, to migrate entities from one non-volatile solid state storage unit to another non-volatile solid state storage unit, and to add and remove copies of entities. This allows for maintaining the redundancy of the underlying data. When an authority owner fails, is going to be decommissioned, or is overloaded, the authority is transferred to a new storage node. Transient failures make it non-trivial to ensure that all non-faulty machines agree upon the new authority location. The ambiguity that arises due to transient failures can be achieved automatically by a consensus protocol such as Paxos, hot-warm failover schemes, via manual intervention by a remote system administrator, or by a local hardware administrator (such as by physically removing the failed machine from the cluster, or pressing a button on the failed machine). In some embodiments, a consensus protocol is used, and failover is automatic. If too many failures or replication events occur in too short a time period, the system goes into a self-preservation mode and halts replication and data movement activities until an administrator intervenes in accordance with some embodiments.

As authorities are transferred between storage nodes and authority owners update entities in their authorities, the system transfers messages between the storage nodes and non-volatile solid state storage units. With regard to persistent messages, messages that have different purposes are of different types. Depending on the type of the message, the system maintains different ordering and durability guarantees. As the persistent messages are being processed, the messages are temporarily stored in multiple durable and non-durable storage hardware technologies. In some embodiments, messages are stored in RAM, NVRAM and on NAND flash devices, and a variety of protocols are used in order to make efficient use of each storage medium. Latency-sensitive client requests may be persisted in replicated NVRAM, and then later NAND, while background rebalancing operations are persisted directly to NAND.

Persistent messages are persistently stored prior to being transmitted. This allows the system to continue to serve client requests despite failures and component replacement. Although many hardware components contain unique identifiers that are visible to system administrators, manufacturer, hardware supply chain and ongoing monitoring quality control infrastructure, applications running on top of the infrastructure address virtualize addresses. These virtualized addresses do not change over the lifetime of the storage system, regardless of component failures and replacements. This allows each component of the storage system to be replaced over time without reconfiguration or disruptions of client request processing, i.e., the system supports non-disruptive upgrades.

In some embodiments, the virtualized addresses are stored with sufficient redundancy. A continuous monitoring system correlates hardware and software status and the hardware identifiers. This allows detection and prediction of failures due to faulty components and manufacturing details. The monitoring system also enables the proactive transfer of authorities and entities away from impacted devices before failure occurs by removing the component from the critical path in some embodiments.

Figure 2C:
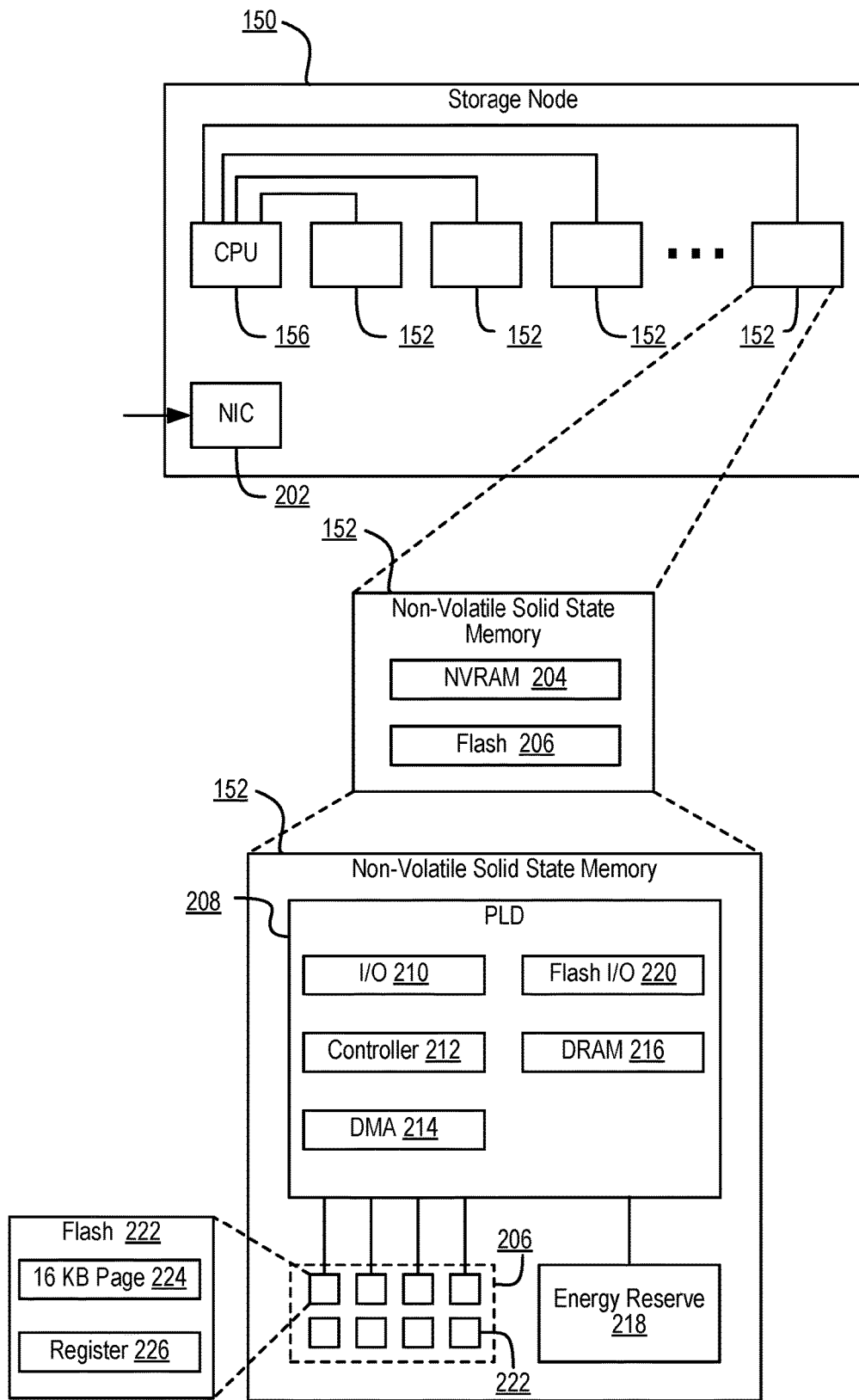
FIG. 2C is a multiple level block diagram, showing contents of a storage node and contents of one of the non-volatile solid state storage units in accordance with some embodiments.

FIG. 2C is a multiple level block diagram, showing contents of a storage node 150 and contents of a non-volatile solid state storage 152 of the storage node 150. Data is communicated to and from the storage node 150 by a network interface controller ('NIC') 202 in some embodiments. Each storage node 150 has a CPU 156, and one or more non-volatile solid state storage 152, as discussed above. Moving down one level in FIG. 2C, each non-volatile solid state storage 152 has a relatively fast non-volatile solid state memory, such as nonvolatile random access memory ('NVRAM') 204, and flash memory 206. In some embodiments, NVRAM 204 may be a component that does not require program/erase cycles (DRAM, MRAM, PCM), and can be a memory that can support being written vastly more often than the memory is read from. Moving down another level in FIG. 2C, the NVRAM 204 is implemented in one embodiment as high speed volatile memory, such as dynamic random access memory (DRAM) 216, backed up by energy reserve 218. Energy reserve 218 provides sufficient electrical power to keep the DRAM 216 powered long enough for contents to be transferred to the flash memory 206 in the event of power failure. In some embodiments, energy reserve 218 is a capacitor, super-capacitor, battery, or other device, that supplies a suitable supply of energy sufficient to enable the transfer of the contents of DRAM 216 to a stable storage medium in the case of power loss. The flash memory 206 is implemented as multiple flash dies 222, which may be referred to as packages of flash dies 222 or an array of flash dies 222. It should be appreciated that the flash dies 222 could be packaged in any number of ways, with a single die per package, multiple dies per package (i.e. multichip packages), in hybrid packages, as bare dies on a printed circuit board or other substrate, as encapsulated dies, etc. In the embodiment shown, the non-volatile solid state storage 152 has a controller 212 or other processor, and an input output (I/O) port 210 coupled to the controller 212. I/O port 210 is coupled to the CPU 156 and/or the network interface controller 202 of the flash storage node 150. Flash input output (I/O) port 220 is coupled to the flash dies 222, and a direct memory access unit (DMA) 214 is coupled to the controller 212, the DRAM 216 and the flash dies 222. In the embodiment shown, the I/O port 210, controller 212, DMA unit 214 and flash I/O port 220 are implemented on a programmable logic device ('PLD') 208, e.g., an FPGA. In this embodiment, each flash die 222 has pages, organized as sixteen kB (kilobyte) pages 224, and a register 226 through which data can be written to or read from the flash die 222. In further embodiments, other types of solid-state memory are used in place of, or in addition to flash memory illustrated within flash die 222.

Storage clusters 161, in various embodiments as disclosed herein, can be contrasted with storage arrays in general. The storage nodes 150 are part of a collection that creates the storage cluster 161. Each storage node 150 owns a slice of data and computing required to provide the data. Multiple storage nodes 150 cooperate to store and retrieve the data. Storage memory or storage devices, as used in storage arrays in general, are less involved with processing and manipulating the data. Storage memory or storage devices in a storage array receive commands to read, write, or erase data. The storage memory or storage devices in a storage array are not aware of a larger system in which they are embedded, or what the data means. Storage memory or storage devices in storage arrays can include various types of storage memory, such as RAM, solid state drives, hard disk drives, etc. The storage units 152 described herein have multiple interfaces active simultaneously and serving multiple purposes. In some embodiments, some of the functionality of a storage node 150 is shifted into a storage unit 152, transforming the storage unit 152 into a combination of storage unit 152 and storage node 150. Placing computing (relative to storage data) into the storage unit 152 places this computing closer to the data itself. The various system embodiments have a hierarchy of storage node layers with different capabilities. By contrast, in a storage array, a controller owns and knows everything about all of the data that the controller manages in a shelf or storage devices. In a storage cluster 161, as described herein, multiple controllers in multiple storage units 152 and/or storage nodes 150 cooperate in various ways (e.g., for erasure coding, data sharding, metadata communication and redundancy, storage capacity expansion or contraction, data recovery, and so on).

Figure 2D:
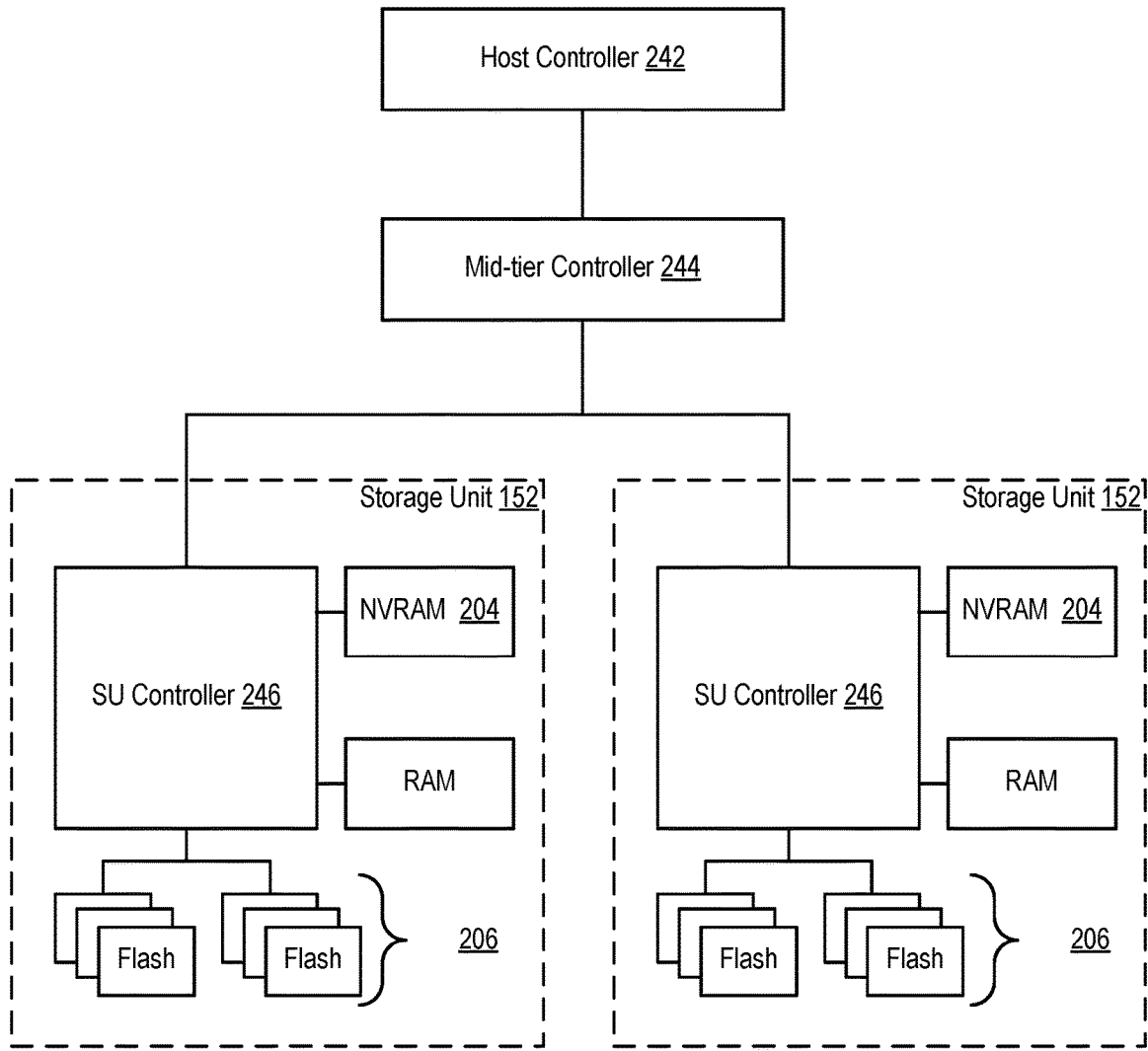
FIG. 2D shows a storage server environment, which uses embodiments of the storage nodes and storage units of some previous FIG.s in accordance with some embodiments.

FIG. 2D shows a storage server environment, which uses embodiments of the storage nodes 150 and storage units 152 of FIGS. 2A-C. In this version, each storage unit 152 has a processor such as controller 212 (see FIG. 2C), an FPGA, flash memory 206, and NVRAM 204 (which is super-capacitor backed DRAM 216, see FIGS. 2B and 2C) on a PCIe (peripheral component interconnect express) board in a chassis 138 (see FIG. 2A). The storage unit 152 may be implemented as a single board containing storage, and may be the largest tolerable failure domain inside the chassis. In some embodiments, up to two storage units 152 may fail and the device will continue with no data loss.

The physical storage is divided into named regions based on application usage in some embodiments. The NVRAM 204 is a contiguous block of reserved memory in the storage unit 152 DRAM 216, and is backed by NAND flash. NVRAM 204 is logically divided into multiple memory regions written for two as spool (e.g., spool_region). Space within the NVRAM 204 spools is managed by each authority 168 independently. Each device provides an amount of storage space to each authority 168. That authority 168 further manages lifetimes and allocations within that space. Examples of a spool include distributed transactions or notions. When the primary power to a storage unit 152 fails, onboard super-capacitors provide a short duration of power hold up. During this holdup interval, the contents of the NVRAM 204 are flushed to flash memory 206. On the next power-on, the contents of the NVRAM 204 are recovered from the flash memory 206.

As for the storage unit controller, the responsibility of the logical "controller" is distributed across each of the blades containing authorities 168. This distribution of logical control is shown in FIG. 2D as a host controller 242, mid-tier controller 244 and storage unit controller(s) 246. Management of the control plane and the storage plane are treated independently, although parts may be physically co-located on the same blade. Each authority 168 effectively serves as an independent controller. Each authority 168 provides its own data and metadata structures, its own background workers, and maintains its own lifecycle.

Figure 2E:
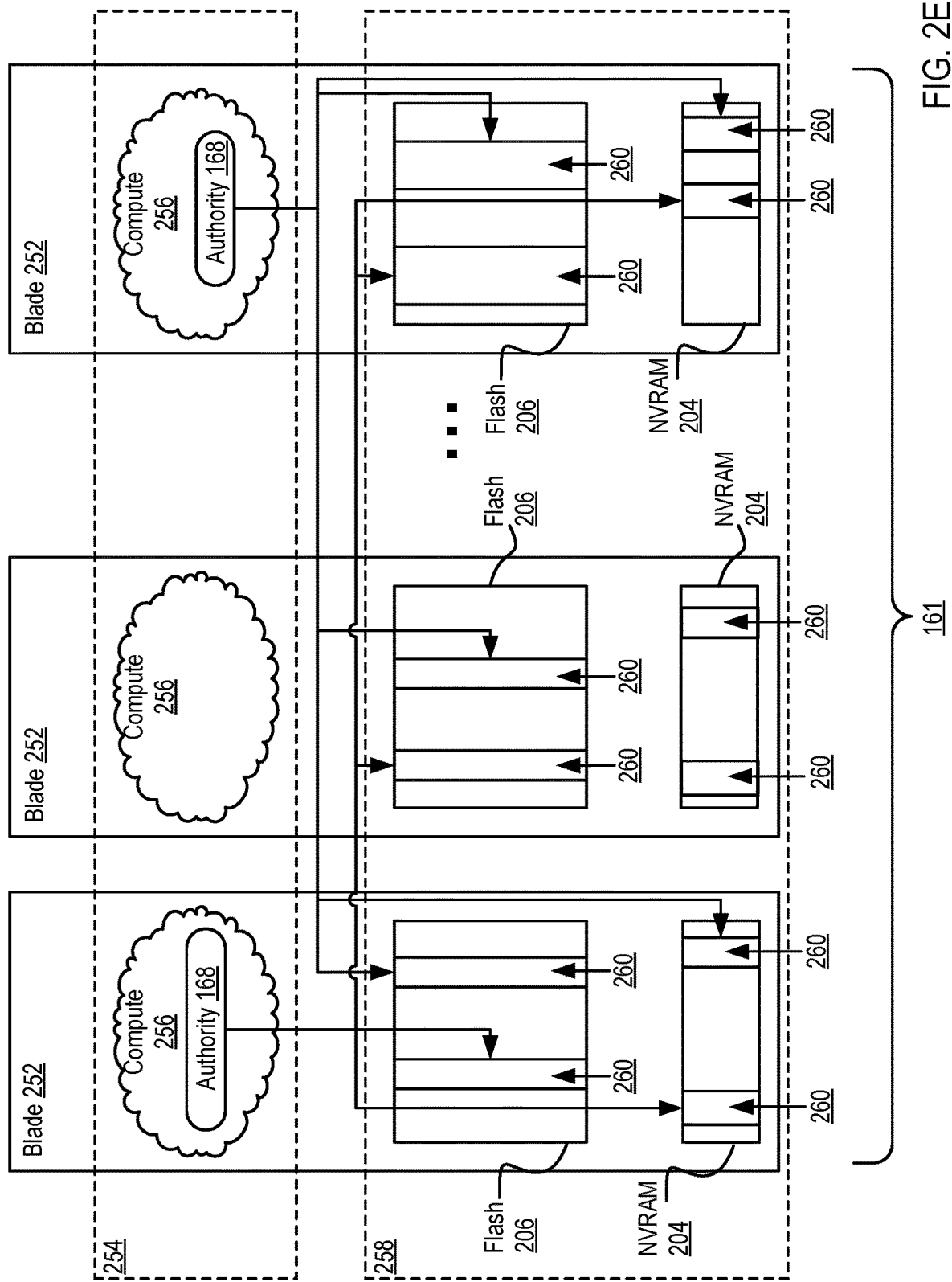
FIG. 2E is a blade hardware block diagram, showing a control plane, compute and storage planes, and authorities interacting with underlying physical resources, in accordance with some embodiments.

FIG. 2E is a blade 252 hardware block diagram, showing a control plane 254, compute and storage planes 256, 258, and authorities 168 interacting with underlying physical resources, using embodiments of the storage nodes 150 and storage units 152 of FIGS. 2A-C in the storage server environment of FIG. 2D. The control plane 254 is partitioned into a number of authorities 168 which can use the compute resources in the compute plane 256 to run on any of the blades 252. The storage plane 258 is partitioned into a set of devices, each of which provides access to flash 206 and NVRAM 204 resources. In one embodiment, the compute plane 256 may perform the operations of a storage array controller, as described herein, on one or more devices of the storage plane 258 (e.g., a storage array).

In the compute and storage planes 256, 258 of FIG. 2E, the authorities 168 interact with the underlying physical resources (i.e., devices). From the point of view of an authority 168, its resources are striped over all of the physical devices. From the point of view of a device, it provides resources to all authorities 168, irrespective of where the authorities happen to run. Each authority 168 has allocated or has been allocated one or more partitions 260 of storage memory in the storage units 152, e.g. partitions 260 in flash memory 206 and NVRAM 204. Each authority 168 uses those allocated partitions 260 that belong to it, for writing or reading user data. Authorities can be associated with differing amounts of physical storage of the system. For example, one authority 168 could have a larger number of partitions 260 or larger sized partitions 260 in one or more storage units 152 than one or more other authorities 168.

Figure 2F:
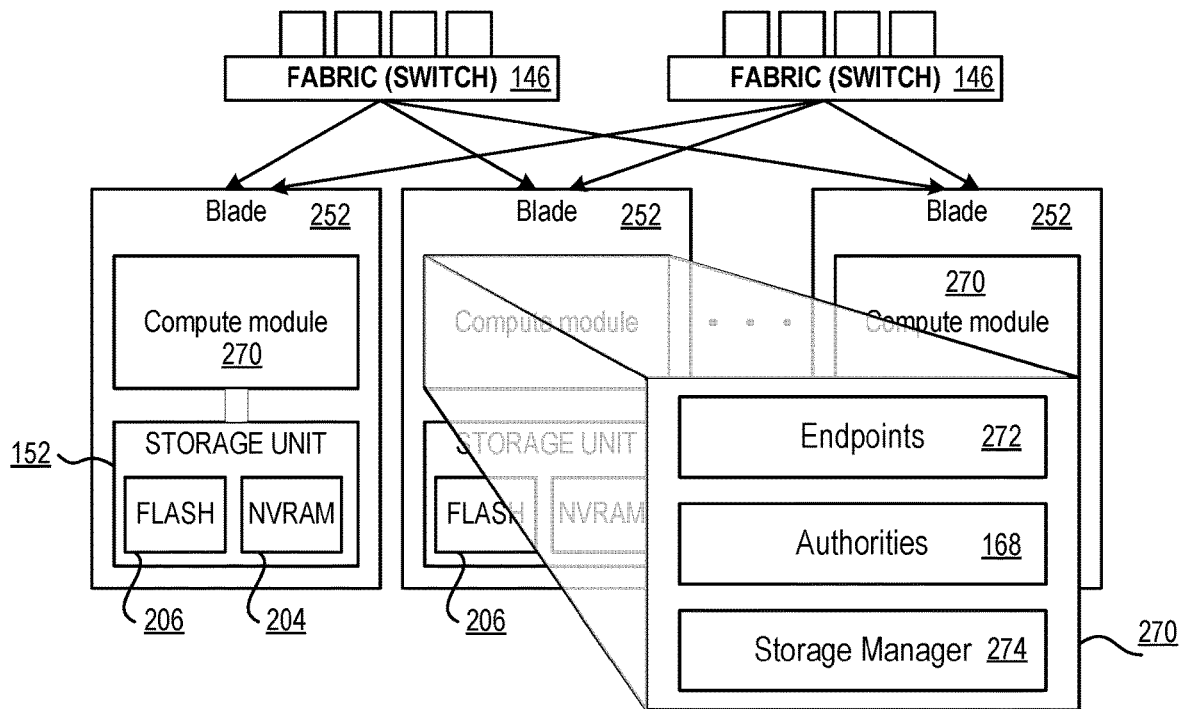
FIG. 2F depicts elasticity software layers in blades of a storage cluster, in accordance with some embodiments.

FIG. 2F depicts elasticity software layers in blades 252 of a storage cluster, in accordance with some embodiments. In the elasticity structure, elasticity software is symmetric, i.e., each blade's compute module 270 runs the three identical layers of processes depicted in FIG. 2F. Storage managers 274 execute read and write requests from other blades 252 for data and metadata stored in local storage unit 152 NVRAM 204 and flash 206. Authorities 168 fulfill client requests by issuing the necessary reads and writes to the blades 252 on whose storage units 152 the corresponding data or metadata resides. Endpoints 272 parse client connection requests received from switch fabric 146 supervisory software, relay the client connection requests to the authorities 168 responsible for fulfillment, and relay the authorities' 168 responses to clients. The symmetric three-layer structure enables the storage system's high degree of concurrency. Elasticity scales out efficiently and reliably in these embodiments. In addition, elasticity implements a unique scale-out technique that balances work evenly across all resources regardless of client access pattern, and maximizes concurrency by eliminating much of the need for inter-blade coordination that typically occurs with conventional distributed locking.

Still referring to FIG. 2F, authorities 168 running in the compute modules 270 of a blade 252 perform the internal operations required to fulfill client requests. One feature of elasticity is that authorities 168 are stateless, i.e., they cache active data and metadata in their own blades' 252 DRAMs for fast access, but the authorities store every update in their NVRAM 204 partitions on three separate blades 252 until the update has been written to flash 206. All the storage system writes to NVRAM 204 are in triplicate to partitions on three separate blades 252 in some embodiments. With triple-mirrored NVRAM 204 and persistent storage protected by parity and Reed-Solomon RAID checksums, the storage system can survive concurrent failure of two blades 252 with no loss of data, metadata, or access to either.

Because authorities 168 are stateless, they can migrate between blades 252. Each authority 168 has a unique identifier. NVRAM 204 and flash 206 partitions are associated with authorities' 168 identifiers, not with the blades 252 on which they are running in some. Thus, when an authority 168 migrates, the authority 168 continues to manage the same storage partitions from its new location. When a new blade 252 is installed in an embodiment of the storage cluster, the system automatically rebalances load by: partitioning the new blade's 252 storage for use by the system's authorities 168, migrating selected authorities 168 to the new blade 252, starting endpoints 272 on the new blade 252 and including them in the switch fabric's 146 client connection distribution algorithm.

From their new locations, migrated authorities 168 persist the contents of their NVRAM 204 partitions on flash 206, process read and write requests from other authorities 168, and fulfill the client requests that endpoints 272 direct to them. Similarly, if a blade 252 fails or is removed, the system redistributes its authorities 168 among the system's remaining blades 252. The redistributed authorities 168 continue to perform their original functions from their new locations.

Figure 2G:
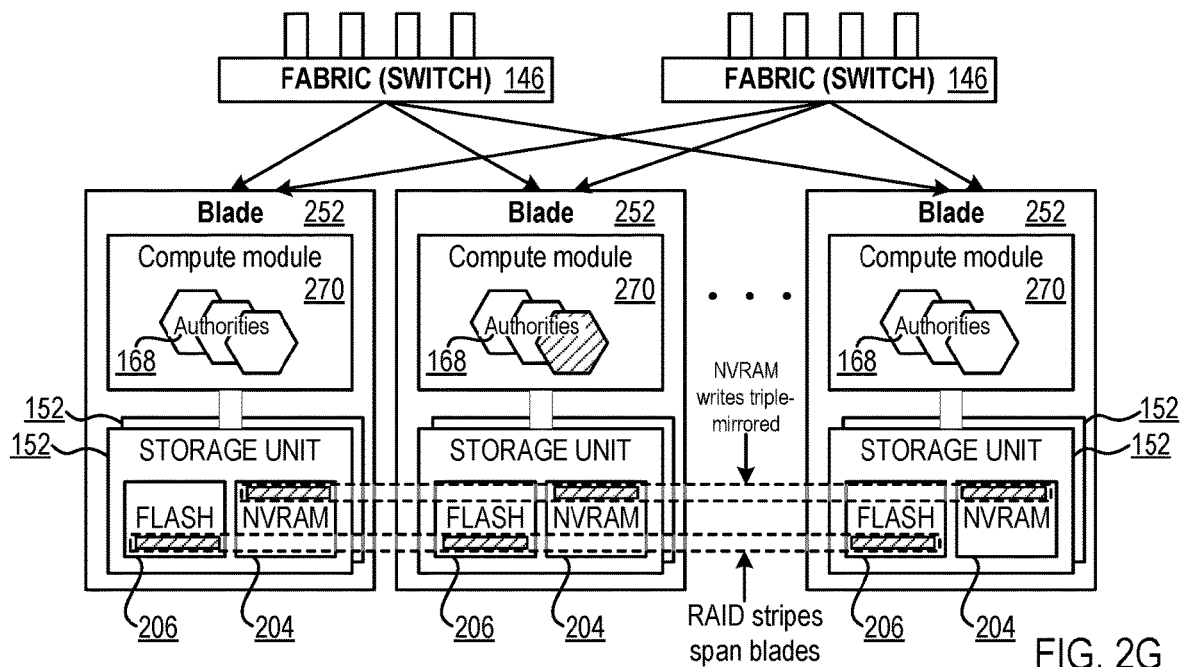
FIG. 2G depicts authorities and storage resources in blades of a storage cluster, in accordance with some embodiments.

FIG. 2G depicts authorities 168 and storage resources in blades 252 of a storage cluster, in accordance with some embodiments. Each authority 168 is exclusively responsible for a partition of the flash 206 and NVRAM 204 on each blade 252. The authority 168 manages the content and integrity of its partitions independently of other authorities 168. Authorities 168 compress incoming data and preserve it temporarily in their NVRAM 204 partitions, and then consolidate, RAID-protect, and persist the data in segments of the storage in their flash 206 partitions. As the authorities 168 write data to flash 206, storage managers 274 perform the necessary flash translation to optimize write performance and maximize media longevity. In the background, authorities 168 "garbage collect," or reclaim space occupied by data that clients have made obsolete by overwriting the data. It should be appreciated that since authorities' 168 partitions are disjoint, there is no need for distributed locking to execute client and writes or to perform background functions.

The embodiments described herein may utilize various software, communication and/or networking protocols. In addition, the configuration of the hardware and/or software may be adjusted to accommodate various protocols. For example, the embodiments may utilize Active Directory, which is a database based system that provides authentication, directory, policy, and other services in a WINDOWS™ environment. In these embodiments, LDAP (Lightweight Directory Access Protocol) is one example application protocol for querying and modifying items in directory service providers such as Active Directory. In some embodiments, a network lock manager ('NLM') is utilized as a facility that works in cooperation with the Network File System ('NFS') to provide a System V style of advisory file and record locking over a network. The Server Message Block ('SMB') protocol, one version of which is also known as Common Internet File System ('CIFS'), may be integrated with the storage systems discussed herein. SMP operates as an application-layer network protocol typically used for providing shared access to files, printers, and serial ports and miscellaneous communications between nodes on a network. SMB also provides an authenticated inter-process communication mechanism. AMAZON™ S3 (Simple Storage Service) is a web service offered by Amazon Web Services, and the systems described herein may interface with Amazon S3 through web services interfaces (REST (representational state transfer), SOAP (simple object access protocol), and BitTorrent). A RESTful API (application programming interface) breaks down a transaction to create a series of small modules. Each module addresses a particular underlying part of the transaction. The control or permissions provided with these embodiments, especially for object data, may include utilization of an access control list ('ACL'). The ACL is a list of permissions attached to an object and the ACL specifies which users or system processes are granted access to objects, as well as what operations are allowed on given objects. The systems may utilize Internet Protocol version 6 ('IPv6'), as well as IPv4, for the communications protocol that provides an identification and location system for computers on networks and routes traffic across the Internet. The routing of packets between networked systems may include Equal-cost multi-path routing ('ECMP'), which is a routing strategy where next-hop packet forwarding to a single destination can occur over multiple "best paths" which tie for top place in routing metric calculations. Multi-path routing can be used in conjunction with most routing protocols, because it is a per-hop decision limited to a single router. The software may support Multi-tenancy, which is an architecture in which a single instance of a software application serves multiple customers. Each customer may be referred to as a tenant. Tenants may be given the ability to customize some parts of the application, but may not customize the application's code, in some embodiments. The embodiments may maintain audit logs. An audit log is a document that records an event in a computing system. In addition to documenting what resources were accessed, audit log entries typically include destination and source addresses, a timestamp, and user login information for compliance with various regulations. The embodiments may support various key management policies, such as encryption key rotation. In addition, the system may support dynamic root passwords or some variation dynamically changing passwords.

Figure 3A:
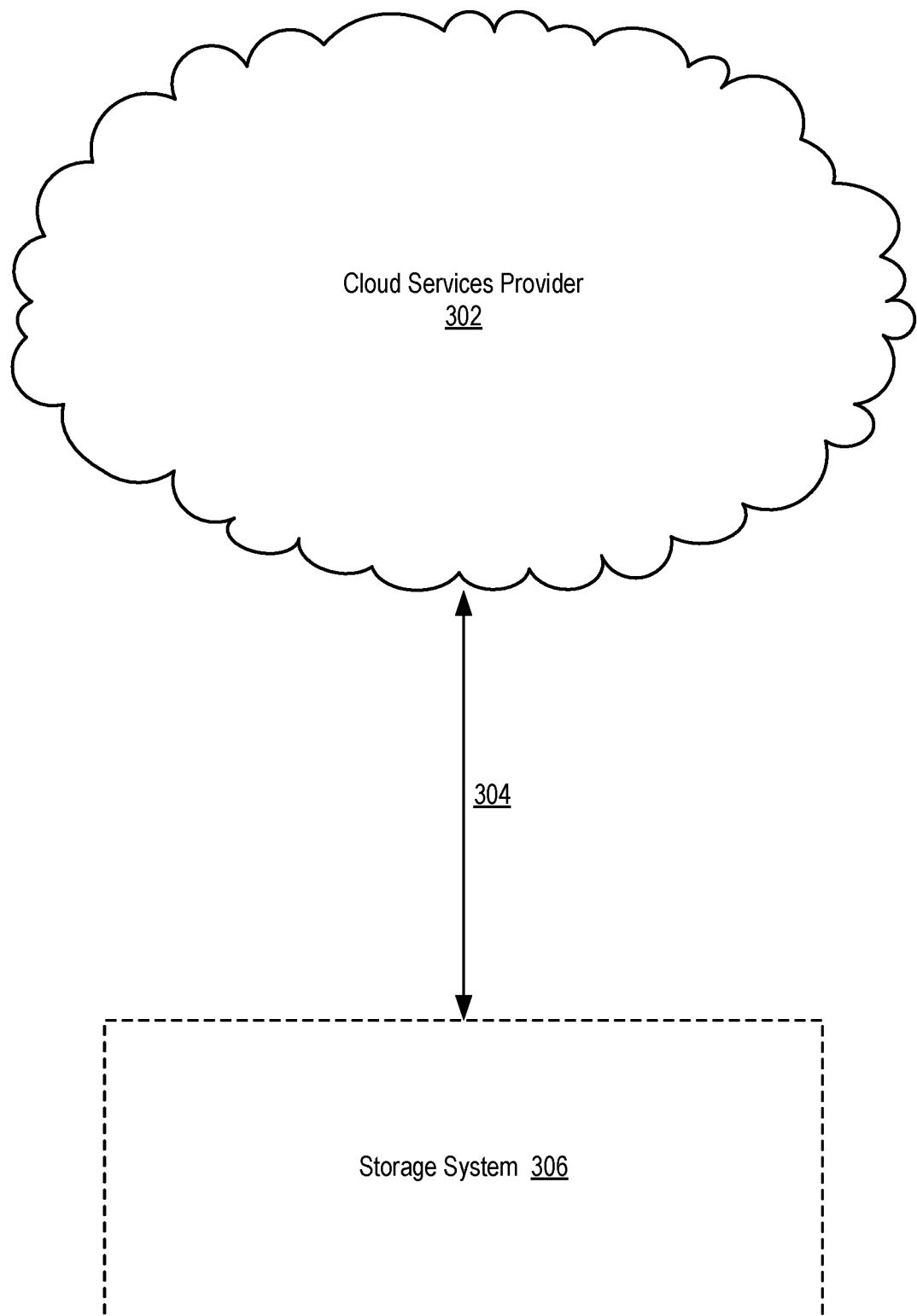
FIG. 3A sets forth a diagram of a storage system that is coupled for data communications with a cloud services provider in accordance with some embodiments of the present disclosure.

FIG. 3A sets forth a diagram of a storage system 306 that is coupled for data communications with a cloud services provider 302 in accordance with some embodiments of the present disclosure. Although depicted in less detail, the storage system 306 depicted in FIG. 3A may be similar to the storage systems described above with reference to FIGS. 1A-1D and FIGS. 2A-2G. In some embodiments, the storage system 306 depicted in FIG. 3A may be embodied as a storage system that includes imbalanced active/active controllers, as a storage system that includes balanced active/active controllers, as a storage system that includes active/active controllers where less than all of each controller's resources are utilized such that each controller has reserve resources that may be used to support failover, as a storage system that includes fully active/active controllers, as a storage system that includes dataset-segregated controllers, as a storage system that includes dual-layer architectures with front-end controllers and back-end integrated storage controllers, as a storage system that includes scale-out clusters of dual-controller arrays, as well as combinations of such embodiments.

In the example depicted in FIG. 3A, the storage system 306 is coupled to the cloud services provider 302 via a data communications link 304. The data communications link 304 may be embodied as a dedicated data communications link, as a data communications pathway that is provided through the use of one or data communications networks such as a wide area network ('WAN') or LAN, or as some other mechanism capable of transporting digital information between the storage system 306 and the cloud services provider 302. Such a data communications link 304 may be fully wired, fully wireless, or some aggregation of wired and wireless data communications pathways. In such an example, digital information may be exchanged between the storage system 306 and the cloud services provider 302 via the data communications link 304 using one or more data communications protocols. For example, digital information may be exchanged between the storage system 306 and the cloud services provider 302 via the data communications link 304 using the handheld device transfer protocol ('HDTP'), hypertext transfer protocol ('HTTP'), internet protocol ('IP'), real-time transfer protocol ('RTP'), transmission control protocol ('TCP'), user datagram protocol ('UDP'), wireless application protocol ('WAP'), or other protocol.

The cloud services provider 302 depicted in FIG. 3A may be embodied, for example, as a system and computing environment that provides a vast array of services to users of the cloud services provider 302 through the sharing of computing resources via the data communications link 304. The cloud services provider 302 may provide on-demand access to a shared pool of configurable computing resources such as computer networks, servers, storage, applications and services, and so on. The shared pool of configurable resources may be rapidly provisioned and released to a user of the cloud services provider 302 with minimal management effort. Generally, the user of the cloud services provider 302 is unaware of the exact computing resources utilized by the cloud services provider 302 to provide the services. Although in many cases such a cloud services provider 302 may be accessible via the Internet, readers of skill in the art will recognize that any system that abstracts the use of shared resources to provide services to a user through any data communications link may be considered a cloud services provider 302.

In the example depicted in FIG. 3A, the cloud services provider 302 may be configured to provide a variety of services to the storage system 306 and users of the storage system 306 through the implementation of various service models. For example, the cloud services provider 302 may be configured to provide services through the implementation of an infrastructure as a service ('IaaS') service model, through the implementation of a platform as a service ('PaaS') service model, through the implementation of a software as a service ('SaaS') service model, through the implementation of an authentication as a service ('AaaS') service model, through the implementation of a storage as a service model where the cloud services provider 302 offers access to its storage infrastructure for use by the storage system 306 and users of the storage system 306, and so on. Readers will appreciate that the cloud services provider 302 may be configured to provide additional services to the storage system 306 and users of the storage system 306 through the implementation of additional service models, as the service models described above are included only for explanatory purposes and in no way represent a limitation of the services that may be offered by the cloud services provider 302 or a limitation as to the service models that may be implemented by the cloud services provider 302.

In the example depicted in FIG. 3A, the cloud services provider 302 may be embodied, for example, as a private cloud, as a public cloud, or as a combination of a private cloud and public cloud. In an embodiment in which the cloud services provider 302 is embodied as a private cloud, the cloud services provider 302 may be dedicated to providing services to a single organization rather than providing services to multiple organizations. In an embodiment where the cloud services provider 302 is embodied as a public cloud, the cloud services provider 302 may provide services to multiple organizations. In still alternative embodiments, the cloud services provider 302 may be embodied as a mix of a private and public cloud services with a hybrid cloud deployment.

Although not explicitly depicted in FIG. 3A, readers will appreciate that a vast amount of additional hardware components and additional software components may be necessary to facilitate the delivery of cloud services to the storage system 306 and users of the storage system 306. For example, the storage system 306 may be coupled to (or even include) a cloud storage gateway. Such a cloud storage gateway may be embodied, for example, as hardware-based or software-based appliance that is located on premise with the storage system 306. Such a cloud storage gateway may operate as a bridge between local applications that are executing on the storage array 306 and remote, cloud-based storage that is utilized by the storage array 306. Through the use of a cloud storage gateway, organizations may move primary iSCSI or NAS to the cloud services provider 302, thereby enabling the organization to save space on their on-premises storage systems. Such a cloud storage gateway may be configured to emulate a disk array, a block-based device, a file server, or other storage system that can translate the SCSI commands, file server commands, or other appropriate command into REST-space protocols that facilitate communications with the cloud services provider 302.

In order to enable the storage system 306 and users of the storage system 306 to make use of the services provided by the cloud services provider 302, a cloud migration process may take place during which data, applications, or other elements from an organization's local systems (or even from another cloud environment) are moved to the cloud services provider 302. In order to successfully migrate data, applications, or other elements to the cloud services provider's 302 environment, middleware such as a cloud migration tool may be utilized to bridge gaps between the cloud services provider's 302 environment and an organization's environment. Such cloud migration tools may also be configured to address potentially high network costs and long transfer times associated with migrating large volumes of data to the cloud services provider 302, as well as addressing security concerns associated with sensitive data to the cloud services provider 302 over data communications networks. In order to further enable the storage system 306 and users of the storage system 306 to make use of the services provided by the cloud services provider 302, a cloud orchestrator may also be used to arrange and coordinate automated tasks in pursuit of creating a consolidated process or workflow. Such a cloud orchestrator may perform tasks such as configuring various components, whether those components are cloud components or on-premises components, as well as managing the interconnections between such components. The cloud orchestrator can simplify the inter-component communication and connections to ensure that links are correctly configured and maintained.

In the example depicted in FIG. 3A, and as described briefly above, the cloud services provider 302 may be configured to provide services to the storage system 306 and users of the storage system 306 through the usage of a SaaS service model, eliminating the need to install and run the application on local computers, which may simplify maintenance and support of the application. Such applications may take many forms in accordance with various embodiments of the present disclosure. For example, the cloud services provider 302 may be configured to provide access to data analytics applications to the storage system 306 and users of the storage system 306. Such data analytics applications may be configured, for example, to receive vast amounts of telemetry data phoned home by the storage system 306. Such telemetry data may describe various operating characteristics of the storage system 306 and may be analyzed for a vast array of purposes including, for example, to determine the health of the storage system 306, to identify workloads that are executing on the storage system 306, to predict when the storage system 306 will run out of various resources, to recommend configuration changes, hardware or software upgrades, workflow migrations, or other actions that may improve the operation of the storage system 306.

The cloud services provider 302 may also be configured to provide access to virtualized computing environments to the storage system 306 and users of the storage system 306. Such virtualized computing environments may be embodied, for example, as a virtual machine or other virtualized computer hardware platforms, virtual storage devices, virtualized computer network resources, and so on. Examples of such virtualized environments can include virtual machines that are created to emulate an actual computer, virtualized desktop environments that separate a logical desktop from a physical machine, virtualized file systems that allow uniform access to different types of concrete file systems, and many others.

Figure 3B:
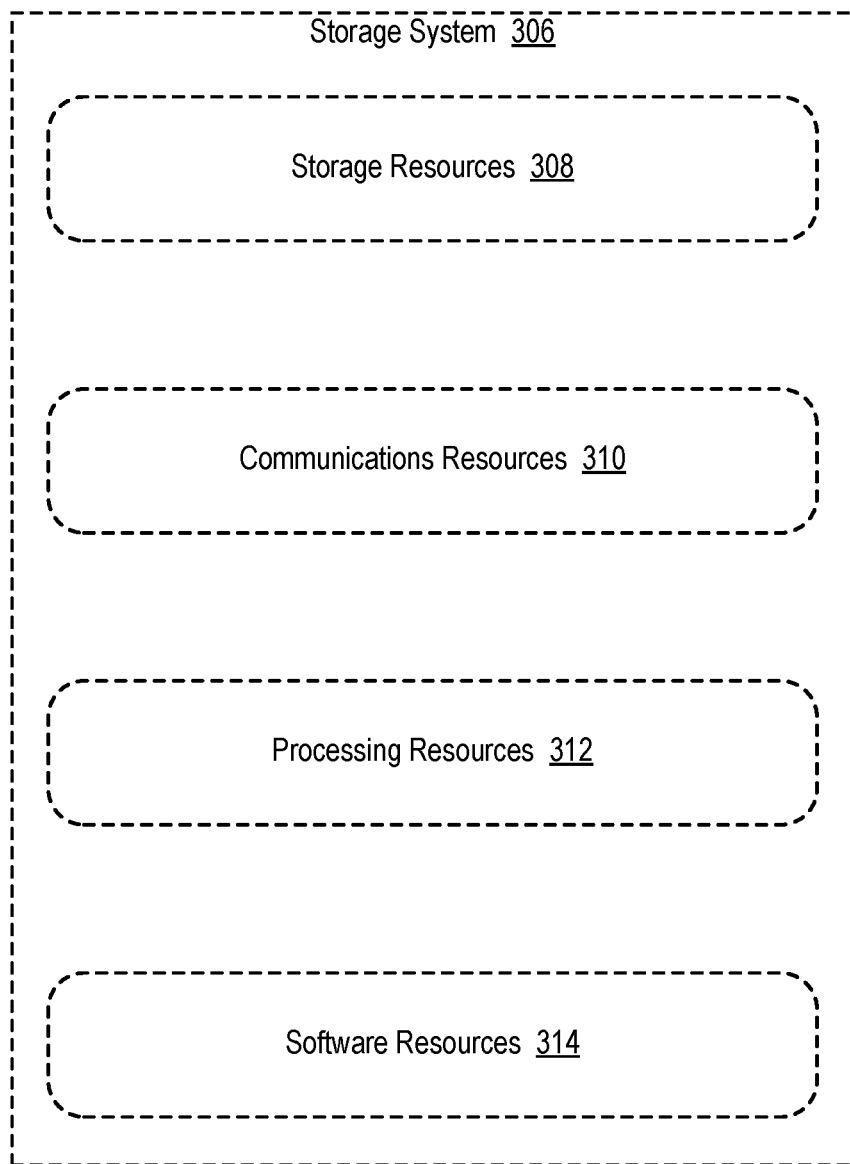
FIG. 3B sets forth a diagram of a storage system in accordance with some embodiments of the present disclosure.

For further explanation, FIG. 3B sets forth a diagram of a storage system 306 in accordance with some embodiments of the present disclosure. Although depicted in less detail, the storage system 306 depicted in FIG. 3B may be similar to the storage systems described above with reference to FIGS. 1A-1D and FIGS. 2A-2G as the storage system may include many of the components described above.

The storage system 306 depicted in FIG. 3B may include a vast amount of storage resources 308, which may be embodied in many forms. For example, the storage resources 308 can include nano-RAM or another form of nonvolatile random access memory that utilizes carbon nanotubes deposited on a substrate, 3D crosspoint non-volatile memory, flash memory including single-level cell ('SLC') NAND flash, multi-level cell ('MLC') NAND flash, triple-level cell ('TLC') NAND flash, quad-level cell ('QLC') NAND flash, or others. Likewise, the storage resources 308 may include non-volatile magnetoresistive random-access memory ('MRAM'), including spin transfer torque ('STT') MRAM. The example storage resources 308 may alternatively include non-volatile phase-change memory ('PCM'), quantum memory that allows for the storage and retrieval of photonic quantum information, resistive random-access memory ('ReRAM'), storage class memory ('SCM'), or other form of storage resources, including any combination of resources described herein. Readers will appreciate that other forms of computer memories and storage devices may be utilized by the storage systems described above, including DRAM, SRAM, EEPROM, universal memory, and many others. The storage resources 308 depicted in FIG. 3A may be embodied in a variety of form factors, including but not limited to, dual in-line memory modules ('DIMMs'), non-volatile dual in-line memory modules ('NVDIMMs'), M.2, U.2, and others.

The storage resources 308 depicted in FIG. 3A may include various forms of SCM. SCM may effectively treat fast, non-volatile memory (e.g., NAND flash) as an extension of DRAM such that an entire dataset may be treated as an in-memory dataset that resides entirely in DRAM. SCM may include non-volatile media such as, for example, NAND flash. Such NAND flash may be accessed utilizing NVMe that can use the PCIe bus as its transport, providing for relatively low access latencies compared to older protocols. In fact, the network protocols used for SSDs in all-flash arrays can include NVMe using Ethernet (ROCE, NVME TCP), Fibre Channel (NVMe FC), InfiniBand (iWARP), and others that make it possible to treat fast, non-volatile memory as an extension of DRAM. In view of the fact that DRAM is often byte-addressable and fast, non-volatile memory such as NAND flash is block-addressable, a controller software/hardware stack may be needed to convert the block data to the bytes that are stored in the media. Examples of media and software that may be used as SCM can include, for example, 3D XPoint, Intel Memory Drive Technology, Samsung's Z-SSD, and others.

The example storage system 306 depicted in FIG. 3B may implement a variety of storage architectures. For example, storage systems in accordance with some embodiments of the present disclosure may utilize block storage where data is stored in blocks, and each block essentially acts as an individual hard drive. Storage systems in accordance with some embodiments of the present disclosure may utilize object storage, where data is managed as objects. Each object may include the data itself, a variable amount of metadata, and a globally unique identifier, where object storage can be implemented at multiple levels (e.g., device level, system level, interface level). Storage systems in accordance with some embodiments of the present disclosure utilize file storage in which data is stored in a hierarchical structure. Such data may be saved in files and folders, and presented to both the system storing it and the system retrieving it in the same format.

The example storage system 306 depicted in FIG. 3B may be embodied as a storage system in which additional storage resources can be added through the use of a scale-up model, additional storage resources can be added through the use of a scale-out model, or through some combination thereof. In a scale-up model, additional storage may be added by adding additional storage devices. In a scale-out model, however, additional storage nodes may be added to a cluster of storage nodes, where such storage nodes can include additional processing resources, additional networking resources, and so on.

The storage system 306 depicted in FIG. 3B also includes communications resources 310 that may be useful in facilitating data communications between components within the storage system 306, as well as data communications between the storage system 306 and computing devices that are outside of the storage system 306, including embodiments where those resources are separated by a relatively vast expanse. The communications resources 310 may be configured to utilize a variety of different protocols and data communication fabrics to facilitate data communications between components within the storage systems as well as computing devices that are outside of the storage system. For example, the communications resources 310 can include fibre channel ('FC') technologies such as FC fabrics and FC protocols that can transport SCSI commands over FC network, FC over ethernet ('FCoE') technologies through which FC frames are encapsulated and transmitted over Ethernet networks, InfiniBand ('IB') technologies in which a switched fabric topology is utilized to facilitate transmissions between channel adapters, NVM Express ('NVMe') technologies and NVMe over fabrics ('NVMeoF') technologies through which non-volatile storage media attached via a PCI express ('PCIe') bus may be accessed, and others. In fact, the storage systems described above may, directly or indirectly, make use of neutrino communication technologies and devices through which information (including binary information) is transmitted using a beam of neutrinos.

The communications resources 310 can also include mechanisms for accessing storage resources 308 within the storage system 306 utilizing serial attached SCSI ('SAS'), serial ATA ('SATA') bus interfaces for connecting storage resources 308 within the storage system 306 to host bus adapters within the storage system 306, internet small computer systems interface ('iSCSI') technologies to provide block-level access to storage resources 308 within the storage system 306, and other communications resources that that may be useful in facilitating data communications between components within the storage system 306, as well as data communications between the storage system 306 and computing devices that are outside of the storage system 306.

The storage system 306 depicted in FIG. 3B also includes processing resources 312 that may be useful in useful in executing computer program instructions and performing other computational tasks within the storage system 306. The processing resources 312 may include one or more ASICs that are customized for some particular purpose as well as one or more CPUs. The processing resources 312 may also include one or more DSPs, one or more FPGAs, one or more systems on a chip ('SoCs'), or other form of processing resources 312. The storage system 306 may utilize the storage resources 312 to perform a variety of tasks including, but not limited to, supporting the execution of software resources 314 that will be described in greater detail below.

The storage system 306 depicted in FIG. 3B also includes software resources 314 that, when executed by processing resources 312 within the storage system 306, may perform a vast array of tasks. The software resources 314 may include, for example, one or more modules of computer program instructions that when executed by processing resources 312 within the storage system 306 are useful in carrying out various data protection techniques to preserve the integrity of data that is stored within the storage systems. Readers will appreciate that such data protection techniques may be carried out, for example, by system software executing on computer hardware within the storage system, by a cloud services provider, or in other ways. Such data protection techniques can include, for example, data archiving techniques that cause data that is no longer actively used to be moved to a separate storage device or separate storage system for long-term retention, data backup techniques through which data stored in the storage system may be copied and stored in a distinct location to avoid data loss in the event of equipment failure or some other form of catastrophe with the storage system, data replication techniques through which data stored in the storage system is replicated to another storage system such that the data may be accessible via multiple storage systems, data snapshotting techniques through which the state of data within the storage system is captured at various points in time, data and database cloning techniques through which duplicate copies of data and databases may be created, and other data protection techniques.

The software resources 314 may also include software that is useful in implementing software-defined storage ('SDS'). In such an example, the software resources 314 may include one or more modules of computer program instructions that, when executed, are useful in policy-based provisioning and management of data storage that is independent of the underlying hardware. Such software resources 314 may be useful in implementing storage virtualization to separate the storage hardware from the software that manages the storage hardware.

The software resources 314 may also include software that is useful in facilitating and optimizing I/O operations that are directed to the storage resources 308 in the storage system 306. For example, the software resources 314 may include software modules that perform carry out various data reduction techniques such as, for example, data compression, data deduplication, and others. The software resources 314 may include software modules that intelligently group together I/O operations to facilitate better usage of the underlying storage resource 308, software modules that perform data migration operations to migrate from within a storage system, as well as software modules that perform other functions. Such software resources 314 may be embodied as one or more software containers or in many other ways.

Figure 3C:
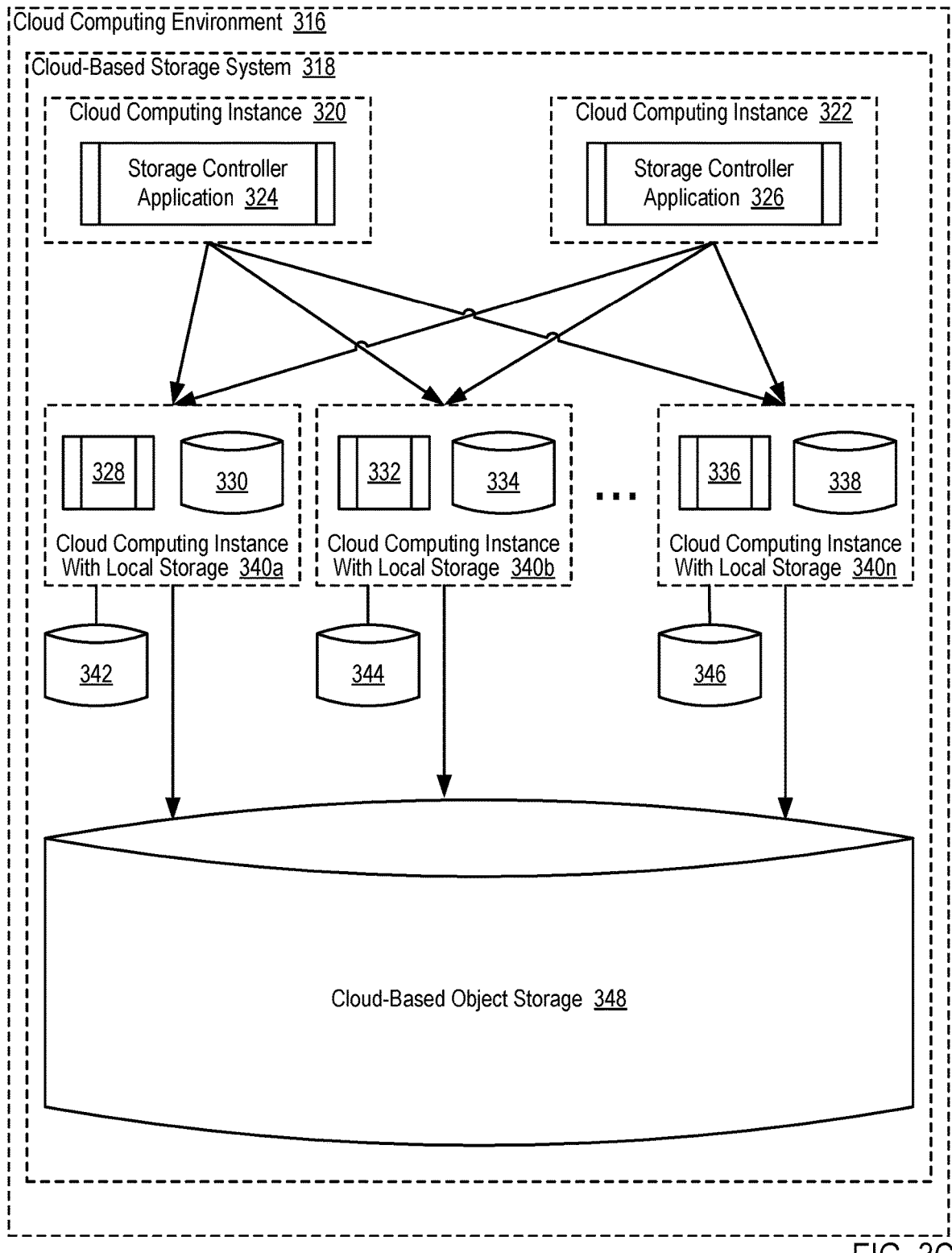
FIG. 3C sets forth an example of a cloud-based storage system in accordance with some embodiments of the present disclosure.

For further explanation, FIG. 3C sets forth an example of a cloud-based storage system 318 in accordance with some embodiments of the present disclosure. In the example depicted in FIG. 3C, the cloud-based storage system 318 is created entirely in a cloud computing environment 316 such as, for example, Amazon Web Services ('AWS'), Microsoft Azure, Google Cloud Platform, IBM Cloud, Oracle Cloud, and others. The cloud-based storage system 318 may be used to provide services similar to the services that may be provided by the storage systems described above. For example, the cloud-based storage system 318 may be used to provide block storage services to users of the cloud-based storage system 318, the cloud-based storage system 318 may be used to provide storage services to users of the cloud-based storage system 318 through the use of solid-state storage, and so on.

The cloud-based storage system 318 depicted in FIG. 3C includes two cloud computing instances 320, 322 that each are used to support the execution of a storage controller application 324, 326. The cloud computing instances 320, 322 may be embodied, for example, as instances of cloud computing resources (e.g., virtual machines) that may be provided by the cloud computing environment 316 to support the execution of software applications such as the storage controller application 324, 326. In one embodiment, the cloud computing instances 320, 322 may be embodied as Amazon Elastic Compute Cloud ('EC2') instances. In such an example, an Amazon Machine Image ('AMI') that includes the storage controller application 324, 326 may be booted to create and configure a virtual machine that may execute the storage controller application 324, 326.

In the example method depicted in FIG. 3C, the storage controller application 324, 326 may be embodied as a module of computer program instructions that, when executed, carries out various storage tasks. For example, the storage controller application 324, 326 may be embodied as a module of computer program instructions that, when executed, carries out the same tasks as the controllers 110A, 110B in FIG. 1A described above such as writing data received from the users of the cloud-based storage system 318 to the cloud-based storage system 318, erasing data from the cloud-based storage system 318, retrieving data from the cloud-based storage system 318 and providing such data to users of the cloud-based storage system 318, monitoring and reporting of disk utilization and performance, performing redundancy operations, such as RAID or RAID-like data redundancy operations, compressing data, encrypting data, deduplicating data, and so forth. Readers will appreciate that because there are two cloud computing instances 320, 322 that each include the storage controller application 324, 326, in some embodiments one cloud computing instance 320 may operate as the primary controller as described above while the other cloud computing instance 322 may operate as the secondary controller as described above. Readers will appreciate that the storage controller application 324, 326 depicted in FIG. 3C may include identical source code that is executed within different cloud computing instances 320, 322.

Consider an example in which the cloud computing environment 316 is embodied as AWS and the cloud computing instances are embodied as EC2 instances. In such an example, the cloud computing instance 320 that operates as the primary controller may be deployed on one of the instance types that has a relatively large amount of memory and processing power while the cloud computing instance 322 that operates as the secondary controller may be deployed on one of the instance types that has a relatively small amount of memory and processing power. In such an example, upon the occurrence of a failover event where the roles of primary and secondary are switched, a double failover may actually be carried out such that: 1) a first failover event where the cloud computing instance 322 that formerly operated as the secondary controller begins to operate as the primary controller, and 2) a third cloud computing instance (not shown) that is of an instance type that has a relatively large amount of memory and processing power is spun up with a copy of the storage controller application, where the third cloud computing instance begins operating as the primary controller while the cloud computing instance 322 that originally operated as the secondary controller begins operating as the secondary controller again. In such an example, the cloud computing instance 320 that formerly operated as the primary controller may be terminated. Readers will appreciate that in alternative embodiments, the cloud computing instance 320 that is operating as the secondary controller after the failover event may continue to operate as the secondary controller and the cloud computing instance 322 that operated as the primary controller after the occurrence of the failover event may be terminated once the primary role has been assumed by the third cloud computing instance (not shown).

Readers will appreciate that while the embodiments described above relate to embodiments where one cloud computing instance 320 operates as the primary controller and the second cloud computing instance 322 operates as the secondary controller, other embodiments are within the scope of the present disclosure. For example, each cloud computing instance 320, 322 may operate as a primary controller for some portion of the address space supported by the cloud-based storage system 318, each cloud computing instance 320, 322 may operate as a primary controller where the servicing of I/O operations directed to the cloud-based storage system 318 are divided in some other way, and so on. In fact, in other embodiments where costs savings may be prioritized over performance demands, only a single cloud computing instance may exist that contains the storage controller application.

The cloud-based storage system 318 depicted in FIG. 3C includes cloud computing instances 340a, 340b, 340n with local storage 330, 334, 338. The cloud computing instances 340a, 340b, 340n depicted in FIG. 3C may be embodied, for example, as instances of cloud computing resources that may be provided by the cloud computing environment 316 to support the execution of software applications. The cloud computing instances 340a, 340b, 340n of FIG. 3C may differ from the cloud computing instances 320, 322 described above as the cloud computing instances 340a, 340b, 340n of FIG. 3C have local storage 330, 334, 338 resources whereas the cloud computing instances 320, 322 that support the execution of the storage controller application 324, 326 need not have local storage resources. The cloud computing instances 340a, 340b, 340n with local storage 330, 334, 338 may be embodied, for example, as EC2 M5 instances that include one or more SSDs, as EC2 R5 instances that include one or more SSDs, as EC2 I3 instances that include one or more SSDs, and so on. In some embodiments, the local storage 330, 334, 338 must be embodied as solid-state storage (e.g., SSDs) rather than storage that makes use of hard disk drives.

In the example depicted in FIG. 3C, each of the cloud computing instances 340a, 340b, 340n with local storage 330, 334, 338 can include a software daemon 328, 332, 336 that, when executed by a cloud computing instance 340a, 340b, 340n can present itself to the storage controller applications 324, 326 as if the cloud computing instance 340a, 340b, 340n were a physical storage device (e.g., one or more SSDs). In such an example, the software daemon 328, 332, 336 may include computer program instructions similar to those that would normally be contained on a storage device such that the storage controller applications 324, 326 can send and receive the same commands that a storage controller would send to storage devices. In such a way, the storage controller applications 324, 326 may include code that is identical to (or substantially identical to) the code that would be executed by the controllers in the storage systems described above. In these and similar embodiments, communications between the storage controller applications 324, 326 and the cloud computing instances 340a, 340b, 340n with local storage 330, 334, 338 may utilize iSCSI, NVMe over TCP, messaging, a custom protocol, or in some other mechanism.

In the example depicted in FIG. 3C, each of the cloud computing instances 340a, 340b, 340n with local storage 330, 334, 338 may also be coupled to block-storage 342, 344, 346 that is offered by the cloud computing environment 316. The block-storage 342, 344, 346 that is offered by the cloud computing environment 316 may be embodied, for example, as Amazon Elastic Block Store ('EBS') volumes. For example, a first EBS volume may be coupled to a first cloud computing instance 340a, a second EBS volume may be coupled to a second cloud computing instance 340b, and a third EBS volume may be coupled to a third cloud computing instance 340n. In such an example, the block-storage 342, 344, 346 that is offered by the cloud computing environment 316 may be utilized in a manner that is similar to how the NVRAM devices described above are utilized, as the software daemon 328, 332, 336 (or some other module) that is executing within a particular cloud comping instance 340a, 340b, 340n may, upon receiving a request to write data, initiate a write of the data to its attached EBS volume as well as a write of the data to its local storage 330, 334, 338 resources. In some alternative embodiments, data may only be written to the local storage 330, 334, 338 resources within a particular cloud comping instance 340a, 340b, 340n. In an alternative embodiment, rather than using the block-storage 342, 344, 346 that is offered by the cloud computing environment 316 as NVRAM, actual RAM on each of the cloud computing instances 340a, 340b, 340n with local storage 330, 334, 338 may be used as NVRAM, thereby decreasing network utilization costs that would be associated with using an EBS volume as the NVRAM.

In the example depicted in FIG. 3C, the cloud computing instances 340a, 340b, 340n with local storage 330, 334, 338 may be utilized, by cloud computing instances 320, 322 that support the execution of the storage controller application 324, 326 to service I/O operations that are directed to the cloud-based storage system 318. Consider an example in which a first cloud computing instance 320 that is executing the storage controller application 324 is operating as the primary controller. In such an example, the first cloud computing instance 320 that is executing the storage controller application 324 may receive (directly or indirectly via the secondary controller) requests to write data to the cloud-based storage system 318 from users of the cloud-based storage system 318. In such an example, the first cloud computing instance 320 that is executing the storage controller application 324 may perform various tasks such as, for example, deduplicating the data contained in the request, compressing the data contained in the request, determining where to the write the data contained in the request, and so on, before ultimately sending a request to write a deduplicated, encrypted, or otherwise possibly updated version of the data to one or more of the cloud computing instances 340a, 340b, 340n with local storage 330, 334, 338. Either cloud computing instance 320, 322, in some embodiments, may receive a request to read data from the cloud-based storage system 318 and may ultimately send a request to read data to one or more of the cloud computing instances 340a, 340b, 340n with local storage 330, 334, 338.

Readers will appreciate that when a request to write data is received by a particular cloud computing instance 340a, 340b, 340n with local storage 330, 334, 338, the software daemon 328, 332, 336 or some other module of computer program instructions that is executing on the particular cloud computing instance 340a, 340b, 340n may be configured to not only write the data to its own local storage 330, 334, 338 resources and any appropriate block-storage 342, 344, 346 that are offered by the cloud computing environment 316, but the software daemon 328, 332, 336 or some other module of computer program instructions that is executing on the particular cloud computing instance 340a, 340b, 340n may also be configured to write the data to cloud-based object storage 348 that is attached to the particular cloud computing instance 340a, 340b, 340n. The cloud-based object storage 348 that is attached to the particular cloud computing instance 340a, 340b, 340n may be embodied, for example, as Amazon Simple Storage Service ('S3') storage that is accessible by the particular cloud computing instance 340a, 340b, 340n. In other embodiments, the cloud computing instances 320, 322 that each include the storage controller application 324, 326 may initiate the storage of the data in the local storage 330, 334, 338 of the cloud computing instances 340a, 340b, 340n and the cloud-based object storage 348.

Readers will appreciate that, as described above, the cloud-based storage system 318 may be used to provide block storage services to users of the cloud-based storage system 318. While the local storage 330, 334, 338 resources and the block-storage 342, 344, 346 resources that are utilized by the cloud computing instances 340a, 340b, 340n may support block-level access, the cloud-based object storage 348 that is attached to the particular cloud computing instance 340a, 340b, 340n supports only object-based access. In order to address this, the software daemon 328, 332, 336 or some other module of computer program instructions that is executing on the particular cloud computing instance 340a, 340b, 340n may be configured to take blocks of data, package those blocks into objects, and write the objects to the cloud-based object storage 348 that is attached to the particular cloud computing instance 340a, 340b, 340n.

Consider an example in which data is written to the local storage 330, 334, 338 resources and the block-storage 342, 344, 346 resources that are utilized by the cloud computing instances 340a, 340b, 340n in 1 MB blocks. In such an example, assume that a user of the cloud-based storage system 318 issues a request to write data that, after being compressed and deduplicated by the storage controller application 324, 326 results in the need to write 5 MB of data. In such an example, writing the data to the local storage 330, 334, 338 resources and the block-storage 342, 344, 346 resources that are utilized by the cloud computing instances 340a, 340b, 340n is relatively straightforward as 5 blocks that are 1 MB in size are written to the local storage 330, 334, 338 resources and the block-storage 342, 344, 346 resources that are utilized by the cloud computing instances 340a, 340b, 340n. In such an example, the software daemon 328, 332, 336 or some other module of computer program instructions that is executing on the particular cloud computing instance 340a, 340b, 340n may be configured to: 1) create a first object that includes the first 1 MB of data and write the first object to the cloud-based object storage 348, 2) create a second object that includes the second 1 MB of data and write the second object to the cloud-based object storage 348, 3) create a third object that includes the third 1 MB of data and write the third object to the cloud-based object storage 348, and so on. As such, in some embodiments, each object that is written to the cloud-based object storage 348 may be identical (or nearly identical) in size. Readers will appreciate that in such an example, metadata that is associated with the data itself may be included in each object (e.g., the first 1 MB of the object is data and the remaining portion is metadata associated with the data).

Readers will appreciate that the cloud-based object storage 348 may be incorporated into the cloud-based storage system 318 to increase the durability of the cloud-based storage system 318. Continuing with the example described above where the cloud computing instances 340a, 340b, 340n are EC2 instances, readers will understand that EC2 instances are only guaranteed to have a monthly uptime of 99.9% and data stored in the local instance store only persists during the lifetime of the EC2 instance. As such, relying on the cloud computing instances 340a, 340b, 340n with local storage 330, 334, 338 as the only source of persistent data storage in the cloud-based storage system 318 may result in a relatively unreliable storage system. Likewise, EBS volumes are designed for 99.999% availability. As such, even relying on EBS as the persistent data store in the cloud-based storage system 318 may result in a storage system that is not sufficiently durable. Amazon S3, however, is designed to provide 99.999999999% durability, meaning that a cloud-based storage system 318 that can incorporate S3 into its pool of storage is substantially more durable than various other options.

Readers will appreciate that while a cloud-based storage system 318 that can incorporate S3 into its pool of storage is substantially more durable than various other options, utilizing S3 as the primary pool of storage may result in storage system that has relatively slow response times and relatively long I/O latencies. As such, the cloud-based storage system 318 depicted in FIG. 3C not only stores data in S3 but the cloud-based storage system 318 also stores data in local storage 330, 334, 338 resources and block-storage 342, 344, 346 resources that are utilized by the cloud computing instances 340a, 340b, 340n, such that read operations can be serviced from local storage 330, 334, 338 resources and the block-storage 342, 344, 346 resources that are utilized by the cloud computing instances 340a, 340b, 340n, thereby reducing read latency when users of the cloud-based storage system 318 attempt to read data from the cloud-based storage system 318.

In some embodiments, all data that is stored by the cloud-based storage system 318 may be stored in both: 1) the cloud-based object storage 348, and 2) at least one of the local storage 330, 334, 338 resources or block-storage 342, 344, 346 resources that are utilized by the cloud computing instances 340a, 340b, 340n. In such embodiments, the local storage 330, 334, 338 resources and block-storage 342, 344, 346 resources that are utilized by the cloud computing instances 340a, 340b, 340n may effectively operate as cache that generally includes all data that is also stored in S3, such that all reads of data may be serviced by the cloud computing instances 340a, 340b, 340n without requiring the cloud computing instances 340a, 340b, 340n to access the cloud-based object storage 348. Readers will appreciate that in other embodiments, however, all data that is stored by the cloud-based storage system 318 may be stored in the cloud-based object storage 348, but less than all data that is stored by the cloud-based storage system 318 may be stored in at least one of the local storage 330, 334, 338 resources or block-storage 342, 344, 346 resources that are utilized by the cloud computing instances 340a, 340b, 340n. In such an example, various policies may be utilized to determine which subset of the data that is stored by the cloud-based storage system 318 should reside in both: 1) the cloud-based object storage 348, and 2) at least one of the local storage 330, 334, 338 resources or block-storage 342, 344, 346 resources that are utilized by the cloud computing instances 340a, 340b, 340n.

As described above, when the cloud computing instances 340a, 340b, 340n with local storage 330, 334, 338 are embodied as EC2 instances, the cloud computing instances 340a, 340b, 340n with local storage 330, 334, 338 are only guaranteed to have a monthly uptime of 99.9% and data stored in the local instance store only persists during the lifetime of each cloud computing instance 340a, 340b, 340n with local storage 330, 334, 338. As such, one or more modules of computer program instructions that are executing within the cloud-based storage system 318 (e.g., a monitoring module that is executing on its own EC2 instance) may be designed to handle the failure of one or more of the cloud computing instances 340a, 340b, 340n with local storage 330, 334, 338. In such an example, the monitoring module may handle the failure of one or more of the cloud computing instances 340a, 340b, 340n with local storage 330, 334, 338 by creating one or more new cloud computing instances with local storage, retrieving data that was stored on the failed cloud computing instances 340a, 340b, 340n from the cloud-based object storage 348, and storing the data retrieved from the cloud-based object storage 348 in local storage on the newly created cloud computing instances. Readers will appreciate that many variants of this process may be implemented.

Consider an example in which all cloud computing instances 340a, 340b, 340n with local storage 330, 334, 338 failed. In such an example, the monitoring module may create new cloud computing instances with local storage, where high-bandwidth instances types are selected that allow for the maximum data transfer rates between the newly created high-bandwidth cloud computing instances with local storage and the cloud-based object storage 348. Readers will appreciate that instances types are selected that allow for the maximum data transfer rates between the new cloud computing instances and the cloud-based object storage 348 such that the new high-bandwidth cloud computing instances can be rehydrated with data from the cloud-based object storage 348 as quickly as possible. Once the new high-bandwidth cloud computing instances are rehydrated with data from the cloud-based object storage 348, less expensive lower-bandwidth cloud computing instances may be created, data may be migrated to the less expensive lower-bandwidth cloud computing instances, and the high-bandwidth cloud computing instances may be terminated.

Readers will appreciate that in some embodiments, the number of new cloud computing instances that are created may substantially exceed the number of cloud computing instances that are needed to locally store all of the data stored by the cloud-based storage system 318. The number of new cloud computing instances that are created may substantially exceed the number of cloud computing instances that are needed to locally store all of the data stored by the cloud-based storage system 318 in order to more rapidly pull data from the cloud-based object storage 348 and into the new cloud computing instances, as each new cloud computing instance can (in parallel) retrieve some portion of the data stored by the cloud-based storage system 318. In such embodiments, once the data stored by the cloud-based storage system 318 has been pulled into the newly created cloud computing instances, the data may be consolidated within a subset of the newly created cloud computing instances and those newly created cloud computing instances that are excessive may be terminated.

Consider an example in which 1000 cloud computing instances are needed in order to locally store all valid data that users of the cloud-based storage system 318 have written to the cloud-based storage system 318. In such an example, assume that all 1,000 cloud computing instances fail. In such an example, the monitoring module may cause 100,000 cloud computing instances to be created, where each cloud computing instance is responsible for retrieving, from the cloud-based object storage 348, distinct $1/100,000$th chunks of the valid data that users of the cloud-based storage system 318 have written to the cloud-based storage system 318 and locally storing the distinct chunk of the dataset that it retrieved. In such an example, because each of the 100,000 cloud computing instances can retrieve data from the cloud-based object storage 348 in parallel, the caching layer may be restored 100 times faster as compared to an embodiment where the monitoring module only create 1000 replacement cloud computing instances. In such an example, over time the data that is stored locally in the 100,000 could be consolidated into 1,000 cloud computing instances and the remaining 99,000 cloud computing instances could be terminated.

Readers will appreciate that various performance aspects of the cloud-based storage system 318 may be monitored (e.g., by a monitoring module that is executing in an EC2 instance) such that the cloud-based storage system 318 can be scaled-up or scaled-out as needed. Consider an example in which the monitoring module monitors the performance of the could-based storage system 318 via communications with one or more of the cloud computing instances 320, 322 that each are used to support the execution of a storage controller application 324, 326, via monitoring communications between cloud computing instances 320, 322, 340a, 340b, 340n, via monitoring communications between cloud computing instances 320, 322, 340a, 340b, 340n and the cloud-based object storage 348, or in some other way. In such an example, assume that the monitoring module determines that the cloud computing instances 320, 322 that are used to support the execution of a storage controller application 324, 326 are undersized and not sufficiently servicing the I/O requests that are issued by users of the cloud-based storage system 318. In such an example, the monitoring module may create a new, more powerful cloud computing instance (e.g., a cloud computing instance of a type that includes more processing power, more memory, etc.) that includes the storage controller application such that the new, more powerful cloud computing instance can begin operating as the primary controller. Likewise, if the monitoring module determines that the cloud computing instances 320, 322 that are used to support the execution of a storage controller application 324, 326 are oversized and that cost savings could be gained by switching to a smaller, less powerful cloud computing instance, the monitoring module may create a new, less powerful (and less expensive) cloud computing instance that includes the storage controller application such that the new, less powerful cloud computing instance can begin operating as the primary controller.

Consider, as an additional example of dynamically sizing the cloud-based storage system 318, an example in which the monitoring module determines that the utilization of the local storage that is collectively provided by the cloud computing instances 340a, 340b, 340n has reached a predetermined utilization threshold (e.g., 95%). In such an example, the monitoring module may create additional cloud computing instances with local storage to expand the pool of local storage that is offered by the cloud computing instances. Alternatively, the monitoring module may create one or more new cloud computing instances that have larger amounts of local storage than the already existing cloud computing instances 340a, 340b, 340n, such that data stored in an already existing cloud computing instance 340a, 340b, 340n can be migrated to the one or more new cloud computing instances and the already existing cloud computing instance 340a, 340b, 340n can be terminated, thereby expanding the pool of local storage that is offered by the cloud computing instances. Likewise, if the pool of local storage that is offered by the cloud computing instances is unnecessarily large, data can be consolidated and some cloud computing instances can be terminated.

Readers will appreciate that the cloud-based storage system 318 may be sized up and down automatically by a monitoring module applying a predetermined set of rules that may be relatively simple of relatively complicated. In fact, the monitoring module may not only take into account the current state of the cloud-based storage system 318, but the monitoring module may also apply predictive policies that are based on, for example, observed behavior (e.g., every night from 10 PM until 6 AM usage of the storage system is relatively light), predetermined fingerprints (e.g., every time a virtual desktop infrastructure adds 100 virtual desktops, the number of IOPS directed to the storage system increase by X), and so on. In such an example, the dynamic scaling of the cloud-based storage system 318 may be based on current performance metrics, predicted workloads, and many other factors, including combinations thereof.

Readers will further appreciate that because the cloud-based storage system 318 may be dynamically scaled, the cloud-based storage system 318 may even operate in a way that is more dynamic. Consider the example of garbage collection. In a traditional storage system, the amount of storage is fixed. As such, at some point the storage system may be forced to perform garbage collection as the amount of available storage has become so constrained that the storage system is on the verge of running out of storage. In contrast, the cloud-based storage system 318 described here can always 'add' additional storage (e.g., by adding more cloud computing instances with local storage). Because the cloud-based storage system 318 described here can always 'add' additional storage, the cloud-based storage system 318 can make more intelligent decisions regarding when to perform garbage collection. For example, the cloud-based storage system 318 may implement a policy that garbage collection only be performed when the number of IOPS being serviced by the cloud-based storage system 318 falls below a certain level. In some embodiments, other system-level functions (e.g., deduplication, compression) may also be turned off and on in response to system load, given that the size of the cloud-based storage system 318 is not constrained in the same way that traditional storage systems are constrained.

Readers will appreciate that embodiments of the present disclosure resolve an issue with block-storage services offered by some cloud computing environments as some cloud computing environments only allow for one cloud computing instance to connect to a block-storage volume at a single time. For example, in Amazon AWS, only a single EC2 instance may be connected to an EBS volume. Through the use of EC2 instances with local storage, embodiments of the present disclosure can offer multi-connect capabilities where multiple EC2 instances can connect to another EC2 instance with local storage ('a drive instance'). In such embodiments, the drive instances may include software executing within the drive instance that allows the drive instance to support I/O directed to a particular volume from each connected EC2 instance. As such, some embodiments of the present disclosure may be embodied as multi-connect block storage services that may not include all of the components depicted in FIG. 3C.

In some embodiments, especially in embodiments where the cloud-based object storage 348 resources are embodied as Amazon S3, the cloud-based storage system 318 may include one or more modules (e.g., a module of computer program instructions executing on an EC2 instance) that are configured to ensure that when the local storage of a particular cloud computing instance is rehydrated with data from S3, the appropriate data is actually in S3. This issue arises largely because S3 implements an eventual consistency model where, when overwriting an existing object, reads of the object will eventually (but not necessarily immediately) become consistent and will eventually (but not necessarily immediately) return the overwritten version of the object. To address this issue, in some embodiments of the present disclosure, objects in S3 are never overwritten. Instead, a traditional 'overwrite' would result in the creation of the new object (that includes the updated version of the data) and the eventual deletion of the old object (that includes the previous version of the data).

In some embodiments of the present disclosure, as part of an attempt to never (or almost never) overwrite an object, when data is written to S3 the resultant object may be tagged with a sequence number. In some embodiments, these sequence numbers may be persisted elsewhere (e.g., in a database) such that at any point in time, the sequence number associated with the most up-to-date version of some piece of data can be known. In such a way, a determination can be made as to whether S3 has the most recent version of some piece of data by merely reading the sequence number associated with an object—and without actually reading the data from S3. The ability to make this determination may be particularly important when a cloud computing instance with local storage crashes, as it would be undesirable to rehydrate the local storage of a replacement cloud computing instance with out-of-date data. In fact, because the cloud-based storage system 318 does not need to access the data to verify its validity, the data can stay encrypted and access charges can be avoided.

The storage systems described above may carry out intelligent data backup techniques through which data stored in the storage system may be copied and stored in a distinct location to avoid data loss in the event of equipment failure or some other form of catastrophe. For example, the storage systems described above may be configured to examine each backup to avoid restoring the storage system to an undesirable state. Consider an example in which malware infects the storage system. In such an example, the storage system may include software resources 314 that can scan each backup to identify backups that were captured before the malware infected the storage system and those backups that were captured after the malware infected the storage system. In such an example, the storage system may restore itself from a backup that does not include the malware—or at least not restore the portions of a backup that contained the malware. In such an example, the storage system may include software resources 314 that can scan each backup to identify the presences of malware (or a virus, or some other undesirable), for example, by identifying write operations that were serviced by the storage system and originated from a network subnet that is suspected to have delivered the malware, by identifying write operations that were serviced by the storage system and originated from a user that is suspected to have delivered the malware, by identifying write operations that were serviced by the storage system and examining the content of the write operation against fingerprints of the malware, and in many other ways.

Readers will further appreciate that the backups (often in the form of one or more snapshots) may also be utilized to perform rapid recovery of the storage system. Consider an example in which the storage system is infected with ransomware that locks users out of the storage system. In such an example, software resources 314 within the storage system may be configured to detect the presence of ransomware and may be further configured to restore the storage system to a point-in-time, using the retained backups, prior to the point-in-time at which the ransomware infected the storage system. In such an example, the presence of ransomware may be explicitly detected through the use of software tools utilized by the system, through the use of a key (e.g., a USB drive) that is inserted into the storage system, or in a similar way. Likewise, the presence of ransomware may be inferred in response to system activity meeting a predetermined fingerprint such as, for example, no reads or writes coming into the system for a predetermined period of time.

Readers will appreciate that the various components described above may be grouped into one or more optimized computing packages as converged infrastructures. Such converged infrastructures may include pools of computers, storage and networking resources that can be shared by multiple applications and managed in a collective manner using policy-driven processes. Such converged infrastructures may be implemented with a converged infrastructure reference architecture, with standalone appliances, with a software driven hyper-converged approach (e.g., hyper-converged infrastructures), or in other ways.

Readers will appreciate that the storage systems described above may be useful for supporting various types of software applications. For example, the storage system 306 may be useful in supporting artificial intelligence ('AI') applications, database applications, DevOps projects, electronic design automation tools, event-driven software applications, high performance computing applications, simulation applications, high-speed data capture and analysis applications, machine learning applications, media production applications, media serving applications, picture archiving and communication systems ('PACS') applications, software development applications, virtual reality applications, augmented reality applications, and many other types of applications by providing storage resources to such applications.

The storage systems described above may operate to support a wide variety of applications. In view of the fact that the storage systems include compute resources, storage resources, and a wide variety of other resources, the storage systems may be well suited to support applications that are resource intensive such as, for example, AI applications. AI applications may be deployed in a variety of fields, including: predictive maintenance in manufacturing and related fields, healthcare applications such as patient data & risk analytics, retail and marketing deployments (e.g., search advertising, social media advertising), supply chains solutions, fintech solutions such as business analytics & reporting tools, operational deployments such as real-time analytics tools, application performance management tools, IT infrastructure management tools, and many others.

Such AI applications may enable devices to perceive their environment and take actions that maximize their chance of success at some goal. Examples of such AI applications can include IBM Watson, Microsoft Oxford, Google DeepMind, Baidu Minwa, and others. The storage systems described above may also be well suited to support other types of applications that are resource intensive such as, for example, machine learning applications. Machine learning applications may perform various types of data analysis to automate analytical model building. Using algorithms that iteratively learn from data, machine learning applications can enable computers to learn without being explicitly programmed. One particular area of machine learning is referred to as reinforcement learning, which involves taking suitable actions to maximize reward in a particular situation. Reinforcement learning may be employed to find the best possible behavior or path that a particular software application or machine should take in a specific situation. Reinforcement learning differs from other areas of machine learning (e.g., supervised learning, unsupervised learning) in that correct input/output pairs need not be presented for reinforcement learning and sub-optimal actions need not be explicitly corrected.

In addition to the resources already described, the storage systems described above may also include graphics processing units ('GPUs'), occasionally referred to as visual processing unit ('VPUs'). Such GPUs may be embodied as specialized electronic circuits that rapidly manipulate and alter memory to accelerate the creation of images in a frame buffer intended for output to a display device. Such GPUs may be included within any of the computing devices that are part of the storage systems described above, including as one of many individually scalable components of a storage system, where other examples of individually scalable components of such storage system can include storage components, memory components, compute components (e.g., CPUs, FPGAs, ASICs), networking components, software components, and others. In addition to GPUs, the storage systems described above may also include neural network processors ('NNPs') for use in various aspects of neural network processing. Such NNPs may be used in place of (or in addition to) GPUs and may also be independently scalable.

As described above, the storage systems described herein may be configured to support artificial intelligence applications, machine learning applications, big data analytics applications, and many other types of applications. The rapid growth in these sort of applications is being driven by three technologies: deep learning (DL), GPU processors, and Big Data. Deep learning is a computing model that makes use of massively parallel neural networks inspired by the human brain. Instead of experts handcrafting software, a deep learning model writes its own software by learning from lots of examples. Such GPUs may include thousands of cores that are well-suited to run algorithms that loosely represent the parallel nature of the human brain.

Advances in deep neural networks have ignited a new wave of algorithms and tools for data scientists to tap into their data with artificial intelligence (AI). With improved algorithms, larger data sets, and various frameworks (including open-source software libraries for machine learning across a range of tasks), data scientists are tackling new use cases like autonomous driving vehicles, natural language processing and understanding, computer vision, machine reasoning, strong AI, and many others. Applications of such techniques may include: machine and vehicular object detection, identification and avoidance; visual recognition, classification and tagging; algorithmic financial trading strategy performance management; simultaneous localization and mapping; predictive maintenance of high-value machinery; prevention against cyber security threats, expertise automation; image recognition and classification; question answering; robotics; text analytics (extraction, classification) and text generation and translation; and many others. Applications of AI techniques has materialized in a wide array of products include, for example, Amazon Echo's speech recognition technology that allows users to talk to their machines, Google Translate™ which allows for machine-based language translation, Spotify's Discover Weekly that provides recommendations on new songs and artists that a user may like based on the user's usage and traffic analysis, Quill's text generation offering that takes structured data and turns it into narrative stories, Chatbots that provide real-time, contextually specific answers to questions in a dialog format, and many others.

Data is the heart of modern AI and deep learning algorithms. Before training can begin, one problem that must be addressed revolves around collecting the labeled data that is crucial for training an accurate AI model. A full scale AI deployment may be required to continuously collect, clean, transform, label, and store large amounts of data. Adding additional high quality data points directly translates to more accurate models and better insights. Data samples may undergo a series of processing steps including, but not limited to: 1) ingesting the data from an external source into the training system and storing the data in raw form, 2) cleaning and transforming the data in a format convenient for training, including linking data samples to the appropriate label, 3) exploring parameters and models, quickly testing with a smaller dataset, and iterating to converge on the most promising models to push into the production cluster, 4) executing training phases to select random batches of input data, including both new and older samples, and feeding those into production GPU servers for computation to update model parameters, and 5) evaluating including using a holdback portion of the data not used in training in order to evaluate model accuracy on the holdout data. This lifecycle may apply for any type of parallelized machine learning, not just neural networks or deep learning. For example, standard machine learning frameworks may rely on CPUs instead of GPUs but the data ingest and training workflows may be the same. Readers will appreciate that a single shared storage data hub creates a coordination point throughout the lifecycle without the need for extra data copies among the ingest, preprocessing, and training stages. Rarely is the ingested data used for only one purpose, and shared storage gives the flexibility to train multiple different models or apply traditional analytics to the data.

Readers will appreciate that each stage in the AI data pipeline may have varying requirements from the data hub (e.g., the storage system or collection of storage systems). Scale-out storage systems must deliver uncompromising performance for all manner of access types and patterns—from small, metadata-heavy to large files, from random to sequential access patterns, and from low to high concurrency. The storage systems described above may serve as an ideal AI data hub as the systems may service unstructured workloads. In the first stage, data is ideally ingested and stored on to the same data hub that following stages will use, in order to avoid excess data copying. The next two steps can be done on a standard compute server that optionally includes a GPU, and then in the fourth and last stage, full training production jobs are run on powerful GPU-accelerated servers. Often, there is a production pipeline alongside an experimental pipeline operating on the same dataset. Further, the GPU-accelerated servers can be used independently for different models or joined together to train on one larger model, even spanning multiple systems for distributed training. If the shared storage tier is slow, then data must be copied to local storage for each phase, resulting in wasted time staging data onto different servers. The ideal data hub for the AI training pipeline delivers performance similar to data stored locally on the server node while also having the simplicity and performance to enable all pipeline stages to operate concurrently.

Although the preceding paragraphs discuss deep learning applications, readers will appreciate that the storage systems described herein may also be part of a distributed deep learning ('DDL') platform to support the execution of DDL algorithms. The storage systems described above may also be paired with other technologies such as TensorFlow, an open-source software library for dataflow programming across a range of tasks that may be used for machine learning applications such as neural networks, to facilitate the development of such machine learning models, applications, and so on.

The storage systems described above may also be used in a neuromorphic computing environment. Neuromorphic computing is a form of computing that mimics brain cells. To support neuromorphic computing, an architecture of interconnected "neurons" replace traditional computing models with low-powered signals that go directly between neurons for more efficient computation. Neuromorphic computing may make use of very-large-scale integration (VLSI) systems containing electronic analog circuits to mimic neuro-biological architectures present in the nervous system, as well as analog, digital, mixed-mode analog/digital VLSI, and software systems that implement models of neural systems for perception, motor control, or multisensory integration.

Readers will appreciate that the storage systems described above may be configured to support the storage or use of (among other types of data) blockchains. In addition to supporting the storage and use of blockchain technologies, the storage systems described above may also support the storage and use of derivative items such as, for example, open source blockchains and related tools that are part of the IBM™ Hyperledger project, permissioned blockchains in which a certain number of trusted parties are allowed to access the block chain, blockchain products that enable developers to build their own distributed ledger projects, and others. Blockchains and the storage systems described herein may be leveraged to support on-chain storage of data as well as off-chain storage of data.

Off-chain storage of data can be implemented in a variety of ways and can occur when the data itself is not stored within the blockchain. For example, in one embodiment, a hash function may be utilized and the data itself may be fed into the hash function to generate a hash value. In such an example, the hashes of large pieces of data may be embedded within transactions, instead of the data itself. Readers will appreciate that, in other embodiments, alternatives to blockchains may be used to facilitate the decentralized storage of information. For example, one alternative to a blockchain that may be used is a blockweave. While conventional blockchains store every transaction to achieve validation, a blockweave permits secure decentralization without the usage of the entire chain, thereby enabling low cost on-chain storage of data. Such blockweaves may utilize a consensus mechanism that is based on proof of access (PoA) and proof of work (PoW).

The storage systems described above may, either alone or in combination with other computing devices, be used to support in-memory computing applications. In-memory computing involves the storage of information in RAM that is distributed across a cluster of computers. Readers will appreciate that the storage systems described above, especially those that are configurable with customizable amounts of processing resources, storage resources, and memory resources (e.g., those systems in which blades that contain configurable amounts of each type of resource), may be configured in a way so as to provide an infrastructure that can support in-memory computing. Likewise, the storage systems described above may include component parts (e.g., NVDIMMs, 3D crosspoint storage that provide fast random access memory that is persistent) that can actually provide for an improved in-memory computing environment as compared to in-memory computing environments that rely on RAM distributed across dedicated servers.

In some embodiments, the storage systems described above may be configured to operate as a hybrid in-memory computing environment that includes a universal interface to all storage media (e.g., RAM, flash storage, 3D crosspoint storage). In such embodiments, users may have no knowledge regarding the details of where their data is stored but they can still use the same full, unified API to address data. In such embodiments, the storage system may (in the background) move data to the fastest layer available— including intelligently placing the data in dependence upon various characteristics of the data or in dependence upon some other heuristic. In such an example, the storage systems may even make use of existing products such as Apache Ignite and GridGain to move data between the various storage layers, or the storage systems may make use of custom software to move data between the various storage layers. The storage systems described herein may implement various optimizations to improve the performance of in-memory computing such as, for example, having computations occur as close to the data as possible.

Readers will further appreciate that in some embodiments, the storage systems described above may be paired with other resources to support the applications described above. For example, one infrastructure could include primary compute in the form of servers and workstations which specialize in using General-purpose computing on graphics processing units ('GPGPU') to accelerate deep learning applications that are interconnected into a computation engine to train parameters for deep neural networks. Each system may have Ethernet external connectivity, InfiniBand external connectivity, some other form of external connectivity, or some combination thereof. In such an example, the GPUs can be grouped for a single large training or used independently to train multiple models. The infrastructure could also include a storage system such as those described above to provide, for example, a scale-out all-flash file or object store through which data can be accessed via high-performance protocols such as NFS, S3, and so on. The infrastructure can also include, for example, redundant top-of-rack Ethernet switches connected to storage and compute via ports in MLAG port channels for redundancy. The infrastructure could also include additional compute in the form of whitebox servers, optionally with GPUs, for data ingestion, pre-processing, and model debugging. Readers will appreciate that additional infrastructures are also be possible.

Readers will appreciate that the storage systems described above, either alone or in coordination with other computing machinery may be configured to support other AI related tools. For example, the storage systems may make use of tools like ONXX or other open neural network exchange formats that make it easier to transfer models written in different AI frameworks. Likewise, the storage systems may be configured to support tools like Amazon's Gluon that allow developers to prototype, build, and train deep learning models. In fact, the storage systems described above may be part of a larger platform, such as IBM™ Cloud Private for Data, that includes integrated data science, data engineering and application building services.

Readers will further appreciate that the storage systems described above may also be deployed as an edge solution. Such an edge solution may be in place to optimize cloud computing systems by performing data processing at the edge of the network, near the source of the data. Edge computing can push applications, data and computing power (i.e., services) away from centralized points to the logical extremes of a network. Through the use of edge solutions such as the storage systems described above, computational tasks may be performed using the compute resources provided by such storage systems, data may be storage using the storage resources of the storage system, and cloud-based services may be accessed through the use of various resources of the storage system (including networking resources). By performing computational tasks on the edge solution, storing data on the edge solution, and generally making use of the edge solution, the consumption of expensive cloud-based resources may be avoided and, in fact, performance improvements may be experienced relative to a heavier reliance on cloud-based resources.

While many tasks may benefit from the utilization of an edge solution, some particular uses may be especially suited for deployment in such an environment. For example, devices like drones, autonomous cars, robots, and others may require extremely rapid processing—so fast, in fact, that sending data up to a cloud environment and back to receive data processing support may simply be too slow. As an additional example, some IoT devices such as connected video cameras may not be well-suited for the utilization of cloud-based resources as it may be impractical (not only from a privacy perspective, security perspective, or a financial perspective) to send the data to the cloud simply because of the pure volume of data that is involved. As such, many tasks that really on data processing, storage, or communications may be better suited by platforms that include edge solutions such as the storage systems described above.

The storage systems described above may alone, or in combination with other computing resources, serves as a network edge platform that combines compute resources, storage resources, networking resources, cloud technologies and network virtualization technologies, and so on. As part of the network, the edge may take on characteristics similar to other network facilities, from the customer premise and backhaul aggregation facilities to Points of Presence (PoPs) and regional data centers. Readers will appreciate that network workloads, such as Virtual Network Functions (VNFs) and others, will reside on the network edge platform. Enabled by a combination of containers and virtual machines, the network edge platform may rely on controllers and schedulers that are no longer geographically co-located with the data processing resources. The functions, as microservices, may split into control planes, user and data planes, or even state machines, allowing for independent optimization and scaling techniques to be applied. Such user and data planes may be enabled through increased accelerators, both those residing in server platforms, such as FPGAs and Smart NICs, and through SDN-enabled merchant silicon and programmable ASICs.

The storage systems described above may also be optimized for use in big data analytics. Big data analytics may be generally described as the process of examining large and varied data sets to uncover hidden patterns, unknown correlations, market trends, customer preferences and other useful information that can help organizations make more-informed business decisions. As part of that process, semi-structured and unstructured data such as, for example, internet clickstream data, web server logs, social media content, text from customer emails and survey responses, mobile-phone call-detail records, IoT sensor data, and other data may be converted to a structured form.

The storage systems described above may also support (including implementing as a system interface) applications that perform tasks in response to human speech. For example, the storage systems may support the execution intelligent personal assistant applications such as, for example, Amazon's Alexa, Apple Siri, Google Voice, Samsung Bixby, Microsoft Cortana, and others. While the examples described in the previous sentence make use of voice as input, the storage systems described above may also support chatbots, talkbots, chatterbots, or artificial conversational entities or other applications that are configured to conduct a conversation via auditory or textual methods. Likewise, the storage system may actually execute such an application to enable a user such as a system administrator to interact with the storage system via speech. Such applications are generally capable of voice interaction, music playback, making to-do lists, setting alarms, streaming podcasts, playing audiobooks, and providing weather, traffic, and other real time information, such as news, although in embodiments in accordance with the present disclosure, such applications may be utilized as interfaces to various system management operations.

The storage systems described above may also implement AI platforms for delivering on the vision of self-driving storage. Such AI platforms may be configured to deliver global predictive intelligence by collecting and analyzing large amounts of storage system telemetry data points to enable effortless management, analytics and support. In fact, such storage systems may be capable of predicting both capacity and performance, as well as generating intelligent advice on workload deployment, interaction and optimization. Such AI platforms may be configured to scan all incoming storage system telemetry data against a library of issue fingerprints to predict and resolve incidents in real-time, before they impact customer environments, and captures hundreds of variables related to performance that are used to forecast performance load.

The storage systems described above may support the serialized or simultaneous execution of artificial intelligence applications, machine learning applications, data analytics applications, data transformations, and other tasks that collectively may form an AI ladder. Such an AI ladder may effectively be formed by combining such elements to form a complete data science pipeline, where exist dependencies between elements of the AI ladder. For example, AI may require that some form of machine learning has taken place, machine learning may require that some form of analytics has taken place, analytics may require that some form of data and information architecting has taken place, and so on. As such, each element may be viewed as a rung in an AI ladder that collectively can form a complete and sophisticated AI solution.

The storage systems described above may also, either alone or in combination with other computing environments, be used to deliver an AI everywhere experience where AI permeates wide and expansive aspects of business and life. For example, AI may play an important role in the delivery of deep learning solutions, deep reinforcement learning solutions, artificial general intelligence solutions, autonomous vehicles, cognitive computing solutions, commercial UAVs or drones, conversational user interfaces, enterprise taxonomies, ontology management solutions, machine learning solutions, smart dust, smart robots, smart workplaces, and many others.

The storage systems described above may also, either alone or in combination with other computing environments, be used to deliver a wide range of transparently immersive experiences (including those that use digital twins of various "things" such as people, places, processes, systems, and so on) where technology can introduce transparency between people, businesses, and things. Such transparently immersive experiences may be delivered as augmented reality technologies, connected homes, virtual reality technologies, brain-computer interfaces, human augmentation technologies, nanotube electronics, volumetric displays, 4D printing technologies, or others.

The storage systems described above may also, either alone or in combination with other computing environments, be used to support a wide variety of digital platforms. Such digital platforms can include, for example, 5G wireless systems and platforms, digital twin platforms, edge computing platforms, IoT platforms, quantum computing platforms, serverless PaaS, software-defined security, neuromorphic computing platforms, and so on.

The storage systems described above may also be part of a multi-cloud environment in which multiple cloud computing and storage services are deployed in a single heterogeneous architecture. In order to facilitate the operation of such a multi-cloud environment, DevOps tools may be deployed to enable orchestration across clouds. Likewise, continuous development and continuous integration tools may be deployed to standardize processes around continuous integration and delivery, new feature rollout and provisioning cloud workloads. By standardizing these processes, a multi-cloud strategy may be implemented that enables the utilization of the best provider for each workload.

The storage systems described above may be used as a part of a platform to enable the use of crypto-anchors that may be used to authenticate a product's origins and contents to ensure that it matches a blockchain record associated with the product. Similarly, as part of a suite of tools to secure data stored on the storage system, the storage systems described above may implement various encryption technologies and schemes, including lattice cryptography. Lattice cryptography can involve constructions of cryptographic primitives that involve lattices, either in the construction itself or in the security proof. Unlike public-key schemes such as the RSA, Diffie-Hellman or Elliptic-Curve cryptosystems, which are easily attacked by a quantum computer, some lattice-based constructions appear to be resistant to attack by both classical and quantum computers.

A quantum computer is a device that performs quantum computing. Quantum computing is computing using quantum-mechanical phenomena, such as superposition and entanglement. Quantum computers differ from traditional computers that are based on transistors, as such traditional computers require that data be encoded into binary digits (bits), each of which is always in one of two definite states (0 or 1). In contrast to traditional computers, quantum computers use quantum bits, which can be in superpositions of states. A quantum computer maintains a sequence of qubits, where a single qubit can represent a one, a zero, or any quantum superposition of those two qubit states. A pair of qubits can be in any quantum superposition of 4 states, and three qubits in any superposition of 8 states. A quantum computer with n qubits can generally be in an arbitrary superposition of up to 2^n different states simultaneously, whereas a traditional computer can only be in one of these states at any one time. A quantum Turing machine is a theoretical model of such a computer.

The storage systems described above may also be paired with FPGA-accelerated servers as part of a larger AI or ML infrastructure. Such FPGA-accelerated servers may reside near (e.g., in the same data center) the storage systems described above or even incorporated into an appliance that includes one or more storage systems, one or more FPGA-accelerated servers, networking infrastructure that supports communications between the one or more storage systems and the one or more FPGA-accelerated servers, as well as other hardware and software components. Alternatively, FPGA-accelerated servers may reside within a cloud computing environment that may be used to perform compute-related tasks for AI and ML jobs. Any of the embodiments described above may be used to collectively serve as a FPGA-based AI or ML platform. Readers will appreciate that, in some embodiments of the FPGA-based AI or ML platform, the FPGAs that are contained within the FPGA-accelerated servers may be reconfigured for different types of ML models (e.g., LSTMs, CNNs, GRUs). The ability to reconfigure the FPGAs that are contained within the FPGA-accelerated servers may enable the acceleration of a ML or AI application based on the most optimal numerical precision and memory model being used. Readers will appreciate that by treating the collection of FPGA-accelerated servers as a pool of FPGAs, any CPU in the data center may utilize the pool of FPGAs as a shared hardware microservice, rather than limiting a server to dedicated accelerators plugged into it.

The FPGA-accelerated servers and the GPU-accelerated servers described above may implement a model of computing where, rather than keeping a small amount of data in a CPU and running a long stream of instructions over it as occurred in more traditional computing models, the machine learning model and parameters are pinned into the high-bandwidth on-chip memory with lots of data streaming though the high-bandwidth on-chip memory. FPGAs may even be more efficient than GPUs for this computing model, as the FPGAs can be programmed with only the instructions needed to run this kind of computing model.

The storage systems described above may be configured to provide parallel storage, for example, through the use of a parallel file system such as BeeGFS. Such parallel files systems may include a distributed metadata architecture. For example, the parallel file system may include a plurality of metadata servers across which metadata is distributed, as well as components that include services for clients and storage servers.

The systems described above can support the execution of a wide array of software applications. Such software applications can be deployed in a variety of ways, including container-based deployment models. Containerized applications may be managed using a variety of tools. For example, containerized applications may be managed using Docker Swarm, Kubernetes, and others. Containerized applications may be used to facilitate a serverless, cloud native computing deployment and management model for software applications. In support of a serverless, cloud native computing deployment and management model for software applications, containers may be used as part of an event handling mechanisms (e.g., AWS Lambdas) such that various events cause a containerized application to be spun up to operate as an event handler.

The systems described above may be deployed in a variety of ways, including being deployed in ways that support fifth generation ('5G') networks. 5G networks may support substantially faster data communications than previous generations of mobile communications networks and, as a consequence may lead to the disaggregation of data and computing resources as modern massive data centers may become less prominent and may be replaced, for example, by more-local, micro data centers that are close to the mobile-network towers. The systems described above may be included in such local, micro data centers and may be part of or paired to multi-access edge computing ('MEC') systems. Such MEC systems may enable cloud computing capabilities and an IT service environment at the edge of the cellular network. By running applications and performing related processing tasks closer to the cellular customer, network congestion may be reduced and applications may perform better.

In some examples, a non-transitory computer-readable medium storing computer-readable instructions may be provided in accordance with the principles described herein. The instructions, when executed by a processor of a computing device, may direct the processor and/or computing device to perform one or more operations, including one or more of the operations described herein. Such instructions may be stored and/or transmitted using any of a variety of known computer-readable media.

A non-transitory computer-readable medium as referred to herein may include any non-transitory storage medium that participates in providing data (e.g., instructions) that may be read and/or executed by a computing device (e.g., by a processor of a computing device). For example, a non-transitory computer-readable medium may include, but is not limited to, any combination of non-volatile storage media and/or volatile storage media. Exemplary non-volatile storage media include, but are not limited to, read-only memory, flash memory, a solid-state drive, a magnetic storage device (e.g. a hard disk, a floppy disk, magnetic tape, etc.), ferroelectric random-access memory ("RAM"), and an optical disc (e.g., a compact disc, a digital video disc, a Blu-ray disc, etc.). Exemplary volatile storage media include, but are not limited to, RAM (e.g., dynamic RAM).

Figure 3D:
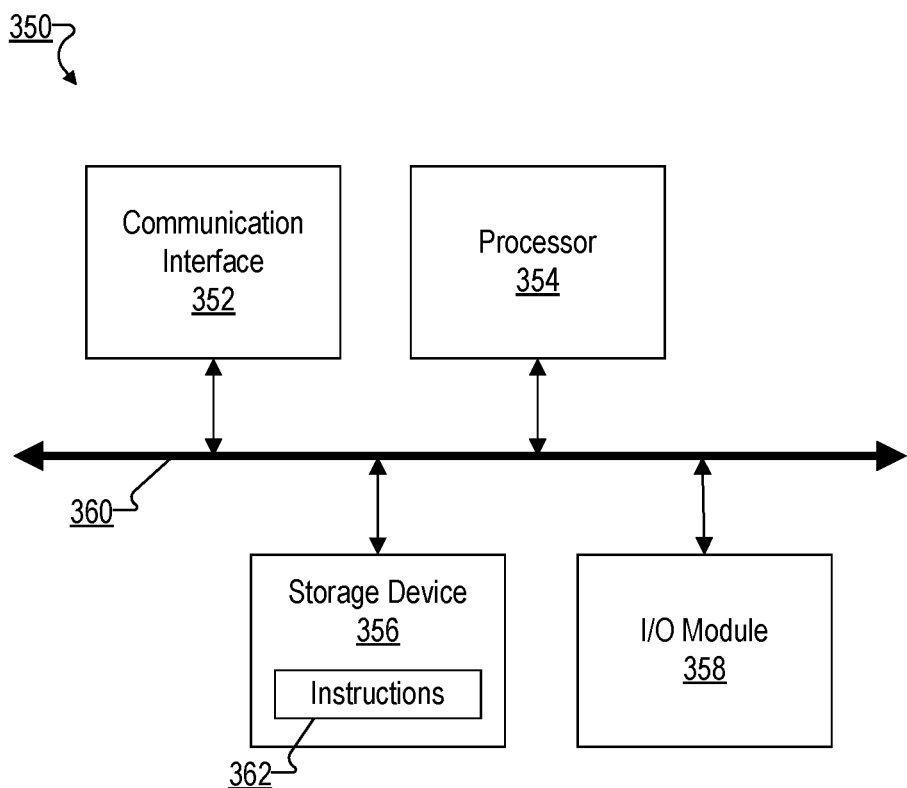
FIG. 3D illustrates an exemplary computing device that may be specifically configured to perform one or more of the processes described herein.

FIG. 3D illustrates an exemplary computing device 350 that may be specifically configured to perform one or more of the processes described herein. As shown in FIG. 3D, computing device 350 may include a communication interface 352, a processor 354, a storage device 356, and an input/output ("I/O") module 358 communicatively connected one to another via a communication infrastructure 360. While an exemplary computing device 350 is shown in FIG. 3D, the components illustrated in FIG. 3D are not intended to be limiting. Additional or alternative components may be used in other embodiments. Components of computing device 350 shown in FIG. 3D will now be described in additional detail.

Communication interface 352 may be configured to communicate with one or more computing devices. Examples of communication interface 352 include, without limitation, a wired network interface (such as a network interface card), a wireless network interface (such as a wireless network interface card), a modem, an audio/video connection, and any other suitable interface.

Processor 354 generally represents any type or form of processing unit capable of processing data and/or interpreting, executing, and/or directing execution of one or more of the instructions, processes, and/or operations described herein. Processor 354 may perform operations by executing computer-executable instructions 362 (e.g., an application, software, code, and/or other executable data instance) stored in storage device 356.

Storage device 356 may include one or more data storage media, devices, or configurations and may employ any type, form, and combination of data storage media and/or device. For example, storage device 356 may include, but is not limited to, any combination of the non-volatile media and/or volatile media described herein. Electronic data, including data described herein, may be temporarily and/or permanently stored in storage device 356. For example, data representative of computer-executable instructions 362 configured to direct processor 354 to perform any of the operations described herein may be stored within storage device 356. In some examples, data may be arranged in one or more databases residing within storage device 356.

I/O module 358 may include one or more I/O modules configured to receive user input and provide user output. I/O module 358 may include any hardware, firmware, software, or combination thereof supportive of input and output capabilities. For example, I/O module 358 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 358 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 358 is configured to provide graphical data to a display for presentation to a user. The graphical data may be representative of one or more graphical user interfaces and/or any other graphical content as may serve a particular implementation. In some examples, any of the systems, computing devices, and/or other components described herein may be implemented by computing device 350.

Advantages and features of the present disclosure can be further described by the following statements.

1. A method comprising: detecting, by a data protection system, a request provided by a host to perform an operation with respect to a storage system; detecting, by the data protection system based on the request, an anomaly associated with the host; and directing, by the data protection system based on the detecting the anomaly associated with the host, the storage system to generate a recovery dataset for data maintained by the storage system.

2. The method of any of the preceding statements, wherein: the request is for the host to attach to a volume of the storage system; and the detecting the anomaly associated with the host comprises determining that an additional host is already attached to the volume at a time of the request.

3. The method of any of the preceding statements, wherein the detecting the anomaly associated with the host comprises determining that the host has not historically provided requests of a similar type as the request.

4. The method of any of the preceding statements, wherein the detecting the anomaly associated with the host comprises determining that the host is associated with an Internet protocol (IP) address that has not been previously used to perform an operation with respect to the storage system.

5. The method of any of the preceding statements, wherein the detecting the anomaly associated with the host comprises determining that the host has not previously provided requests to perform one or more operations with respect to the storage system.

6. The method of any of the preceding statements, wherein the detecting the anomaly associated with the host comprises determining that a round-trip time from an Internet protocol (IP) address associated with the request exceeds a predetermined threshold.

7. The method of any of the preceding statements, further comprising: determining, by the data protection system, that the anomaly is not indicative of a security threat against the data maintained by the storage system; and deleting, by the data protection system based on the determining that the anomaly is not indicative of the security threat, the recovery dataset.

8. The method of any of the preceding statements, further comprising: the recovery dataset is initially classified as a provisional recovery dataset that has a first set of criteria that has to be met for the recovery dataset to be deleted; and the method further comprises: determining, by the data protection system, that the anomaly is indicative of a possible security threat against the data maintained by the storage system; and reclassifying, by the data protection system that the anomaly is indicative of the security threat, the recovery dataset as a protected recovery dataset, the protected recovery dataset having a second set of criteria that has to be met for the recovery dataset to be deleted, the second set of criteria more stringent than the first set of criteria.

9. The method of any of the preceding statements, further comprising using, by the data protection system, the recovery dataset to perform a data recovery process with respect to the data maintained by the storage system.

10. The method of any of the preceding statements, wherein the directing the storage system to generate the recovery dataset comprises directing the storage system to generate the recovery dataset prior to performing the operation.

11. A system comprising: a memory storing instructions; and a processor communicatively coupled to the memory and configured to execute the instructions to: detect a request provided by a host to perform an operation with respect to a storage system; detect, based on the request, an anomaly associated with the host; and direct, based on the detecting the anomaly associated with the host, the storage system to generate a recovery dataset for data maintained by the storage system.

12. The system of any of the preceding statements, wherein: the request is for the host to attach to a volume of the storage system; and the detecting the anomaly associated with the host comprises determining that an additional host is already attached to the volume at a time of the request.

13. The system of any of the preceding statements, wherein the detecting the anomaly associated with the host comprises determining that the host has not historically provided requests of a similar type as the request.

14. The system of any of the preceding statements, wherein the detecting the anomaly associated with the host comprises determining that the host is associated with an Internet protocol (IP) address that has not been previously used to perform an operation with respect to the storage system.

15. The system of any of the preceding statements, wherein the detecting the anomaly associated with the host comprises determining that the host has not previously provided requests to perform one or more operations with respect to the storage system.

16. The system of any of the preceding statements, wherein the detecting the anomaly associated with the host comprises determining that a round-trip time from an Internet protocol (IP) address associated with the request exceeds a predetermined threshold.

17. The system of any of the preceding statements, wherein the processor is further configured to execute the instructions to: determine that the anomaly is not indicative of a security threat against the data maintained by the storage system; and delete, based on the determining that the anomaly is not indicative of the security threat, the recovery dataset.

18. The system of any of the preceding statements, wherein: the recovery dataset is initially classified as a provisional recovery dataset that has a first set of criteria that has to be met for the recovery dataset to be deleted; and the processor is further configured to execute the instructions to: determine that the anomaly is indicative of a possible security threat against the data maintained by the storage system; and reclassify, based on the determining that the anomaly is indicative of the security threat, the recovery dataset as a protected recovery dataset, the protected recovery dataset having a second set of criteria that has to be met for the recovery dataset to be deleted, the second set of criteria more stringent than the first set of criteria.

19. The system of any of the preceding statements, wherein the processor is further configured to execute the instructions to use the recovery dataset to perform a data recovery process with respect to the data maintained by the storage system.

20. A non-transitory computer-readable medium storing instructions that, when executed, direct a processor of a computing device to: detect a request provided by a host to perform an operation with respect to a storage system; detect, based on the request, an anomaly associated with the host; and direct, based on the detecting the anomaly associated with the host, the storage system to generate a recovery dataset for data maintained by the storage system.

Additional advantages and features of the present disclosure can be further described by the following statements.

1. A method comprising: determining, by a data protection system, that a total amount of read traffic and write traffic processed by a storage system during a time period exceeds a threshold, the read traffic representing data read from the storage system during the time period and the write traffic representing data written to the storage system during the time period; determining, by the data protection system, that the write traffic is less compressible than the read traffic; and determining, by the data protection system based on the total amount of read traffic and write traffic exceeding the threshold and on the write traffic being less compressible than the read traffic, that the storage system is possibly being targeted by a security threat.

2. The method of any of the preceding statements, further comprising: identifying, by the data protection system, an attribute associated with one or more of the data read from the storage system or the data written to the storage system; wherein the determining that the storage system is possibly being targeted by the security threat is further based on the attribute.

3. The method of any of the preceding statements, wherein the attribute comprises one or more of: a host attribute associated with a host associated with the storage system, the data read from the storage system or the data written to the storage system being associated with the host; an attribute of a source of the read traffic and the write traffic; an attribute of a storage structure within the storage system and from which the data is being read or to which the data is being written; or a storage format attribute associated with a storage format used by the storage system.

4. The method of any of the preceding statements, further comprising: identifying, by the data protection system, a format type of a data instance included in the data written to the storage system; and determining, by the data protection system, that a content of the data instance does not match what would be expected to be received by the storage system for the identified format type; wherein the determining that the storage system is possibly being targeted by the security threat is further based on the determination that the content of the data instance does not match what would be expected to be received by the storage system for the identified format type.

5. The method of any of the preceding statements, further comprising: identifying, by the data protection system, a pattern associated with one or more of the read traffic or the write traffic; wherein the determining that the storage system is possibly being targeted by the security threat is further based on the pattern.

6. The method of any of the preceding statements, further comprising: determining, by the data protection system, that the data written to the storage system does not include identifiable header information or that the data written to the storage system includes header information that does not match content included in the data written to the storage system; wherein the determining that the storage system is possibly being targeted by the security threat is further based on the determining that the data written to the storage system does not include the identifiable header information or that the data written to the storage system includes header information that does not match the content included in the data written to the storage system.

7. The method of any of the preceding statements, further comprising: determining, by the data protection system, that the data read from the storage system is at least partially compressed and includes the identifiable header information; wherein the determining that the storage system is possibly being targeted by the security threat is further based on the determining that the data read from the storage system is compressed and includes the identifiable header information.

8. The method of any of the preceding statements, further comprising: determining, by the data protection system, that the data written to the storage system includes data that is not decryptable with a key maintained by an authorized key management system external to the storage system; wherein the determining that the storage system is possibly being targeted by the security threat is further based on the determining that the data written to the storage system includes data that is not decryptable with the key maintained by the key management system.

9. The method of any of the preceding statements, further comprising: determining, by the data protection system, that the data written to the storage system does not include a correct cryptographic signature associated with an external data encryption service associated with the storage system; wherein the determining that the storage system is possibly being targeted by the security threat is further based on the determining that the data written to the storage system does not include the correct cryptographic signature.

10. The method of any of the preceding statements, further comprising: determining, by the data protection system, that data already stored by the storage system is deleted or overwritten by the data written to the storage system; wherein the determining that the storage system is possibly being targeted by the security threat is further based on the determining that the data already stored by the storage system is deleted or overwritten by the data written to the storage system.

11. The method of any of the preceding statements, further comprising: accessing, by the data protection system, phone home data transmitted by the storage system; and detecting, by the data protection system based on the phone home data, an anomaly associated with the storage system; wherein the determining that the storage system is possibly being targeted by the security threat is further based on the detected anomaly.

12. The method of any of the preceding statements, wherein the detecting of the anomaly comprises determining that an overall compressibility of data stored by the storage system is below a historical norm associated with one or more of the storage system or a different storage system.

13. The method of any of the preceding statements, further comprising: detecting, by the data protection system, a rate at which data is read from the storage system and written back to the storage system in encrypted form; wherein the determining that the storage system is possibly being targeted by the security threat is further based on the detected rate.

14. The method of any of the preceding statements, further comprising: inputting, by the data protection system, data representative of one or more attributes of the read traffic, the write traffic, or the storage system into a machine learning model; wherein the determining that the storage system is possibly being targeted by the security threat is further based on an output of the machine learning model.

15. The method of any of the preceding statements, further comprising: determining, by the data protection system, an anomaly in a garbage collection process performed by the storage system; wherein the determining that the storage system is possibly being targeted by the security threat is further based on the determining of the anomaly in the garbage collection process.

16. The method of any of the preceding statements, further comprising: identifying, by the data protection system, an attribute of an additional storage system configured to replicate data stored by the storage system; wherein the determining that the storage system is possibly being targeted by the security threat is further based on the attribute of the additional storage system.

17. The method of any of the preceding statements, wherein the threshold represents one or more of a rate, an aggregate amount, or a difference compared to a historical trend associated with the storage system.

18. The method of any of the preceding statements, further comprising performing, by the data protection system in response to the determining that the storage system is possibly being targeted by the security threat, a remedial action with respect to the storage system.

19. The method of any of the preceding statements, wherein the performing of the remedial action comprises directing the storage system to generate a recovery dataset for data stored by the storage system.

20. The method of any of the preceding statements, wherein the performing of the remedial action comprises further comprises directing the storage system to transmit the recovery dataset to a remote storage system for storage by the remote storage system.

21. The method of any of the preceding statements, wherein the transmitting of the recovery dataset to the remote storage system is performed using a network file system (NFS) protocol.

22. The method of any of the preceding statements, wherein the performing of the remedial action comprises notifying the remote storage system of the security threat.

23. The method of any of the preceding statements, further comprising: determining, by the data protection system, that the storage system is actually not being targeted by the security threat; and directing, by the data protection system in response to the determining that the host data is actually not being targeted by the security threat, the storage system to delete the recovery dataset.

24. The method of any of the preceding statements, wherein the recovery dataset comprises a snapshot of a storage structure within the storage system.

25. The method of any of the preceding statements, further comprising preventing, by the data protection system, the recovery dataset from being deleted until one or more conditions are fulfilled.

26. The method of any of the preceding statements, further comprising directing, by the data protection system, the storage system to generate recovery datasets over time in accordance with a data protection parameter set, the recovery datasets usable to restore data maintained by the storage system to a state corresponding to a selectable point in time.

27. The method of any of the preceding statements, wherein the performing of the remedial action comprises directing, in response to the determining that the storage system is possibly being targeted by the security threat, the storage system to use one or more of the recovery datasets to restore the data maintained by the storage system to a state that corresponds to a point in time that precedes a point in time at which the data protection system determines that the storage system is possibly being targeted by the security threat.

28. The method of any of the preceding statements, wherein the performing of the remedial action further comprises modifying, in response to the determining that the storage system is possibly being targeted by the security threat, the data protection parameter set for one or more of the recovery datasets.

29. The method of any of the preceding statements, wherein: the data protection parameter set specifies a retention duration for the recovery datasets, the retention duration defining a duration that each recovery dataset is saved before being deleted; and the modifying of the data protection parameter set comprises one or more of increasing the retention duration or suspending the retention duration so that at least some of the recovery datasets are not deleted without a specific instruction provided by a source that manages the storage system.

30. The method of any of the preceding statements, wherein: the data protection parameter set specifies a recovery dataset generation frequency that defines a frequency at which the recovery datasets are generated; and the modifying of the data protection parameter set comprises increasing the recovery dataset generation frequency.

31. The method of any of the preceding statements, wherein: the data protection parameter set specifies a remote storage frequency that defines a frequency at which a subset of recovery datasets in the recovery datasets are transmitted to a remote storage system connected to the storage system by way of a network; and the modifying of the data protection parameter set comprises modifying the remote storage frequency.

32. The method of any of the preceding statements, further comprising: maintaining, by the data protection system, configuration data for the storage system; and determining, by the data protection system, that the storage system is corrupted due to the security threat; wherein the performing of the remedial action comprises using, in response to the determining that the storage system is corrupted, the configuration data to reconstruct a replacement storage system for the storage system.

33. The method of any of the preceding statements, wherein the performing of the remedial action comprises providing a notification of the security threat.

34. The method of any of the preceding statements, wherein the performing of the remedial action comprises restoring, by the data protection system based on one or more recovery datasets generated by the storage system, data stored by the storage system to an uncorrupted state.

35. The method of any of the preceding statements, wherein the one or more recovery datasets comprise one or more of a recovery dataset generated prior to the determining that the storage system is possibly being targeted by the security threat or a recovery dataset generated after the determining that the storage system is possibly being targeted by the security threat.

36. The method of any of the preceding statements, wherein the recovery dataset generated prior to the determining that the storage system is possibly being targeted by the security threat comprises a provisional ransomware recovery structure that can only be deleted or modified in accordance with one or more ransomware recovery parameters.

37. The method of any of the preceding statements, wherein the one or more ransomware recovery parameters specify a number or type of authenticated entities that have to approve a deletion or modification of the provisional ransomware recovery structure before the provisional ransomware recovery structure can be deleted or modified.

38. The method of any of the preceding statements, wherein the one or more ransomware recovery parameters specify a retention duration before which the provisional ransomware recovery structure can be deleted or modified.

39. The method of any of the preceding statements, wherein the restoring is further based on a version of the data stored by the storage system that resides on a system other than the storage system.

40. The method of any of the preceding statements, wherein: the determining that the storage system is possibly being targeted by the security threat constitutes a first threat detection process; and the method further comprises performing, by the data protection system in response to performing the first threat detection process, a second threat detection process different than the first threat detection process and configured to either confirm that the storage system is possibly being targeted by the security threat with a higher confidence threat detection than the first threat detection process or determine that the storage system is not being targeted by the security threat.

41. The method of any of the preceding statements, wherein the determining that the storage system is possibly being targeted by the security threat comprises determining that there is a potential data corruption in the storage system, and wherein the method further comprises: analyzing, by the data protection system in response to the detecting of the potential data corruption, metrics of the storage system; and determining, by the data protection system based on the analyzing of the metrics of the storage system, a corruption-free recovery point for potential use to recover from the potential data corruption.

42. The method of any of the preceding statements, further comprising: determining, by the data protection system, that the read traffic is within a threshold amount of the write traffic during the time period; wherein the determining that the storage system is possibly being targeted by the security threat is further based on the determining that the read traffic is within the threshold amount of the write traffic during the time period.

43. The method of any of the preceding statements, further comprising: identifying, by the data protection system, an attribute associated with one or more of the data read from the storage system or the data written to the storage system; presenting, by the data protection system within a graphical user interface displayed by a display device, graphical information associated with the attribute; and receiving, by the data protection system by way of the graphical user interface, user input; wherein the determining that the storage system is possibly being targeted by the security threat is further based on the user input.

44. The method of any of the preceding statements, further comprising using, by the data protection system, an unmanipulable clock source internal to the storage system to track the time period.

45. The method of any of the preceding statements, wherein the data protection system is implemented by a controller within the storage system.

46. The method of any of the preceding statements, wherein the data protection system is implemented by a computing system communicatively coupled to the storage system by way of a network.

47. The method of any of the preceding statements, wherein the determining that the storage system is possibly being targeted by the security threat comprises determining that ransomware is possibly on the storage system (e.g., that a ransomware attack is possibly in progress or operation against the storage system).

48. A system comprising: a memory storing instructions; a processor communicatively coupled to the memory and configured to execute the instructions to: determine that a total amount of read traffic and write traffic processed by a storage system during a time period exceeds a threshold, the read traffic representing data read from the storage system during the time period and the write traffic representing data written to the storage system during the time period; determine that the write traffic is less compressible than the read traffic; and determine, based on the total amount of read traffic and write traffic exceeding the threshold and on the write traffic being less compressible than the read traffic, that the storage system is possibly being targeted by a security threat.

49. The system of statement 48, implementing any of the methods recited in the preceding statements.

50. A non-transitory computer-readable medium storing instructions that, when executed, direct a processor of a computing device to: determine that a total amount of read traffic and write traffic processed by a storage system during a time period exceeds a threshold, the read traffic representing data read from the storage system during the time period and the write traffic representing data written to the storage system during the time period; determine that the write traffic is less compressible than the read traffic; and determine, based on the total amount of read traffic and write traffic exceeding the threshold and on the write traffic being less compressible than the read traffic, that the storage system is possibly being targeted by a security threat.

51. The non-transitory computer-readable medium of statement 50, implementing any of the methods recited in the preceding statements.

Additional advantages and features of the present disclosure can be further described by the following statements.

1. A method comprising: performing, by a data protection system for a storage system, a first security threat detection process; determining, by the data protection system based on the performing of the first security threat detection process, that the storage system is possibly being targeted by a security threat; and performing, by the data protection system, a second security threat detection process, the second security threat detection process providing higher confidence threat detection than the first security threat detection process.

2. The method of any of the preceding statements, further comprising confirming, by the data protection system based on the performing of the second security threat detection process, that the storage system is possibly being targeted by the security threat.

3. The method of any of the preceding statements, further comprising: performing, by the data protection system based on the determining that the storage system is possibly being targeted by the security threat, a first remedial action with respect to the storage system; and performing, by the data protection system based on the confirming that the storage system is possibly being targeted by the security threat, a second remedial action with respect to the storage system.

4. The method of any of the preceding statements, wherein the first remedial action is different than the second remedial action.

5. The method of any of the preceding statements, wherein the first remedial action or the second remedial action comprises one or more of providing a notification, generating a first recovery dataset, preventing a second recovery dataset from being deleted or modified, modifying a data protection parameter set for a third recovery dataset, or restoring data stored by the storage system to an uncorrupted state.

6. The method of any of the preceding statements, further comprising determining, by the data protection system based on the performing of the second security threat detection process, that the storage system is not being targeted by the security threat.

7. The method of any of the preceding statements, further comprising reverting back, by the data protection system based on the determining that the storage system is not being targeted by the security threat, to performing the first security threat detection process.

8. The method of any of the preceding statements, further comprising performing, by the data protection system based on the determining that the storage system is possibly being targeted by the security threat, a remedial action with respect to the storage system.

9. The method of any of the preceding statements, wherein the performing of the second security threat detection process is performed in response to the determining that the storage system is possibly being targeted by the security threat.

10. The method of any of the preceding statements, wherein the performing of the second security threat detection process is performed in parallel with the performing of the first security threat detection process.

11. The method of any of the preceding statements, wherein the data protection system is implemented by a controller within the storage system.

12. The method of any of the preceding statements, wherein the data protection system is implemented by a computing system communicatively coupled to the storage system by way of a network.

13. The method of any of the preceding statements, wherein the determining that the storage system is possibly being targeted by the security threat comprises determining that a ransomware attack is possibly in progress against the storage system.

14. A system comprising: a memory storing instructions; a processor communicatively coupled to the memory and configured to execute the instructions to: perform, for a storage system, a first security threat detection process; determine, based on the performing of the first security threat detection process, that the storage system is possibly being targeted by a security threat; and perform a second security threat detection process, the second security threat detection process providing higher confidence threat detection than the first security threat detection process.

15. The system of any of the preceding statements, wherein the processor is further configured to execute the instructions to confirm, based on the performing of the second security threat detection process, that the storage system is possibly being targeted by the security threat.

16. The system of any of the preceding statements, wherein the processor is further configured to execute the instructions to: perform, based on the determining that the storage system is possibly being targeted by the security threat, a first remedial action with respect to the storage system; and perform, based on the confirming that the storage system is possibly being targeted by the security threat, a second remedial action with respect to the storage system.

17. The system of any of the preceding statements, wherein the first remedial action is different than the second remedial action.

18. The system of any of the preceding statements, wherein the first remedial action or the second remedial action comprises one or more of providing a notification, generating a first recovery dataset, preventing a second recovery dataset from being deleted or modified, modifying a data protection parameter set for a third recovery dataset, or restoring data stored by the storage system to an uncorrupted state.

19. The system of any of the preceding statements, wherein the processor is further configured to execute the instructions to determine, based on the performing of the second security threat detection process, that the storage system is not being targeted by the security threat.

20. A non-transitory computer-readable medium storing instructions that, when executed, direct a processor of a computing device to: perform, for a storage system, a first security threat detection process; determine, based on the performing of the first security threat detection process, that the storage system is possibly being targeted by a security threat; and perform a second security threat detection process, the second security threat detection process providing higher confidence threat detection than the first security threat detection process.

Additional advantages and features of the present disclosure can be further described by the following statements.

1. A method comprising: directing, by a data protection system, a storage system to generate recovery datasets over time in accordance with a data protection parameter set, the recovery datasets usable to restore data maintained by the storage system to a state corresponding to a selectable point in time; determining, by the data protection system, that the storage system is possibly being targeted by a security threat; and modifying, by the data protection system in response to the determining that the storage system is possibly being targeted by the security threat, the data protection parameter set for one or more of the recovery datasets.

2. The method of any of the preceding statements, wherein: the data protection parameter set specifies a retention duration for the recovery datasets, the retention duration defining a duration that each recovery dataset is saved before being deleted; and the modifying of the data protection parameter set comprises one or more of increasing the retention duration or suspending the retention duration so that at least some of the recovery datasets are not deleted without a specific instruction provided by a source that manages the storage system.

3. The method of any of the preceding statements, wherein: the data protection parameter set specifies a recovery dataset generation frequency that defines a frequency at which the recovery datasets are generated; and the modifying of the data protection parameter set comprises increasing the recovery dataset generation frequency.

4. The method of any of the preceding statements, wherein: the data protection parameter set specifies a remote storage frequency that defines a frequency at which a subset of recovery datasets in the recovery datasets are transmitted to a remote storage system connected to the storage system by way of a network; and the modifying of the data protection parameter set comprises modifying the remote storage frequency.

5. The method of any of the preceding statements, further comprising: identifying, by the data protection system, an anomaly with respect to the storage system; wherein the determining that the storage system is possibly being targeted by the security threat is based on the identifying of the anomaly.

6. The method of any of the preceding statements, wherein the identifying of the anomaly comprises: determining that a total amount of read traffic and write traffic processed by the storage system during a time period exceeds a threshold, the read traffic representing data read from the storage system during the time period and the write traffic representing data written to the storage system during the time period; and determining, by the data protection system, that the write traffic is less compressible than the read traffic.

7. The method of any of the preceding statements, further comprising performing, by the data protection system in response to the determination that the storage system is possibly being targeted by the security threat, an additional remedial action with respect to the storage system.

8. The method of any of the preceding statements, wherein the performing of the additional remedial action comprises directing the storage system to transmit a recovery dataset included in the recovery datasets to a remote storage system for storage by the remote storage system.

9. The method of any of the preceding statements, wherein the performing of the additional remedial action comprises providing a notification of the security threat.

10. The method of any of the preceding statements, wherein the data protection system is implemented by a controller within the storage system.

11. The method of any of the preceding statements, wherein the data protection system is implemented by a computing system communicatively coupled to the storage system by way of a network.

12. The method of any of the preceding statements, wherein the determining that the storage system is possibly being targeted by the security threat comprises determining that ransomware is possibly on the storage system.

13. The method of any of the preceding statements, further comprising using, by the data protection system, at least one of the recovery datasets to restore the data maintained by the storage system to the state corresponding to the selectable point in time.

14. The method of any of the preceding statements, wherein the determining that the storage system is possibly being targeted by the security threat is performed while the recovery datasets are being generated.

15. A system comprising: a memory storing instructions; a processor communicatively coupled to the memory and configured to execute the instructions to: direct a storage system to generate recovery datasets over time in accordance with a data protection parameter set, the recovery datasets usable to restore data maintained by the storage system to a state corresponding to a selectable point in time; determine that the storage system is possibly being targeted by a security threat; and modify, by in response to the determining that the storage system is possibly being targeted by the security threat, the data protection parameter set for one or more of the recovery datasets.

16. The system of any of the preceding statements, wherein: the data protection parameter set specifies a retention duration for the recovery datasets, the retention duration defining a duration that each recovery dataset is saved before being deleted; and the modifying of the data protection parameter set comprises one or more of increasing the retention duration or suspending the retention duration so that at least some of the recovery datasets are not deleted without a specific instruction provided by a source that manages the storage system.

17. The system of any of the preceding statements, wherein: the data protection parameter set specifies a recovery dataset generation frequency that defines a frequency at which the recovery datasets are generated; and the modifying of the data protection parameter set comprises increasing the recovery dataset generation frequency.

18. The system of any of the preceding statements, wherein: the data protection parameter set specifies a remote storage frequency that defines a frequency at which a subset of recovery datasets in the recovery datasets are transmitted to a remote storage system connected to the storage system by way of a network; and the modifying of the data protection parameter set comprises modifying the remote storage frequency.

19. The system of any of the preceding statements, wherein: the processor is further configured to execute the instructions to identify an anomaly with respect to the storage system; and the determining that the storage system is possibly being targeted by the security threat is based on the identifying of the anomaly.

20. A non-transitory computer-readable medium storing instructions that, when executed, direct a processor of a computing device to: direct a storage system to generate recovery datasets over time in accordance with a data protection parameter set, the recovery datasets usable to restore data maintained by the storage system to a state corresponding to a selectable point in time; determine that the storage system is possibly being targeted by a security threat; and modify, by in response to the determining that the storage system is possibly being targeted by the security threat, the data protection parameter set for one or more of the recovery datasets.

Additional advantages and features of the present disclosure can be further described by the following statements.

1. A method comprising: detecting, by a data protection system for a storage system, a potential data corruption in the storage system;

analyzing, by the data protection system in response to the detecting of the potential data corruption, one or more metrics of the storage system; and determining, by the data protection system based on the analyzing of the one or more metrics of the storage system, a corruption-free recovery point for potential use to recover from the potential data corruption.

2. The method of any of the preceding statements, further comprising: selecting, by the data protection system based on the corruption-free recovery point, a recovery dataset corresponding to the corruption-free recovery point; and restoring, by the data protection system based on the selected recovery dataset, data stored by the storage system to an uncorrupted state.

3. The method of any of the preceding statements, further comprising determining, by the data protection system, that the storage system is possibly being targeted by a security threat that causes the potential data corruption.

4. The method of any of the preceding statements, wherein the recovery dataset comprises one or more of a recovery dataset generated prior to the determining that the storage system is possibly being targeted by the security threat or a recovery dataset generated after the determining that the storage system is possibly being targeted by the security threat.

5. The method of any of the preceding statements, wherein the recovery dataset generated prior to the determining that the storage system is possibly being targeted by the security threat comprises a provisional ransomware recovery structure that can only be deleted or modified in accordance with one or more ransomware recovery parameters.

6. The method of any of the preceding statements, wherein the one or more ransomware recovery parameters specify a number or type of authenticated entities that have to approve a deletion or modification of the provisional ransomware recovery structure before the provisional ransomware recovery structure can be deleted or modified.

7. The method of any of the preceding statements, wherein the one or more ransomware recovery parameters specify a retention duration before which the provisional ransomware recovery structure can be deleted or modified.

8. The method of any of the preceding statements, further comprising: receiving, by the data protection system, user input; wherein the determining that the storage system is possibly being targeted by the security threat is based on the user input.

9. The method of any of the preceding statements, further comprising: identifying, by the data protection system, an anomaly with respect to the storage system; wherein the determining that the storage system is possibly being targeted by the security threat is based on the identifying of the anomaly.

10. The method of any of the preceding statements, wherein the restoring is further based on a version of the data stored by the storage system that resides on a system other than the storage system.

11. The method of any of the preceding statements, further comprising presenting, by the data protection system, a visualization of at least one metric included in the one or more metrics.

12. The method of any of the preceding statements, further comprising: receiving, by the data protection system, user input based on the visualization; wherein the determining of the corruption-free recovery point is further based on the user input.

13. The method of any of the preceding statements, wherein the data protection system is implemented by a controller within the storage system.

14. The method of any of the preceding statements, wherein the data protection system is implemented by a computing system communicatively coupled to the storage system by way of a network.

15. A system comprising: a memory storing instructions; a processor communicatively coupled to the memory and configured to execute the instructions to: detect a potential data corruption in a storage system; analyze, in response to the detecting of the potential data corruption, one or more metrics of the storage system; and determine, based on the analyzing of the one or more metrics of the storage system, a corruption-free recovery point for potential use to recover from the potential data corruption.

16. The system of any of the preceding statements, wherein the processor is further configured to execute the instructions to: select, based on the corruption-free recovery point, a recovery dataset corresponding to the corruption-free recovery point; and restore, based on the selected recovery dataset, data stored by the storage system to an uncorrupted state.

17. The system of any of the preceding statements, wherein the processor is further configured to execute the instructions to determine that the storage system is possibly being targeted by a security threat that causes the potential data corruption.

18. The system of any of the preceding statements, wherein the recovery dataset comprises one or more of a recovery dataset generated prior to the determining that the storage system is possibly being targeted by the security threat or a recovery dataset generated after the determining that the storage system is possibly being targeted by the security threat.

19. The system of any of the preceding statements, wherein the recovery dataset generated prior to the determining that the storage system is possibly being targeted by the security threat comprises a provisional ransomware recovery structure that can only be deleted or modified in accordance with one or more ransomware recovery parameters.

20. A non-transitory computer-readable medium storing instructions that, when executed, direct a processor of a computing device to: detect a potential data corruption in a storage system; analyze, in response to the detecting of the potential data corruption, one or more metrics of the storage system; and determine, based on the analyzing of the one or more metrics of the storage system, a corruption-free recovery point for potential use to recover from the potential data corruption.

One or more embodiments may be described herein with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

While particular combinations of various functions and features of the one or more embodiments are expressly described herein, other combinations of these features and functions are likewise possible. The present disclosure is not limited by the particular examples disclosed herein and expressly incorporates these other combinations.

Malicious entities (e.g., hackers, malware, and/or other entities) may gain unauthorized access to a storage system, such as any of the storage systems described herein. With such access, the malicious entities may target the storage system with a security threat, such as a ransomware attack, a malware attack, and/or one or more other operations configured to destroy, modify, render unusable, or otherwise negatively affect the storage system and/or data maintained by the storage system.

The methods and systems described herein may be configured to detect that a storage system is possibly being targeted by a security threat and to perform various remedial actions in response to detecting that the storage system is possibly being targeted by the security threat.

The methods and systems described herein may additionally or alternatively be configured to detect inadvertent corruption and/or deletion of data stored by a storage system, such as caused by administrative or application errors. For example, the methods and systems described herein may implement monitoring for unexpected behaviors and controls on deletion of certain kinds of data.

Various advantages and benefits may be realized in accordance with the methods and systems described herein. For example, by detecting and performing one or more remedial actions with respect to a security threat targeting a storage system, the methods and systems described herein may minimize or eliminate data corruption, structural damage, and/or performance degradation that may occur as a result of the security threat. Moreover, by implementing a data protection system at the storage level, the methods and systems described herein may provide a last line of defense against security threats, or other forms of corrupting actions, should other data security measures taken at levels above the storage level (e.g., at the client, server, application, or network levels) fail to identify and/or thwart the security threats or other forms of corrupting actions. This may improve the operation of computing devices at both the storage level and at other levels above the storage level.

Figure 4:
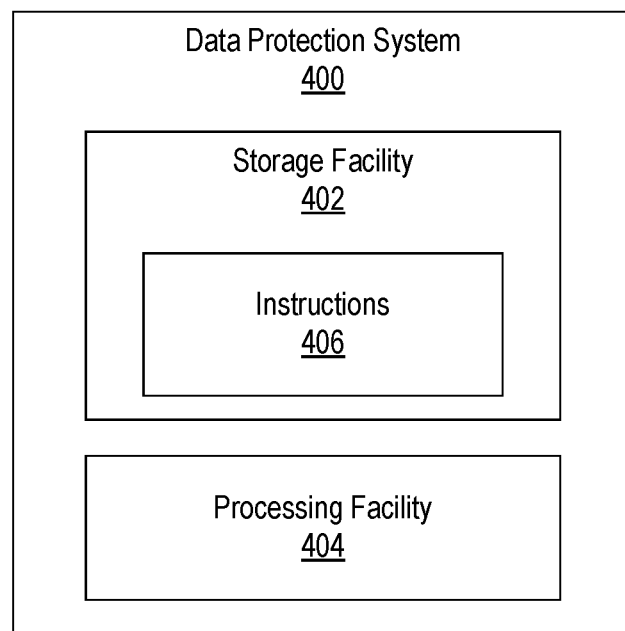
FIG. 4 illustrates an exemplary data protection system in accordance with some embodiments of the present disclosure.

FIG. 4 illustrates an exemplary data protection system 400 ("system 400"). As shown, system 400 may include, without limitation, a storage facility 402 and a processing facility 404 selectively and communicatively coupled to one another. Facilities 402 and 404 may each include or be implemented by hardware and/or software components (e.g., processors, memories, communication interfaces, instructions stored in memory for execution by the processors, etc.). In some examples, facilities 402 and 404 may be distributed between multiple devices and/or multiple locations as may serve a particular implementation.

Storage facility 402 may maintain (e.g., store) executable data used by processing facility 404 to perform any of the operations described herein. For example, storage facility 402 may store instructions 406 that may be executed by processing facility 404 to perform any of the operations described herein. Instructions 406 may be implemented by any suitable application, software, code, and/or other executable data instance. Storage facility 402 may also maintain any data received, generated, managed, used, and/or transmitted by processing facility 404. Storage facility 402 may additionally maintain any other suitable type of data as may serve a particular implementation.

Processing facility 404 may be configured to perform (e.g., execute instructions 406 stored in storage facility 402 to perform) various processing operations described herein. References herein to operations performed by system 400 may be understood to be performed by processing facility 404.

Figure 5:
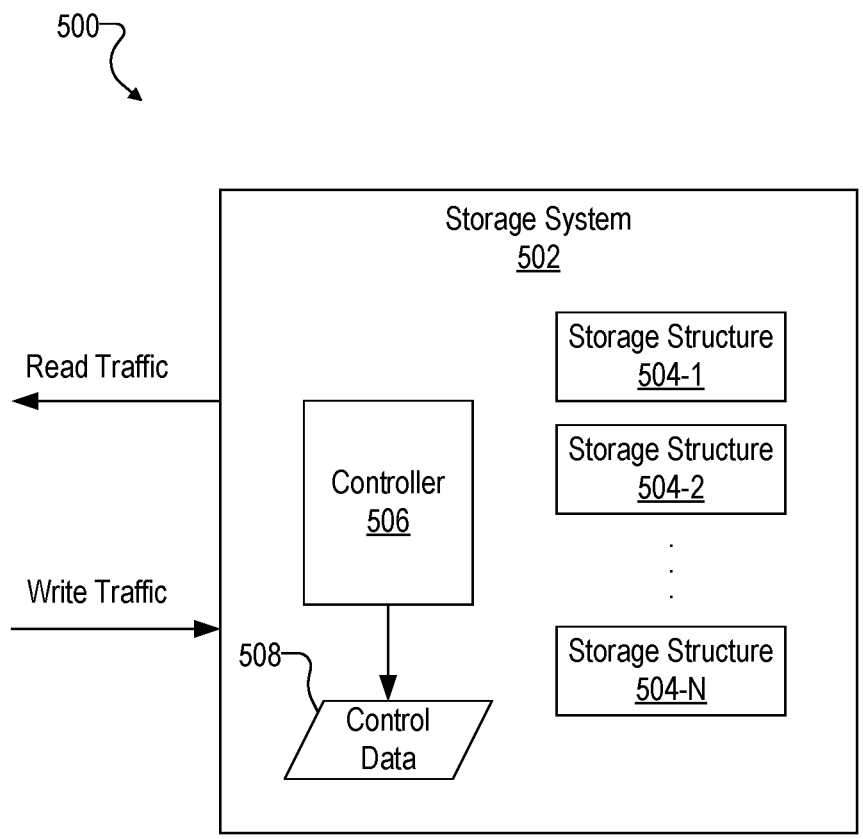
FIG. 5 illustrates an exemplary configuration in which a storage system processes read traffic and write traffic in accordance with some embodiments of the present disclosure.

FIG. 5 illustrates an exemplary configuration 500 in which a storage system 502 processes read traffic and write traffic. The read traffic represents data read from storage system 502 and the write traffic represents data written to storage system 502.

Storage system 502 may be implemented by any of the storage systems, devices, and/or components described herein. For example, storage system 502 may be implemented by a local storage system (e.g., a storage system located on-site at a customer's premises) and/or by a remote storage system (e.g., a storage system located in the cloud).

As shown, storage system 502 includes a plurality of storage structures 504 (e.g., storage structures 504-1 through 504-N) and a controller 506. Storage structures 504 may each include any logical structure within which data may be stored and/or organized. For example, storage structures 504 may include one or more snapshots, volumes, file systems, object stores, object buckets, key value or relational or other databases, backup datasets, objects that manage a group of volumes, container objects, blocks, etc. In some examples, storage structures 504 are maintained in one or more storage elements (e.g., storage arrays, memories, etc.).

Controller 506 may be configured to control operations of elements included in storage system 502 and may be implemented by any suitable combination of processors, operating systems, and/or other components as described herein. In particular, controller 506 may be configured to produce control data 508 configured to control storage structures 504. For example, control data 508 may be representative of one or more instructions to create, modify, write to, read from, delete, eradicate, and/or otherwise interact with storage structures 504.

Read traffic may represent data read from storage system 502 by a source (e.g., a host in communication with storage system 502), and write traffic may represent data written to storage system 502 by the source. Read and write traffic may occur in response to the source transmitting one or more requests to storage system 502. These requests may include instructions for controller 506 to perform one or more operations. Such operations may include writing data to a storage structure 504, reading data from a storage structure 504, deleting data from a storage structure 504, overwriting data within a storage structure 504, and/or deleting a storage structure 504 itself.

In some examples, read traffic, write traffic, and/or one or more requests to interface with storage system 502 may originate from a malicious source and be representative of a ransomware attack on any of the components and/or data within storage system 502 and/or any other malicious operation that destroys, modifies, renders unusable, or otherwise affects any of the components and/or data within storage system 502.

Accordingly, as described herein, system 400 may, in some examples, be configured to monitor the read and write traffic processed by storage system 502 (e.g., by monitoring one or more requests provided by one or more sources to storage system 502) to ascertain whether storage system 502 is possibly being targeted by a security threat.

In some examples, system 400 is implemented by storage system 502. For example, system 400 may be at least partially implemented by controller 506. Additionally or alternatively, system 400 may be at least partially implemented by one or more computing devices or systems separate from and in communication with storage system 502.

Figure 6:
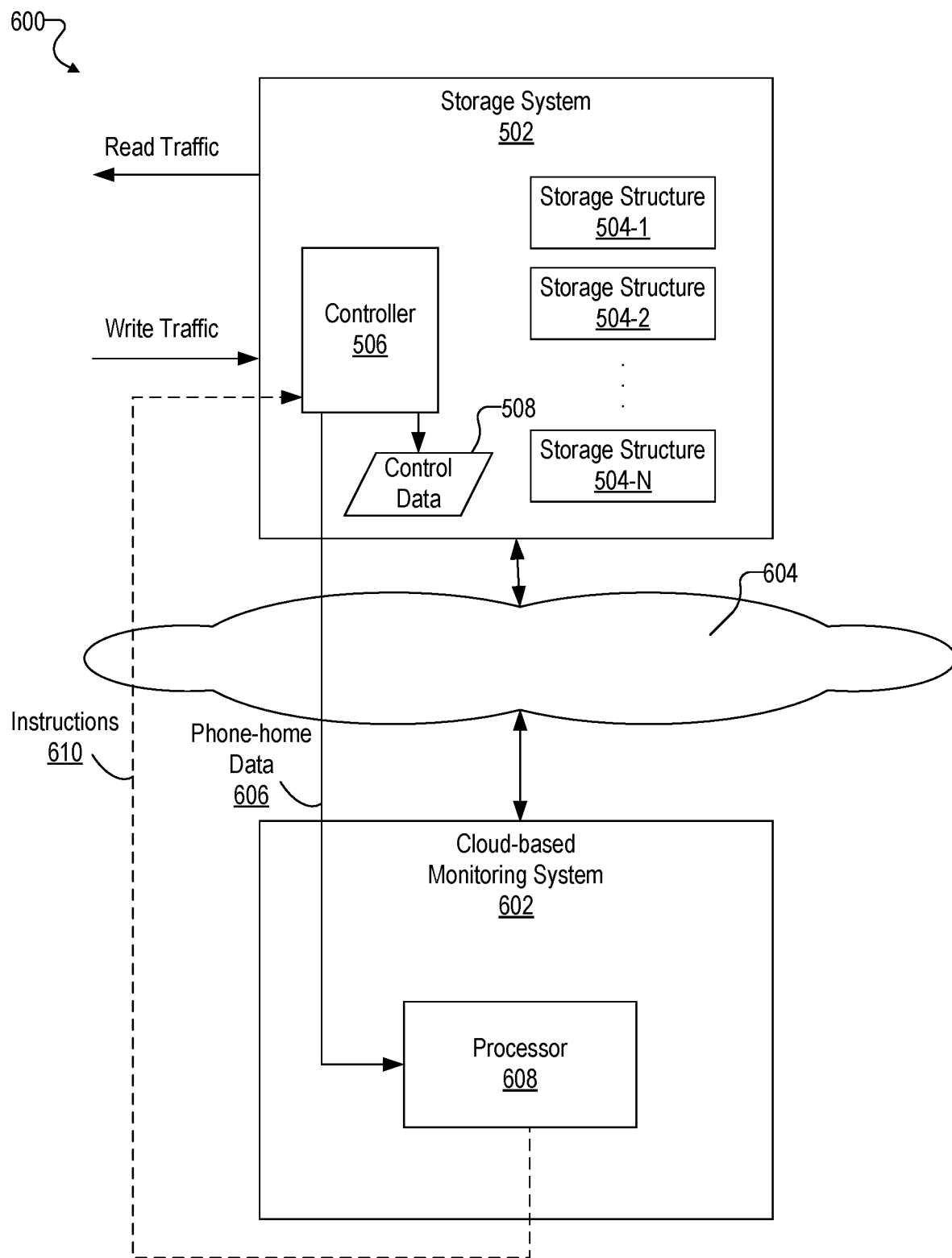
FIG. 6 shows an exemplary configuration in which a cloud-based monitoring system is communicatively coupled to storage system by way of a network in accordance with some embodiments of the present disclosure.

To illustrate, FIG. 6 shows an exemplary configuration 600 in which a cloud-based monitoring system 602 is communicatively coupled to storage system 502 by way of a network 604. Cloud-based monitoring system 602 may at least partially implement system 400.

Network 604 may include the Internet, a wide area network, a local area network, a provider-specific wired or wireless network (e.g., a cable or satellite carrier network or a mobile telephone network), a content delivery network, and/or any other suitable network. Data may flow between storage system 502 and cloud-based data monitoring system 602 using any communication technologies, devices, media, and protocols as may serve a particular implementation.

Cloud-based monitoring system 602 may be implemented by one or more server-side computing devices configured to communicate with storage system 502 by way of network 604. For example, cloud-based monitoring system 602 may be implemented by one or more servers or other physical computing devices.

Cloud-based monitoring system 602 may be configured to perform one or more remote monitoring operations with respect to storage system 502. For example, cloud-based monitoring system 602 may be configured to remotely monitor read and write traffic processed by storage system 502 and/or requests processed by storage system 502. To this end, as shown, cloud-based monitoring system 602 may receive phone-home data 606 from controller 506 of storage system 502 by way of network 604. Phone-home data 606 may include various types of data that may be used by cloud-based monitoring system 602 to monitor various types of operations performed by storage system 502. In particular, phone-home data 606 may include data representative of one or more metrics and/or attributes associated with read and write traffic, one or more metrics and/or attributes associated with components within storage system 502, one or more requests provided by a source to storage system 502, and/or any other data as may serve a particular implementation.

As shown, cloud-based monitoring system 602 may include a processor 608 configured to process phone-home data 606. Processor 608 may process phone-home data 606 in any suitable manner. For example, processor 608 may determine, based on phone-home data 606, that storage system 502 is possibly being targeted by a security threat and transmit instructions 610 to controller 506 to perform one or more remedial actions configured to counteract the security threat.

Various methods that may be performed by system 400 and/or any implementation thereof are described in connection with various flowcharts depicted in the figures. While the flowcharts depicted in the figures illustrate exemplary operations according to one embodiment, other embodiments may omit, add to, reorder, and/or modify any of the operations shown in the flowcharts depicted in the figures. Moreover, each of the operations shown in the flowcharts depicted in the figures may be performed in any of the ways described herein.

Figure 7:
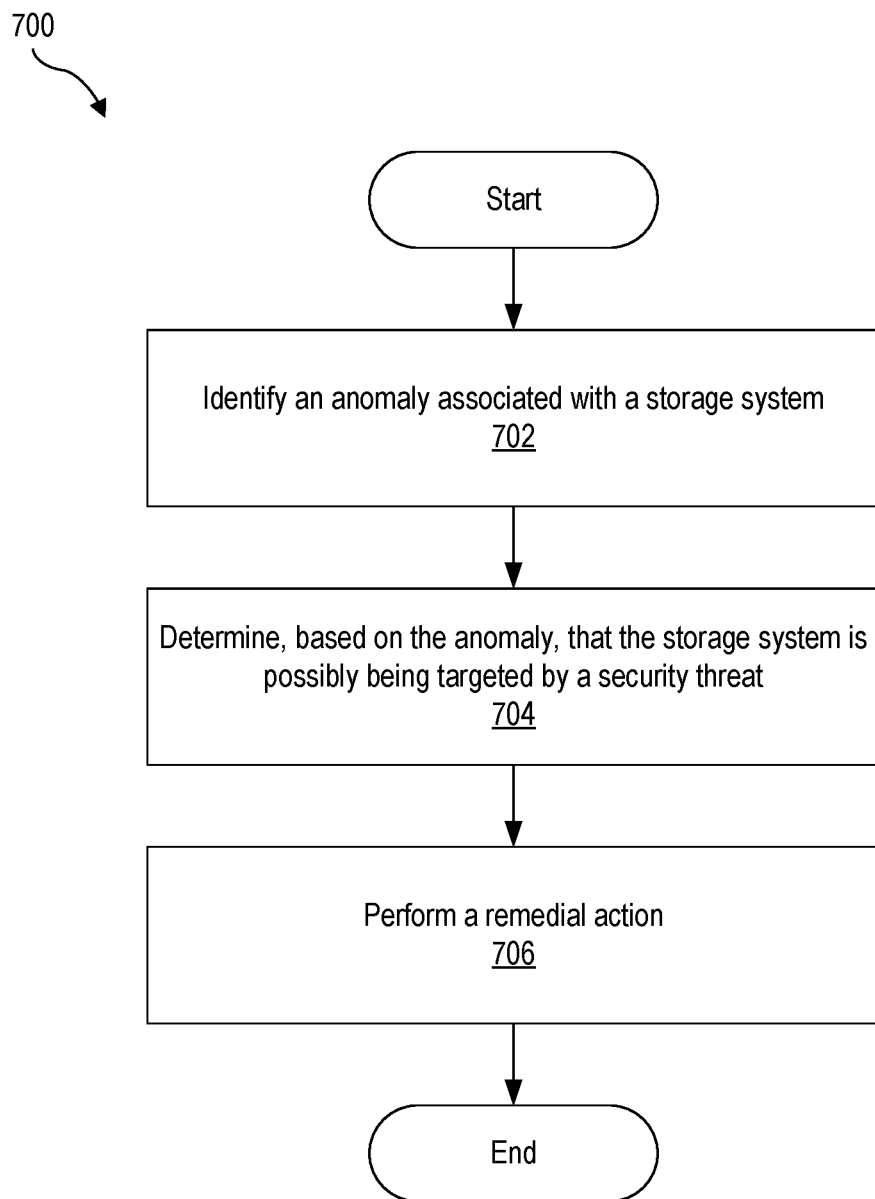
FIGS. 7-31 illustrate exemplary methods in accordance with some embodiments of the present disclosure.

FIG. 7 illustrates an exemplary method 700 of dealing with a possible security threat attack against a storage system (e.g., storage system 502). At operation 702, system 400 identifies an anomaly associated with a storage system. At operation 704, system 400 determines, based on the identified anomaly, that the storage system is possibly being targeted by a security threat. At operation 706, system 400 performs a remedial action (e.g., in response to determining that the storage system is possibly being targeted by the security threat). Examples of each of these operations are described herein.

Various ways in which system 400 may identify an anomaly associated with a storage system and determine that the storage system is possibly being targeted by a security threat are described in connection with FIGS. 8-23. Each of the processes described in connection with these figures may be performed independently to determine that a storage system is possibly being targeted by a security threat. Alternatively, any number of the processes described in connection with these figures may be performed concurrently and/or sequentially in any order to determine that a storage system is possibly being targeted by a security threat.

Figure 8:
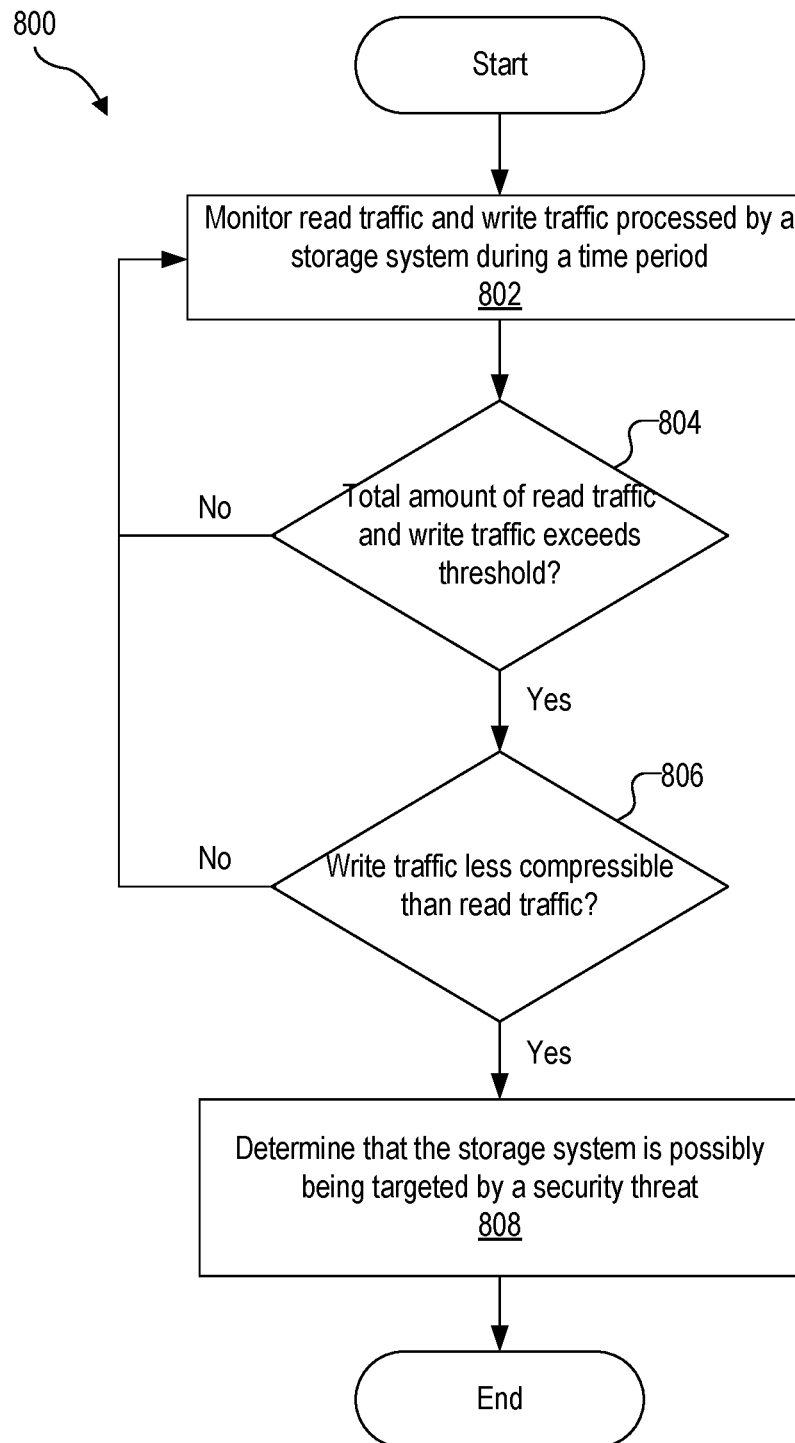

FIG. 8 illustrates an exemplary traffic-based security threat detection method 800 that may be performed by system 400 and/or any implementation thereof. Method 800 may be used alone or in combination with any of the other security threat detection methods described herein.

At operation 802, system 400 monitors read traffic and write traffic processed by a storage system during a time period. The read traffic represents data read from the storage system during the time period and the write traffic represents data written to the storage system during the same time period. In some examples, system 400 is configured to use an unmanipulable clock source internal to the storage system to track the time period.

System 400 may monitor read and write traffic in any suitable manner. For example, system 400 may analyze metrics generated by the storage system and/or a cloud-based monitoring system (e.g., cloud-based monitoring system 602) that are representative of an amount of read and write traffic, the type of data included in the read and write traffic, a source of the read and/or write traffic, timestamp data indicative of a date and/or time that the read and write traffic occurs, and/or any other attribute of the read and write traffic as may serve a particular implementation.

The time period during which system 400 monitors the read and write traffic may be of any suitable duration. In some examples, the time period may be set in response to user input (e.g., by an administrator). Additionally or alternatively, the time period may be set and/or adjusted automatically by system 400 based on an occurrence of one or more events and/or based on one or more attributes associated with the read and/or write traffic.

At decision 804, system 400 determines whether a total amount of read and write traffic exceeds a threshold. At decision 806, system 400 determines whether the write traffic is less compressible than the read traffic. If the total amount of read and write traffic exceeds the threshold ("Yes" at decision 804) and the write traffic is less compressible, or has a far high number of incompressible blocks than the read traffic, than the read traffic ("Yes" at decision 806), system 400 determines at operation 808 that the storage system is possibly being targeted by a security threat. This is because rewriting data as encrypted data is typical of a ransomware attack, and encrypted data is generally not very compressible (in some cases, encrypted data is entirely incompressible). Otherwise, system 400 continues monitoring the read and write traffic ("No" at decision 804 and/or decision 806).

The threshold to which system 400 compares the total amount of read and write traffic may be any suitable value and type. For example, the threshold may be a particular amount of bytes of data included in the read and write traffic during the time period. Additionally or alternatively, the threshold may be representative of a rate (e.g., a certain amount of data per second, minute, hour, or some other time increment). Additionally or alternatively, the threshold may be representative of aggregate amount (e.g., a total number of bytes). Additionally or alternatively, the threshold may be representative of a difference from historical trends. As an illustration, if system 400 detects a spike in a total amount of read and write traffic during a particular time period compared to a similar time period on a different day, this may be indicative of a possible security threat against the storage system.

In some examples, the threshold to which system 400 compares the total amount of read and write traffic may be set in response to user input (e.g., by an administrator). Additionally or alternatively, the threshold may be set and/or adjusted automatically by system 400 based on an occurrence of one or more events and/or based on one or more attributes associated with the read and/or write traffic. For example, the threshold may be increased during periods of time when the total amount of read and write traffic are typically higher than average. Likewise, the threshold may be decreased during periods of time when the total amount of read and write traffic are typically lower than average.

In some examples, system 400 may maintain data representative of multiple thresholds each corresponding to different types of data included in the read and write traffic and/or to any other attribute of the read and write traffic. In these examples, system 400 may concurrently compare different segments of the read and write traffic to the different thresholds. If one or more of the thresholds are met, system 400 may satisfy decision 804 (e.g., by proceeding along the "Yes" branch of decision 804).

System 400 may determine whether the write traffic is less compressible than the read traffic in any suitable manner. For example, system 400 may determine an overall compressibility (e.g., in terms of percentage and/or total amount of storage space saved if compressed) of the write traffic and of the read traffic during the time period. If the overall compressibility of the write traffic is less than the overall compressibility of the read traffic (e.g., by more than a particular threshold), this may indicate that the write traffic includes encrypted data (which has a relatively low amount of compressibility), which may be indicative of a ransomware attack and/or any other type of security threat. It will be recognized that overall compressibility is only one metric that may be used to determine whether the write traffic is less compressible than the read traffic. Other metrics may include file by file comparisons of compressibility, peak compressibility metrics, etc.

As indicated at operation 808, based on the total amount of read traffic and write traffic exceeding the threshold and on the write traffic being less compressible than the read traffic, system 400 may determine that the storage system is possibly being targeted by a security threat. System 400 may take one or more other factors into consideration when determining whether the storage system is possibly being targeted by the security threat.

Figure 9:
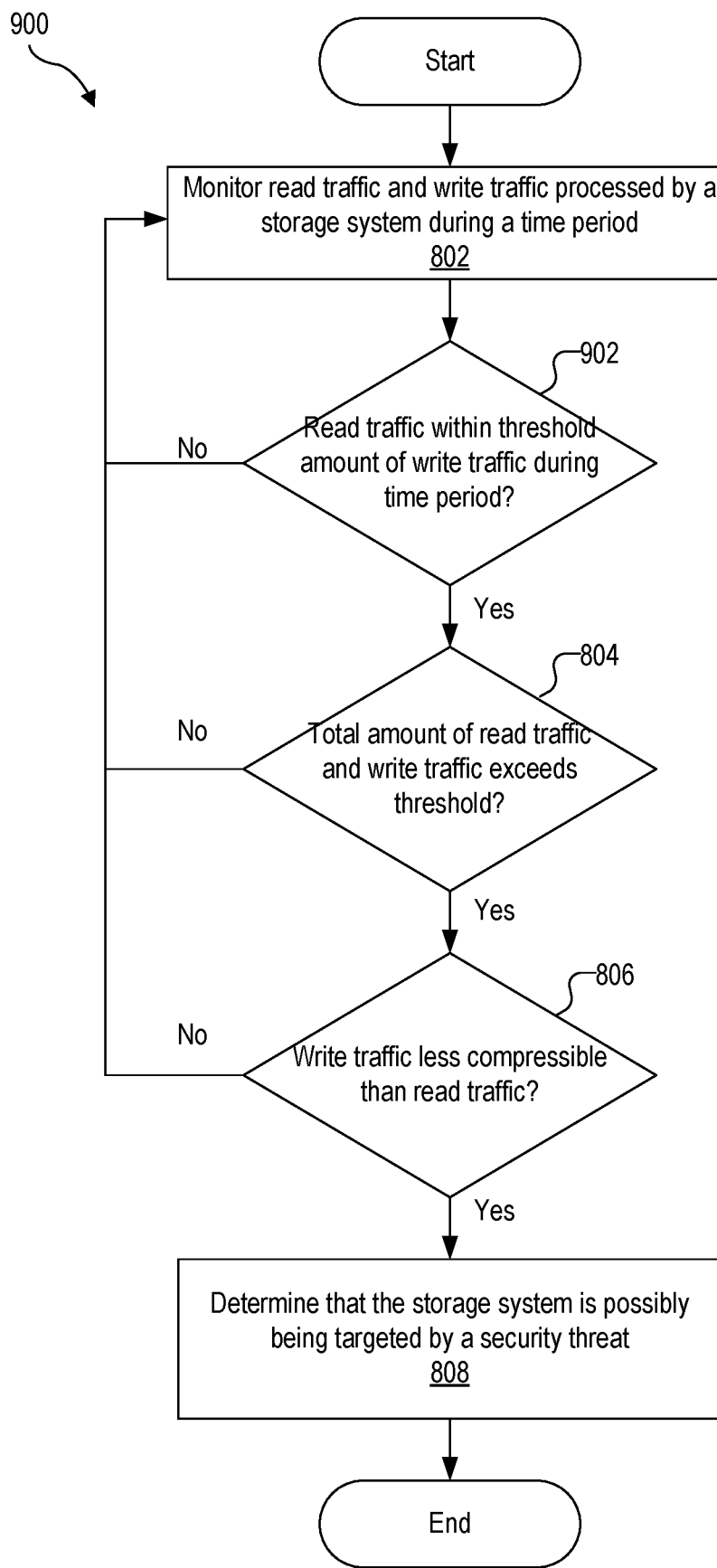

For example, FIG. 9 illustrates another exemplary traffic-based security threat detection method 900 that may be performed by system 400 and/or any implementation thereof. Method 900 may be used alone or in combination with any of the other security threat detection methods described herein.

Method 900 is similar to method 800, except that method 900 further includes another condition that needs to be satisfied before system 400 determines that the storage system is possibly being targeted by the security threat. In particular, at decision 902, system 400 determines whether the read traffic is within a threshold amount of the write traffic during the time period. This threshold amount may be relatively small such that satisfaction of this condition occurs when the total amount of read traffic during the time period is approximately the same as the total amount of write traffic during the time period. This may be indicative of a ransomware attack or other security threat against the storage system in which data maintained by the storage system is being read out, encrypted, and written back to the storage system.

Hence, if system 400 determines that the read traffic is within the threshold amount of the write traffic during the time period ("Yes" at decision 902), and if the results of decisions 804 and 806 are both "Yes" as described in connection with FIG. 8, system 400 may determine that the storage system is possibly being targeted by a security threat.

Figure 10:
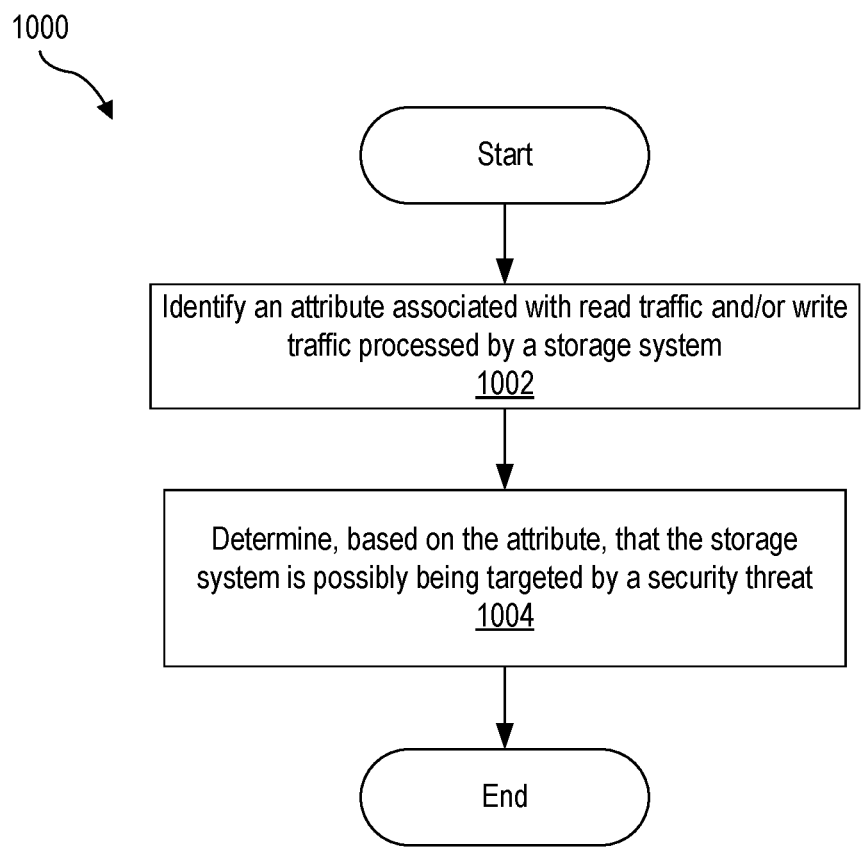

FIG. 10 illustrates an exemplary attribute-based security threat detection method 1000 that may be performed by system 400 and/or any implementation thereof. Method 1000 may be used alone or in combination with any of the other security threat detection methods described herein. For example, method 1000 may be used in combination with method 800 and/or method 900 to detect data substreams within all of the read and write traffic to a storage system that may be indicative of a methodical attempt by a malicious entity to corrupt data maintained by the storage system (e.g., by encrypting data and/or overwriting a collection of unencrypted data).

At operation 1002, system 400 identifies an attribute associated with read traffic and/or write traffic processed by a storage system. This identification may be performed while system 400 is monitoring the read and/or write traffic processed by the storage system as described herein. At operation 1004, system 400 determines, based on the identified attribute, that the storage system is possibly being targeted by a security threat.

The attribute identified in operation 1002 may be any suitable attribute as may serve a particular implementation. For example, the attribute may include a host attribute that identifies a particular host associated with the storage system. In this implementation, system 400 may monitor host-specific data read from the storage system and/or host-specific data written to the storage system to detect a possible security threat against the storage system. This may be beneficial if there are multiple hosts associated with a particular storage system. In this scenario, host-specific data associated with each host may be monitored in accordance with a different rule set specific to each host.

To illustrate, a particular host may be associated with highly sensitive data (e.g., financial data or other types of personal data) maintained by a storage system that may be more prone to a ransomware attack and/or other type of security threat than other data that is not as sensitive. In this example, a relatively stringent rule set (e.g., a relatively low threshold for decision 804) may be used when monitoring read and/or write traffic associated with this host. For example, a relatively stringent rule set may be used for a host that does not normally issue traffic to a particular dataset.

As another example, the attribute identified in operation 1002 may include an attribute of a storage structure (e.g., storage structure 504) within the storage system. For example, the attribute may include an identifier of a particular volume and/or other type of storage structure within the storage system to which data is being written and/or from which data is being read, a storage capacity of a storage structure to which data is being written and/or from which data is being read, and/or any other suitable attribute associated with a particular storage structure.

To illustrate, system 400 may monitor read and write traffic associated with a particular volume within a storage system to determine whether a total amount of read and write traffic exceeds a threshold (decision 804) and/or whether the write traffic is less compressible than the read traffic (decision 806). In this manner, a security threat that targets a particular storage structure within a storage system may be more effectively detected.

As another example, the attribute identified at operation 1002 may include a storage format attribute that identifies and/or is otherwise associated with a storage format used by the storage system. For example, the storage format attribute may indicate that the storage system is using an object storage format, a block storage format, and/or a file storage format. This data may be used in any manner to more specifically specify a rule set used to monitor for possible security threats against the storage system.

In some examples, such as in a file-based and/or object-based storage system, stored data (e.g., files and/or objects) may be identifiable as being of a particular type (e.g., an image file, a video file, a ZIP archive, a text file, a machine code binary file, a log file, a database table space, etc.). However, the content of the data may instead look like encrypted data (e.g. randomized and incompressible content) that does not match what would be expected of the particular type. System 400 may be configured to detect these types of content versus format type mismatches and, based on one or more of the mismatches, determine that the storage system is possibly being targeted by a security threat.

Figure 11:
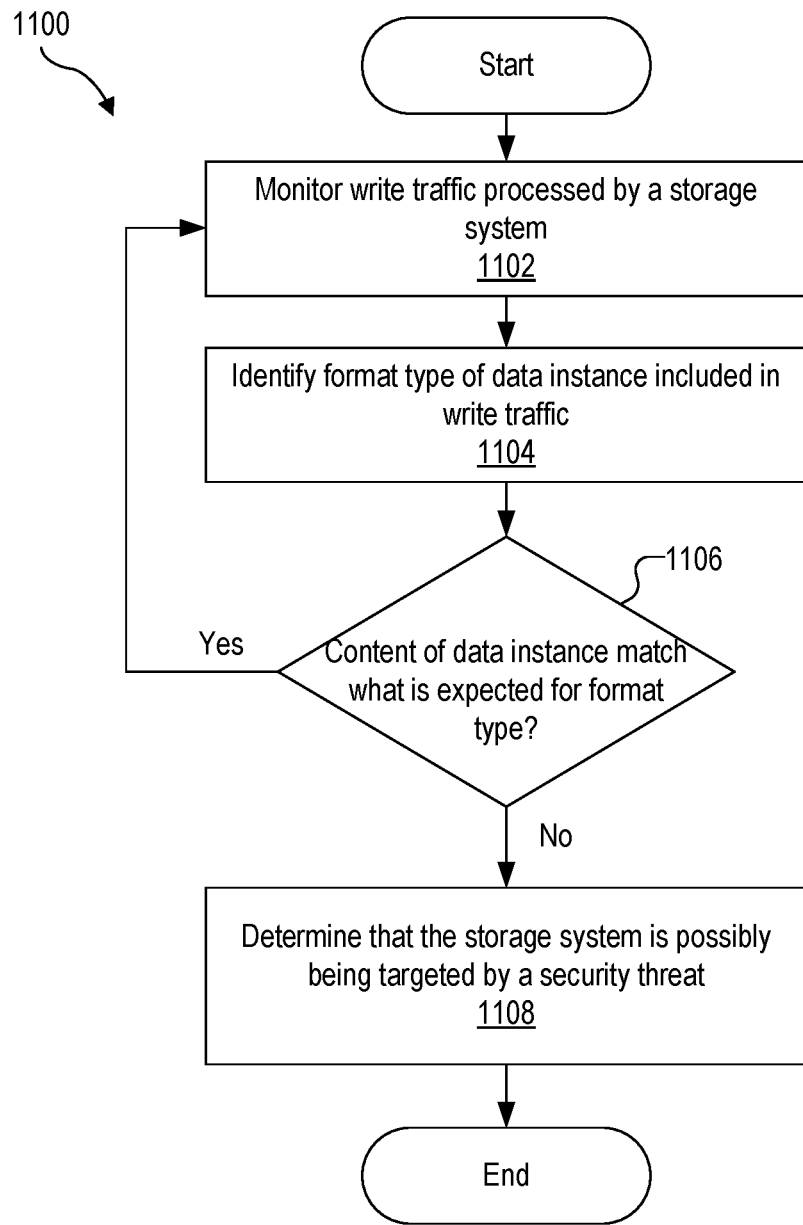

To illustrate, FIG. 11 shows an exemplary format type-based security threat detection method 1100 that may be performed by system 400 and/or any implementation thereof. Method 1100 may be used alone or in combination with any of the other security threat detection methods described herein.

At operation 1102, system 400 monitors write traffic processed by a storage system. This may be performed in any of the ways described herein.

At operation 1104, system 400 identifies a format type of a data instance (e.g., a file and/or object) included in the write traffic. The format type may be indicative of a particular type of data (e.g., an image file, a database tablespace, etc.). System 400 may identify the format type based on metadata associated with the data instance, a file extension of the data instance, and/or in any other suitable manner.

At decision 1106, system 400 determines whether the content of the data instance matches what is expected for the identified format type. If the content of the data instance does not match what is expected for the identified format type ("No" at decision 1106), system 400 may, at operation 1108, determine that the storage system is possibly being targeted by a security threat. If the content of the data instance does match what is expected for the identified format type ("Yes" at decision 1106), system continues monitoring the write traffic processed by the storage system. In some examples, a threshold number of mismatches between data instances and identified format types may be detected before system 400 determines that the storage system is possibly being targeted by a security threat.

Figure 12:
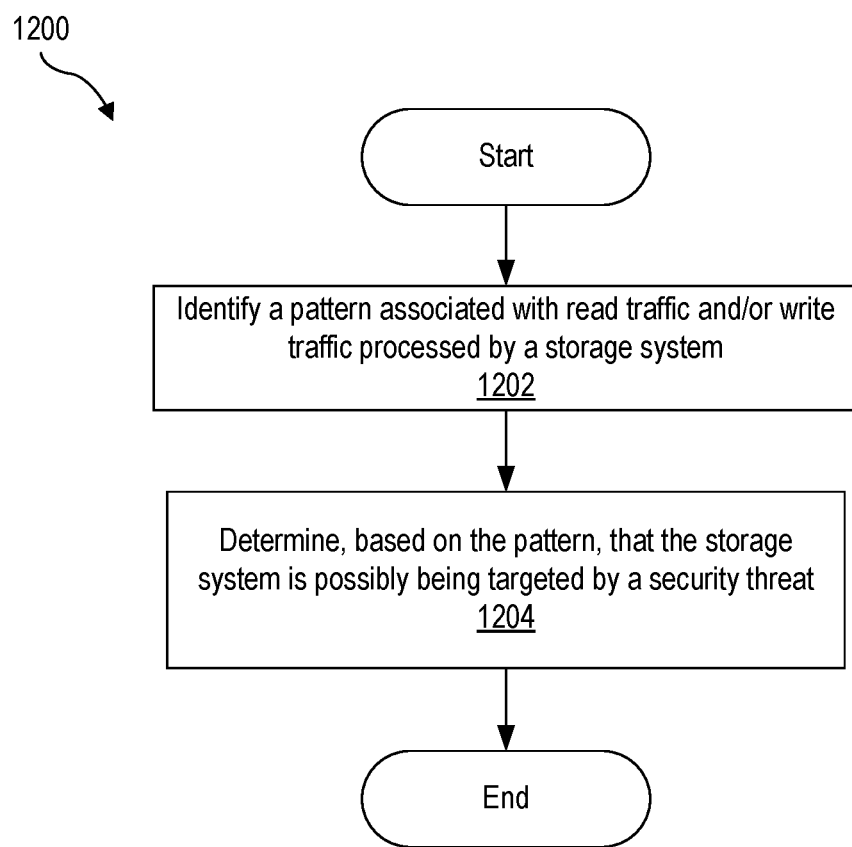

FIG. 12 illustrates an exemplary pattern-based security threat detection method 1200 that may be performed by system 400 and/or any implementation thereof. Method 1200 may be used alone or in combination with any of the other security threat detection methods described herein.

At operation 1202, system 400 identifies a pattern associated with read traffic and/or write traffic processed by a storage system. This identification may be performed while system 400 is monitoring the read and/or write traffic processed by the storage system as described herein. At operation 1204, system 400 determines, based on the identified pattern, that the storage system is possibly being targeted by a security threat.

System 400 may identify the pattern at operation 1202 in any suitable manner. For example, a ransomware attack may repeatedly read data and write the same data in encrypted form in an identifiable pattern of read/writes. This pattern may be identified by system 400 based one or more metrics associated with the read and write traffic and used to determine that the storage system is possibly being targeted by a security threat. Such metrics may be included in data maintained by a controller of a storage system and/or in phone home data transmitted by the storage system to a cloud-based monitoring system.

As another example, system 400 may identify a pattern involving reading from a block volume in some pattern with direct overwrites of compressible data with incompressible data (e.g., with no identifiable data format headers, or with incompressible content versus prior content that was compressible) a short time later, particularly in a sequential pattern of reads and a trailing pattern of sequential overwrites. To illustrate, such a pattern may include a read of the first few blocks of a block volume or partition or another recognizable structure stored on a block volume that may be the start of a file system or host-based block device (e.g., a logical volume in a volume manager), followed by an overwrite of that data with relatively incompressible data. In some examples, such a pattern may begin at logical block address (LBA) zero.

As another example, system 400 may identify any pattern of reading unmapped blocks and rewriting of those same blocks with relatively incompressible data, or writing an equivalent amount of relatively incompressible data elsewhere in the storage system.

These patterns, as well as others that may be detected by system 400, are not common I/O patterns for a storage system and may accordingly be flagged by system 400 as being indicative of a possible security threat against the storage system.

System 400 may detect a pattern indicative of a possible security threat against a storage system over any suitable amount of time. For example, some patterns may be relatively subtle and therefore detected by system 400 over a relatively long amount of time using one or more metrics, machine learning algorithms, and/or other detection algorithms. Other patterns may be detected relatively quickly by system 400.

In some examples, a confidence level of the determination made by system 400 that the storage system is possibly being targeted by a security threat may change over time as one or more patterns are detected and/or tracked by system 400. For example, a detected pattern may result in system 400 determining that the storage system is possibly being targeted by a security threat with an initial confidence level. Over time, if the pattern persists or becomes more prevalent, the confidence level of the determination that the storage system is possibly being targeted by the security threat may increase.

Figure 13:
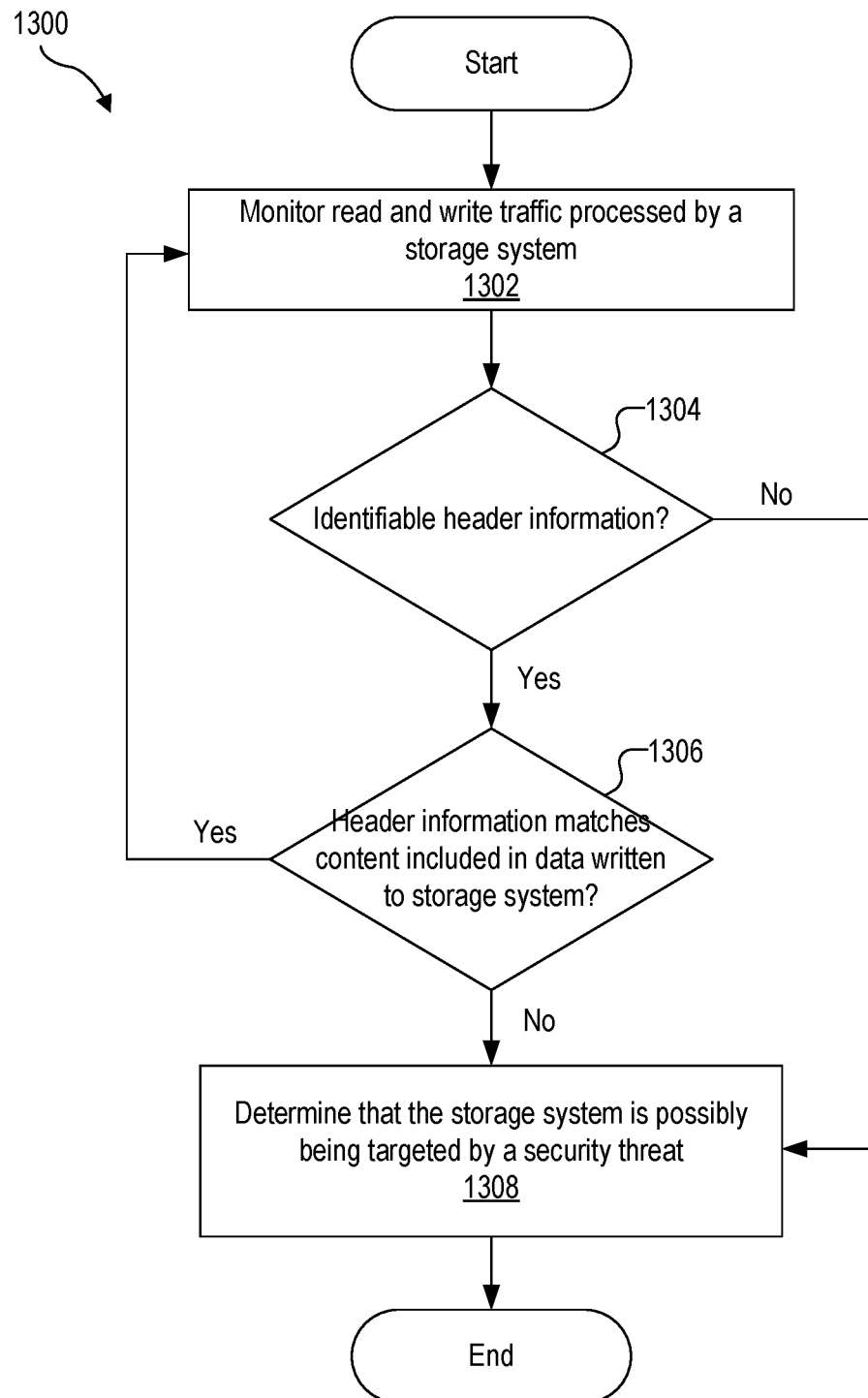

FIG. 13 shows an exemplary header information-based security threat detection method 1300 that may be performed by system 400 and/or any implementation thereof. Method 1300 may be used alone or in combination with any of the other security threat detection methods described herein.

At operation 1302, system 400 monitors read and write traffic processed by a storage system. This may be performed in any of the ways described herein.

At decision 1304, system 400 determines whether the write traffic includes identifiable header information. If the write traffic does not include identifiable header information ("No" at decision 1304), system 400 may, at operation 1308, determine that the storage system is possibly being targeted by a security threat.

If the write traffic does include identifiable header information ("Yes" at decision 1304), system 400 determines, at decision 1306, whether the header information matches content included in data written to the storage system. If the header information does not match content included in data written to the storage system, system 400 may, at operation 1308, determine that the storage system is possibly being targeted by a security threat. Alternatively, if the header information does match content included in data written to the storage system, system 400 may return to monitoring the write traffic at operation 1302.

As used herein, header information may refer to supplemental data included in (e.g., placed at a beginning of) a block of data being transmitted to the storage system. The header information may identify a format, type, and/or other attribute of data included in a payload portion of the block of data being transmitted to the storage system. Additionally or alternatively, the header information may include a checksum and/or other data that may be used to test for corrupted data.

In some examples, legitimate data (e.g., data not associated with a security threat) being written to a storage system includes identifiable header information that matches content (e.g., payload content) included in the data being written to the storage system. For example, if the identifiable header information of legitimate data indicates that the payload data has a certain format, the payload data should have that format.

However, data associated with a security threat (e.g., a ransomware attack and/or an attempt to write corrupt data to the storage system) may either not have identifiable header information or include identifiable header information that does not match content included in the data being written to the storage system. For example, data being written to a storage system as part of a security threat against the storage system may include header information related to known image, video, sound, or archive files, but payload data included in the data being written to the storage system may not be of any of those types of files. As another example, files may be renamed as part of a re-encryption performed by a malicious entity. For example, if a collection of JPEG files are rewritten into new files with new names, those names may not indicate that they are JPEG files. To detect this, system 400 may determine that a preponderance of files in a directory tree, for example, had been of a particular set of file types by filename pattern, and that those files are being replaced by new files that no longer have that filename pattern.

Accordingly, if data being written to the storage system does not include identifiable header information, system 400 may flag the data as possibly being representative of a security threat against the storage system. Additionally or alternatively, if data written to the storage system includes identifiable header information, but the header information does not match content included in the data written to the storage, system 400 may flag the data as possibly being representative of a security threat against the storage system.

In some examples, system 400 may determine file formats from header data when reading files. This may be performed when files are written out with a name pattern (such as with a .JPG suffix), by recognizing contents of configuration files (such as a database configuration file identifying certain files or block devices as being used as specific parts of a database (logs, tablespaces, etc.)), and/or in any suitable manner. Accordingly, system 400 may detect a change in filename pattern by detecting when reads have a particular detectable format but writes do not have the same format, or when writes of files with known filename formats (such as .JPG suffixes or the many other suffixes associated with file types) do not result in files with a recognizable format. In response, system 400 may flag data involved in these writes as possibly being representative of a security threat against the storage system.

In some examples, system 400 may base a determination of whether a storage system is being targeted by a security threat by comparing header information included in read traffic with header information included in write traffic. For example, if data read from the storage system is at least partially compressed (e.g., already compressed image, video, or sound files, or even compressed archives) and includes identifiable header information, but no similar identifiable header information can be found in the data being written to the storage system, this may indicate that the read data is being replaced with encrypted data. Hence, system 400 may in this scenario determine that the storage system is possibly being targeted by a security threat.

Figure 14:
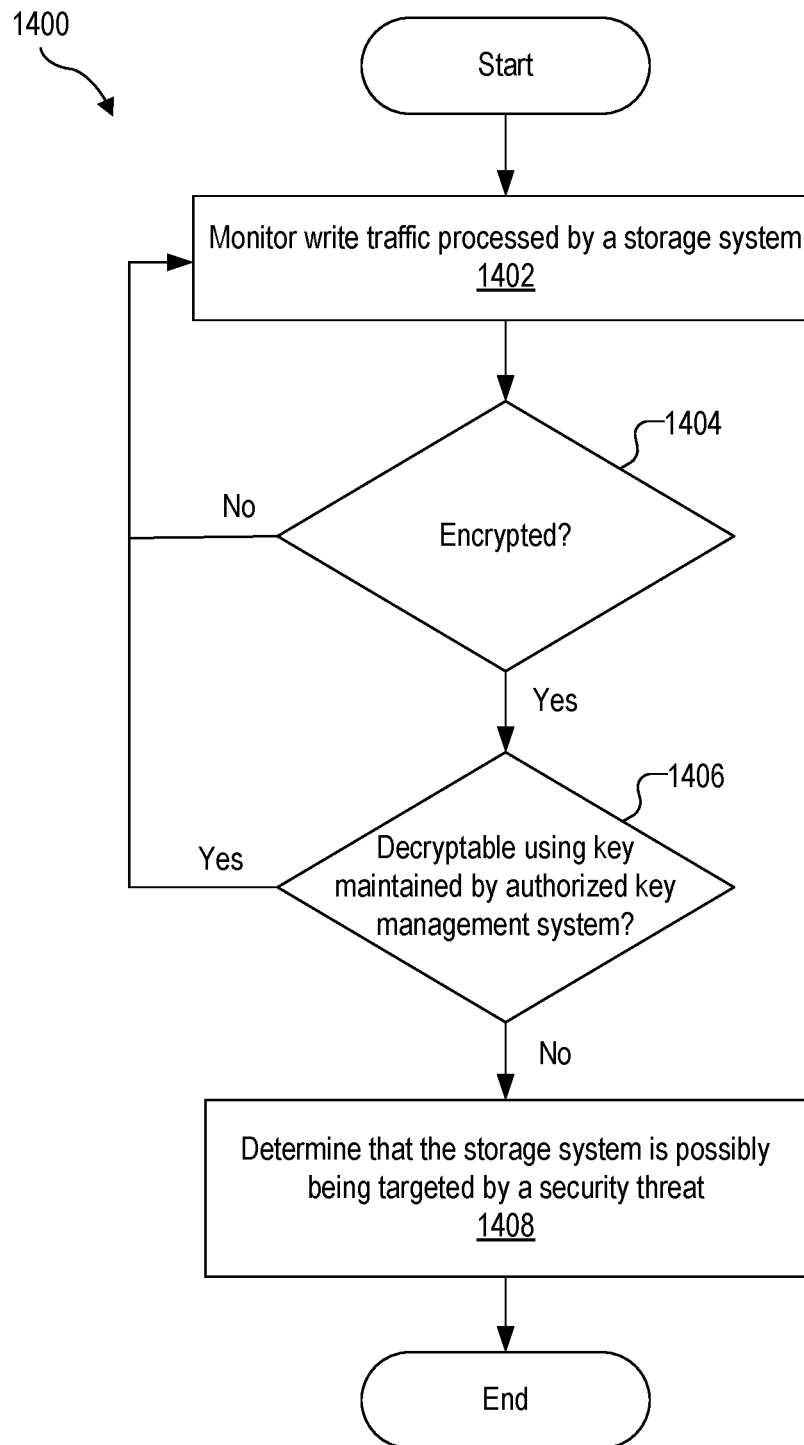

FIG. 14 shows an exemplary cryptography-based security threat detection method 1400 that may be performed by system 400 and/or any implementation thereof. Method 1400 may be used alone or in combination with any of the other security threat detection methods described herein.

At operation 1402, system 400 monitors write traffic processed by a storage system. This may be performed in any of the ways described herein.

At decision 1404, system 400 determines whether data included in the write traffic is encrypted. If the data is not encrypted ("No" at decision 1404), system 1402 continues monitoring the write traffic (operation 1402).

However, if the data is encrypted ("Yes" at decision 1404), system 400 determines at decision 1406 whether the encrypted data is decryptable using a key maintained by an authorized key management system. If the data is decryptable using a key maintained by the authorized key management system ("Yes" at decision 1406), system 1402 continues monitoring the write traffic (operation 1402).

However, if the data is not decryptable using a key maintained by the authorized key management system ("No" at decision 1406), system 400 may determine, at operation 1408, that the storage system is possibly being targeted by a security threat.

In this example, the authorized key management system may be implemented by any suitable entity and/or system external to and in communication with the storage system. For example, the authorized key management system may utilize the key management interoperability protocol (KMIP) to encrypt legitimate data before the legitimate data is written to the storage system. In some examples, an authorized key management system external to the storage system may facilitate data in motion security before the data is written to the storage system. In some examples, such data in motion security may not prevent system 400 from profiling the underlying data (e.g., the data that has been encrypted) for compressibility.

System 400 may determine whether data included in the write traffic is decryptable into recognizable unencrypted data using a key maintained by an authorized key management system in any suitable manner. For example, system 400 may route the write traffic through the authorized key management system before allowing the write traffic to be written to the storage system. The authorized key management system may determine whether the write traffic is decryptable in any suitable manner. As another example, system 400 may maintain a copy of the key maintained by the authorized key management system and perform any suitable process configured to determine whether the data included in the write traffic is decryptable using the key. As another example, there could be multiple keys that might be used to encrypt data, where the key used for encryption of a particular data item is not obvious from the item itself. Multiple candidate keys could be tried for decryption, as a result, to determine if any of them can decrypt the data into a form that is recognizable as unencrypted.

If the data included in the write traffic is not decryptable by any of several candidate keys maintained by the authorized key management system, system 400 may determine that the data is possibly associated with a security threat against the storage system.

Figure 15:
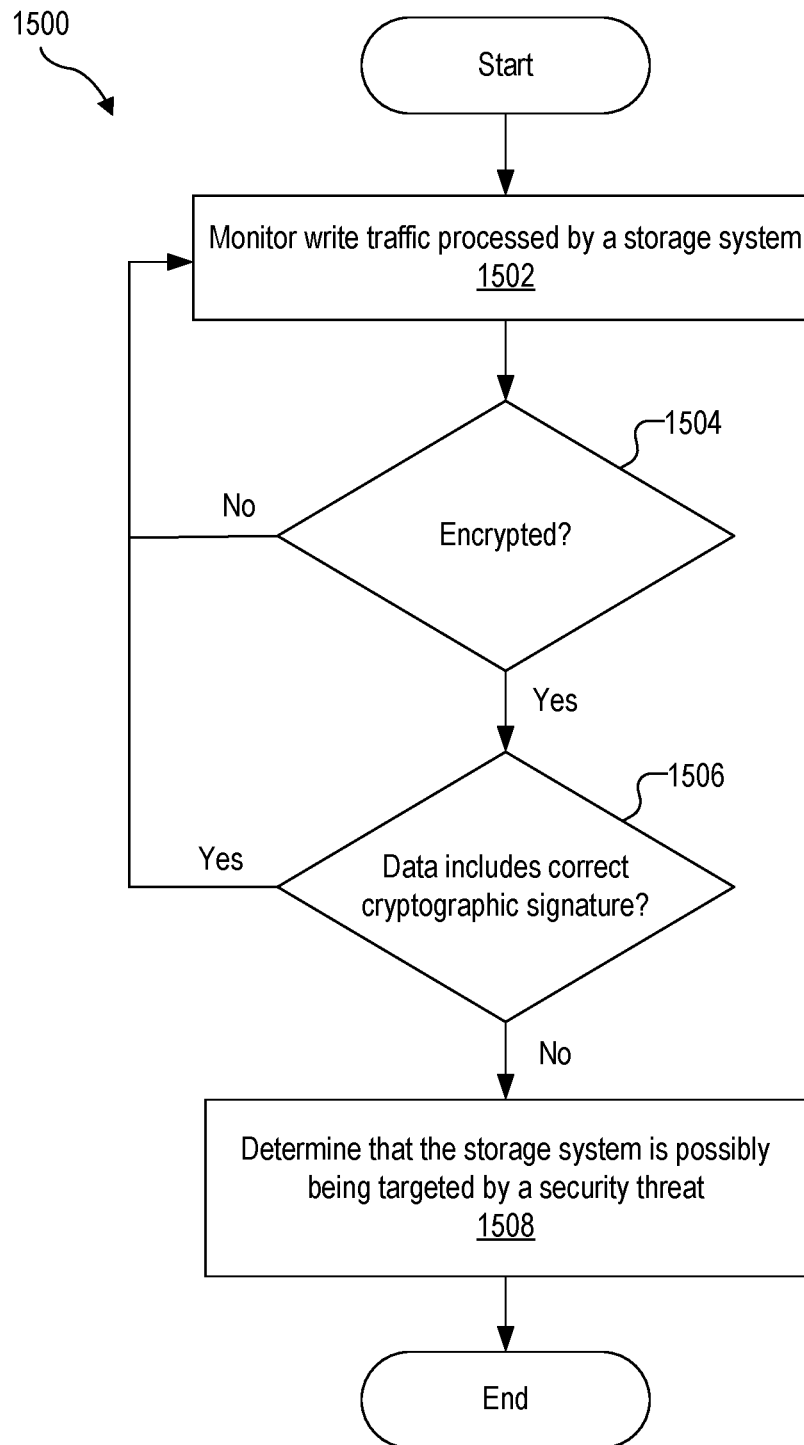

FIG. 15 shows another exemplary cryptography-based security threat detection method 1500 that may be performed by system 400 and/or any implementation thereof. Method 1500 may be used alone or in combination with any of the other security threat detection methods described herein.

At operation 1502, system 400 monitors write traffic processed by a storage system. This may be performed in any of the ways described herein.

At decision 1504, system 400 determines whether data included in the write traffic is encrypted. If the data is not encrypted ("No" at decision 1504), system 1502 continues monitoring the write traffic (operation 1502).

However, if the data is encrypted ("Yes" at decision 1504), system 400 determines at decision 1506 whether the encrypted data includes a correct cryptographic signature. As used herein, a cryptographic signature may refer to any sequence of data (e.g., a digital signature) that indicates that data has been encrypted using a key maintained by an authorized key management system.

If the encrypted data does include a correct cryptographic signature ("Yes" at decision 1506), system 1502 continues monitoring the write traffic (operation 1502).

However, if the encrypted data does not include a correct cryptographic signature ("No" at decision 1506), system 400 may determine, at operation 1508, that the storage system is possibly being targeted by a security threat.

In some examples, method 1400 and/or method 1500 may be leveraged to provide an end-to-end authentication heuristic from applications through the storage stack to prevent an unauthenticated process from writing data associated with a security threat (e.g., ransomware blocks) to the storage system in the first place.

Figure 16:
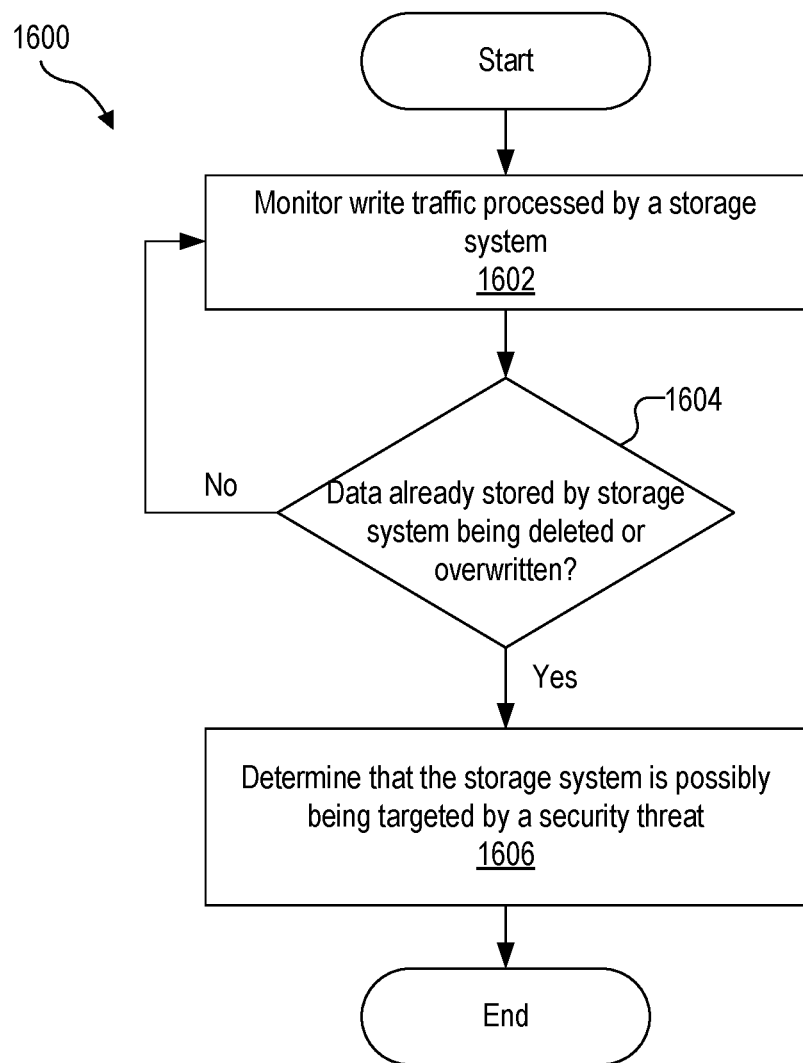

FIG. 16 shows an exemplary stored data-based security threat detection method 1600 that may be performed by system 400 and/or any implementation thereof. Method 1600 may be used alone or in combination with any of the other security threat detection methods described herein.

At operation 1602, system 400 monitors write traffic processed by a storage system. This may be performed in any of the ways described herein.

At decision 1604, system 400 determines whether data already stored by the storage system is being deleted or overwritten by the write traffic. If data is not being deleted or overwritten ("No" at decision 1604), system 400 continues monitoring the write traffic at operation 1602.

However, if data is being deleted or overwritten by the write traffic ("Yes" at decision 1604), system 400 may determine, at operation 1606, that the storage system is possibly being targeted by a security threat.

System 400 may determine that data already stored by the storage system is being deleted or overwritten by write traffic in any suitable manner. For example, in a file or object based storage system, deletions and overwrites can be detected directly. In the case of an object based storage system that is being used by a host to store file systems or databases, deletions may be inferred by system 400 by a combination of previously read data being overwritten quickly, or sometime later (such as because blocks added to a free list were eventually reused), by being unmapped, or by being overwritten with zeros. Such deletions or overwrites may in and of themselves be indicative of a possible security threat against a storage system. Additionally or alternatively, such deletions or overwrites in combination with any of the other security threat detection methods described herein may be indicative of a possible security threat against a storage system.

Figure 17:
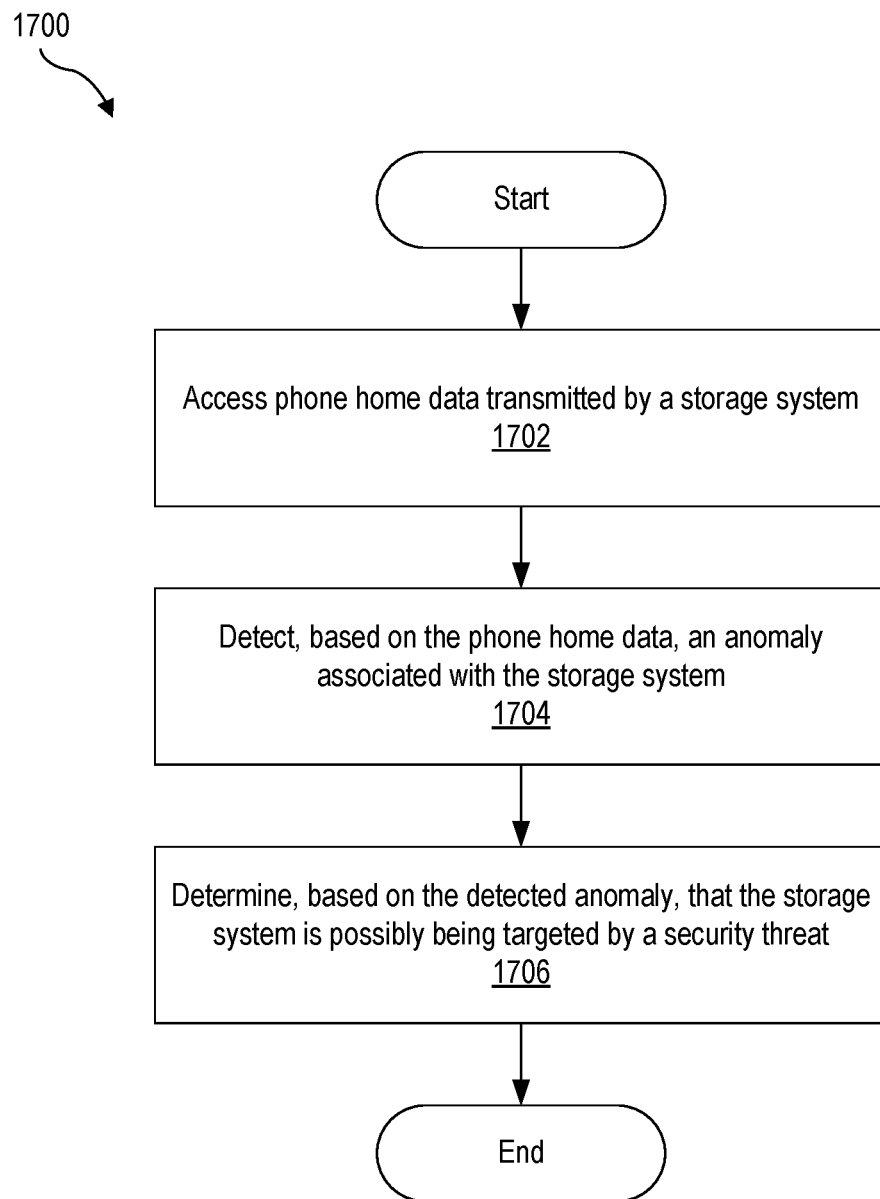

FIG. 17 shows a remote security threat detection method 1700 that may be performed by system 400 and/or any implementation thereof. Method 1700 may be used alone or in combination with any of the other security threat detection methods described herein.

At operation 1702, system 400 accesses phone home data (e.g., phone home data 606) transmitted by a storage system. This may be performed in any of the ways described herein.

At operation 1704, system 400 detects, based on the phone home data, an anomaly associated with the storage system. The anomaly may include any of the anomalies described herein.

At operation 1706, system 400 determines, based on the detected anomaly, that the storage system is possibly being targeted by a security threat.

To illustrate, a cloud-based monitoring system implementation of system 400 may use the phone home data transmitted thereto by a storage system to identify a pattern and or attribute of read and/or write traffic that may be indicative of a possible security threat against the storage system. For example, system 400 may detect that an overall compressibility of data stored by the storage system is below a historical norm associated with the storage system or with a different storage system (e.g., a different storage system that has one or more similar attributes as the storage system). Based on this, system 400 may determine that the storage system is possibly being targeted by a security threat.

In some examples, system 400 may be provided with user input that identifies certain metrics that system 400 should focus on (e.g., in phone home data and/or in metrics data maintained by the storage system) when monitoring for anomalies that may be indicative of a security threat against the storage system. For example, a customer of a storage system may provide user input representative of expected types of data for the write traffic so that system 400 may take that information into account when analyzing the write traffic.

Figure 18:
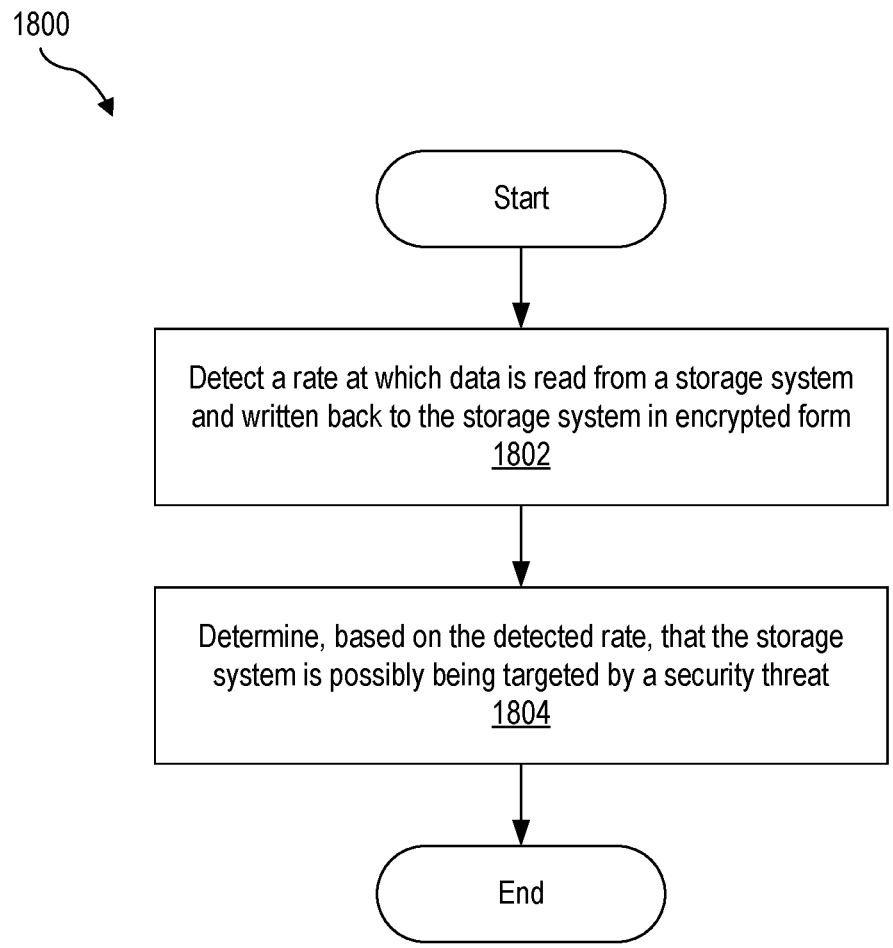

FIG. 18 shows an exemplary rate-based security threat detection method 1800 that may be performed by system 400 and/or any implementation thereof. Method 1800 may be used alone or in combination with any of the other security threat detection methods described herein.

At operation 1802, system 400 detects a rate at which data is read from a storage system and written back to the storage system in encrypted form. At operation 1804, system 400 determines, based on the detected rate, that the storage system is possibly being targeted by a security threat.

To illustrate, some relatively slow write patterns may be an indication that a malicious entity is in fact doing something that a normal program that encrypts a dataset for legitimate purposes would not be doing. For example, a sequential process that reads data and writes back that same data in incompressible form, but that does so at a rate that is much slower than a legitimate process would do so may itself be an indication that the storage system is being targeted by a security threat. System 400 may be configured to detect this difference in rate and, in response, determine that the storage system is possibly being targeted by a security threat.

As another example, a process that slowly rewrites a set of files that were originally in a recognizable format into a nonrecognizable format may be an indication that the storage system is being targeted by a security threat. Based on this relatively slow rewrite process, system 400 may determine that the storage system is possibly being targeted by a security threat.

As another example, a read/write process that is relatively faster than what would be expected during a particular time period may be an indication that the storage system is being targeted by a security threat. For example, during a weekend when read/write traffic is historically relatively slow, if system 400 detects a rate of read/writes that is above a particular threshold, system 400 may determine that the storage system is possibly being targeted by a security threat.

Rate-based detection of security threats may be performed over any suitable amount of time. For example, to detect relatively slow rates, system 400 may monitor one or more metrics associated with read/write traffic over the course of a relatively long period of time. In these cases, system 400 may lock down and/or otherwise maintain one or more recovery datasets (e.g., provisional ransomware recovery structures, as described herein) for a relatively long period of time in case they are needed to recover from data corruption caused by the security threat.

Figure 19:
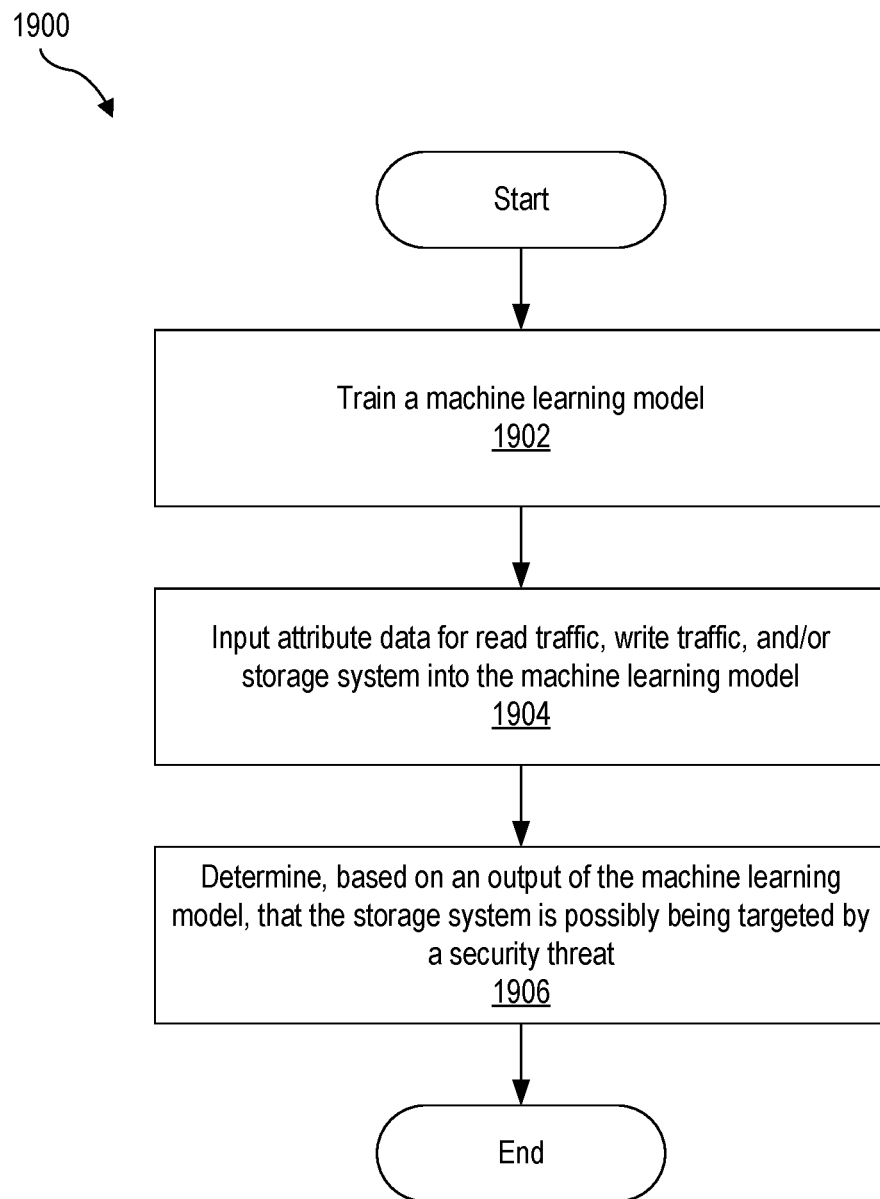

FIG. 19 shows an exemplary machine learning model-based security threat detection method 1900 that may be performed by system 400 and/or any implementation thereof. Method 1900 may be used alone or in combination with any of the other security threat detection methods described herein.

At operation 1902, a machine learning model is trained (e.g., by system 400 and/or any other system) to detect anomalies associated with read/write traffic processed by a storage system. The machine learning model may be supervised and/or unsupervised as may serve a particular implementation and may be configured to implement one or more decision tree learning algorithms, association rule learning algorithms, artificial neural network learning algorithms, deep learning algorithms, bitmap algorithms, and/or any other suitable data analysis technique as may serve a particular implementation. In some examples, the machine learning model is trained with actual ransomware payloads.

In some examples, the machine learning model is trained using honeypot files, sectors of blocks, and/or any other data structure configured to serve as a decoy for ransomware and other security threats. These honeypot data structures may be maintained by system 400 at any suitable location (e.g., within the storage system or remote from the storage system). Based on how attackers interact with the honeypot data structures, system 400 may train the machine learning model. The honeypot outputs may additionally or alternatively be used in combination with any of the other security threat detection methods described herein.

At operation 1904, system 400 inputs attribute data for read traffic, write traffic, and/or the storage system into the machine learning model. The machine learning model may process this attribute data in any suitable manner. For example, the machine learning model may be trained to look at deduplication checksum/hashes in a data reducing storage array leveraging an out of band cloud service that cannot be compromised. This may allow the machine learning model to recognize when write traffic differs from a historical trend. As another example, the machine learning model may be configured to detect actual ransomware payloads within write traffic.

At operation 1906, system 400 determines, based on an output of the machine learning model, that the storage system is possibly being targeted by a security threat. This may be performed in any suitable manner. For example, the output of the machine learning may include a confidence score. If the confidence score is above a certain threshold, system 400 may determine that the storage system is possibly being targeted by a security threat.

Figure 20:
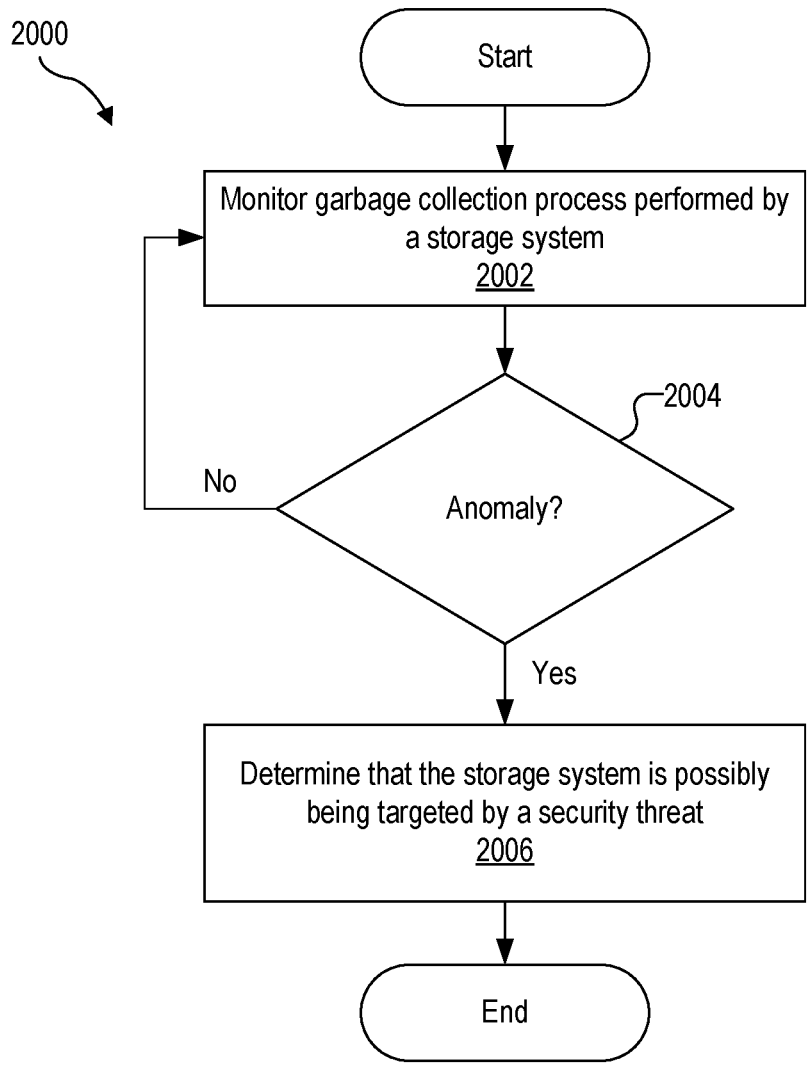

FIG. 20 shows an exemplary garbage collection-based security threat detection method 2000 that may be performed by system 400 and/or any implementation thereof. Method 2000 may be used alone or in combination with any of the other security threat detection methods described herein.

At operation 2002, system 400 monitors a garbage collection process performed by a storage system. The garbage collection process may include any process configured to reclaim storage system space as described herein.

At decision 2004, system 400 determines whether there is an anomaly in the garbage collection process performed by the storage system. If system 400 does not determine that there is an anomaly in the garbage collection process performed by the storage system ("No" at decision 2004), system 400 continues monitoring the garbage collection process at operation 2002. However, if system 400 determines that there is an anomaly in the garbage collection process performed by the storage system ("Yes" at decision 2004), system 400 may determine at operation 2006 that the storage system is possibly being targeted by a security threat.

System 400 may detect an anomaly in a garbage collection process performed by a storage system in any suitable manner. For example, as data in a segment becomes invalid due to a ransomware attack or other security threat, the data becomes more attractive for garbage collection. This may result in a higher than average amount of garbage collection performed by the storage system. This change in garbage collection may be detected by system 400 by analyzing metrics associated with the garbage collection process and may be used to determine that the storage system is possibly being targeted by a security threat.

System 400 may additionally or alternatively monitor one or more other internal processes performed by a storage system to determine whether the storage system is possibly being targeted by a security threat. For example, system 400 may monitor a deep compression process performed by one or more libraries within a storage system. In this example, system 400 may monitor for block patterns that match one or more rootkits and/or other structures that are put in place during the full lifecycle of a malicious attack. Such block patterns may be indicative of an impending encryption process that happens at the end of the malicious attack. If such block patterns are detected, system 400 may determine that the storage system is possibly being targeted by a security threat.

In some configurations, first and second storage systems are configured to serve as replicating storage systems one for another. For example, any data stored in the first storage system may be replicated in the second storage system. This may provide various data redundancy and security features. In these configurations, system 400 may be configured to identify attributes of both storage systems (e.g., by monitoring read/write traffic at both storage systems) to determine whether one or both of the storage systems are possibly being targeted by a security threat.

Figure 21:
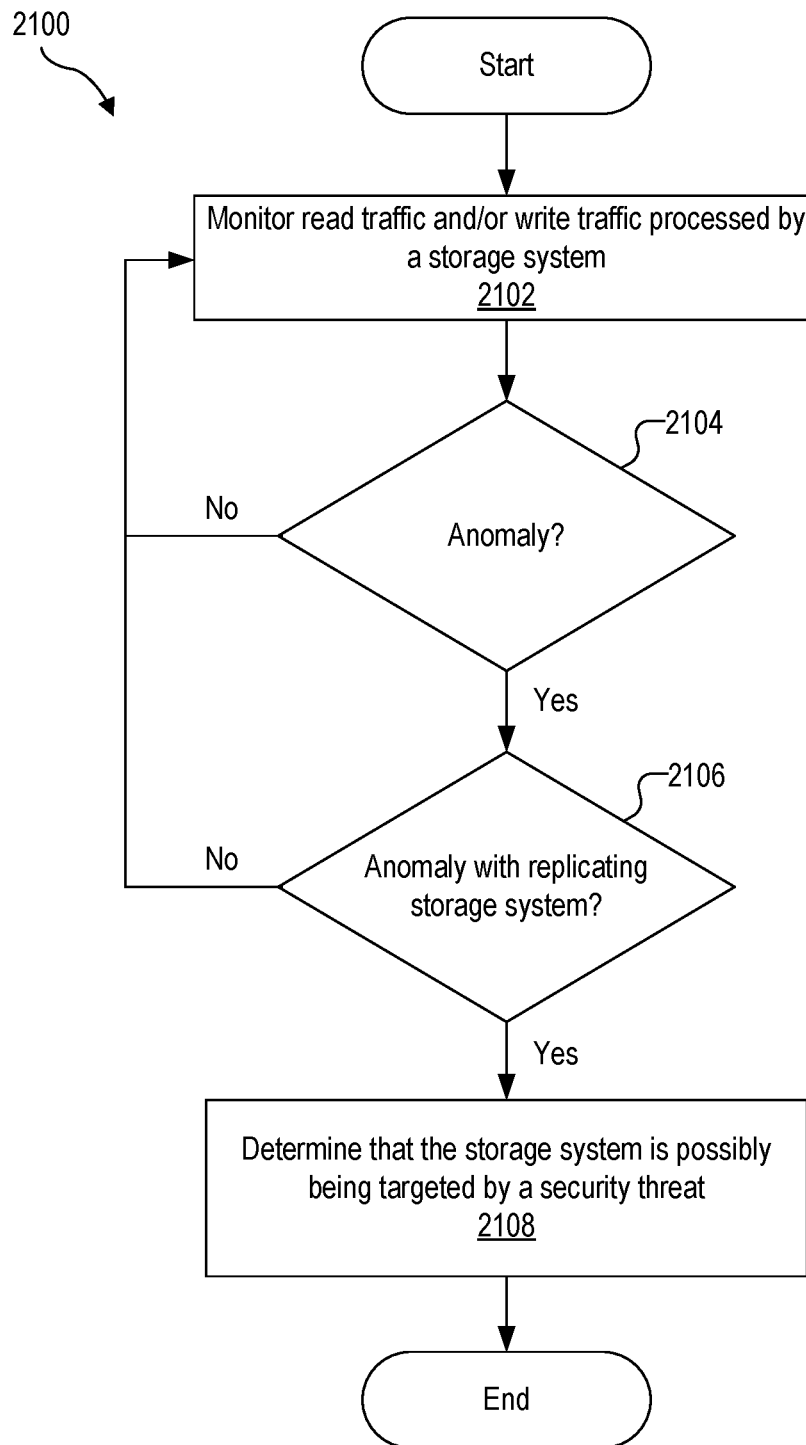

To illustrate, FIG. 21 shows an exemplary replicating storage system-based security threat detection method 2100 that may be performed by system 400 and/or any implementation thereof. Method 2100 may be used alone or in combination with any of the other security threat detection methods described herein.

At operation 2102, system 400 monitors read and/or write traffic processed by a storage system. This may be performed in any of the ways described herein.

At decision 2104, system 400 determines whether there is an anomaly associated with the storage system (e.g., with the read and/or write traffic processed by the storage system). This may be performed in any of the ways described herein. If system 400 does not detect an anomaly ("No" at decision 2104), system 400 continues monitoring the read and/or write traffic at operation 2102.

However, if system 400 detects an anomaly ("Yes" at decision 2104), system 400 may determine whether a similar (e.g., the same) anomaly exists at a replicating storage system configured to replicate data stored by the storage system (decision 2106).

If system 400 does not detect an anomaly at the replicating storage system ("No" at decision 2106), system 400 continues monitoring the read and/or write traffic at operation 2102.

However, if system 400 detects an anomaly at the replicating storage system ("Yes" at decision 2106), system 400 may determine at operation 2108, based on the anomaly being detected at both storage systems, that the storage system (and, in some cases, the replicating storage system) is possibly being targeted by a security threat.

By way of example, analyzers implementing system 400 may be run on both storage systems when a dataset is replicated between a first and second storage system, with results compared so that the two storage systems can serve as checks on each other. For example, metrics that lead system 400 to provisionally determine that the first storage system is possibly being targeted by a security threat may be exchanged to ensure that both storage systems are seeing the same information.

Since many read and write requests (or file system, database, or object requests) may only be received by one of the storage systems, the other storage system may only have some metrics. For example, the second storage system, such as one that is the target of an asymmetric form of replication for a dataset, may only have information on general compressibility of writes for that dataset. The two storage systems may still exchange the metrics they do have with each other, with each comparing the metrics they do know to those coming from the other storage system and using the metrics received from the other storage system.

For example, a combination of actual profiles of read, writes, overwrites, compressibility of data in actual read and write requests, and metrics organized by hosts may be exchanged with the storage systems comparing general compressibility of written data for anomalies between the two storage systems and with the additional information from a first storage system used to duplicate the first storage system's analysis on the second storage system.

In a symmetrically replicated storage system with symmetric access to replicated datasets, metrics may be exchanged to ensure that both storage systems have the relevant data necessary for either of them to detect some types of anomalies, such as because some read, write, or other requests are directed to one of the two storage systems while other read, write, or other requests are directed to the other of the two storage systems.

These kinds of exchanges may further be used to detect some examples where one or the other storage system has been compromised. For example, secure hashes of metrics that both storage systems are expected to know may be exchanged rather than exchanging those metrics directly, so a compromised storage system cannot use trends in a common metric received from the other storage system to guess future values for that metric to fool the paired storage system. Since metrics can have some natural differences between two storage systems such as due to other activity, differences in snapshots, or delays in when updates are received and processed, securely hashed metrics may allow for approximations. This may be done in several ways, such as by providing a small set of secure hashes corresponding to discrete ranges of values. For example, if a compressibility factor or compressibility factors within time ranges is provided for recent updates to a dataset, such as based on a percentage, if a first storage system sees an overall compressibility in recent updates of 20% on 100 MB of updates in the prior 30 second interval, and another sees a compressibility of recent updates of 18% on 99 MB of updates in the prior 30 second interval, then the first storage system may securely hash values representing two compressibility ranges of 18% to 20% and 20% to 22% each combined with two update quantity ranges of 98 MB to 100 MB and 100 MB to 102 MB, (forming four secure hashes of each compressibility range with each update quantity range) and the second storage system may securely hash values representing two compressibility ranges of 16% to 18% and 18% to 20% each combined with three update quantity ranges of 96 MB to 98 MB, 98 MB to 100 MB, and 100 MB to 102 MB (forming six secure hashes of each compressibility range with each update quantity range). Since one of the ranges from the first storage system agrees with one of the ranges from the second storage system, the storage systems can be seen as agreeing closely enough without having exchanged too much data about their actual metrics.

In some examples, metrics may be shared to some third system or to a cloud service or some vendor provided service for comparison purposes, in addition to or rather than the two storage systems themselves sharing these anomaly detection metrics data between them. If the two storage systems do not exchange these metrics, then an external system or service can be more certain that the metrics it is receiving from each system are not being guessed at by compromised storage system based on data it is exchanging with an uncompromised storage system.

Figure 22:
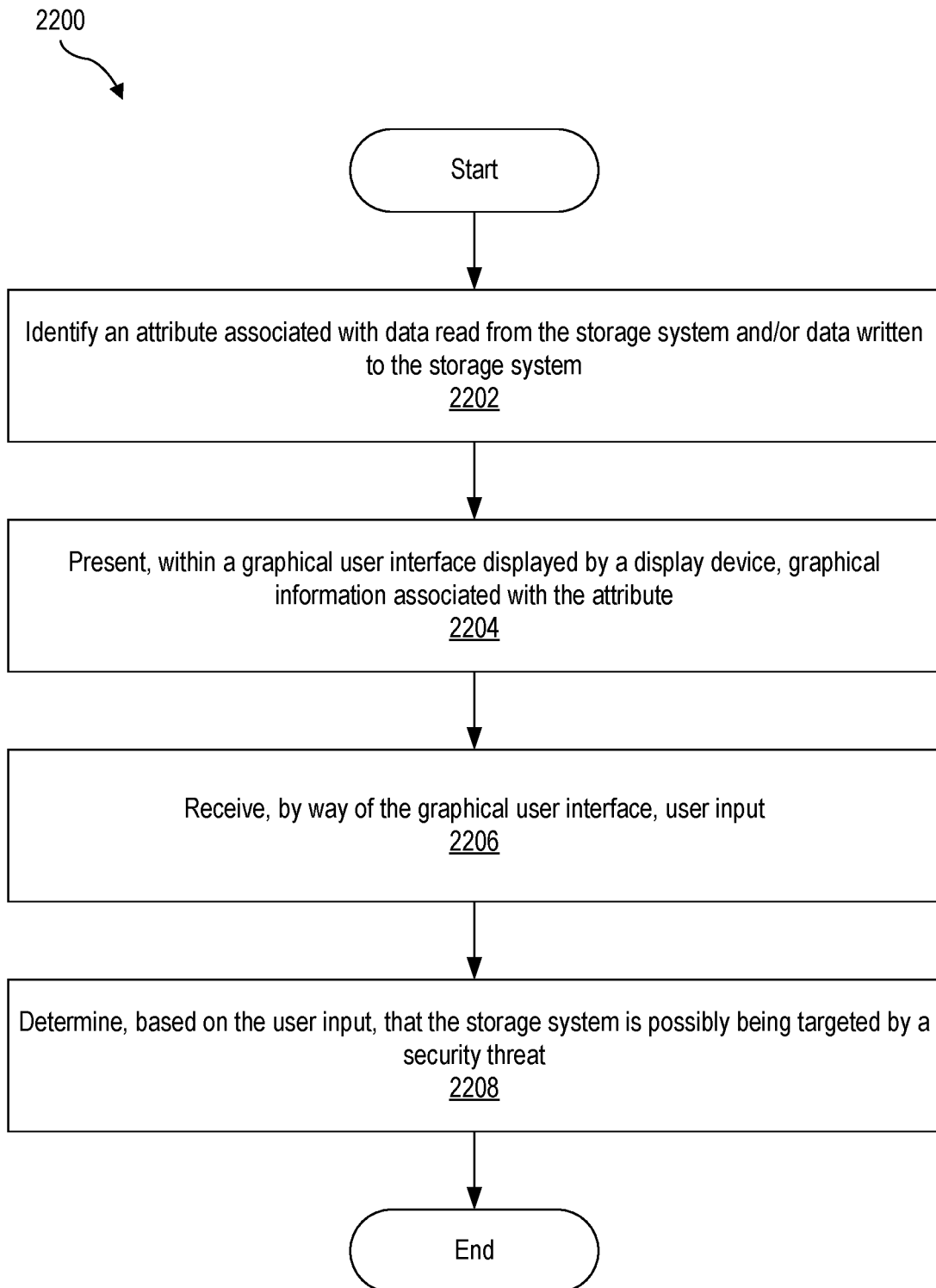

FIG. 22 shows an exemplary user input-based security threat detection method 2200 that may be performed by system 400 and/or any implementation thereof. Method 2200 may be used alone or in combination with any of the other security threat detection methods described herein.

At operation 2202, system 400 identifies an attribute associated with data read from the storage system and/or data written to the storage system. The attribute may include one or more of the attributes described herein.

At operation 2204, system 400 presents, within a graphical user interface displayed by a display device, graphical information associated with the attribute. For example, system 400 may present one or more graphs, analytics information, etc. associated with the attribute.

At operation 2206, system 400 receives user input by way of the graphical user interface (and/or by way of any other means for receiving user input, such as by way of an API). For example, a user (e.g., an administrator) may, based on the graphical information, provide user input indicating that the attribute is indicative of a possible security threat against the storage system.

At operation 2208, system 400 determines, based on the user input, that the storage system is possibly being targeted by a security threat.

To illustrate, system 400 may provide a graph over time of various metrics that may be useful for determining when an attack may have started over time. Based on this graph, a user may provide user input indicating that the storage system has been possibly targeted by a security threat.

In some examples, system 400 may be configured to perform multiple security threat detection processes to determine whether a storage system is being targeted by a security threat. For example, system 400 may perform two or more of the security threat detection methods described in connection with FIGS. 8-22. These threat detection processes may be performed in parallel and/or serially as may serve a particular implementation.

Some security threat detection processes provide higher confidence threat detection than others. In other words, some security threat detection processes may detect a possible security threat with higher accuracy than others. However, a relatively high confidence threat detection method may, in some instances, be more resource intensive and/or take more time than relatively low confidence threat detection methods. Hence, in some examples, system 400 may be configured to initially use a first security threat detection process to provisionally determine that a storage system is a target of a security threat. System 400 may then use a second security threat detection process that provides higher confidence threat detection than the first security threat detection process to verify the provisional determination that the storage system is a target of the security threat.

Figure 23:
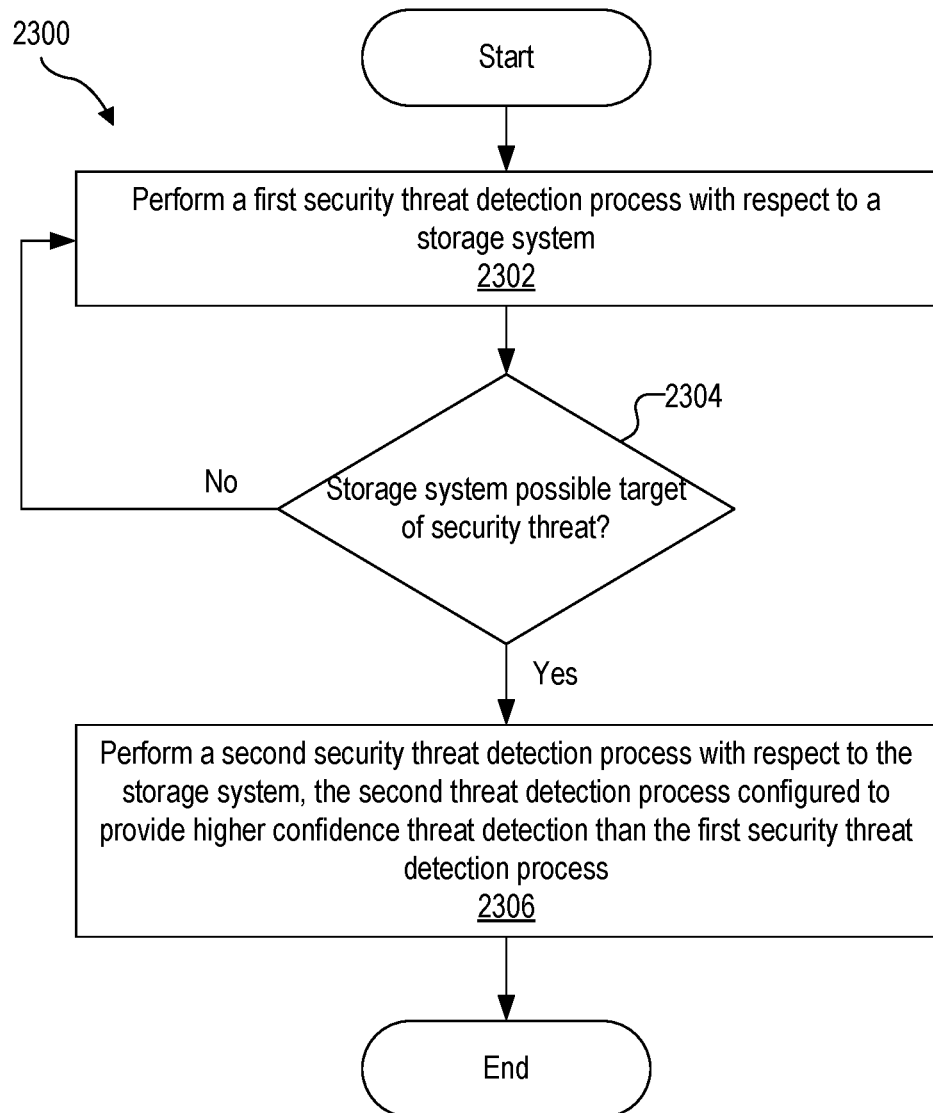

To illustrate, FIG. 23 shows an exemplary multi-level security threat detection method 2300 that may be performed by system 400 and/or any implementation thereof. Method 2300 may be used alone or in combination with any of the other security threat detection methods described herein.

At operation 2302, system 400 performs a first security threat detection process with respect to a storage system. The first security threat detection process may include any of the security threat detection processes described herein.

At decision 2304, system 400 determines, based on the first security threat detection process, whether the storage system is a possible target of a security threat. If system 400 determines that the storage system is not a possible target of security threat based on the first security threat detection process ("No" at decision 2304), system 400 continues to perform the first security threat detection process at operation 2302.

However, if system 400 determines, based on the first security threat detection process, that the storage system is a possible target of a security threat ("Yes" at decision 2304), system 400 may perform a second security threat detection process with respect to the storage system (operation 2306). The second security threat detection process is configured to provide higher confidence threat detection than the first security threat detection process. Based on the results of the second security threat detection process, system 400 may either confirm that the storage system is being targeted by the security threat or determine that the storage system is not being targeted by the security threat.

In some examples, the second security threat detection process is performed in response to determining that the storage system is possibly being targeted by the security threat. Alternatively, the second security threat detection process may be performed in parallel with the first second security threat detection process.

In method 2300, the first and second security threat detection processes may be different in some examples. For example, the first security threat detection process may require less resources to perform than the second security threat detection process. In alternative examples, the first and second security threat detection processes are similar processes. In these examples, the second security threat detection process may, for example, be performed for a longer duration and/or with different parameters to provide the higher confidence threat detection. In alternative examples, the first and second security threat detection processes are the same, just performed over different time periods to make a determination with different levels of accuracy.

Various remedial actions that may be performed by system 400 in response to determining that a storage system is possibly being targeted by a security threat are described in connection with FIGS. 24-30. Each of the processes described in connection with these figures may be performed independently or in combination (e.g., sequentially or concurrently) with other processes used to perform a remedial action. Moreover, each of the remedial action processes described in connection with these figures may be performed in connection with one or more of the security threat detection processes described herein.

Figure 24:
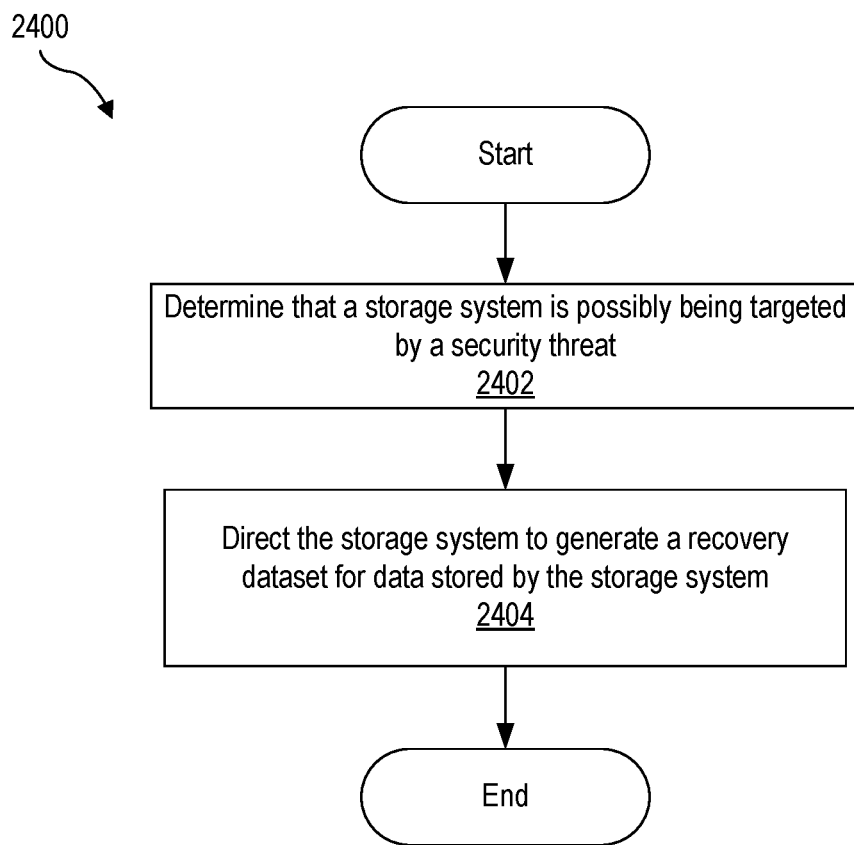

FIG. 24 shows an exemplary recovery dataset-based remedial action method 2400 that may be performed by system 400 and/or any implementation thereof. Method 2400 may be used alone or in combination with any of the other remedial action methods described herein.

At operation 2402, system 400 determines that a storage system is possibly being targeted by a security threat. This may be performed in any of the ways described herein.

At operation 2404, system 400 directs the storage system to generate, in response to the determination that the storage system is possibly being targeted by the security threat, a recovery dataset for data stored by the storage system. The recovery dataset may include a snapshot, a backup dataset, an ordered log of metadata describing an ordered application of updates to data maintained by the storage system, and/or any other suitable data structure that may be used to restore data to an uncorrupted state. The recovery dataset 400 may be for all data stored by the storage system, data stored on a particular storage structure (e.g., a volume), data associated with a particular host, and/or any other subset of data stored by the storage system.

By directing the storage system to immediately generate a recovery dataset in response to determining that the storage system is possibly being targeted by the security threat, system 400 may use the recovery dataset (or direct the storage system to use the recovery dataset) to restore at least some of the data maintained by the storage system to an uncorrupted state should the possible security threat turn out to be an actual security threat. In some examples, the recovery dataset is used in combination with one or more previously generated recovery datasets and/or other data sources (e.g., data residing at a host) to restore data that is already corrupted before the recovery dataset is generated in response to the determination that the storage system is possibly being targeted by the security threat.

In some examples, system 400 may direct the storage system to transmit the recovery dataset to a remote storage system for storage by the remote storage system. The remote storage system may include any combination of computing devices remote from and communicatively coupled to the storage system (e.g., by way of a network). In this manner, the recovery dataset itself may be protected from the security threat. In some examples, the transmission of the recovery dataset to the remote storage system is performed using a NFS protocol, an object store protocol, an SMB storage protocol, an S3 storage protocol, and/or any other storage protocol as may serve a particular implementation. In some examples, the remote storage system is implemented by write-only media with restrictions on deletions.

In some examples, system 400 may notify the remote storage system of the security threat so that the remote storage system may abstain from deleting the recovery dataset until one or more conditions are fulfilled. Such conditions may include, but are not limited to, input provided by one or more authenticated entities, a notification from system 400 that it is safe to delete the recovery dataset, etc. For example, system 400 may determine that the storage system is actually not being targeted by the security threat. In response, system 400 may transmit a command to the remote storage system for the remote storage system to delete the recovery dataset.

In embodiments where the recovery dataset is stored within the storage system, system 400 may prevent the recovery dataset from being deleted or modified until system 400 determines that the recovery dataset is not needed to restore data within the storage system. For example, system 400 may direct the storage system to lock down the recovery dataset, make the recovery dataset read-only, make the recovery dataset hidden, and/or otherwise protect the recovery dataset. When one or more conditions are fulfilled (e.g., input from one or more authenticated entities, passage of a set amount of time, etc.), system 400 may allow the storage system to delete the recovery dataset.

Figure 25:
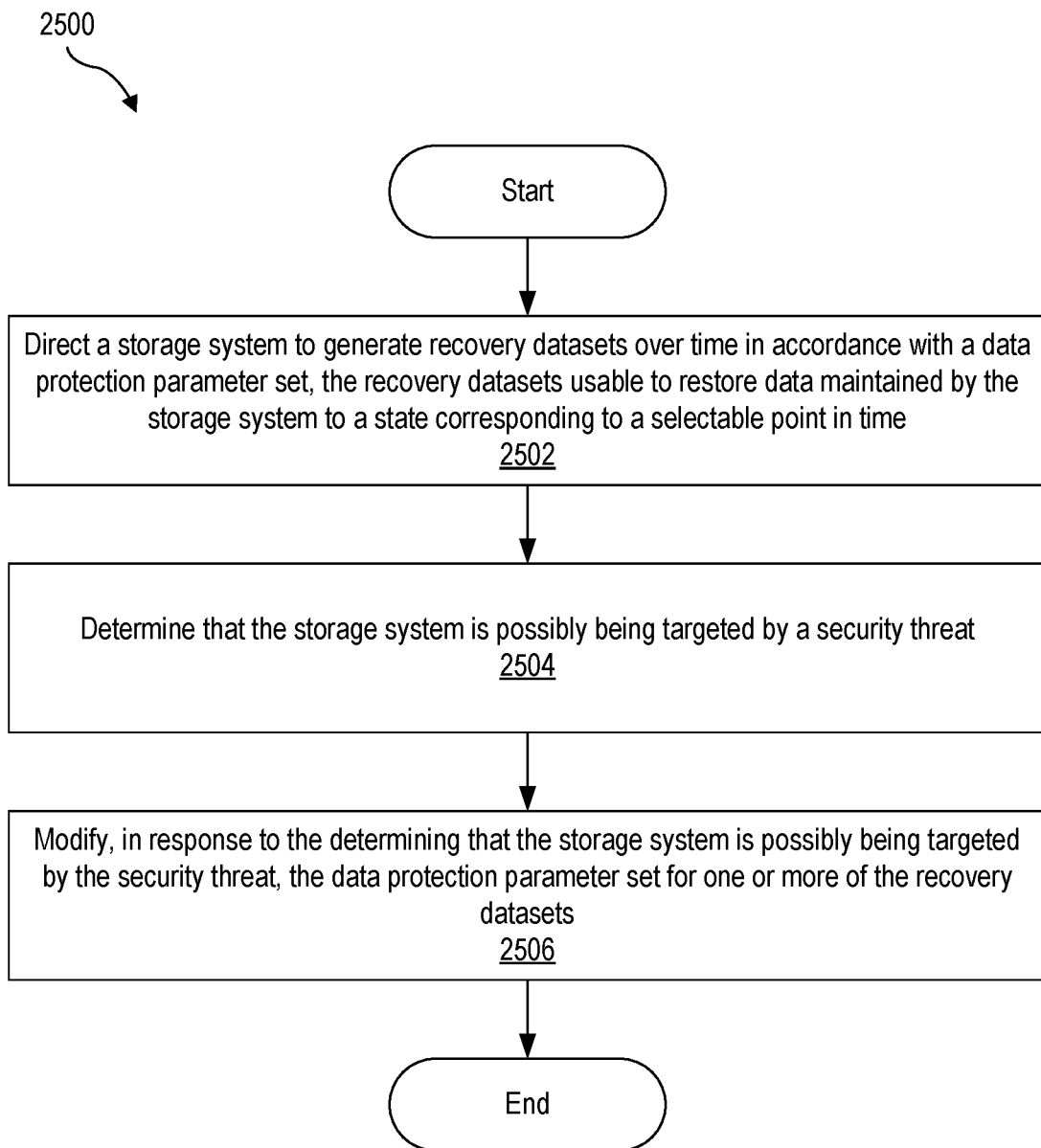

FIG. 25 shows an exemplary continuous data protection-based remedial action method 2500 that may be performed by system 400 and/or any implementation thereof. Method 2500 may be used alone or in combination with any of the other remedial action methods described herein.

At operation 2502, system 400 directs a storage system to generate recovery datasets over time (e.g., as a rolling set of snapshots) in accordance with a data protection parameter set. As described herein, these recovery datasets are usable to restore data maintained by the storage system to a state corresponding to a selectable point in time. The data protection parameter set may define one or more parameters associated with the generation of the recovery datasets over time, as described herein.

At operation 2504, system 400 determines that the storage system is possibly being targeted by a security threat. This may be performed in any of the ways described herein. In some examples, one or more of the recovery datasets generated at operation 2502 are generated prior to system 400 determining that the storage system is possibly being targeted by the security threat. One or more of the recovery datasets generated at operation 2502 may also be generated subsequent to system 400 determining that the storage system is possibly being targeted by the security threat.

At operation 2506, system 400 modifies, in response to determining that the storage system is possibly being targeted by the security threat, the data protection parameter set for one or more of the recovery datasets.

To illustrate, the data protection parameter set may specify a retention duration for one or more of the recovery datasets. The retention duration defines a duration that each recovery dataset is saved before being deleted (e.g., 24 or 48 hours, or longer in the case of, for example, a weekend or extended break). In the absence of a detected security threat, each recovery dataset may be retained for only a relatively short duration before being deleted. However, based on a determination that the storage system is possibly being targeted by a security threat, system 400 may either increase the retention duration or suspend the retention duration so that at least some of the recovery datasets are not deleted without a specific instruction provided by a source that manages the storage system. In this manner, one or more of the recovery datasets may be used to restore data on the storage system to an uncorrupted state if system 400 determines that the storage system has in actuality been targeted by the security threat.

As another example, the data protection parameter set may additionally or alternatively specify a recovery dataset generation frequency that defines a frequency at which the recovery datasets are generated. In this example, based on a determination that the storage system is possibly being targeted by a security threat, system 400 may increase the recovery dataset generation frequency so that more recovery datasets are available for use in restoring data on the storage system to an uncorrupted state if system 400 determines that the storage system has in actuality been targeted by the security threat.

As another example, the data protection parameter set may additionally or alternatively specify a remote storage frequency that defines a frequency at which a subset of recovery datasets in the recovery datasets are transmitted to a remote storage system connected to the storage system by way of a network (e.g., by using a network file system, streaming backup, or object storage protocol). In this example, based on a determination that the storage system is possibly being targeted by a security threat, system 400 may modify the remote storage frequency. For example, system 400 may increase the remote storage frequency so that more recovery datasets are stored in a read-only format on the remote storage system and available for use in restoring data on the storage system to an uncorrupted state if system 400 determines that the storage system has in actuality been targeted by the security threat.

System 400 may additionally or alternatively direct the storage system to generate (e.g., periodically and/or in response to an occurrence of certain events) one or more provisional ransomware recovery structures (e.g., snapshots). These provisional ransomware recovery structures may be configured such that they can only be deleted or modified in accordance with one or more ransomware recovery parameters. For example, the one or more ransomware recovery parameters may specify a number or a collection of types of authenticated entities that have to approve a deletion or modification of a provisional ransomware recovery structure before the provisional ransomware recovery structure can be deleted or modified. As another example, the one or more ransomware recovery parameters may specify a minimum retention duration before which the provisional ransomware recovery structure can be deleted or modified.

In some examples, any of the recovery datasets generated herein may be converted to a set of locked-down snapshots (or other suitable types of recovery datasets), possibly as a combination of discretionary snapshots formed early in a possible attack which can be deleted by the storage system itself if system 400 determines that the detection was a false alarm that did not stand up to deeper scrutiny. Additionally or alternatively, instead of formalizing formation and holds on discretionary snapshots, garbage collection, merges, deletions, and/or other maintenance on continuous data protection stores or frequent snapshots may be put on hold pending further analysis. For example, as soon as a bump in incompressible writes is received that is beyond historical norms, system 400 may initiate discretionary lockdowns to avoid deleting recent recoverable images of the storage system that precede the increase in incompressible writes. If the increase in incompressible writes reverts to the historical norm or does not hold up as sufficient to indicate a plausible ransomware attack, then the discretionary snapshots or holds on maintenance operations may be released. If they do hold up, they may be converted into ransomware/corruption protection snapshots with their increased scrutiny required for deletion (or with no means of deleting them within some designated or scheduled time frame). In the case of a continuous data protection store, rather than forming a ransomware/corruption protection snapshot, cleanup or merger of consistency points within the continuous data protection store itself may be blocked from occurring or severely reduced if a plausible sustained attack is detected, with the same kinds of models for duration of time and change authorization models that are described for ransomware/corruption protection snapshots.

A continuous data protection store is a feature of a storage system that records updates to a dataset in such a way that consistent images of prior contents of the dataset can be accessed with a low time granularity (often on the order of seconds, or even less), and stretching back for a reasonable period of time (often hours or days). These allow access to very recent consistent points in time for the dataset, and also allow access to access to points in time for a dataset that might have just preceded some event that, for example, caused parts of the dataset to be corrupted or otherwise lost, while retaining close to the maximum number of updates that preceded that event. Conceptually, they are like a sequence of snapshots of a dataset taken very frequently and kept for a long period of time, though continuous data protection stores are often implemented quite differently from snapshots. A storage system implementing a data continuous data protection store may further provide a means of accessing these points in time, accessing one or more of these points in time as snapshots or as cloned copies, or reverting the dataset back to one of those recorded points in time.

Over time, to reduce overhead, some points in the time held in a continuous data protection store can be merged with other nearby points in time, essentially deleting some of these points in time from the store. This can reduce the capacity needed to store updates. It may also be possible to convert a limited number of these points in time into longer duration snapshots. For example, such a store might keep a low granularity sequence of points in time stretching back a few hours from the present, with some points in time merged or deleted to reduce overhead for up to an additional day. Stretching back in the past further than that, some of these points in time could be converted to snapshots representing consistent point-in-time images from only every few hours.

Figure 26:
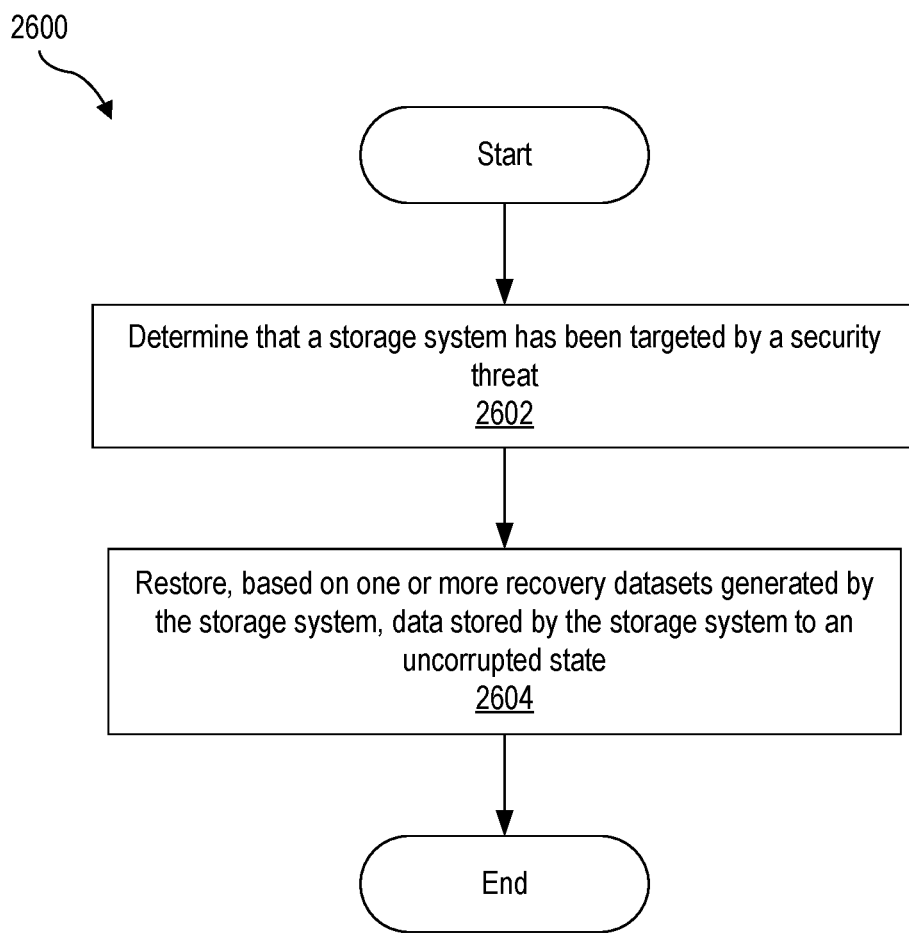

FIG. 26 shows an exemplary data restoration method 2600 that may be performed by system 400 and/or any implementation thereof. Method 2600 may be used alone or in combination with any of the other remedial action methods described herein.

At operation 2602, system 400 determines that a storage system has been targeted by a security threat. As part of this, system 400 may identify data on the storage that has been corrupted by the security threat.

At operation 2604, system 400 restores (e.g., by directing the storage system to restore), based on one or more recovery datasets generated by the storage system, data stored by the storage system to an uncorrupted state.

The one or more recovery datasets used to restore the data to the uncorrupted state at operation 2604 may include one or more recovery datasets generated prior to system 400 determining that the storage system is possibly being targeted by the security threat (e.g., a recovery dataset generated in accordance with continuous data protection-based remedial action method 2500 and/or a provisional ransomware recovery structure). Additionally or alternatively, the one or more recovery datasets used to restore the data to the uncorrupted state at operation 2604 may include one or more recovery datasets generated after system 400 determines that the storage system is possibly being targeted by the security threat (e.g., a recovery dataset generated in accordance with recovery dataset-based remedial action method 2400).

In some examples, system 400 may further perform the data restoration based on a version of the data that resides on a system other than the storage system. This other system may include a replicating storage system, a host computing device, and/or any other suitable system as may serve a particular implementation. For example, host data residing on a host computing device may be used in combination with one or more of the recovery datasets described herein to restore data residing on the storage system to an uncorrupted state.

In some examples, system 400 may select a recovery dataset for use in restoring data to the storage system by first determining a corruption-free recovery point for the storage system. This corruption-free recovery point corresponds to a point in time that precedes any data corruption caused by the security threat. System 400 may then select a recovery dataset that corresponds to the corruption-free recovery point for use in a data restoration process.

Figure 27:
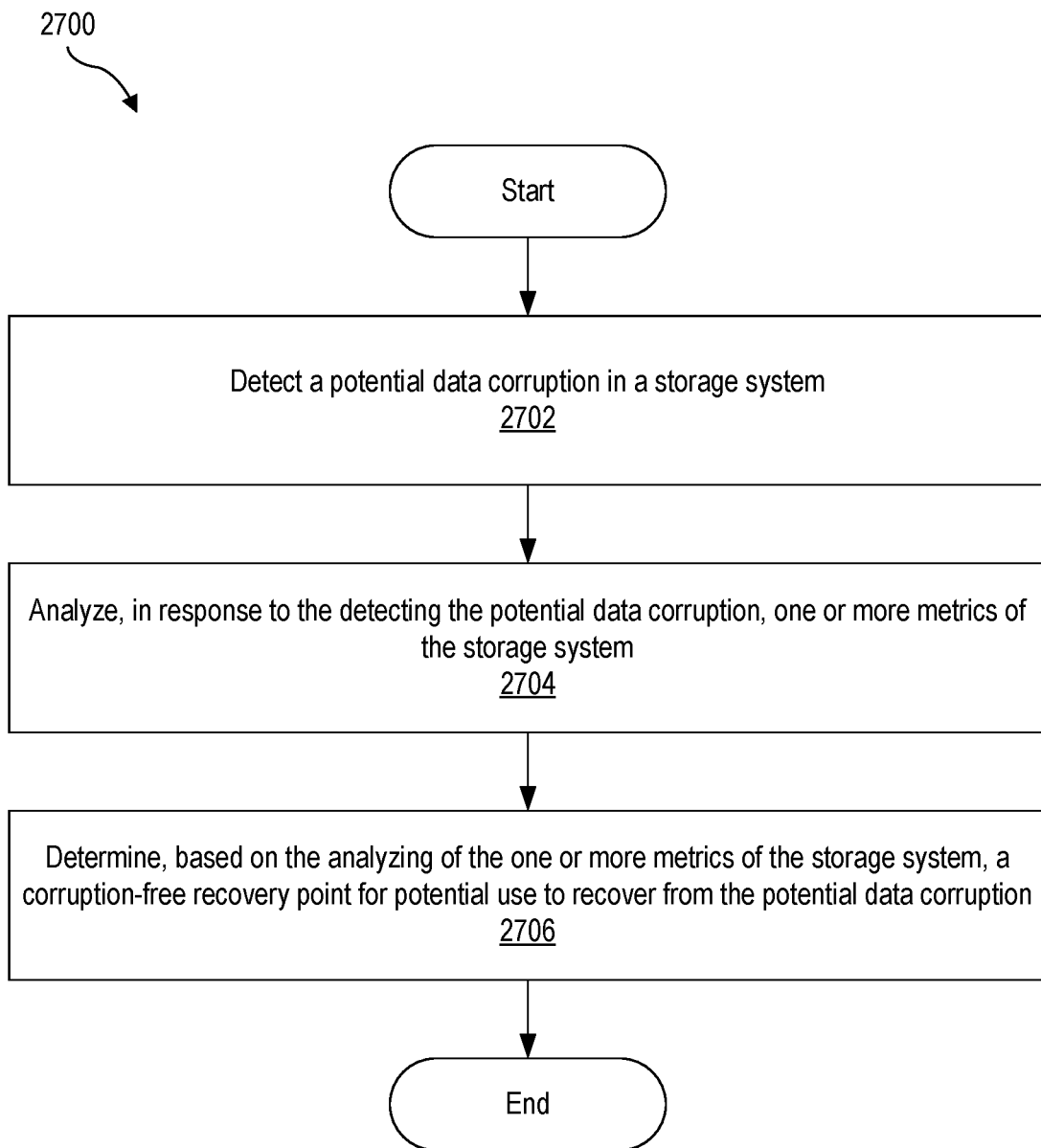

System 400 may determine a corruption-free recovery point for a storage system in any suitable manner. For example, FIG. 27 shows an exemplary data restoration method 2700 that may be performed by system 400 and/or any implementation thereof. Method 2700 may be used alone or in combination with any of the other remedial action methods described herein.

At operation 2702, system 400 detects a potential data corruption in a storage system. The potential data corruption may be caused by any of the security threats described herein. System 400 may detect the potential data corruption based on one or more metrics maintained or generated by the storage system, an analysis of the data stored by the storage system, and one or more attributes of a security threat that causes the potential data corruption.

At operation 2704, system 400 analyzes, in response to detecting the potential data corruption, one or more metrics of the storage system. These metrics may be any of the metrics described herein.

At operation 2706, system 400 determines, based on the analyzing of the one or more metrics of the storage system, a corruption-free recovery point for potential use to recover from the potential data corruption. The corruption-free recovery point may be determined automatically by system 400 based on one or more metrics associated with the storage system and/or data maintained by the storage system. Additionally or alternatively, system 400 may determine the corruption-free recovery point based on user input provided by a user.

To illustrate, in some examples, system 400 may present (e.g., within a graphical user interface) one or more visualizations that may assist a user in identifying a corruption-free recovery point. For example, system 400 may visualize changes and/or types of changes either in a continuous data protection store or in a time-ordered set of snapshots. For example, system 400 may provide a graph over time of various metrics that may be useful for determining when an attack may have started over time, where changes are related to differences between snapshots or between continuous data protection consistency points, presented in time order. These metrics may include reads, writes, compressibility of reads, compressibility of writes, and hosts issuing requests, including possibly a visualization of unusual compressibility ratios for particular datasets and from particular hosts.

If file, object, or database information is available for a set of changes (such as but not exclusively because the storage system is itself a file, database, or object server, or because a storage system hosting a block volume used by a client host to store a file system, object store, or database has suitable format analyzers that can determine file, object/bucket, or database changes from the stored file system or database), system 400 can further add metrics related to number of files or objects or database elements or blobs read, with their compressibility, including from various hosts, and number of files or objects written, overwritten, or created and then written, again including compressibility. A visualizer may provide the ability to zoom into directories, buckets, files, tablespaces, or objects that show activity of interest, and then provide graphs or other visualizations to show activity against those over time, including the ability to segregate by hosts or networks from which requests were received.

By being able to hone in on a particular update stream which seems to be the source of deliberate corruption or encryption, these visualizations can be used by a user to trace back in time to when that activity may have started. Then, a continuous data protection consistency point or snapshot from prior to that can be used as a corruption-free starting point for recovery from the attack. Further, system 400 can visualize activity from the hosts used for the attack to isolate which parts of the storage system may have been attacked and corrupted or encrypted, which should suggest that other stored data was not affected and can likely be considered safe.

Figure 28:
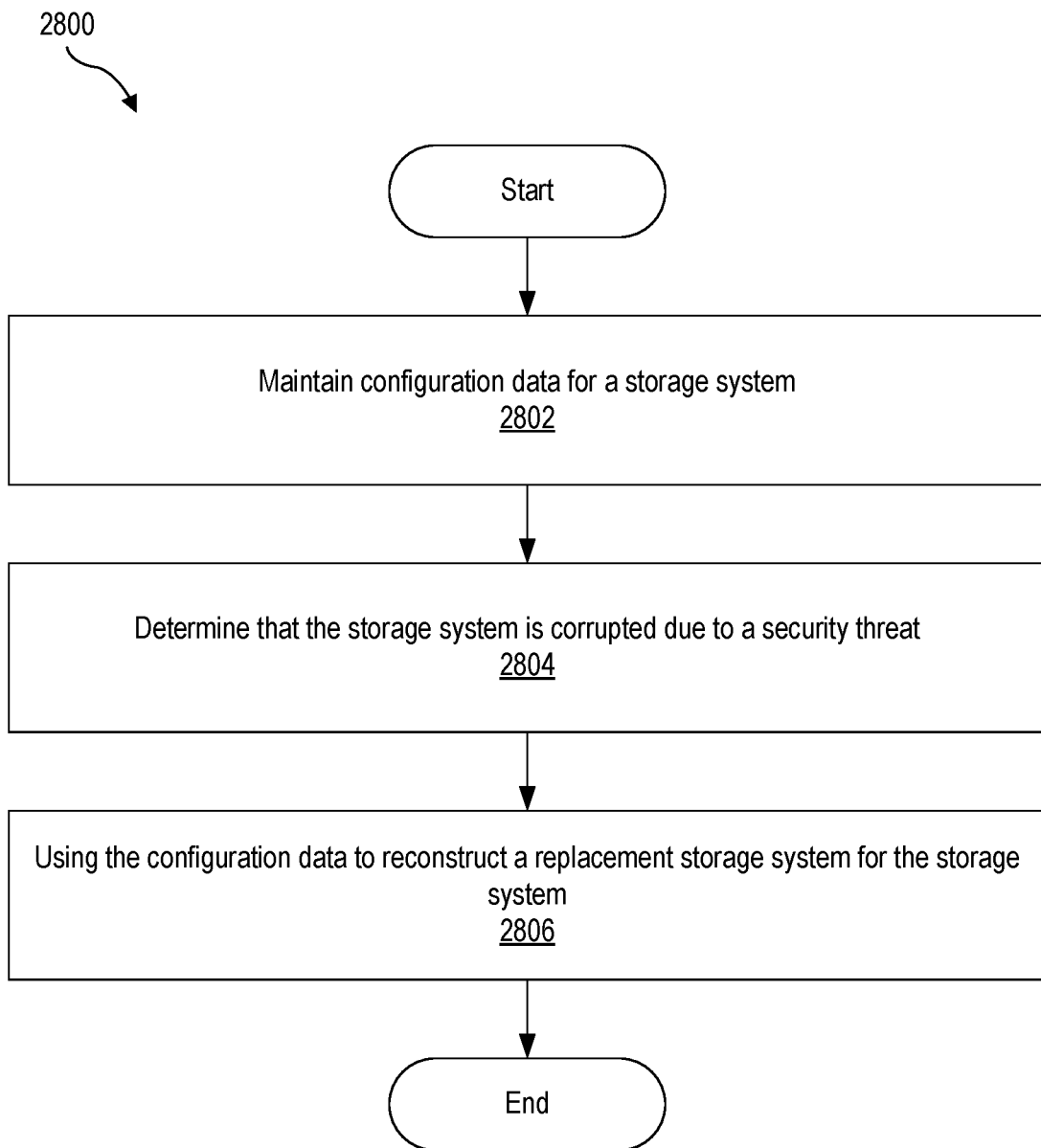

FIG. 28 shows an exemplary replacement storage system reconstruction method 2800 that may be performed by system 400 and/or any implementation thereof. Method 2800 may be used alone or in combination with any of the other remedial action methods described herein.

At operation 2802, system 400 maintains configuration data for a storage system. The configuration data may include data representative of one or more host connections and identities, storage system target endpoint addresses, and/or other types of configuration information for a storage system.

At operation 2804, system 400 determines that the storage system is corrupted due to a security threat. This determination may be performed in any suitable manner.

At operation 2806, system 400 uses the configuration data to reconstruct a replacement storage system for the storage system. The replacement storage system may be separate from the storage system and/or within the same storage system as may serve a particular implementation.

Figure 29:
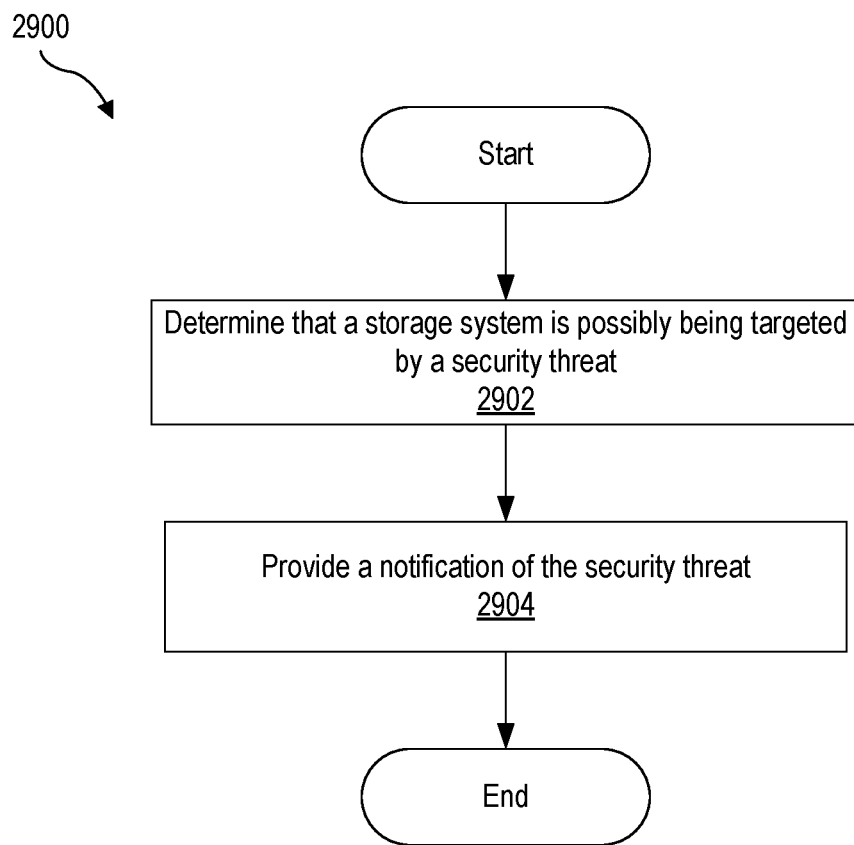

FIG. 29 shows an exemplary notification-based remedial action method 2900 that may be performed by system 400 and/or any implementation thereof. Method 2900 may be used alone or in combination with any of the other remedial action methods described herein.

At operation 2902, system 400 determines that a storage system is possibly being targeted by a security threat. This may be performed in any of the ways described herein.

At operation 2904, system 400 provides a notification in response to the determination that the storage system is possibly being targeted by the security threat. The notification may be in any suitable format. For example, the notification may include a message (e.g., a text message and/or an email), a notification within a user interface used by a user (e.g., an administrator) to manage the storage system, a phone call, and/or any other suitable type of notification as may serve a particular implementation.

Figure 30:
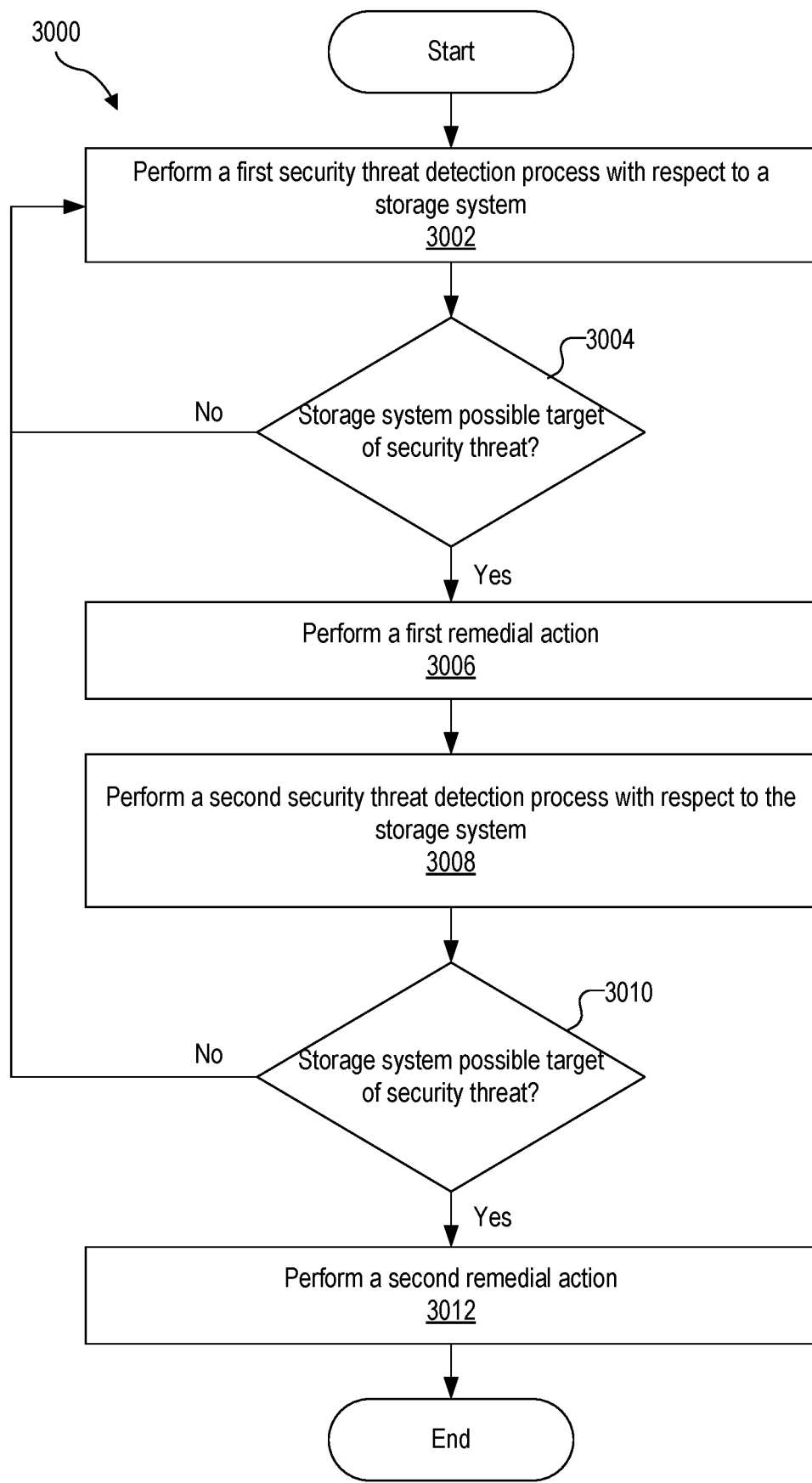

FIG. 30 shows an exemplary multi-level remedial action method 3000 that may be performed by system 400 and/or any implementation thereof. Method 3000 may be used alone or in combination with any of the other remedial action methods described herein.

At operation 3002, system 400 performs a first security threat detection process with respect to a storage system. The first security threat detection process may include any of the security threat detection processes described herein.

At decision 3004, system 400 determines, based on the first security threat detection process, whether the storage system is a possible target of a security threat. If system 400 determines that the storage system is not a possible target of security threat based on the first security threat detection process ("No" at decision 3004), system 400 continues to perform the first security threat detection process at operation 3002.

However, if system 400 determines, based on the first security threat detection process, that the storage system is a possible target of a security threat ("Yes" at decision 3004), system 400 may perform a first remedial action (operation 3006). The first remedial action may include any of the remedial actions described herein.

System 400 may also perform a second security threat detection process with respect to the storage system (operation 3008). The second security threat detection process may be configured to provide higher confidence threat detection than the first security threat detection process. Operations 3006 and 3008 may be performed concurrently or sequentially as may serve a particular implementation.

Based on the results of the second security threat detection process, system 400 may either confirm that the storage system is possibly being targeted by the security threat ("Yes" at decision 3010) or determine that the storage system is not being targeted by the security threat ("No" at decision 3010). if system 400 determines that the storage system is not being targeted by the security threat ("No" at decision 3010), system 400 may revert back to performing the first security threat detection process (which may require less resources to perform then the second security threat detection process). However, if system 400 confirms that the storage system is possibly being targeted by the security threat ("Yes" at decision 3010), system 400 may perform a second remedial action at operation 3012. The second remedial action may include any of the remedial actions described herein.

In some examples, the second remedial action is different than the first remedial action. For example, the first remedial action may include providing a notification to an administrator of the storage system that the storage system is possibly being targeted by a security threat. If the second security threat detection process confirms this, system 400 may perform a more comprehensive remedial action (the second remedial action), such as creating and/or locking down one or more recovery datasets that may be used to restore corrupted data to an uncorrupted state (such as with the authorization models described herein for ransomware protection snapshots).

Various ways in which the methods and systems of detecting a possible security threat against a storage system and taking one or more remedial actions in response to the security threat are now described.

In some examples, a cloud-based monitoring system implementation of system 400 may provide integrity checks to a storage system or a host that may be used to certify that the storage system or host is running normally and has not been compromised. This may be performed in any suitable manner.

Additionally or alternatively, system 400 may leverage write and deletion protected storage mechanisms to ensure availability of some number of ransomware/corruption protection snapshots, copies, or backups. These are also useful to support legal holds or other related operational purposes.

Additionally or alternatively, system 400 may provide minimum authorization requirements for policy changes (and possibly limits to how already locked down data can be affected by an authorized change in policy) that can be applied to the establishment or configuration of any policies, models, and/or processes described herein. Minimum authorization may require, for example, various combinations of authorization by authenticated operators, administrators, managers, a storage system's vendor, a storage system's selling partner, an AI entity that evaluates requests, etc. A policy may also stipulate a set of combinations that are allowed to change the policy. Allowed combinations may require, for example, at least a minimum number of managers as well as either multiple entities within the storage system vendor or multiple entities within a storage system's selling partner, as well as certification by at least two of several AI entities evaluating the change. Additionally or alternatively, an additional set of managers (and one or more CxO level authenticated users) may override one or more authorizing entities (e.g., a storage system seller or an AI engine) that would need to authorize a change with fewer managers or without CxCO level authorization from an authenticated CxO level user.

In some examples, duration times for recovery datasets or other time-related models described herein may not generally be based on clocks which are subject to external modification, such as time of day clocks. For example, time interval (or time since power-on) clocks can be used (which are often built into CPUs or other hardware) by system 400, with interval information being persisted periodically so a reboot or failover within a storage system can leverage prior known intervals to ensure that a minimum absolute time has passed since some time or event associated with a protection snapshot or other aspect of a particular model described herein. This may ensure that an external manipulation of time (such as by hijacking an NTP server on a network) cannot be used to speed up automatic deletion activities. Moreover, if system 400 identifies unusual discrepancies between interval-based time measurement and time-of-day clock times, system 400 may flag this as a potential indicator that the storage system is being targeted by a security threat.

In some examples, system 400 may facilitate replication of data (e.g., rule set data) between administrative authorities. This may provide an additional level of protection against inadvertent or malicious modification of such data.

In some examples, system 400 may direct a first storage system to store replication data in a second storage system with a separate implementation such as through the first storage system storing replicated data as files or objects in a second storage system, or otherwise using the second storage system's regular store operations, rather than through a protocol link between identically implemented storage systems. In this manner, bugs which may be used to attack one of the storage systems may be ineffective at attacking the other storage system.

In some examples, the protection methods and systems described herein may be layered in various ways to increase the robustness of the overall system in ensuring that uncorrupted data is available somewhere. For example, system 400 may provide for storing data into a separately implemented storage system under a separate administrative domain which itself keeps a set of snapshots or includes continuous data protection and which is monitored for corruption by a monitoring service. In this scenario, the primary storage system also includes snapshots or continuous data protection (or both) and is also monitored by the monitoring service.

Some cases of potential corruption or ransomware or other attacks may not be detected by automated software but may be noticed or anticipated by humans. For example, a manager or human resources person may have concerns about a disgruntled employee, or someone in information technology may notice some behaviors that do not make sense. In such cases, a user may provide a user input command for system 400 to direct a storage system to create provisional or locked down ransomware/corruption protection snapshots that may otherwise have been created by policy or by software. In a continuous data protection store, this may result in a set of backward looking locked-down snapshots and recover points, as well. This may also result in a temporary change, with lesser authorization requirements, to increase the rate of creating protection snapshots or to increase the time limits in policies before they can be deleted.

In addition to support for human operators, an API may also be provided by system 400 for creation of ransomware/ corruption protection snapshots or for locking down recent snapshots or for managing the creation of provisional protection snapshots (or any other type of provisional ransomware recovery structure) and their conversion to fully protected snapshots. Then, for example, additional security software such as network or server traffic monitors, or software interacting with software threat analyzer services, may also trigger creation and management of combinations of creation of ransomware/corruption protection snapshots, provisional protection snapshots, and conversions of provisional protection snapshots into full protection snapshots. Such an API may also trigger increases in time limits before protection snapshots can be deleted.

In some examples, a storage system may require certification from a certain number of monitoring services or monitoring service endpoints (such as at least two, or a majority of several such services or endpoints) for the storage system to delete discretionary ransomware protection snapshots and checkpoints or to alter their policy to reduce the period of time they will be retained or to alter the period of time or the amount of activity needed to determine that the provisional detection does or does not rise to the level that the discretionary snapshots will be automatically released or will automatically be converted into full ransomware protection snapshots.

Figure 31:
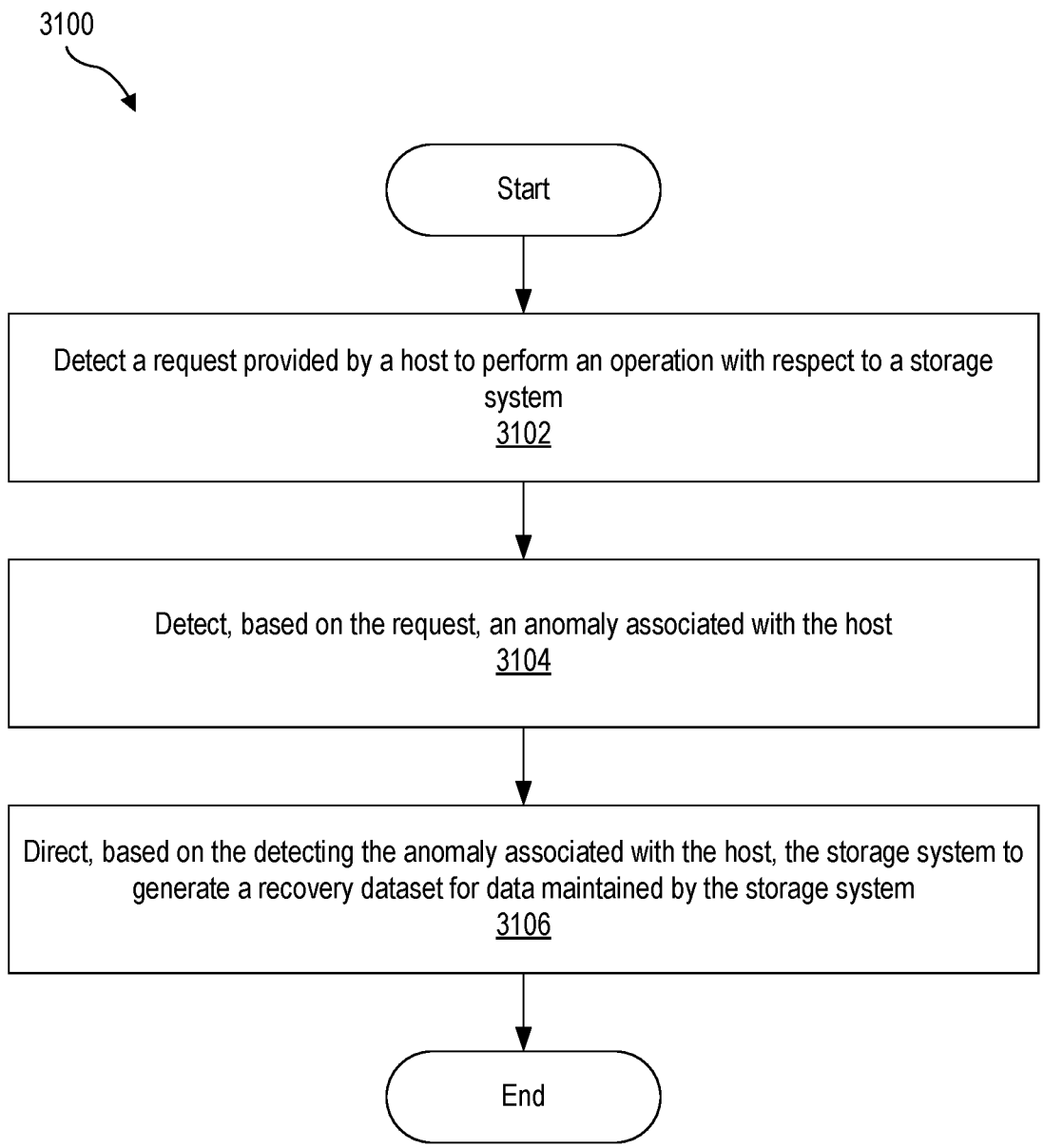

FIG. 31 shows an exemplary method 3100 that may be performed by system 400 and/or any implementation thereof. Method 3100 may be used alone or in combination with other methods described herein.

At operation 3102, system 400 may detect a request provided by a host to perform an operation with respect to a storage system. The request may include a request for the host to attach to a volume of the storage system, a request to provision, delete, or otherwise modify a volume of the storage system, a request to write data to the storage system, a request to read data stored by the storage system, a request to modify or delete data (e.g., one or more data instances, one or more recovery datasets, etc.) stored by the storage system, a request to perform an administrative operation with respect to the storage system (e.g., a web user interface request, a request associated with an API token, etc.) and/or any other type of request to perform any type of operation with respect to the storage system (e.g., a request to modify one or more permissions, owners, accessors (e.g., hosts or network addresses that can access the storage system), and/or any other access control attribute associated with the storage system). Illustrative access control attributes that may be modified include administrative accesses from source network addresses or from authenticated users (such as through user interface or APIs) as well as client host storage access interfaces.

The host that provides the request may include any suitable system, device, script, or entity as may serve a particular implementation. In some examples, the host may be malicious in that it attempts to perform malicious operations (e.g., operations associated with a ransomware attack) against data maintained by the storage system.

At operation 3104, system 400 may detect, based on the request, an anomaly associated with the host. This may be performed in any suitable manner.

For example, the request provided by the host may be for the host (or another host) to attach to a volume (or otherwise connect to a storage element of) of the storage system. However, a first host may already be attached to the volume at a time of the request. Accordingly, in this scenario, system 400 may detect an anomaly associated with the host by determining that the first host is already attached to the volume at the time of the request. Additionally or alternatively, system 400 may detect an anomaly associated with the host by determining that one or more hosts specifically identified by a blacklist or the like are already attached to the volume at the time of the request.

Additionally or alternatively, system 400 may detect an anomaly associated with the host (i.e., the host that is provided access as a result of the request) by determining that the host has not historically provided requests of a similar type as the request. For example, the request provided by host may be for the host to attach to a volume of the storage system. In this scenario, system 400 may detect an anomaly associated with the host by determining that the host has not previously provided any requests to attach to the volume (or to any other volume of the storage system). Alternatively, system 400 may detect an anomaly associated with the host by determining that the last time the host provided a request to attach to the host was more than a predetermined amount of time prior to receiving the current request. Additionally or alternatively, system 400 may detect an anomaly associated with the host by determining that the host has not previously provided requests of any kind to perform one or more operations with respect to the storage system.

Additionally or alternatively, system 400 may detect an anomaly associated with the host by determining that the host is associated with an Internet protocol (IP) address that has not been previously used to perform an operation with respect to the storage system. This may be performed in any suitable manner.

Additionally or alternatively, system 400 may detect an anomaly associated with the host by determining that a round-trip time from an Internet protocol (IP) address associated with the request exceeds a predetermined threshold. Such a condition may be indicative of a possible alternate geography attack or any other attack that involves an unusual request source and/or an unusual network path for the request. The round-trip time may be determined in any suitable manner.

Additionally or alternatively, system 400 may detect an anomaly associated with the host by identifying any other attribute of the host and determining, based on the attribute, that the host is possibly associated with a security threat against data maintained by the storage system.

At operation 3106, system 400 may direct, based on detecting the anomaly associated with the host, the storage system to generate a recovery dataset for data maintained by the storage system and/or perform one or more other remedial actions (e.g., blocking one or more requests provided by the host, etc. The recovery dataset may be similar to any of the recovery datasets described herein. In some examples, system 400 may direct the storage system to generate the recovery dataset prior to performing the operation that is the subject of the request.

As described herein, the recovery dataset may be subsequently used to perform a data recovery process with respect to data maintained by the storage system if system 400, or IT staff using system 400, determines that the data maintained by the storage system had been subjected to a security threat (e.g., a ransomware attack or other data corruption event) that may have corrupted or deleted data.

In some examples, in response to detecting the anomaly associated with the host, system 400 may perform further analysis to determine whether the anomaly is indicative of a security threat against the data maintained by the storage system. Such analysis may be performed in any of the ways described herein. If system 400 determines that the anomaly is not indicative of a security threat against the data maintained by the storage system, system 400 may delete (or direct the storage system to delete) one or more recovery datasets (e.g., the recovery dataset generated at operation 3106).

In contrast, in some examples, the recovery dataset generated at operation 3106 may be initially classified as a provisional recovery dataset that has a first set of criteria that has to be met for the recovery dataset to be deleted. In these examples, if system 400 determines that the anomaly is indicative of a possible security threat against the data maintained by the storage system, system 400 may reclassify the recovery dataset as a protected recovery dataset.

As used herein, a protected recovery dataset may have a second set of criteria that has to be met for the protected recovery dataset to be deleted, the second set of criteria more stringent than the first set of criteria associated with the provisional recovery dataset. For example, a provisional recovery dataset may be deleted automatically by the storage system in response to system 400 determining that the storage system is not being targeted by a security threat, while a protected recovery dataset may require additional criteria to be met (e.g., authorization from one or more authorized personnel) before the protected recovery dataset may be deleted.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
    detecting, by a data protection system, a request provided by a host to perform an operation with respect to a storage system, wherein the request is for the host to attach to a volume of the storage system;
    detecting, by the data protection system based on the request, an anomaly associated with the host, the detecting the anomaly comprising determining that an additional host is already attached to the volume at a time of the request;
    directing, by the data protection system based on the detecting the anomaly associated with the host, the storage system to generate a recovery dataset for data maintained by the storage system; and
    using, by the data protection system, the recovery dataset to perform a data recovery process with respect to the data maintained by the storage system.

2. The method of claim 1, wherein the detecting the anomaly associated with the host further comprises determining that the host has not historically provided requests of a similar type as the request.

3. The method of claim 1, wherein the detecting the anomaly associated with the host further comprises determining that the host is associated with an Internet protocol (IP) address that has not been previously used to perform an operation with respect to the storage system.

4. The method of claim 1, wherein the detecting the anomaly associated with the host further comprises determining that the host has not previously provided requests to perform one or more operations with respect to the storage system.

5. The method of claim 1, wherein the detecting the anomaly associated with the host further comprises determining that a round-trip time from an Internet protocol (IP) address associated with the request exceeds a predetermined threshold.

6. The method of claim 1, further comprising:
    the recovery dataset is initially classified as a provisional recovery dataset that has a first set of criteria that has to be met for the recovery dataset to be deleted; and
    the method further comprises:
        determining, by the data protection system, that the anomaly is indicative of a possible security threat against the data maintained by the storage system; and
        reclassifying, by the data protection system that the anomaly is indicative of the security threat, the recovery dataset as a protected recovery dataset, the protected recovery dataset having a second set of criteria that has to be met for the recovery dataset to be deleted, the second set of criteria more stringent than the first set of criteria.

7. The method of claim 1, wherein the directing the storage system to generate the recovery dataset comprises directing the storage system to generate the recovery dataset prior to performing the operation.

8. A system comprising:
    a memory storing instructions; and
    a processor communicatively coupled to the memory and configured to execute the instructions to:
        detect a request provided by a host to perform an operation with respect to a storage system, wherein the request is for the host to attach to a volume of the storage system;
        detect, based on the request, an anomaly associated with the host, the detecting the anomaly comprising determining that an additional host is already attached to the volume at a time of the request; and
        direct, based on the detecting the anomaly associated with the host, the storage system to generate a recovery dataset for data maintained by the storage system; and
        use the recovery dataset to perform a data recovery process with respect to the data maintained by the storage system.

9. The system of claim 8, wherein the detecting the anomaly associated with the host further comprises determining that the host has not historically provided requests of a similar type as the request.

10. The system of claim 8, wherein the detecting the anomaly associated with the host further comprises determining that the host is associated with an Internet protocol (IP) address that has not been previously used to perform an operation with respect to the storage system.

11. The system of claim 8, wherein the detecting the anomaly associated with the host further comprises determining that the host has not previously provided requests to perform one or more operations with respect to the storage system.

12. The system of claim 8, wherein the detecting the anomaly associated with the host further comprises determining that a round-trip time from an Internet protocol (IP) address associated with the request exceeds a predetermined threshold.

13. The system of claim 8, wherein:
    the recovery dataset is initially classified as a provisional recovery dataset that has a first set of criteria that has to be met for the recovery dataset to be deleted; and the processor is further configured to execute the instructions to:
 determine that the anomaly is indicative of a possible security threat against the data maintained by the storage system; and
 reclassify, based on the determining that the anomaly is indicative of the security threat, the recovery dataset as a protected recovery dataset, the protected recovery dataset having a second set of criteria that has to be met for the recovery dataset to be deleted, the second set of criteria more stringent than the first set of criteria.

14. The system of claim 8, wherein the processor is further configured to execute the instructions to use the recovery dataset to perform a data recovery process with respect to the data maintained by the storage system.

15. A non-transitory computer-readable medium storing instructions that, when executed, direct a processor of a computing device to:
 detect a request provided by a host to perform an operation with respect to a storage system, wherein the request is for the host to attach to a volume of the storage system;
 detect, based on the request, an anomaly associated with the host, the detecting the anomaly comprising determining that an additional host is already attached to the volume at a time of the request;
 direct, based on the detecting the anomaly associated with the host, the storage system to generate a recovery dataset for data maintained by the storage system; and
 use the recovery dataset to perform a data recovery process with respect to the data maintained by the storage system.

16. The non-transitory computer-readable medium of claim 15, wherein the detecting the anomaly associated with the host further comprises determining that the host has not historically provided requests of a similar type as the request.

17. The non-transitory computer-readable medium of claim 15, wherein the detecting the anomaly associated with the host further comprises determining that the host is associated with an Internet protocol (IP) address that has not been previously used to perform an operation with respect to the storage system.

18. The non-transitory computer-readable medium of claim 15, wherein the detecting the anomaly associated with the host further comprises determining that the host has not previously provided requests to perform one or more operations with respect to the storage system.

19. The non-transitory computer-readable medium of claim 15, wherein the detecting the anomaly associated with the host further comprises determining that a round-trip time from an Internet protocol (IP) address associated with the request exceeds a predetermined threshold.

20. The non-transitory computer-readable medium of claim 15, wherein the directing the storage system to generate the recovery dataset comprises directing the storage system to generate the recovery dataset prior to performing the operation.

* * * * *